US011247912B2

(12) United States Patent
Enomura et al.

(10) Patent No.: US 11,247,912 B2
(45) Date of Patent: Feb. 15, 2022

(54) METHOD FOR PRODUCING OXIDE PARTICLES WITH CONTROLLED COLOR CHARACTERISTICS

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 257 days.

(21) Appl. No.: 16/306,225

(22) PCT Filed: Jun. 2, 2017

(86) PCT No.: PCT/JP2017/020727
§ 371 (c)(1),
(2) Date: Nov. 30, 2018

(87) PCT Pub. No.: WO2017/209306
PCT Pub. Date: Dec. 7, 2017

(65) Prior Publication Data
US 2019/0211209 A1 Jul. 11, 2019

(30) Foreign Application Priority Data

Jun. 2, 2016 (JP) .............................. JP2016-111346
Jun. 3, 2016 (WO) .................. PCT/JP2016/066542
(Continued)

(51) Int. Cl.
*C01F 17/235* (2020.01)
*C01G 49/06* (2006.01)
(Continued)

(52) U.S. Cl.
CPC .......... *C01F 17/235* (2020.01); *B22F 1/0018* (2013.01); *B22F 1/0062* (2013.01);
(Continued)

(58) Field of Classification Search
None
See application file for complete search history.

(56) References Cited

U.S. PATENT DOCUMENTS 6,235,270 B1 5/2001 Ishii et al.
6,534,044 B1 3/2003 Wada et al.
(Continued)

FOREIGN PATENT DOCUMENTS

DE 10 2004 004 147 A1 8/2005
EP 0 988 853 A1 3/2000
(Continued)

OTHER PUBLICATIONS

Extended European Search Report dated Oct. 31, 2019, for European Application No. 17806856.5.
(Continued)

*Primary Examiner* — Colin W. Slifka
(74) *Attorney, Agent, or Firm* — Birch, Stewart, Kolasch & Birch, LLP

(57) ABSTRACT

With an aim to provide a method for producing an oxide particle with controlled color characteristics and also provide an oxide particle with controlled color characteristics, the present invention provides a method for producing an oxide particle, wherein the color characteristics of the oxide particle are controlled by controlling a ratio of an M-OH bond between an element (M) and a hydroxide group (OH) or an M-OH bond/M-O bond ratio, where the element (M) is one element or plural different elements other than oxygen or hydrogen included in the oxide particle selected from metal oxide particles and semi-metal oxide particles.
(Continued)

According to the present invention, by controlling the M-OH bond or the M-OH bond/M-O bond ratio of the metal oxide particle or the semi-metal oxide particle, the oxide particle with controlled color characteristics of any of reflectance, transmittance, molar absorption coefficient, hue, and saturation can be provided.

18 Claims, 70 Drawing Sheets

(30) Foreign Application Priority Data

| Nov. 7, 2016 | (WO) | .................. PCT/JP2016/083001 |
|---|---|---|
| Feb. 2, 2017 | (WO) | .................. PCT/JP2017/003876 |

(51) Int. Cl.

| C01G 9/02 | (2006.01) |
|---|---|
| C09C 1/24 | (2006.01) |
| C01B 33/02 | (2006.01) |
| C01B 33/32 | (2006.01) |
| C01G 53/00 | (2006.01) |
| C09C 3/06 | (2006.01) |
| C01B 13/14 | (2006.01) |
| C01F 17/206 | (2020.01) |
| C01G 49/02 | (2006.01) |
| C09D 7/62 | (2018.01) |
| C09C 1/04 | (2006.01) |
| B22F 1/00 | (2006.01) |
| C09C 3/12 | (2006.01) |
| C01G 23/04 | (2006.01) |

(52) U.S. Cl.
CPC ............ *C01B 13/14* (2013.01); *C01B 13/145* (2013.01); *C01B 33/02* (2013.01); *C01B 33/325* (2013.01); *C01F 17/206* (2020.01); *C01G 9/02* (2013.01); *C01G 49/02* (2013.01); *C01G 49/06* (2013.01); *C01G 53/006* (2013.01); *C09C 1/043* (2013.01); *C09C 1/24* (2013.01); *C09C 3/06* (2013.01); *C09C 3/063* (2013.01); *C09C 3/12* (2013.01); *C09D 7/62* (2018.01); *B22F 2301/10* (2013.01); *B22F 2301/15* (2013.01); *B22F 2301/255* (2013.01); *B22F 2302/256* (2013.01); *B22F 2304/054* (2013.01); *B22F 2304/056* (2013.01); *C01G 23/04* (2013.01); *C01P 2002/01* (2013.01); *C01P 2002/02* (2013.01); *C01P 2002/70* (2013.01); *C01P 2002/72* (2013.01); *C01P 2002/82* (2013.01); *C01P 2004/03* (2013.01); *C01P 2004/04* (2013.01); *C01P 2004/50* (2013.01); *C01P 2004/62* (2013.01); *C01P 2004/64* (2013.01); *C01P 2004/80* (2013.01); *C01P 2006/60* (2013.01); *C01P 2006/62* (2013.01); *C01P 2006/66* (2013.01); *C01P 2006/90* (2013.01)

(56) References Cited

U.S. PATENT DOCUMENTS

| 10,071,396 B2 | 9/2018 | Nakano et al. |
|---|---|---|
| 2002/0037262 A1 | 3/2002 | Tanaka et al. |
| 2005/0152828 A1* | 7/2005 | Aga .......................... C09C 1/40 423/594.2 |
| 2009/0186053 A1 | 7/2009 | Meyer et al. |
| 2010/0021712 A1 | 1/2010 | Katayama |
| 2010/0155310 A1 | 6/2010 | Enomura |
| 2010/0242793 A1 | 9/2010 | Greb et al. |
| 2014/0037519 A1 | 2/2014 | Kuraki et al. |
| 2015/0217332 A1 | 8/2015 | Fujii et al. |
| 2017/0226418 A1 | 8/2017 | Otsuka et al. |

FOREIGN PATENT DOCUMENTS

| EP | 2 860 226 A1 | 4/2015 |
|---|---|---|
| JP | 2008-260648 A | 10/2008 |
| JP | 2009-112892 A | 5/2009 |
| JP | 2009-263547 A | 11/2009 |
| JP | 2010-530448 A | 9/2010 |
| JP | 4868558 B1 | 2/2012 |
| JP | 2013-249393 A | 12/2013 |
| JP | 2014-42891 A | 3/2014 |
| JP | 2014-42892 A | 3/2014 |
| WO | WO 98/26011 A1 | 6/1998 |
| WO | WO 98/47476 A1 | 10/1998 |
| WO | WO 00/42112 A1 | 7/2000 |
| WO | WO 2008/129901 A1 | 10/2008 |
| WO | WO 2009/008393 A1 | 1/2009 |
| WO | WO 2012/147209 A1 | 11/2012 |
| WO | WO 2016/060223 A1 | 4/2016 |

OTHER PUBLICATIONS

Han et al., "Synthesis of Monodispersed and Spherical SiO$_2$-Coated Fe$_2$ O$_3$ Nanoparticle", Bull. Korean Chem. Soc., vol. 21, No. 12, 2000, pp. 1193-1198, 7 pages total.

International Search Report, issued in PCT/JP2017/020727, dated Jul. 11, 2017.

* cited by examiner

FIG. 44
(A)
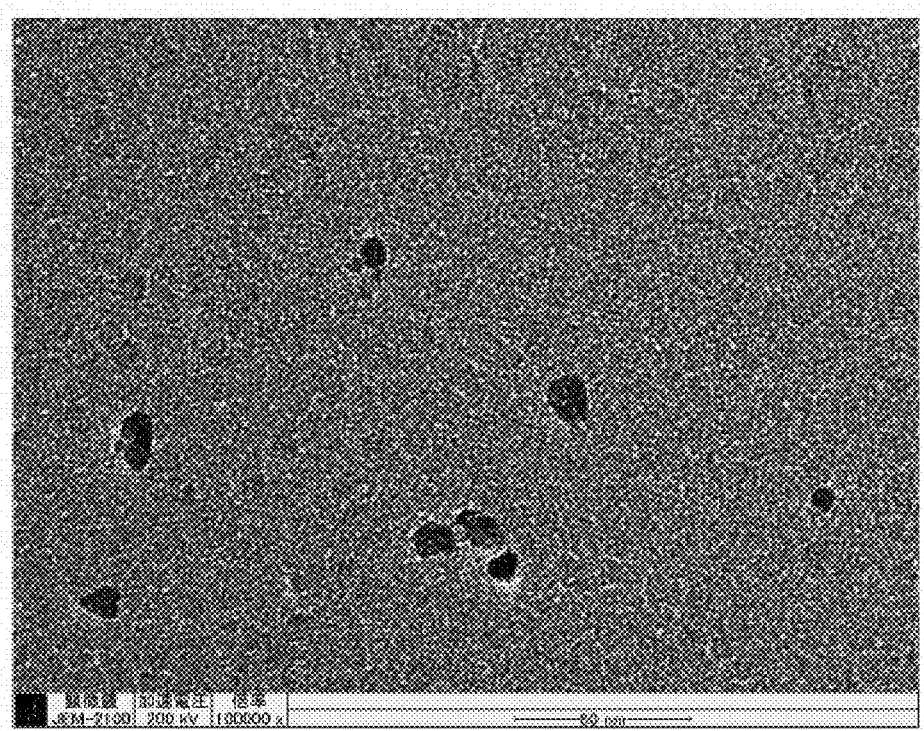
(B)
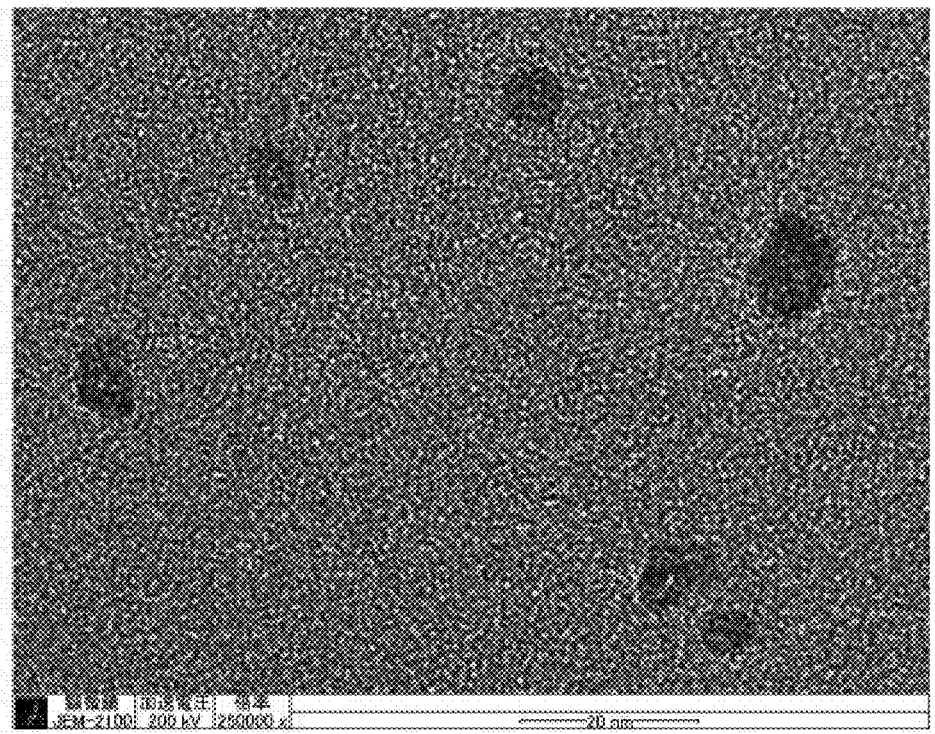

FIG. 53
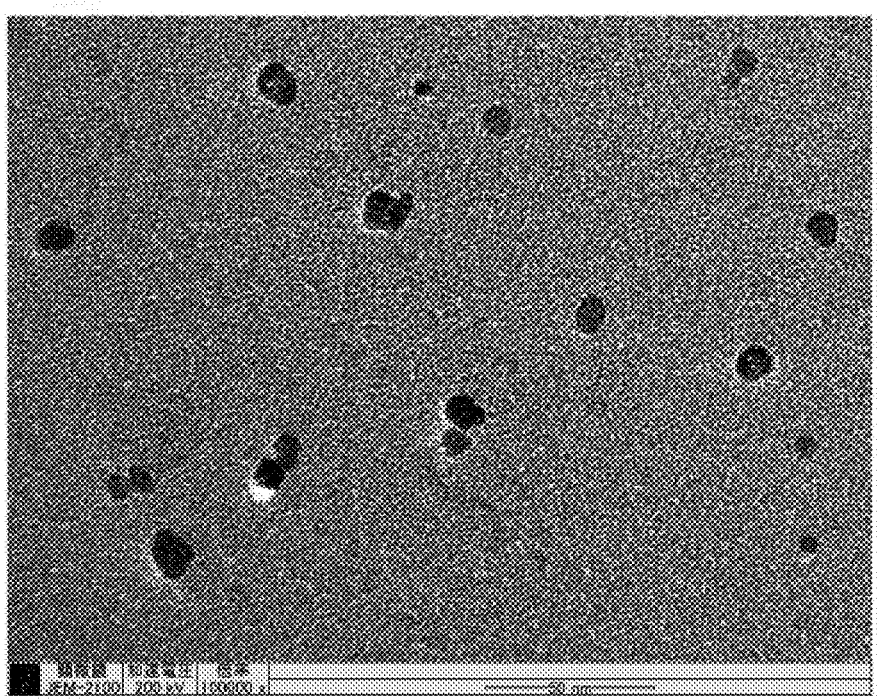
(A)
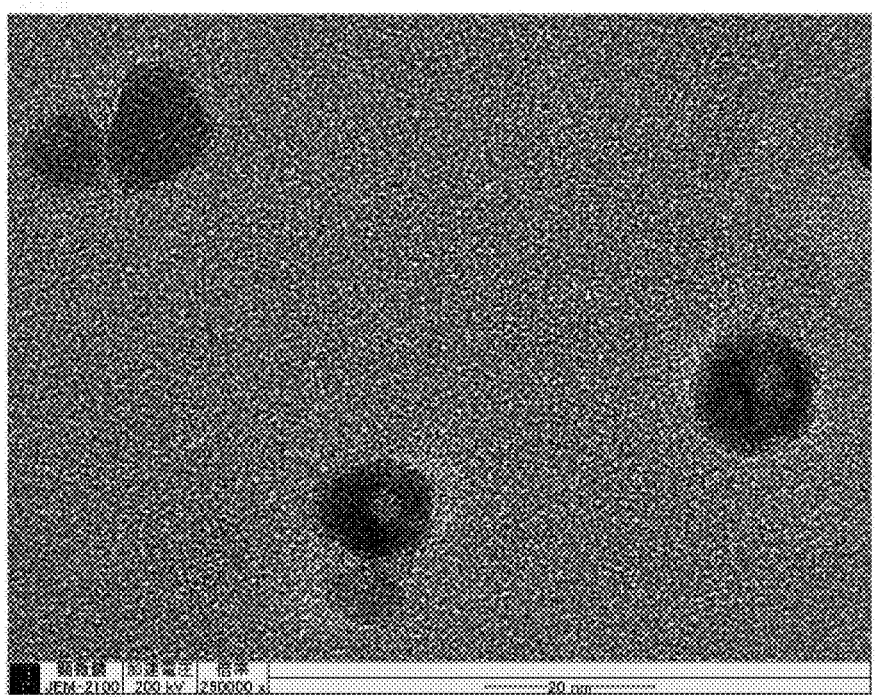
(B)

METHOD FOR PRODUCING OXIDE PARTICLES WITH CONTROLLED COLOR CHARACTERISTICS

TECHNICAL FIELD

The present invention relates to a method for producing an oxide particle with controlled color characteristics.

BACKGROUND ART

An oxide particle can change its characteristics such as UV-absorption characteristic and reflection characteristic of a near infrared beam by selecting a metal element or a semi-metal element included in the said oxide particle, so that it is the material used in a wide range of field such as a sun-screening agent, a lip stick, and a foundation in the cosmetic field, an outer wall and a signboard in a construction material field, as well as in a coating material of a vehicle, a glass, etc., wherein when this is used for a purpose to apply to a human body such as the cosmetic use, requirements to a beautiful appearance, a high quality feeling, and a safety are very high. When it is used in construction materials as well as in a coating material of an outer wall, a signboard, a vehicle, etc., requirements to a clear color and designability are also being increased so high.

Therefore, in order to improve the color characteristics, UV absorption characteristic, reflection characteristic of a near infrared beam, etc., many methods are provided, wherein illustrative example thereof includes the method in which oxides such as iron oxide and zinc oxide are made to microparticles (see, Patent Document 1 and Patent Document 2) and the method of composite oxidation in which an oxide is prepared with plural elements other than iron or zinc as the element to constitute the oxide other than oxygen (see, Patent Document 3 and Patent Document 4).

However, even if the transparency of a microparticle dispersion can be improved by atomization, it is difficult to control the color characteristics such as reflectance, transmission and absorption characteristics, hue, and saturation. In addition, in making the composite oxide, the characteristics of the oxide significantly change depending on the metal to be used for; and thus, it is difficult to control especially the color characteristics. Accordingly, it has been difficult to finely and precisely control the characteristics in the oxide particle.

In Patent Document 5, a silica-coated metal oxide particle whose surface is further treated with a hydrophobicity-affording agent such as dimethyl ethoxy silane is described; however, the particle is merely treated with the hydrophobicity-affording agent in order to enhance a dispersion property to an oily dispersion medium such as polyglycerin triisostearate, silicone oil, squalene, or the like for the use as the cosmetics. Meanwhile, in Patent Document 5, it is described that the peak observed in the region of 1150 $cm^{-1}$ to 1250 $cm^{-1}$ in the infrared absorption spectrum thereof is due to the absorption of the deformation vibration of Si—OH; however, this should be usually attributed to the Si—OH bond, so that the description of this as Si—OH is apparently incorrect. Therefore, in Patent Document 5, neither the amount of the Si—OH group included in the silica-coated metal oxide is controlled, nor is controlled the ratio of the M-OH bond to the M-O bond. Namely, in Patent Document 5, too, the oxide particle having the color characteristics thereof controlled was not disclosed.

In Patent Document 6 and Patent Document 7 which disclosed the inventions by the present applicant, the method is described in which uniform oxide nanoparticles are produced by using the method to separate various nanoparticles such as iron oxide in between processing surfaces which are disposed so as to be able to approach to and separate from each other as well as to rotate relative to each other. However, Patent Document 6 describes the method to separately produce an oxide and a hydroxide, and Patent Document 7 describes the method to produce a uniform oxide; therefore, the production method of the oxide having the color characteristics thereof controlled was not described.

PRIOR ART DOCUMENTS

Patent Documents

Patent Document 1: Japanese Patent Laid-Open Publication No. 2009-263547
Patent Document 2: International Patent Laid-Open Publication No. 1998/026011
Patent Document 3: Japanese Patent Application Publication No. 2010-530448
Patent Document 4: Japanese Patent Laid-Open Publication No. 2013-249393
Patent Document 5: International Patent Laid-Open Publication No. 2000/42112
Patent Document 6: Japanese Patent No. 4868558
Patent Document 7: International Patent Laid-Open Publication No. 2009/008393

DISCLOSURE OF INVENTION

Problems to be Solved by the Invention

Under the circumstance as mentioned above, the present invention has an object to provide a method for producing an oxide particle with controlled color characteristics. Under the circumstance as mentioned above, in the present invention, the problem to be solved is to provide an oxide particle which can be stably supplied with a low energy and a low resource consumption, or a method for producing the oxide particle. Because a regular arrangement of atoms is interrupted on a surface of an oxide particle, the atoms present on the oxide particle surface are very reactive so that they often react with a suitable substance which is present nearby to form a surface compound. Especially in the case of very small particle with the size of 100 nm or less, effects of the surface atom is so large and eminent that the precise control thereof is necessary. In order to maximize the characteristics expected from control of the surface compound of the oxide particle as well as to supplement such characteristics, the other problem to be solved is to control the amount of a hydroxide group included in the oxide or the ratio of the amount of a hydroxide group so as to control the color characteristics. The present invention is to utilize the fact that a M-OH bond or a M-OH bond/M-O bond ratio included in the oxide changes the ratio and the form thereof in accordance with a production method and an environmental change after the production thereof. Other problem to be solved is to control the reflectance in the near infrared region of 780 nm to 2500 nm. Further, other problem to be solved is to control reflectance, transmittance, hue, or saturation in the visible wavelength range of 380 nm to 780 nm. Further, other problem to be solved is to control reflectance or a molar absorption coefficient in the UV range of 190 nm to 380 nm. Inventors of the presently applied invention found the relationship of the M-OH bond ratio or the M-OH bond/M-O bond ratio included in the oxide particle with transmission characteristic, absorption characteristic, reflection characteristic, hue, or saturation of the oxide particle such as an iron oxide particle, a zinc oxide particle, a cerium oxide particle, and a cobalt zinc composite oxide particle, whereby they found that the color characteristics of the oxide particle can be improved by controlling the M-OH bond ratio or the M-OH bond/M-O bond ratio included in the oxide particle. The present invention could be completed by these findings. In addition, under the circumstance as mentioned above, other problem to be solved in the present invention is to provide a coating composition or a film-like composition containing the oxide particle having the color characteristics thereof controlled.

Means for Solving the Problems

Inventors of the presently applied invention found that an M-OH bond ratio or an M-OH bond/M-O bond ratio included in a metal oxide particle or a semi-metal oxide particle (hereinafter, these are sometimes collectively referred to as "oxide particle") has a relationship with color characteristics of the oxide particle, such as transmission characteristic, absorption characteristic, reflection characteristic, hue, or saturation; and on the basis of these findings, the present invention could be completed.

Namely, the present invention relates to a method for producing an oxide particle, wherein color characteristics of the oxide particle are controlled by controlling a ratio of an M-OH bond which is a bond between an element (M) and a hydroxide group (OH), where the element (M) is one element or plural different elements other than oxygen or hydrogen included in the oxide particle selected from metal oxide particles and semi-metal oxide particles.

Also, the present invention relates to a method for producing an oxide particle, wherein color characteristics of the oxide particle are controlled by controlling an M-OH bond/M-O bond ratio, which is a ratio of an M-OH bond between an element (M) and a hydroxide group (OH) to a ratio of an M-O bond between the element (M) and oxygen (O), where the element (M) is one element or plural different elements other than oxygen or hydrogen included in the oxide particle selected from metal oxide particles and semi-metal oxide particles.

Also, in the present invention, the M-OH bond ratio is preferably a ratio of an area of peaks derived from the M-OH bond separated in wave shapes in a wave number range of 800 $cm^{-1}$ to 1250 $cm^{-1}$ to a total area of peaks obtained by wave shape separation of peaks in a wave number range of 100 $cm^{-1}$ to 1250 $cm^{-1}$ in an infrared spectrum of the oxide particle measured with a total reflection method (ATR method).

Also, in the present invention, it is preferable to control the color characteristics by controlling the M-OH bond/M-O bond ratio, which is the area ratio of the M-OH bond to the area ratio of the M-O bond, wherein the M-O bond ratio is an area ratio of peaks derived from a Si—O bond separated in wave shapes in a wave number range of 100 $cm^{-1}$ more to less than 800 $cm^{-1}$ obtained by wave shape separation of peaks in a wave number range of 100 $cm^{-1}$ to 1250 $cm^{-1}$ in an infrared spectrum of the silicon compound-coated metal fine particle measured with a total reflection method (ATR method), the M-OH bond ratio is an area ratio of peaks derived from the M-OH bond separated in wave shapes in a wave number range of 800 $cm^{-1}$ to 1250 $cm^{-1}$.

Also, in the present invention, the color characteristics are preferably any of reflectance, transmittance, molar absorption coefficient, hue, or saturation.

Also, in the present invention, the M-OH bond ratio or the M-OH bond/M-O bond ratio included in the oxide particle is preferably controlled by a changing treatment of a functional group included in the oxide particle.

Also, in the present invention, the changing treatment of the functional group is preferably any of a substitution reaction, an addition reaction, an elimination reaction, a dehydration reaction, a condensation reaction, or an oxidation reaction.

Also, in the present invention, the changing treatment of the functional group is preferably an esterification treatment.

Also, in the present invention, the M-OH bond ratio or the M-OH bond/M-O bond ratio is controlled preferably under a state of a dispersion body in which the oxide particle is dispersed in a dispersion medium.

Also, in the present invention, the M-OH bond ratio or the M-OH bond/M-O bond ratio is controlled preferably by using a dispersion solution reformation apparatus equipped with a removal unit using a filtration membrane.

Also, in the present invention, it is preferable that the dispersion body be film-like, and that the color characteristics of the oxide particle be controlled by a heat treatment of the film-like dispersion body.

Also, in the present invention, the oxide particle is preferably an oxide particle in which at least part of a surface of a single oxide particle or of a surface of an agglomerate formed by agglomeration of plural oxide particles is coated with a silicon compound.

Also, in the present invention, a particle diameter of the oxide particle or the agglomerate of the oxide particles is preferably 1 nm or more and 50 nm or less.

Also, in the present invention, it is preferable that by controlling the M-OH bond ratio or the M-OH bond/M-O bond ratio to be low, an average reflectance to the light beam with the wavelength range of 780 nm to 2500 nm be controlled to be high.

Also, in the present invention, it is preferable that by controlling the M-OH bond ratio or the M-OH bond/M-O bond ratio to be low, an average molar absorption coefficient to the light beam with the wavelength range of 190 nm to 380 nm be controlled to be high.

Effects of the Invention

According to the present invention, the oxide particle wherein any of the color characteristics thereof including reflectance, transmittance, molar absorption coefficient, hue, or saturation is controlled by controlling an M-O bond ratio or an M-OH bond/M-O bond ratio included in a metal oxide particle or a semi-metal oxide particle could be provided. Because the color characteristics of the oxide particle can be strictly controlled by controlling the M-OH bond ratio or the M-OH bond/M-O bond ratio, the composition could be readily designed more accurately in the oxide particle for diversified uses as well as for an intended characteristic as compared with conventional methods.

Figure 1:
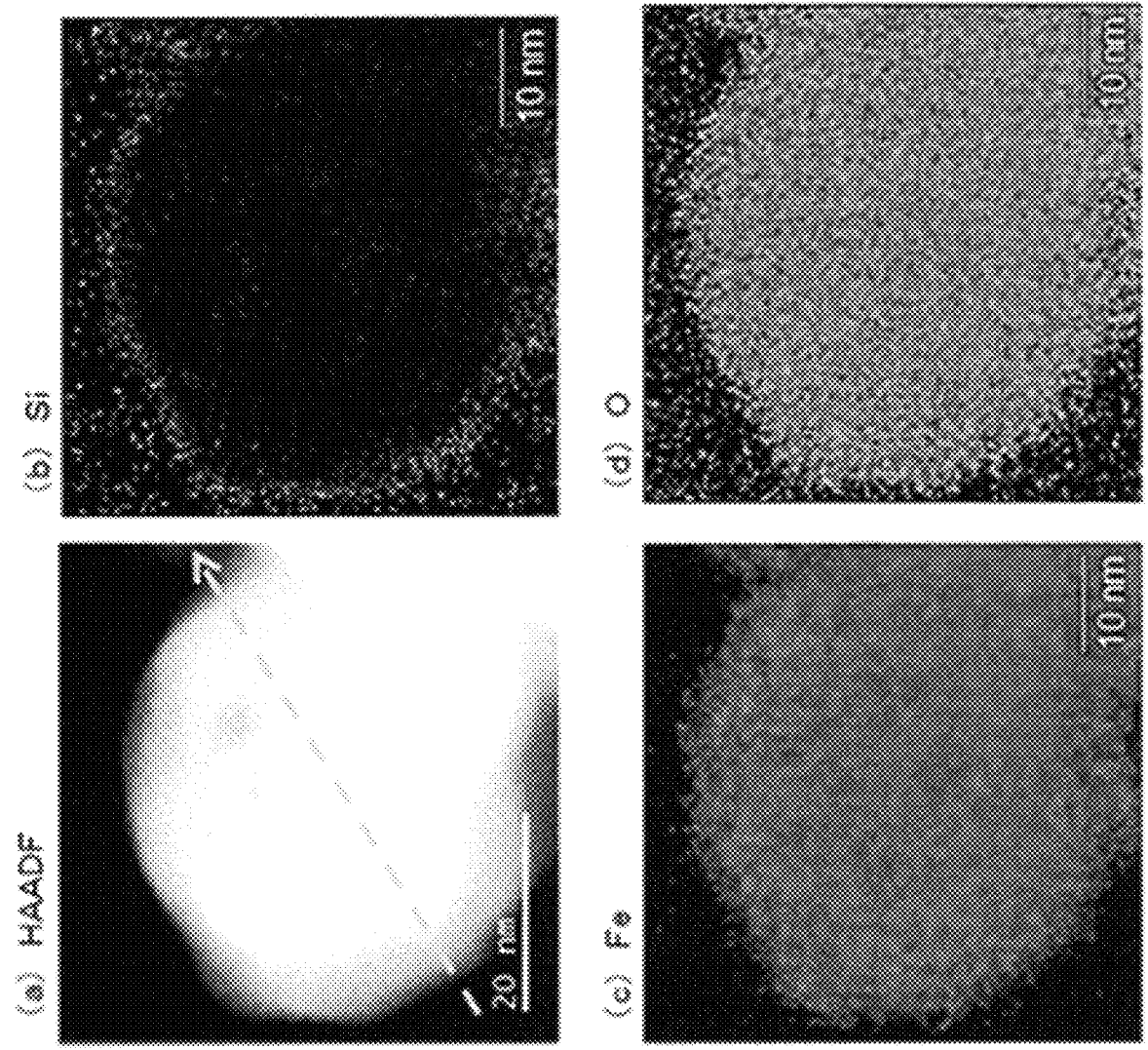
FIG. 1

This is the STEM mapping result of the silicon compound-coated iron oxide particle obtained in Example 1-5 of the present invention in which the surface of the iron oxide particle is coated with a silicon compound.

FIG. 2

This is the line analysis result of the silicon compound-coated iron oxide particle obtained in Example 1-5 of the present invention in which the surface of the iron oxide particle is coated with a silicon compound.

FIG. 3

This is the STEM mapping result of the silicon compound-coated iron oxide particle obtained in Example 1 of the present invention in which part of the surface of the iron oxide particle is coated with a silicon compound.

FIG. 4

This is the line analysis result of the silicon compound-coated iron oxide particle obtained in Example 1 of the present invention in which part of the surface of the iron oxide particle is coated with a silicon compound.

FIG. 5

This is the IR measurement results of the silicon compound-coated iron oxide particles obtained in Example 1 and Example 1-5 of the present invention.

FIG. 6

This is the separation result of the wave shapes in the wave number range of 100 cm$^{-1}$ to 1250 cm$^{-1}$ in the IR measurement result of the silicon compound-coated iron oxide particle obtained in Example 1 of the present invention.

FIG. 7

This is the separation result of the wave shapes in the wave number range of 100 cm$^{-1}$ to 1250 cm$^{-1}$ in the IR measurement result of the silicon compound-coated iron oxide particle obtained in Example 1-5 of the present invention.

FIG. 8

This is the XRD measurement result of the silicon compound-coated iron oxide particle obtained in Example 1-5 of the present invention.

FIG. 9

This is the measurement results of the reflection spectra to the light beam in the wavelength of 200 nm to 2500 nm in the silicon compound-coated iron oxide particles obtained in Examples of the present invention.

FIG. 10

This is the graph of the average reflectance to the light beam in the wavelength of 780 nm to 2500 nm to the M-OH bond/M-O bond ratio included in the silicon compound-coated iron oxide particles obtained in Examples of the present invention.

FIG. 11

This is the graph of the average reflectance to the light beam in the wavelength of 780 nm to 2500 nm to the M-OH bond/M-O bond ratio of the silicon compound-coated iron oxide particles obtained in Examples in which the aqueous dispersion solution of the silicon compound-coated iron oxide particles of the present invention are subjected to a heat treatment.

FIG. 12

This is the transmission spectra of the dispersion solutions in which the silicon compound-coated iron oxide particles obtained in Example 1 and Example 1-5 of the present invention and the iron oxide particle obtained in Example 4 are respectively dispersed into propylene glycol.

FIG. 13

This is the graph of the average reflectance to the light beam in the wavelength of 780 nm to 2500 nm to the M-OH bond/M-O bond ratio of the silicon compound-coated iron oxide particles obtained in Examples of the present invention.

FIG. 14

This is the graph of the maximum reflectance to the light beam in the wavelength of 400 nm to 620 nm to the M-OH bond/M-O bond ratio of the silicon compound-coated iron oxide particles obtained in Examples of the present invention.

FIG. 15

This is the graph of the average reflectance to the light beam in the wavelength of 620 nm to 750 nm to the M-OH bond/M-O bond of the silicon compound-coated iron oxide particles obtained in Examples of the present invention.

FIG. 16

This is the graph of the hue in the L*a*b* color system to the M-OH bond/M-O bond ratio of the silicon compound-coated iron oxide particles obtained in Examples of the present invention.

FIG. 17

This is the graph of the molar absorption coefficient of the dispersion solution in which the silicon compound-coated iron oxide particles obtained in Example 1 and Example 1-5 of the present invention are dispersed into propylene glycol and of the dispersion solution in which the iron oxide particle obtained in Example 4 is dispersed into propylene glycol.

FIG. 18

This is the graph of the average molar absorption coefficient to the light beam in the wavelength of 190 nm to 380 nm of the dispersion solution in which the silicon compound-coated iron oxide particles obtained in each of Examples 1, 1-3, 1-4, and 1-5 of the present invention are dispersed into propylene glycol to the M-OH bond/M-O bond ratio of the said silicon compound-coated iron oxide particle.

FIG. 19

This is the reflection spectra measurement results to the light beam in the wavelength of 200 nm to 2500 nm of the silicon compound-coated iron oxide particles obtained in Examples 1, Example 1-9, and Example 1-10 of the present invention.

FIG. 20

This is the IR spectrum measurement results of the silicon compound-coated iron oxide particles obtained in Example 1 and Example 1-9 of the present invention.

FIG. 21

This is the STEM mapping result of the silicon compound-coated zinc oxide particle obtained in Example 2 of the present invention in which the surface of the zinc oxide particle is coated with a silicon compound.

FIG. 22

This is the line analysis result of the silicon compound-coated zinc oxide particle obtained in Example 2 of the present invention in which the surface of the zinc oxide particle is coated with a silicon compound.

FIG. 23

This is the STEM mapping result of the silicon compound-coated zinc oxide particle obtained in Example 2-4 of the present invention in which part of the surface of the zinc oxide particle is coated with a silicon compound.

FIG. 24

This is the line analysis result of the silicon compound-coated zinc oxide particle obtained in Example 2-4 of the present invention in which part of the surface of the zinc oxide particle is coated with a silicon compound.

FIG. 25

This is the measurement results of the reflection spectra to the light beam in the wavelength of 200 nm to 2500 nm in the silicon compound-coated zinc oxide particle obtained in Examples of the present invention.

FIG. 26

This is the graph of the average reflectance to the light beam in the wavelength of 780 nm to 2500 nm to the M-OH bond/M-O bond ratio of the silicon compound-coated zinc oxide particles obtained in Examples of the present invention.

FIG. 27

This is the measurement result of the reflection spectra to the light beam in the wavelength of 200 nm to 780 nm to the M-OH bond/M-O bond ratio of the silicon compound-coated zinc oxide particles obtained in Examples of the present invention.

FIG. 28

This is the graph of the saturation in the L*a*b* color system to the M-OH bond/M-O bond ratio of the silicon compound-coated zinc oxide particles obtained in Examples of the present invention.

FIG. 29

This is the graph of the L*value in the L*a*b* color system to the M-OH bond/M-O bond ratio of the silicon compound-coated zinc oxide particles obtained in Examples of the present invention.

FIG. 30

This is the measurement result of the transmission spectra of the dispersion solutions in which the silicon compound-coated zinc oxide particles obtained in Examples 2, 2-2, 2-3, and 2-4 of the present invention and the zinc oxide particle obtained in Example 5 are dispersed into propylene glycol.

FIG. 31

This is the graph of the molar absorption coefficients of the dispersion solutions in which the silicon compound-coated zinc oxide particles obtained in Examples 2, 2-2, 2-3, and 2-4 of the present invention and the zinc oxide particle obtained in Example 5 are dispersed into propylene glycol.

FIG. 32

This is the TEM picture of the silicon compound-coated cerium oxide particle obtained in Example 3 of the present invention in which the surface of the cerium oxide particle is coated with the silicon compound.

FIG. 33

This is the graph of the molar absorption coefficients of the dispersion solutions in which the silicon compound-coated cerium oxide particle obtained in Examples 3 of the present invention and the cerium oxide particle obtained in Example 8 are dispersed into propylene glycol.

FIG. 34

This is a rough drawing of the apparatus used in the control method of the M-OH bond/M-O bond ratio of the oxide particle of the present invention.

FIG. 35

This is the XRD measurement result of the iron oxide particle obtained in Example 4 of the present invention.

FIG. 36

This is the IR measurement results of the iron oxide particles obtained in Example 4 and Example 4-4 of the present invention in the wave number range of 50 $cm^{-1}$ to 4000 $cm^{-1}$.

FIG. 37

This is the separation result of the wave shapes in the wave number range of 100 $cm^{-1}$ to 1250 $cm^{-1}$ in the IR measurement result of the iron oxide particle obtained in Example 4 of the present invention.

FIG. 38

This is the separation result of the wave shapes in the wave number range of 100 $cm^{-1}$ to 1250 $cm^{-1}$ in the IR measurement result of the iron oxide particle obtained in Example 4-4 of the present invention.

FIG. 39

This is the graph of the molar absorption coefficients of the dispersion bodies in which the iron oxide particles obtained in Example 4 and Examples 4-2 to 4-4 of the present invention are dispersed into propylene glycol, measured with the wavelength range of 190 nm to 780 nm.

FIG. 40

This is the graph of the average molar absorption coefficients to the light beam in the wavelength of 190 nm to 380 nm the M-OH bond/M-O bond ratio of the iron oxide particles obtained in Example 4 and Examples 4-2 to 4-4 of the present invention.

FIG. 41

This is the measurement results of the reflection spectra to the light beam in the wavelength of 200 nm to 2500 nm of the iron oxide particles obtained in Example 4 and Examples 4-2 to 4-4 of the present invention.

FIG. 42

This is the graph of the average reflectance to the light beam in the wavelength of 780 nm to 2500 nm to the M-OH bond/M-O bond ratio of the iron oxide particles obtained in Example 4 and Examples 4-2 to 4-4 of the present invention.

FIG. 43

This is the TEM picture of the zinc oxide particle obtained in Example 5 of the present invention.

FIG. 44

This is the TEM picture of the zinc oxide particle obtained in Example 5-4 of the present invention.

FIG. 45

This is the XRD measurement result of the zinc oxide particle obtained in Example 5 of the present invention.

FIG. 46

This is the IR measurement results of the zinc oxide particles obtained in Example 5 and Example 5-4 of the present invention in the wave number range of 50 $cm^{-1}$ to 4000 $cm^{-1}$.

FIG. 47

This is the separation result of the wave shapes in the wave number range of 100 $cm^{-1}$ to 1250 $cm^{-1}$ in the IR measurement result of the zinc oxide particle obtained in Example 5 of the present invention.

FIG. 48

This is the separation result of the wave shape in the wave number range of 100 $cm^{-1}$ to 1250 $cm^{-1}$ in the IR measurement result of the zinc oxide particle obtained in Example 5-2 of the present invention.

FIG. 49

This is the separation result of the wave shapes in the wave number range of 100 $cm^{-1}$ to 1250 $cm^{-1}$ in the IR measurement result of the zinc oxide particle obtained in Example 5-4 of the present invention.

FIG. 50

This is the graph of the molar absorption coefficients of the dispersion bodies in which the zinc oxide particles obtained in Example 5 and Examples 5-2 to 5-4 and Comparative Example 2-1 of the present invention are dispersed into propylene glycol, measured with the wavelength range of 200 nm to 780 nm.

FIG. 51

This is the measurement results of the reflection spectra to the light beam in the wavelength of 200 nm to 2500 nm of the zinc oxide particles obtained in Example 5 and Examples 5-2 to 5-4 of the present invention.

FIG. 52

This is the transmission spectra to the light beam in the wavelength of 200 nm to 780 nm in the dispersion bodies in which the zinc oxide particles obtained in Example 5 and Examples 5-2 to 5-4 of the present invention are dispersed into propylene glycol.

FIG. 53

This is the TEM picture of the zinc oxide particle obtained in Example 5-6 of the present invention.

FIG. 54

This is the IR measurement results of the zinc oxide particles obtained in Example 5 and Example 5-6 in the wave number range of 50 $cm^{-1}$ to 4000 $cm^{-1}$.

FIG. 55

This is the graph of the molar absorption coefficients of the dispersion bodies in which the zinc oxide particles obtained in Example 5 and Examples 5-5 to Example 5-7 and Comparative Example 2-1 of the present invention are dispersed into propylene glycol, measured with the wavelength range of 200 nm to 780 nm.

FIG. 56

This is the measurement results of the reflection spectra to the light beam in the wavelength of 200 nm to 2500 nm of the zinc oxide particle powders obtained in Example 5 and Example 5-5 to Example 5-7 of the present invention.

FIG. 57

This is the graph of the average reflectance to the light beam in the wavelength of 780 nm to 2500 nm to the M-OH bond/M-O bond ratio of the zinc oxide particle powders obtained in Example 5 and Example 5-5 to Example 5-7 of the present invention.

FIG. 58

This is the reflection spectra to the light beam in the wavelength of 200 nm to 780 nm of the zinc oxide particle powders obtained in Example 5 and Example 5-5 to Example 5-7 of the present invention.

FIG. 59

This is the TEM picture of the zinc oxide particle obtained in Comparative Example 2-1 of the present invention.

FIG. 60

This is the TEM picture of the zinc oxide particle obtained in Comparative Example 3-1 of the present invention.

FIG. 61

This is the TEM picture of the zinc oxide particle obtained in Comparative Example 3-2 of the present invention.

FIG. 62

This is the STEM mapping result of the cobalt zinc composite oxide particle obtained in Example 9 of the present invention.

FIG. 63

This is the line analysis result of the cobalt zinc composite oxide particle obtained in Example 9 of the present invention.

FIG. 64

This is the STEM mapping result of the cobalt zinc composite oxide particle obtained in Example 11 of the present invention.

FIG. 65

This is the line analysis result of the cobalt zinc composite oxide particle obtained in Example 11 of the present invention.

FIG. 66

This is the transmission spectra of the dispersion solutions in which the cobalt zinc composite oxide particles obtained in Example 9, Example 10, and Example 11 of the present invention are dispersed into propylene glycol.

FIG. 67

This is the reflection spectra of the cobalt zinc composite oxide particles obtained in Example 9 to Example 11 of the present invention.

FIG. 68

This is the STEM mapping result of the silicon cobalt zinc composite oxide particle obtained in Example 13 of the present invention.

FIG. 69

This is the line analysis result of the silicon cobalt zinc composite oxide particle obtained in Example 13 of the present invention.

FIG. 70

This is the refection spectra of the cobalt zinc composite oxide particles obtained in Example 9 to Example 11 of the present invention and of the silicon cobalt zinc composite oxide particles obtained in Example 12 to Example 14 of the present invention.

BEST MODE FOR CARRYING OUT THE INVENTION

Hereinafter, one example of the embodiments of the present invention will be explained on the basis of the drawings. Meanwhile, the aspect of the present invention is not limited to the embodiments described below.

(Oxide Particle)

The oxide particle relating to the present invention is the oxide particle whose color characteristic such as reflectance, transmittance, molar absorption coefficient, hue, or saturation is controlled by controlling the M-OH bond ratio or the M-OH bond/M-O bond ratio included in the oxide particle. When the oxide particle relating to the present invention is used in the composition for a coating film, a coating body, application to a skin of human body, or the like, or in the film-like composition for a glass or the like, not only designability, beautiful appearance, or texture is not impaired but also coloring can be effectively made, so that a coating composition or a film-like oxide composition which can be effectively used for a material to be coated can be provided.

Oxide Particle Embodiment 1

The oxide particle relating to the present invention is the oxide particle which is obtained by reaction, precipitation, separation, co-deposition, or the like, and includes a single element or a plurality of elements other than oxygen or hydrogen. With regard to the above-mentioned single element or plurality of elements other than oxygen or hydrogen, metal elements or semi-metal elements in the chemical periodic table are preferable. With regard to the semi-metal element in the present invention, semi-metal elements such as Si, Ge, As, Sb, Te, and Se may be cited as preferable examples, though not limited to them. The oxide particle may be formed of a single element of these metals and semi-metals, or alternatively, it may be a composite oxide particle formed of plural elements or formed of a metal element and a semi-metal element. In the case where the oxide particle including different elements is carried out, this may be carried out as the embodiment of the above-mentioned composite oxide particle, or alternatively, as described later, this may be carried out as the embodiment in which at least part of the surface of the oxide particle is coated with an oxide including an element which is different from the element other than oxygen included in the oxide particle.

Oxide Particle Embodiment 2

The oxide particle relating to the present invention is not limited to those only composed of an oxide. It may also be carried out as the embodiment in which a compound other than the oxide is included therein with the amount thereof to a degree not affecting the present invention. For example, it may be carried out not only as the oxide particle or the composite oxide particle having a compound other than these oxides included therein, but also as the oxide particle in which at least part of the surface thereof is coated with a compound other than the oxide. Illustrative example of the compound other than the oxide includes a hydroxide, a hydroxylated oxide, a nitride, a carbide, various salts such as a nitrate salt and a sulfate salt, a hydrate, and an organic solvate.

Oxide Particle Embodiment 3

Figure 2:
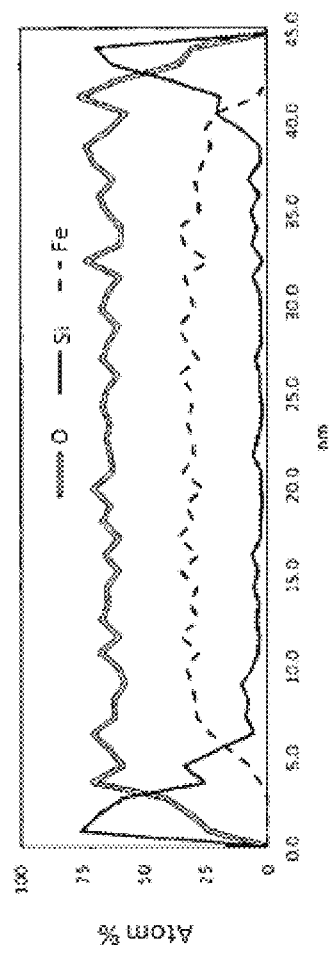
Figure 3:
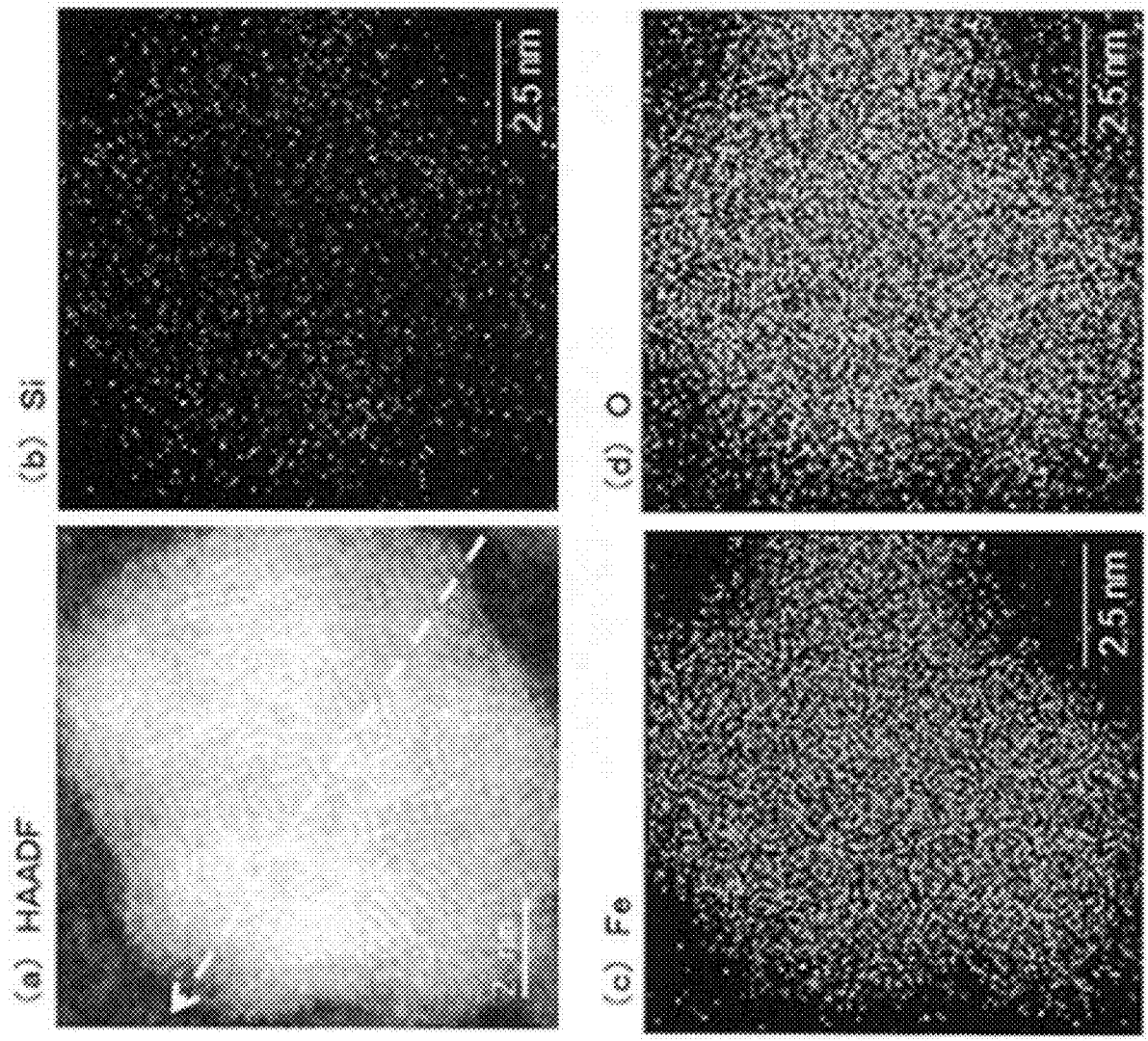
Figure 4:
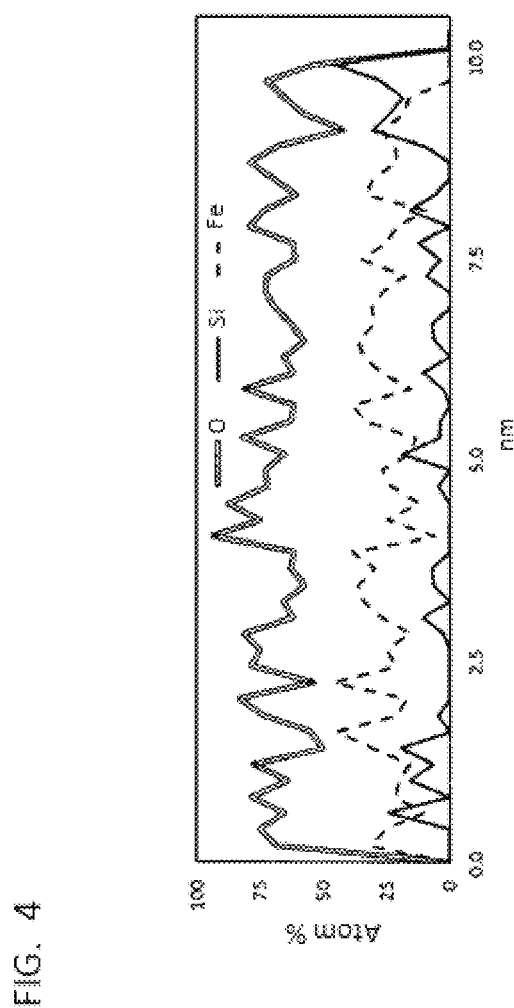

As one example of the oxide particle of the present invention, an iron oxide particle in which at least part of the surface of the oxide particle obtained in Example 1-5 to be described later is coated with a silicon oxide, which is one of silicon compounds, will be described. FIG. 1 is the mapping result using STEM of the silicon compound-coated iron oxide particle obtained in Example 1-5. FIG. 1 shows the mapping results of (a) a dark field image (HAADF image), (b) silicon (Si), (c) iron (Fe), and (d) oxygen (O), respectively. As can be seen in FIG. 1, iron and oxygen are detected in the entire particle, while silicon is detected mainly on the surface of the particle. FIG. 2 is the result of the line analysis of the HAADF image of FIG. 1 at the position of the dotted line, wherein the atom % (mol %) of the elements detected in the line portions from one edge to the other edge of the particle is shown. As can be seen in FIG. 2, oxygen and silicon are detected in the range to the both edges of the line analysis; on the other hand, iron is not detected to several nanometers inside from the edge of the particle. Therefore, it can be seen that the surface of the iron oxide is coated with a silicon oxide. In FIG. 3, the mapping result using STEM of the silicon compound-coated iron oxide particle obtained in Example 1 to be described later is shown; and in FIG. 4, the line analysis result of the HAADF image of FIG. 3 at the position of the dotted line is shown. As can be seen in FIG. 3 and FIG. 4, to contrary to the particle obtained in Example 1-5, the iron oxide particle obtained in Example 1 is not entirely with a silicon oxide, but it is the silicon compound-coated iron oxide particle in which part of the surface of the iron oxide particle is coated with a silicon oxide. Therefore, as one example of the oxide of the present invention, the embodiment may be carried out as the silicon compound-coated oxide particle in which at least part of the surface of the oxide particle is coated with a silicon compound.

(Explanation of the M-OH Bond-1)

Figure 5:
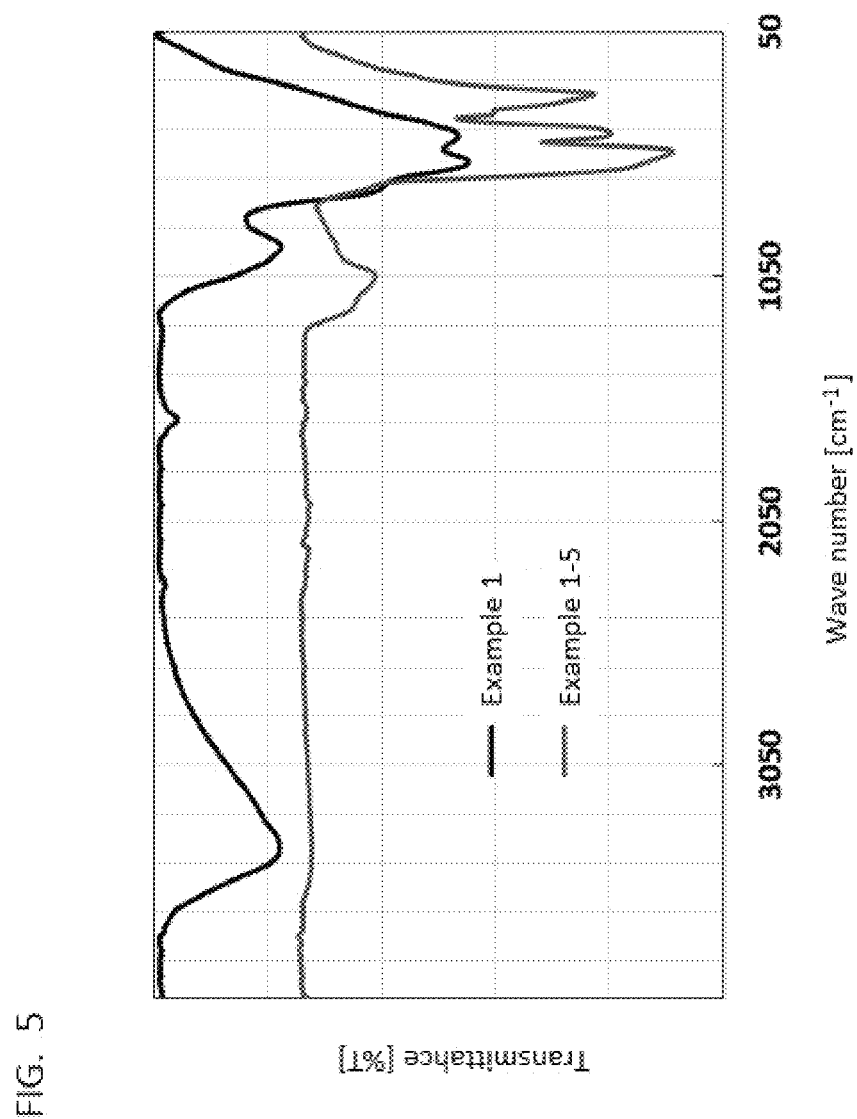

In FIG. 5, the FT-IR measurement results of the silicon compound-coated oxide particles obtained in Example 1 and Example 1-5, measured with a total reflection method (ATR method) (hereinafter, this is simply abbreviated as IR measurement), are shown. Meanwhile, IR is the abbreviation of the infrared absorption spectrometry. As compared with the IR measurement result of the silicon compound-coated oxide particle obtained in Example 1, the IR measurement result of the silicon compound-coated oxide particle obtained in Example 1-5 shows smaller broad peaks about 1650 $cm^{-1}$ and about 3400 $cm^{-1}$, and it appears that the broad peaks between about 800 $cm^{-1}$ and 1250 $cm^{-1}$ shift to a higher wavelength side. In the present invention, among these peaks, it is presumed that the peak about 3400 $cm^{-1}$ is the peak derived from a hydroxide group (—OH) including water, the peaks between about 800 $cm^{-1}$ and about 1250 $cm^{-1}$ include the peaks derived from the M-OH bond, and the peaks between about 100 $cm^{-1}$ and about 800 $cm^{-1}$ include the peaks derived from the M-O bond. In the present invention, various color characteristics are controlled by controlling the M-OH bond ratio or the M-OH bond/M-O bond ratio included in the oxide particle, wherein the M-OH bond ratio or the M-OH bond/M-O bond ratio can be determined, for example, by the IR measurement result. The M-OH bond ratio or the M-OH bond/M-O bond ratio may be measured with the methods other than the IR measurement as well, wherein illustrative example thereof includes an X-ray photoelectron spectroscopic method (XPS), a solid nuclear magnetic resonance method (solid NMR), and an electron energy loss spectroscopic method (EELS).

(Explanation of the M-OH Bond-2)

Figure 6:
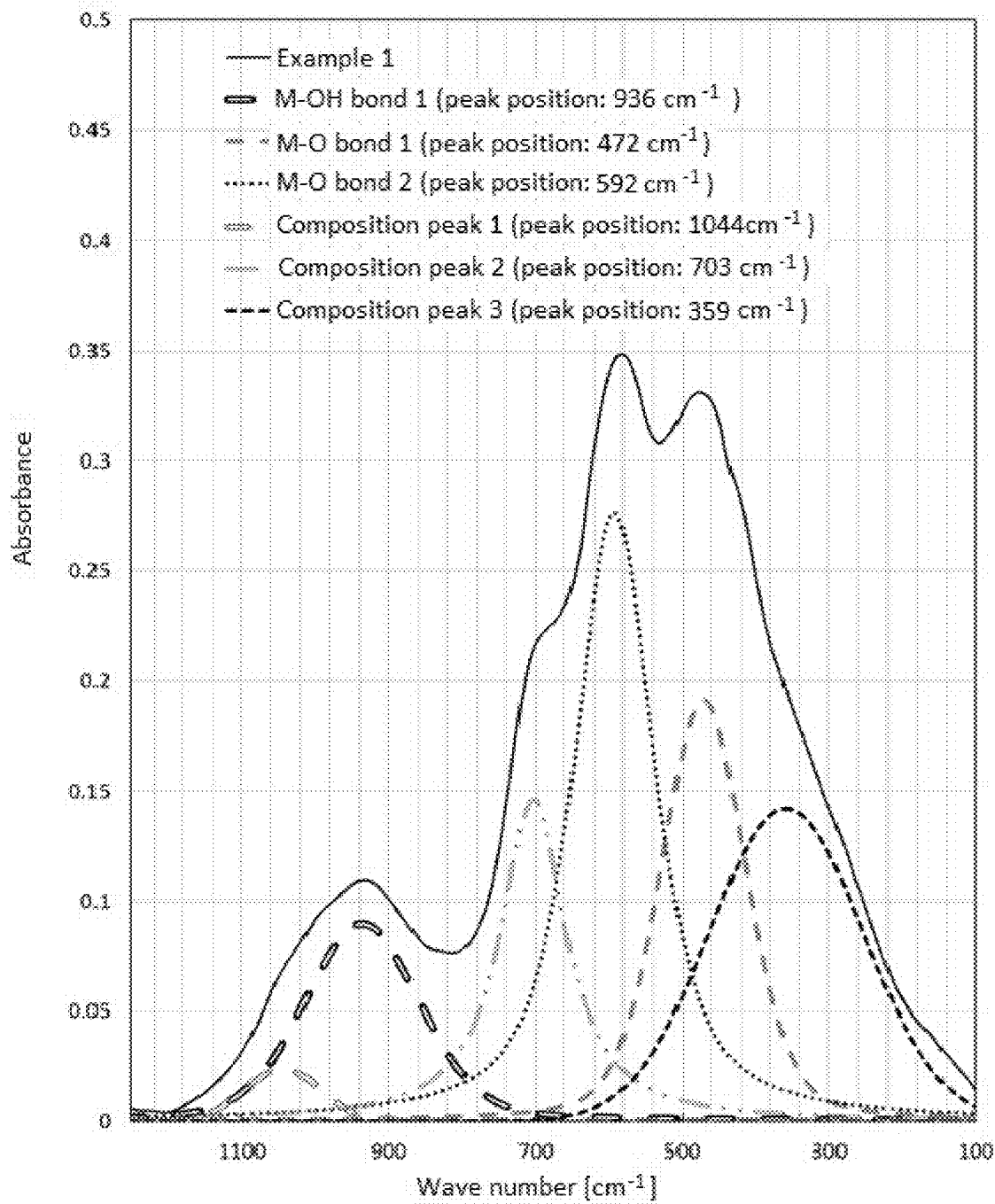
Figure 7:
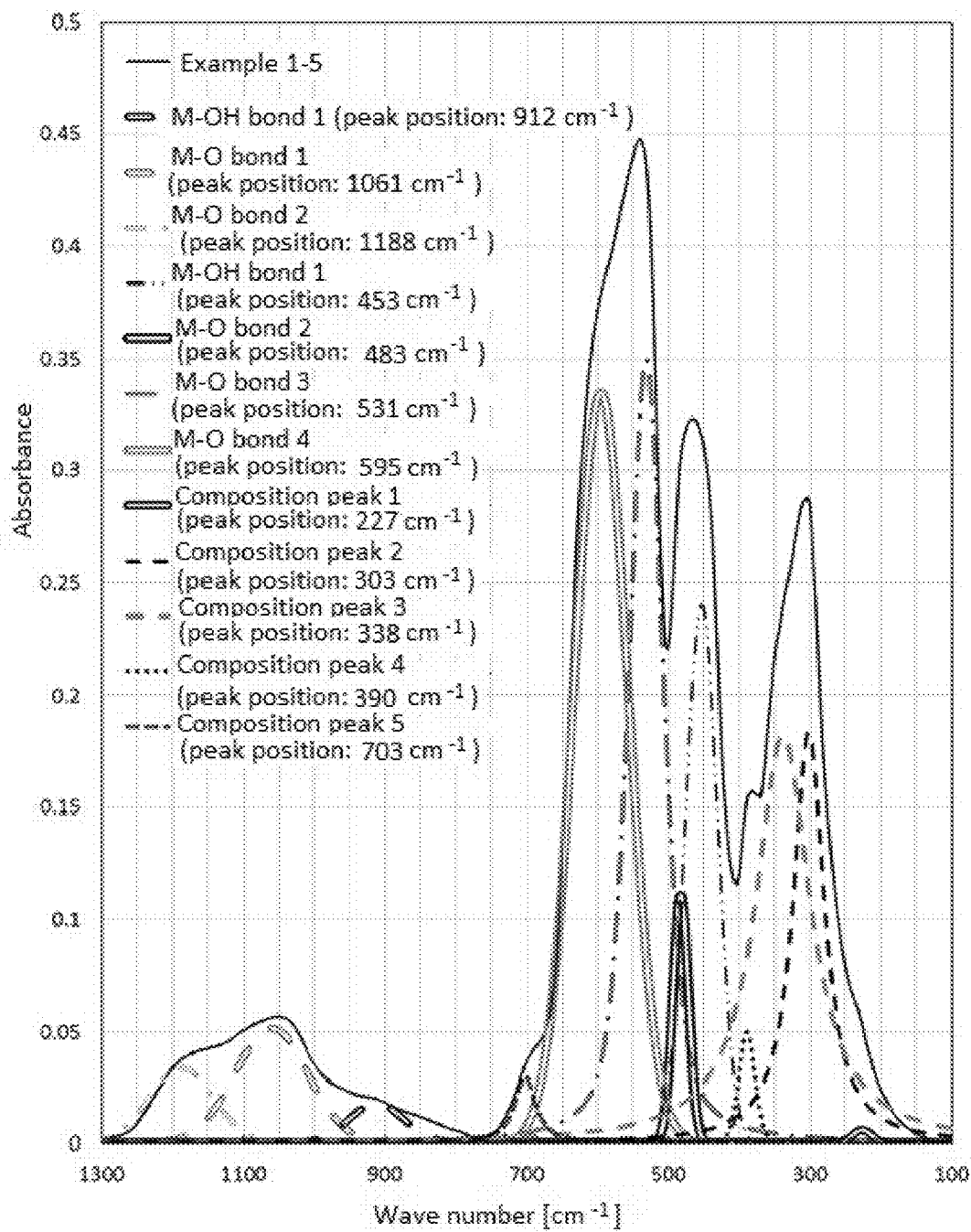

The separation result of the wave shapes in the wave number range of 100 $cm^{-1}$ to 1250 $cm^{-1}$ in the IR measurement result in Example 1 is described in FIG. 6; and the same that is obtained in Example 1-5 is described in FIG. 7. Meanwhile, in the previous explanation, the vertical axis of the IR measurement result is shown by transmittance (% T); however, in FIG. 6 and FIG. 7, the vertical axis is shown by absorbance because separation of the wave shape is carried out using absorbance in the vertical axis. In the present invention, the peaks in the wave number range of 100 $cm^{-1}$ to 1250 $cm^{-1}$ in the IR measurement result is separated; and as a result, among the peaks having the wave shapes thereof separated in the wave number range of 800 $cm^{-1}$ to 1250 $cm^{-1}$, the peak whose wave shape is separated at about 936 $cm^{-1}$ can be assigned to the peak derived from the M-OH bond (FIG. 6: M-OH bond 1), and among the peaks having the wave shape thereof separated in the wave number range of 100 $cm^{-1}$ to 800 $cm^{-1}$, the peaks whose wave shape is separated at about 472 $cm^{-1}$ (FIG. 6: M-O bond 1) and about 592 $cm^{-1}$ (FIG. 6: M-O bond 2) can be assigned to the peaks derived from the M-O bond. In the present invention, it is preferable that the area ratio of the peak separated into the wave shape of the M-OH bond to the total area of all the peaks whose wave shapes are separated in the wave number range of 100 $cm^{-1}$ to 1250 $cm^{-1}$ be controlled as the M-OH bond ratio, and the area ratio of the peak separated into the wave shape of the M-O bond be controlled as the M-O bond ratio, whereby the color characteristics of the oxide particle be controlled by controlling the M-OH bond ratio to the M-O bond ratio, namely, the M-OH bond/M-O bond ratio. Meanwhile, each peak which is separated into the wave shape can be assigned to the M-OH bond or the M-O bond by using publicly known references or data base. In the case where plurality of peaks derived from M-O bond composed of the same type M appear, it is preferable by using the peak whose area ratio of M-O bond peak is the largest to the total area of all the peaks whose wave shapes are separated, and by the same token, with regard to M-OH bond, in the case where plurality of peaks appear from the M-OH bond composed of the same type M, it is preferable by using the peak whose area ratio of the M-O bond peak is the largest to the total area of all the peaks whose wave shapes are separated, to derive the M-OH bond/M-O bond ratio. In addition, in the case where plurality of peaks of the M-O bond composed of different type M such as Fe and Si appear, as well as in the case where plurality of M-OH bonds composed of different type M appear, with regard to the M-OH bond or the M-O bond, it is preferable that the area ratio of each peak of the plural peaks be separately calculated so that the total sum thereof is taken as the M-OH bond ratio or the M-O bond ratio so as to derive the M-OH bond/M-O bond ratio. Meanwhile, in these drawings, the peaks not assignable are regarded as the composition peaks.

As can be seen in FIG. 6 and FIG. 7, in Example 1-5, the ratio of the total area of each peak which is separated into the wave shapes of the M-OH bond to the entire peak components which are separated into the wave shapes is smaller as compared with Example 1. Namely, it is shown that the M-OH bond ratio or the M-OH bond/M-O bond ratio included in the oxide particle of the Example 1-5 is lower than the M-OH bond ratio or the M-OH bond/M-O bond ratio included in the oxide particle of the Example 1. In the present invention, as one example to calculate the M-OH bond ratio or the M-OH bond/M-O bond ratio, the peaks in the wave number range of 100 $cm^{-1}$ to 1250 $cm^{-1}$ in the IR measurement result are separated into the wave shapes, and the area ratio calculated from the total area of the M-OH bond which is separated into the wave shapes in the wave number range of 800 $cm^{-1}$ to 1250 $cm^{-1}$ to the total area of all the peaks which are separated into the wave shapes is taken as the M-OH bond ratio (M-OH ratio [%]); and the M-OH bond ratio to the ratio of the M-O bond ratio which is the total area of the M-O bond having been separated into the wave shapes in the wave number range of 100 $cm^{-1}$ to 800 $cm^{-1}$ is taken as the M-OH bond/M-O bond ratio (M-OH bond/M-O bond ratio [%]). Then, it was found that by controlling them, the color characteristics of the oxide particle can be controlled.

(Explanation of the M-OH Bond-4)

Figure 8:
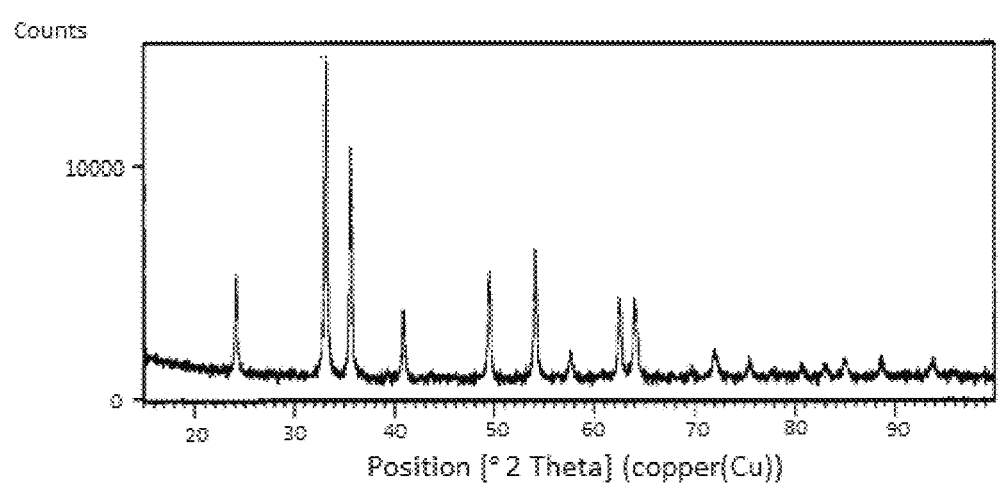

In FIG. 8, the XRD measurement result of the oxide particle obtained in Example 1-5 is shown. As can be seen in FIG. 8, the peaks other than those derived from α-$Fe_2O_3$ are not observed. In the XRD measurement result, neither are observed in Example 1 the peaks other than those derived from α-$Fe_2O_3$ (not shown in the drawing). Nevertheless, the peaks derived from the M-OH bond are detected in the IR measurement result, suggesting that the M-OH bond exists not inside the particle but mainly on the surface of the oxide particle so that the peaks of the hydroxide, etc. are not detected in the XRD measurement result. In addition, the XRD measurement result shows that the silicon compound confirmed by the IR measurement includes an amorphous form.

(Specific Example of the M-OH Bond Ratio and Color Characteristics)

Figure 9:
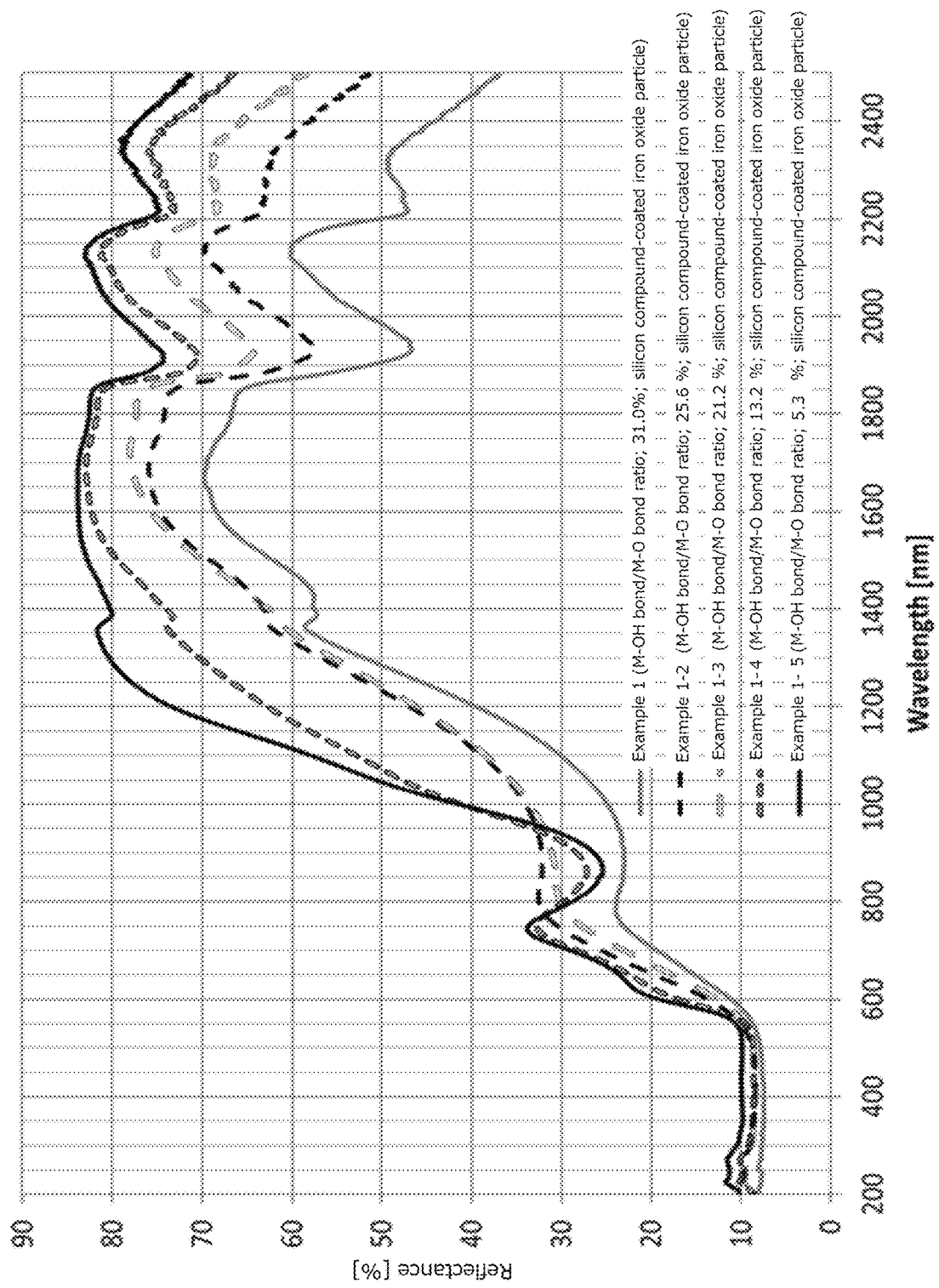
Figure 10:
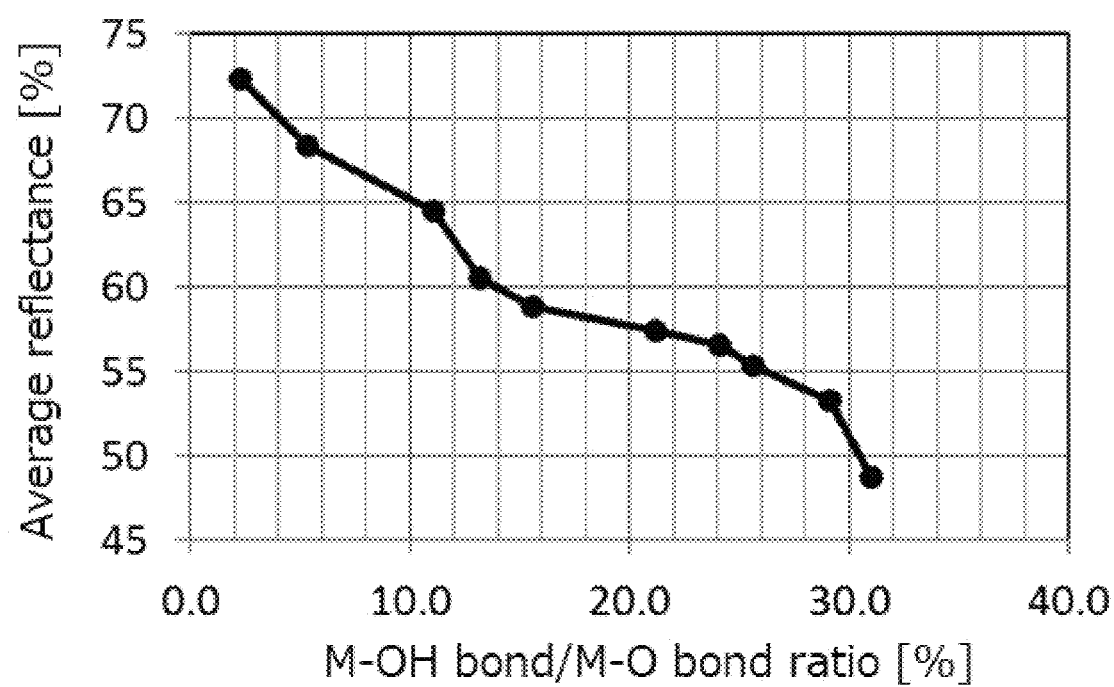

In FIG. 9, the reflection spectra to the light beam in the wavelength of 200 nm to 2500 nm in the oxide particles obtained in Example 1 and Examples 1-2 to 1-5 are shown. First, it can be seen that the reflectance of the silicon compound-coated oxide particle obtained in Example 1-5 to the light beam in the wavelength of a near infrared region of 780 nm to 2500 nm is higher than that of the silicon compound-coated oxide particle obtained in Example 1. The M-OH ratio ([%]) and the M-OH bond/M-O bond ratio ([%]), which are calculated by separating the peaks in the wave number range of 100 $cm^{-1}$ to 1250 $cm^{-1}$ in the IR spectrum into the wave shapes, are smaller in the order of Example 1-5<1-4<1-3<1-2<1; on the other hand, the average reflectance to the light beam in the wavelength of 780 nm to 2500 nm is larger in the order of Example 1-5>1-4>1-3>1-2>1. Meanwhile, the average reflectance to the light beam in the wavelength of 780 nm to 2500 nm means a simple average value of each reflectance in the entire measured wavelength range of 780 nm to 2500 nm in the wavelength range. In FIG. 10, the graph of the average reflectance to the light beam in the wavelength of 780 nm to 2500 nm to the M-OH bond/M-O bond ratio is shown. From FIG. 10, it can be seen that when the M-OH bond ratio as well as the M-OH bond/M-O bond ratio is lower, the average reflectance to the light beam in the wavelength of 780 nm to 2500 nm has tendency to be higher. Namely, in the oxide particle of the present invention, by controlling the M-OH bond ratio included in the oxide particle, the average reflectance to the light beam in the wavelength of 780 nm to 2500 nm, i.e., one of the color characteristics thereof, can be controlled; and moreover, in the oxide particle, it is preferable that the average reflectance to the light beam in the wavelength of 780 nm to 2500 nm be increased by decreasing the M-OH bond ratio as well as the M-OH bond/M-O bond ratio.

(Control of the M-OH Bond Ratio and Color Characteristics)

In the present invention, similarly to the reflectance and average reflectance to the light beam in the near infrared region of the wavelength of 780 nm to 2500 nm, by controlling the M-OH bond ratio and the M-OH bond/M-O bond ratio included in the oxide particle, the molar absorption coefficient, the average molar absorption coefficient, or the transmittance to the light beam in the UV region of wavelength of 190 nm (200 nm) to 380 nm, the reflectance, the average reflectance, or the transmittance and the average transmittance in the visible region of wavelength of 380 nm to 780 nm, the color characteristics such as the hue H (=b*/a*), the saturation C (=$\sqrt{(a^*)^2+(b^*)^2}$), and the like, in the L*a*b* color system can be precisely and strictly controlled, so that a suitable oxide particle can be provided, especially when it is used for a coating composition or a film-like composition.

(Color Characteristic: Average Molar Absorption Coefficient)

The molar absorption coefficient can be calculated by the following equation 1 from the absorbance and the molar concentration of the substance to be measured in the measurement sample, in the UV-visible absorption spectroscopic measurement.

$$\varepsilon = A/(c \cdot l) \qquad \text{(Equation 1)}$$

Meanwhile, ε is a substance-specific constant, called a molar absorption coefficient, which is the absorbance of a dispersion solution with the thickness of 1 cm and the concentration of 1 mol/L; and thus the unit thereof is L/(mol·cm). And, A is the absorbance in the UV-visible absorption spectroscopic measurement, and c is the sample's molar concentration (mol/L). And l is the length of the transmitting light (optical path length: cm), which is usually a cell thickness upon measuring the UV-visible absorption spectrum. In the present invention, in order to show the capacity to absorb the light beam in the UV region of 190 nm (200 nm) to 380 nm, a simple average of each molar absorption coefficient in the entire measured wavelength of 190 nm (200 nm) to 380 nm is calculated so as to evaluate as the average molar absorption coefficient.

(Color Characteristic: Average Reflectance or Average Transmittance)

As described above, the average reflectance to the light beam in the wavelength of 780 nm to 2500 nm means a simple average value of each reflectance in the entire measured wavelength of the refection spectrum with the wavelength range of 780 nm to 2500 nm. The average transmittance with the wavelength range of 380 nm to 780 nm means a simple average of each transmittance in the entire measured wavelength of the transmission spectrum with the wavelength range of 380 nm to 780 nm.

In the average molar absorption coefficient, the average reflectance, and the average transmittance, the wavelength ranges thereof are not limited to those described above, so that the wavelength range in which the average values are obtained may be appropriately determined in accordance with the target color characteristics.

(Color Characteristic: Hue or Saturation)

The hue or the saturation in the present invention may be expressed with the hue H (=b*/a*, b*>0, and a*>0) or the saturation $C=\sqrt{((a^*)^2+(b^*)^2)}$ in an L*a*b* color system. Meanwhile, the L*a*b* color system is one of the uniform color spaces, in which L* is the value showing the brightness, wherein a larger value thereof means that it is brighter. And, a* and b* represent the chromaticity. In the present invention, the color system is not limited to the L*a*b* color system, so that the color characteristics may be evaluated by using other color system such as the XYZ system.

(Control of the M-OH Bond Ratio: Explanation of the Method-1)

In the present invention, the control method of the M-OH bond ratio is not particularly restricted; however, it is preferable to control the M-OH bond ratio by a changing treatment of the functional group included in the oxide particle. The changing treatment of the functional group may be carried out by a conventional method used to the functional group included in the oxide particle such as a substitution reaction, an addition reaction, an elimination reaction, a dehydration reaction, a condensation reaction, a reduction reaction, or an oxidation reaction; with these methods, the M-OH bond ratio can be controlled. In control of the M-OH bond ratio, the M-OH bond/M-O bond ratio may be increased or decreased. As one example thereof, the method may be cited wherein the M-OH bond ratio or the M-OH bond/M-O bond ratio is controlled by an esterification in which, for example, a carboxylic acid such as acetic anhydride is caused to act to the M-OH bond included in the oxide particle so as to achieve the dehydration/condensation reaction in which the OH is removed from the carboxyl group (—COOH) and H is removed from the OH group (—OH) in the M-OH group. In the esterification, besides the method using the acid anhydride, among others, methods using a mixed acid anhydride, an acid halide, or the like, or the methods using a dehydrating agent such as carbodiimide may also be used. Besides the esterification reaction, among others, by the method in which an alkyl halide, an aryl halide, or a hetero-aryl halide is caused to act to the M-OH group preferably in the presence of an acid catalyst so as to carry out dehydration to form an ether bond between the substance such as the alkyl halide and M, or by the method in which an isocyanate or a thioisocyanate is caused to act to the M-OH so as to form a (thio)urethane bond, the M-OH bond ratio or the M-OH bond/M-O bond ratio may be controlled as well.

Alternatively, the M-OH bond ratio or the M-OH bond/M-O bond ratio included in the oxide particle may be controlled by using a substance having a functional group containing fluorine or a functional group containing a hydrophilic group, a hydrophobic group, or the like, as the substance to be acted with the M-OH bond. The present invention is not limited to the method in which a new bond is formed by causing other substance or functional group to directly act to the M-OH bond or the M-O bond. Therefore, among others, the M-OH bond ratio or the M-OH bond/M-O bond ratio may be controlled, for example, by the method in which a carbodiimide is caused to act to a carboxylic acid or the like included in the particle; or the M-OH bond ratio or the M-OH bond/M-O bond ratio may be controlled by the method in which the bond such as the M-O—(CH$_2$)$_2$—OH bond is formed by causing ethylene oxide or the like as well as an epihalohydrin to act thereto. Besides, the M-OH bond ratio or the M-OH bond/M-O bond ratio may be controlled by causing hydrogen peroxide or ozone to act to the oxide particle. Or alternatively, the M-OH bond ratio or the M-OH bond/M-O bond ratio may also be controlled by controlling a procedure of separating the oxide particle, pH, or the like upon separating the oxide particle in a solution. In addition, these ratios may be controlled by the method in which the oxide particle is subjected to a heat treatment as one example of the dehydration reaction. In the case where the M-OH bond ratio or the M-OH bond/M-O bond ratio is controlled by a heat treatment of the oxide particle, the heat treatment may also be carried out with a dry process or under the state of the dispersion body in which the oxide particle is dispersed in a dispersing medium. In addition, as it will be described later, these ratios may be controlled by dispersing the oxide particle in a target solvent followed by the treatment such as stirring the solution after the substance including a functional group is added into the dispersion solution; or alternatively, these ratios may be controlled by a treatment such as stirring the dispersion solution including the separated oxide particles. In addition, in the method in which impurities are removed from a slurry solution including the oxide particle by a membrane filtration with a cross flow method together with a dispersion processing of the particle in an apparatus having a dispersing equipment and a filtration membrane continuously constructed, these ratio can be controlled, among others, by changing the slurry temperature or the temperature of the washing solution used in the cross flow. In this case, uniform reformation treatment can be done to the primary particle of the oxide particle, especially to the surface of each primary particle, so that there are merits that control of the ratio of the M-OH bond included in the oxide particle of the present invention as well as control of the color characteristics can be carried out more strictly and uniformly.

The pH control upon separating the oxide particle may be carried out by including a pH controlling agent such as an acidic substance or a basic substance into at least one of various solutions and solvents in the present invention, or by changing the flow rate upon mixing a fluid containing an oxide raw material solution with a fluid containing an oxide separating solvent.

The method to change the functional group included in the oxide particle relating to the present invention is not particularly restricted. A method may be carried out in which the oxide particle is dispersed into a target solvent followed by adding a substance having a functional group into the dispersion solution thus obtained and then subjecting the dispersion solution to the treatment such as stirring. Alternatively, a method may be carried out in which a fluid including the oxide particle is mixed with a fluid including a substance having a functional group by using the aforementioned micro reactor.

The substance having a functional group is not particularly restricted. Substances having a functional group which can be substituted with a hydroxy group included in the oxide particle may be cited, wherein illustrative example thereof includes acylating agents such as acetic anhydride and propionic anhydride; methylating agents such dimethyl sulfate and dimethyl carbonate; and silane coupling agents such as chloro trimethyl silane and methyl trimethoxy silane.

As described before, the M-OH bond ratio can also be controlled by the method in which hydrogen peroxide or ozone is caused to act to the oxide particle. The method in which hydrogen peroxide or ozone is caused to act to the oxide particle is not particularly restricted. A method may be carried out in which the oxide particle is dispersed into a target solvent followed by adding solution such as hydrogen peroxide or ozone, an aqueous solution including them, or the like into the dispersion solution thereby subjecting the treatment such as stirring. Alternatively, a method may be carried out in which a fluid including the oxide particle is mixed with a fluid including hydrogen peroxide or ozone by using the afore-mentioned micro reactor.

With regard to the dispersion body, a liquid dispersion body may be used in which the oxide particle is dispersed in a liquid dispersion medium such as water, an organic solvent, or a resin. Alternatively, a film-like dispersion body which is prepared by using a dispersion solution which includes the oxide particles may be used. In the case when the heat treatment is carried out under the state of the dispersion body which includes the oxide particles, agglomeration of the particles can be suppressed more readily as compared with the heat treatment in a dry method; and in the case when the oxide particle of the present invention is used in a laminated coat film or in a highly designable multilayered coat film, these being described in Japanese Patent Laid-Open Publication No. 2014-042891 and Japanese Patent Laid-Open Publication No. 2014-042892, the color characteristics of the oxide particle can be controlled by controlling the M-OH bond/M-O bond ratio included in the oxide particle with the method such as the heat treatment after the oxide particle is made to the laminated coat film or to the multilayered coat film; and thus, these methods are suitable in reduction of the number of process steps as well as in strict control of the color characteristics. Meanwhile, in the laminated coat film as well as the highly designable multilayered coat film which are described in Japanese Patent Laid-Open Publication No. 2014-042891 and Japanese Patent Laid-Open Publication No. 2014-042892, feelings of deepness and fineness are realized by increasing a difference between highlight and shade in a specific color so as to significantly change a strength of a reflection light depending on observation angles. Therefore, in order to increase the highlight, it is required to increase a transmittance of a certain color as well as to increase the difference between highlight and shade. Especially, in a coat film such as a clear coat film which includes a substance such as an oxide particle having characteristics of a UV-beam shielding effect and reflection of a near infrared beam, when a molar absorption coefficient in a UV region, i.e., a capacity of the oxide particle to absorb a UV beam, is higher, transparency of the coat film as the oxide particle dispersion body can be increased; and also, by reducing the use amount of the oxide particle, a Haze value can be made lower.

In addition, besides the use in the laminated coat film, this can be used, for example, in a laminated glass in which an intermediate film such as a resin film is interposed between plural plate glasses, or as a film-like composition for a film used in a glass and the like of a building and for a sheet which is attached to a glass; in addition, this can be suitably used for absorption of a UV beam, reflection of a near infrared beam, and so force as a transparent composition by dispersing an oxide particle such as the silicon compound-coated zinc oxide particle into a transparent material for a glass, a transparent resin, or the like. Moreover, because this can enhance the transparent characteristic to a visible light, this can also be suitably used as a transparent composition for protection of a UV beam as well a near infrared beam. In addition, similarly to the laminated coat film, the color characteristics of the oxide particle can also be controlled by controlling the M-OH bond ratio included in the oxide particle by changing a functional group with a heat treatment or the like after the oxide particle is made to a film-like form or to a transparent material by dispersing the oxide particles to a glass, a transparent resin, or the like; and thus, similarly to the laminated coat film, this is suitable in reduction of the number of process steps as well as in strict control of the color characteristics.

Preferable Embodiment of the Oxide Particle 1

In the present invention, the primary particle diameter of the oxide particle is preferably 1 nm or more and 100 nm or less, while more preferably 1 nm or more and 50 nm or less. As described before, it is presumed that because the ratio of the M-OH bond included in the oxide particle is present mainly on the surface of the particle, the oxide particle whose primary particle diameter is 100 nm or less has a larger surface area as compared with the oxide particle whose primary particle diameter is more than 100 nm; and thus, it is presumed that control of the M-OH bond ratio or the M-OH bond/M-O bond ratio of the oxide particle has significant effect to the color characteristics of the oxide particle, such as a transparent characteristic, an absorption characteristic, a reflection characteristic, a hue, a saturation, and the like. Accordingly, in the oxide particle whose primary particle diameter is 100 nm or less, there is a merit that prescribed color characteristics (especially color characteristics for the use as a coat material or as a film-like form) can be suitably expressed by controlling the M-OH bond ratio or the M-OH bond/M-O bond ratio included in the oxide particle.

Preferable Embodiment of the Oxide Particle 2

In the present invention, in the oxide particle in which at least part of the surface of the oxide particle is coated, such as a silicon compound-coated iron oxide particle, a ratio of the average primary particle diameter of the oxide particle after being coated with the compound to the average primary particle diameter of the oxide particle before being coated is preferably 100.5% or more and 190% or less. When the coating of the compound to the oxide particle is too thin, there is a risk that the effect to the color characteristics due to the oxide particle coated with the compound is difficult to be expressed; and thus, the average primary particle diameter of the oxide particle after being coated with the compound is preferably 100.5% or more of the average primary particle of the oxide particle. On the other hand, when the coat is too thick, or when a coarse agglomerate is coated, control of the color characteristics is so difficult that the average primary particle diameter of the oxide particle after being coated with the compound is preferably 190% or less of the average primary particle diameter of the oxide particle. The oxide particle coated with the compound relating to the present invention may be a core-shell type compound-coated oxide particle in which entire surface of the core oxide particle is uniformly coated with the compound. The compound-coated oxide particle is preferably the one which is coated at least part of the surface of a single particle thereof, not an agglomerate of plural oxide particles; however, it may be a compound-coated oxide particle in which at least part of the surface of the agglomerate body of plural oxide particles is coated.

Preferable Embodiment of the Oxide Particle 3

The compound which coats at least part of the surface of the oxide particle in the present invention is preferably a silicon compound, wherein a compound including a silicon oxide is still more preferable, while a compound including an amorphous silicon oxide is more preferable. When the silicon compound includes an amorphous silicon oxide, the silicon compound-coated oxide particle can be strictly controlled in its color characteristics such as reflectance, transmittance, molar absorption coefficient, hue, and saturation. When the silicon compound is a crystalline silicon oxide, it is very difficult to make the M-OH (Si—OH) bond exist; and thus, control of the color characteristics of the present invention can be difficult sometimes.

(Production Method of the Oxide Particle: Equipment)

As one example of the production method of the oxide particle relating to the present invention, a method may be cited in which the oxide particle is prepared, for example, by using a micro reactor, or by carrying out a reaction in a dilute system in a batch reactor, or by a crushing method using a bead mill or the like, wherein simultaneously or after the preparation, the M-OH bond ratio included in the oxide particle is controlled in the reactor. Alternatively, the equipment and method proposed by the applicant of the present invention, described in Japanese Patent Laid-Open Publication No. 2009-112892, may be used. The equipment described in Japanese Patent Laid-Open Publication No. 2009-112892 has a stirring vessel having an inner circumferential surface whose cross sectional shape is circular as well as a stirring tool arranged so as to form a minute clearance with the inner circumferential surface of the stirring vessel, wherein the stirring vessel is provided with at least two fluid inlet ports and at least one fluid outlet port; of the fluids to be processed, one fluid to be processed which includes one of reactants is introduced into the stirring vessel form one of the fluid inlet ports, and a second fluid to be processed which includes one reactant that is different from the aforementioned reactant is introduced from one fluid inlet port other than the aforementioned fluid inlet port into the stirring vessel from a flow path that is different from that of the first fluid to be processed; and at least one of the stirring vessel and the stirring tool rotates relative to the other at high speed so as to cause a thin film state of the fluids to be processed; and in this thin film, the reactants included at least in the first fluid to be processed and the second fluid to be processed are caused to react to each other. As shown in FIG. 4 and FIG. 5 of the said gazette, it is described that three or more introduction ports may be arranged in order to introduce three or more fluids to be processed into the stirring vessel. In addition, as one example of the micro reactor, the equipment based on the same principle as the fluid processing equipment described in Patent Documents 6 and 7 may be cited.

As one example of the production method of the oxide particle relating to the present invention, it is preferable to use the production method of the oxide particle wherein an oxide raw material solution including at least an oxide particle raw material and an oxide separating solvent including at least an oxide separating agent to separate the oxide particle are prepared, whereby the oxide particle is produced by the method such as reaction, precipitation, separation, co-deposition, or the like in a mixed fluid formed by mixing the oxide raw material solution with the oxide separating solvent. As described above, at the time when the oxide particle is produced by the method such as reaction, precipitation, separation, co-deposition, or the like, it does not matter if the particle whose M-OH bond ratio is controlled at a prescribed value is produced.

The raw material of the oxide particle in the present invention is not particularly restricted. Any material which can produce the oxide by the method such as reaction, precipitation, separation, co-deposition, or the like may be used. For example, a single body of a metal or of a semi-metal, or compounds thereof may be cited. In the present invention, compounds of a metal or of a semi-metal are collectively called the compound. The compound is not particularly restricted, whereas illustrative example thereof includes a metal or a semi-metal in the form of its salt, oxide, hydroxide, hydroxylated oxide, nitride, carbide, complex, organic salt, organic complex, organic compound, as well as hydrate or organic solvate of them. The metal salt or the semi-metal salt is not particularly restricted, whereas illustrative example thereof includes a metal or a semi-metal in the form of nitrate salts, nitrous salts, sulfate salts, sulfite salts, formate salts, acetate salts, phosphate salts, phosphite salts, hypophosphite salts, chlorides, oxy salts, acetylacetonato salts, as well as hydrates or organic solvates of them. Illustrative example of the organic compound includes alkoxides of a metal or of a semi-metal. These metal compounds and semi-metal compounds may be used singly or as a mixture of two or more of them.

In addition, with regard to the raw material of the silicon compound in the case of the oxide particle including the silicon compound, such as in the case that the oxide particle is the silicon compound-coated oxide, illustrative example thereof includes oxides, hydroxides, salts, alkoxides, or the like of silicon, as well as hydrates of them. Although there is no particular restriction, the following substances may be cited: silicate salts such as sodium silicate, phenyl trimethoxy silane, methyl trimethoxy silane, methyl triethoxy silane, 3-glycidoxypropyl trimethoxy silane, 3-trifluoropropyl-trimethoxy silane, methacryloxypropyl triethoxy silane, tetramethoxy silane (TMOS), tetraethoxy silane (TEOS), oligomer condensate of TEOS such as ethyl silicate 40, tetraisopropylsilane, tetrapropoxysilane, tetraisobutoxysilane, tetrabutoxysilane, and the like. In addition, as the raw material for the silicon compound, other siloxane compounds, bis(triethoxysilyl) methane, 1,9-bis (triethoxysilyl) nonane, diethoxy dichlorosilane, triethoxy chlorosilane, etc., may also be used. In the case where the oxide particle in the present invention is the silicon compound-coated oxide particle, it is preferable that silicon be included in the range of 2% to 80%, while more preferably in the range of 5% to 50%, relative to the elements other than oxygen which constitute the oxide particle to be coated. With regard to the raw material of the silicon compound, the use amount and kind thereof may be arbitrarily selected in accordance with the targeted oxide particle.

In the case where the raw material of the oxide particle or of the silicon compound is solid, it is preferable to use the oxide particle raw material in the molten state or in the state of being mixed with or dissolved into a later-described solvent (including the state of molecular dispersion thereof). Even in the case where the oxide particle raw material is a liquid or a gas, it is preferable to use the oxide particle raw material in the state of being mixed with or dissolved into a later-described solvent (including the state of molecular dispersion thereof).

There is no particular restriction in the oxide separating substance so far as it can separate the oxide particle raw material included in the oxide raw material solution as the oxide particle, wherein for example, an acidic substance or a basic substance may be used. It is preferable to use the oxide separating substance at least in the state of being mixed with, dissolved into, or molecular-dispersed in a later-described solvent.

Illustrative example of the basic substance includes: metal hydroxides such as sodium hydroxide and potassium hydroxide; metal alkoxides such as sodium methoxide and sodium isopropoxide; amine compounds such as triethylamine, diethylamino ethanol, and diethylamine; and ammonia.

Illustrative example of the acidic substance includes: inorganic acids such as aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, trifluoroacetic acid, trichloroacetic acid, and citric acid. Meanwhile, the basic substance and the acidic substance may be used not only in order to separate the oxide particle but also as the pH adjusting agent in order to control the ratio of the M-OH bond included in the oxide particle as described before.

(Solvent)

With regard to the solvent to be used in the oxide raw material solution and the oxide separating solvent, for example, water, an organic solvent, or a mixed solvent comprising plurality of them may be cited. Illustrative example of the water includes tapped water, ion-exchanged water, pure water, ultra-pure water, and RO water (reverse osmosis water). Illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogenated compound solvent, an ester compound solvent, an ionic liquid, a carboxylic acid compound, and a sulfonic acid compound. These solvents may be used singly or as a mixture of plurality of them. Illustrative example of the alcohol compound solvent includes: monoalcohols such as methanol and ethanol; and polyols such as ethylene glycol and propylene glycol.

(Dispersant, Etc.)

In the present invention, in accordance with the purpose and necessity, various dispersants and surfactants may be used so far as they do not exert an adverse effect in preparation of the oxide particle. There is no particular restriction in them, whereas generally used various dispersants and surfactants which are commercially available goods, products, newly synthesized substances, or the like may be used. Illustrative example thereof includes an anionic surfactant, a cationic surfactant, a nonionic surfactant, and various polymer dispersants. These may be used singly or as a mixture of two or more of them. The surfactant and dispersant may be included in at least any one of the oxide raw material solution and the oxide separating solvent. Alternatively, the surfactant and the dispersant may be included in a fluid other than the oxide raw material solution and the oxide separating solvent.

(Control of the M-OH Bond Ratio: Outline of the Method)

The present invention controls, as described above, the ratio of the M-OH bond which is the bond between the hydroxide group (OH) and a single element or plural elements (M) other than oxygen or hydrogen included in the oxide particle. Specifically, this method may be carried out by dividing the process into a step in which an untreated oxide particle having a prescribed primary particle diameter whose M-OH bond ratio or M-OH bond/M-O bond ratio is to be controlled is prepared and a step in which control of the M-OH bond ratio or of the M-OH bond/M-O bond ratio is carried out to the untreated oxide particle. However, in the step in which the untreated oxide particle is prepared, upon producing the oxide particle by separation or the like, it doesn't matter if the particle having the M-OH bond ratio or the M-OH bond/M-O bond ratio controlled to a prescribed value is produced.

(Coating Composition or Film-Like Composition)

Other than those described in Japanese Patent Laid-Open Publication No. 2014-042891 and Japanese Patent Laid-Open Publication No. 2014-042892, the coating oxide composition or the film-like oxide composition of the present invention is not particularly restricted, wherein for example, the coating composition or the film-like composition may be used for various coatings such as a solvent-type paint and an aqueous paint. Depending on the purpose, if needed, the coating oxide composition may arbitrarily contain further, besides a pigment and a dye, additives such as a wetting agent, a dispersant, a color separation inhibitor, a levelling agent, a viscosity controlling agent, an anti-skinning agent, an anti-gelling agent, an anti-foaming agent, an anti-sagging agent, a fungicide, a UV absorber, a film-forming aid, a surfactant, a resin component, and the like. Illustrative example of the resin component for the coating purpose includes a polyester resin, a melamine resin, a phenol resin, an epoxy resin, a vinyl chloride resin, an acryl resin, a urethane resin, a silicon resin, and a fluorinated resin. The coated matter to which the paint including the coating oxide composition of the present invention is applied may be a monolayer coated matter composed of a single paint composition, or a multilayer coated matter composed of plural paint compositions like the multilayer coating use described in Japanese Patent Laid-Open Publication No. 2014-042891 and Japanese Patent Laid-Open Publication No. 2014-042892; or alternatively, the composition may be used in the pigment-included paint or in the paint such as a clear paint. For the purpose of the film-like composition, a binder resin, a curing agent, a curing catalyst, a leveling agent, a surfactant, a silane coupling agent, an anti-foaming agent, a coloring material such as a pigment or a dye, an antioxidant, and the like, may be included as needed.

(Coating Composition, Film-Like Composition, or Transparent Composition)

The coating oxide composition, the film-like oxide composition, or the transparent composition relating to the present invention includes the oxide particle such as the oxide particle powder, the dispersion body having the oxide particles dispersed into a liquid dispersing medium, and a dispersion body having the oxide particles dispersed to a solid (or a liquid, etc., before being solidified) such as a glass and a transparent resin. The oxide particle included in the coating oxide composition or in the film-like oxide composition may be composed of one oxide particle, or composed of the agglomerate having plural oxide particles agglomerated, or a mixture of them. When they are composed of the agglomerate having plural oxide particles agglomerated, the size of the agglomerate is preferably 50 nm or less. The oxide composition described above may be used after being dispersed together with various pigments into a cosmetic or a paint; or alternatively, it may overcoat a coat film. Moreover, the oxide particle may be used as an only pigment. Illustrative example of the liquid dispersion medium includes water such as tapped water, distilled water, RO water (reverse osmosis water), pure water, and ultra-pure water; alcoholic solvents such as methanol, ethanol, and isopropyl alcohol; polyalcoholic solvents such as propylene glycol, ethylene glycol, diethylene glycol, and glycerin; ester solvents such as ethyl acetate and butyl acetate; aromatic solvents such as benzene, toluene, and xylene; ketonic solvents such as acetone and methyl ethyl ketone; nitrile solvents such as acetonitrile; and silicone oils, vegetable oil, and waxes. These may be used singly or as a mixture of plurality of them.

(Color of the Coating Composition or the Film-Like Composition)

There is no particular restriction in the color of the transparent material such as a coat material, a film, or a glass, so that the coating oxide composition or the film-like composition of the present invention may be used for a target hue. They may be suitably blended with a coating composition used in the coating material of a white type, a grey type, and a black type, these color types being, for example, a color provided with a brightness of 10 of a white to a brightness of 0 of a black in the Munsell color system; a red type which is, for example, a color provided with a hue from RP to YR in the Munsell color wheel; a yellow to green type which is, for example, a color provided with a hue from Y to BG in the Munsell color wheel, or a blue to purple type which is, for example, a color provided with a pigment from B to P in the Munsell color wheel (including metal colors in all of them). The color is not limited to the above-mentioned colors, and thus, the colors of other hues may be used as well. In addition, especially by using the coating composition including the oxide particle of the present invention for the top coat of a coat film or a coat body showing these colors, impairing color development of every color can be remarkably decreased, so that the designability of the coat body can be enhanced; and thus, this is suitable. With regard to the pigments and dyes included in the coating composition as needed, various pigments and dyes may be used, whereby for example, all the pigments and dyes that are registered in the color index may be used. Among them, illustrative example thereof includes: pigments and dyes that are classified to C. I. Pigment Green in the pigment that constitutes a green color; pigments and dyes that are classified to C. I. Pigment Blue in the pigment that constitutes a blue color; pigments and dyes that are classified to C. I. Pigment White in the pigment that constitutes a white color; pigments and dyes that are classified to C. I. Pigment Yellow in the pigment that constitutes a yellow color; pigments and dyes that are classified to C. I. Pigment Red in the pigment and dye that constitute a red color; and pigments and dyes that are classified to C. I. Pigment Violet and C. I. Pigment Orange in the pigment and dye that constitute a violet color. More specific example thereof includes quinacridone type pigments such as C. I. Pigment Red 122 and C. I. Pigment Violet 19; diketopyrrole type pigments such as C. I. Pigment Red 254 and C. I. Pigment Orange 73; naphthol type pigments such as C. I. Pigment Red 150 and C. I. Pigment Red 170; perylene type pigments such as C. I. Pigment Red 123 and C. I. Pigment Red 179; and azo type pigments such as C. I. Pigment Red 144. These pigments and dyes may be used singly or as a mixture of plurality of them. Meanwhile, the oxide composition of the present invention may be blended singly to the coating composition or to the film-like composition without mixing with these pigments, dyes, or the like. By including the oxide particle in the coating composition of the present invention, the saturation can be enhanced furthermore; and when this is used in the multi-layer coating as described in Japanese Patent Laid-Open Publication No. 2014-042891 and Japanese Patent Laid-Open Publication No. 2014-042892, the coated matter having a large difference between a high light portion and a shade portion can be constructed without causing whitening in the shade portion while enhancing a blackness so as to enable to obtain a sharp metallic feel or the like; and thus, this is suitable. In addition, by including the oxide particle in the film-like composition to be used in a transparent substrate such as a glass used in a building, a vehicle, a display, or the like, a UV beam can be effectively absorbed so as to be shielded thereby enhancing a safety to a human body, and decomposition of an organic substance or the like in a building or in a vehicle can be suppressed, and temperature rise in a building or a in a vehicle can be suppressed because a near infrared beam can be effectively reflected so as to be shielded, and a film or a glass having a high transparent feel can be obtained because of a high transmitting characteristic to a visible beam; and thus, this is suitable.

EXAMPLES

Hereinafter, the present invention will be explained in more detail with referring to Examples; however, the present invention is not limited only to these Examples. Meanwhile, pure water used in the following Examples is the pure water having a conductivity of 0.86 µS/cm (measurement temperature of 25° C.) unless specifically described.

(Preparation of the TEM Observation Sample and Preparation of STEM Observation Sample)

Part of the wet cake sample of the oxide particle obtained in Example is dispersed into propylene glycol, and then further diluted with isopropyl alcohol (IPA) by 100 times. The diluted solution thus obtained was dropped onto a collodion film or a micro grid and then dried to obtain the TEM observation sample or the STEM observation sample.

(Transmission Electron Microscope and Energy Dispersive X-Ray Spectrometer Apparatuses: TEM-EDS Analysis)

For observation and quantitative analysis of the oxide particle by the TEM-EDS analysis, a transmission electron microscope (JEM-2100; manufactured by JEOL Ltd.) equipped with an energy dispersive X-ray spectrometer (JED-2300; manufactured by JEOL Ltd.) was used. The observation conditions with 80 kV of the acceleration power and 25000 or more of the observation magnification were used. The particle diameter was calculated from the distance between the both edges of the maximum outer circumference of the oxide particle observed with TEM, and an average value thereof (average primary particle diameter) was calculated from the measurement results of the particle diameters of 100 particles. The molar ratio of the element components that constitute the oxide in the oxide particle was calculated by TEM-EDS, and then, an average value of the calculation results of the molar ratios of 10 or more of the particles was calculated.

(Scanning Transmission Electron Microscope and Energy Dispersive X-Ray Spectrometer Apparatus: STEM-EDS Analysis)

For mapping and quantitative analysis of the elements included in the oxide particle by the STEM-EDS analysis, an atomic resolution analytical electron microscope (JEM-ARM200F; manufactured by JEOL Ltd.) equipped with an energy dispersive X-ray spectrometer (Centurio; manufactured by JEOL Ltd.) was used. Analysis was carried out using the observation conditions with 80 kV of the acceleration power, 50000 or more of the observation magnification, and 0.2 nm of the beam diameter.

(X-Ray Diffraction Measurement)

For the X-ray diffraction (XRD) measurement, a powder X-ray diffraction measurement apparatus (EMPYREAN: manufactured by PANalytical business unit of Spectris Co., Ltd.) was used. The measurement conditions with a measurement range of 10 to 100 [° 2 Theta], a Cu anticathode, a tube voltage of 45 kV, a tube current of 40 mA, and a scanning rate of 0.3°/min were used. The XRD measurement was carried out using dried powders of the oxide particles obtained in each Example.

(FT-IR Measurement)

For measurement of FT-IR, a Fourier transform infrared spectrophotometer (FT/IR-6600: manufactured by JASCO Corp.) was used. The measurement was made using the ATR method under a nitrogen atmosphere with the resolution of 4.0 cm$^{-1}$ and the cumulative number of 1024. Separation of the wave shapes of the peaks in the wave number range of 100 cm$^{-1}$ to 1250 cm$^{-1}$ of the infrared absorption spectrum was made with the curve fitting such that the residual sum of squares would become 0.01 or less by using a spectrum analysis program attached to a control software of the FT/IR-6600. The measurement was carried out using the dried powder of the oxide particle obtained in Examples.

(Transmission Spectrum, Absorption Spectrum, Reflection Spectrum, Hue, and Saturation)

Transmission spectrum, absorption spectrum, reflection spectrum, hue, and saturation were measured using a UV, visible, near infrared spectrophotometer (V-770: manufactured by JASCO Corp.). Measurement was carried out with a measurement range of 190 nm to 800 nm, or 200 nm to 800 nm in the transmission spectrum; a measurement range of 190 nm to 800 nm, or 200 nm to 800 nm in the absorption spectrum; the sampling rate of 0.2 nm; and the low measurement rate. Average transmittance was calculated by simple averaging of the transmittances of plural measurement wavelengths in a certain wavelength range.

With regard to the molar absorption coefficient, after measurement of the absorption spectrum, from the absorbance obtained from the measurement and the oxide concentration of the dispersion solution thereof, the molar absorption coefficient at each measured wavelength was calculated; and then, the graph was obtained with the measured wavelength in the horizontal axis and the molar absorption coefficient in the vertical axis. For the measurement thereof, a cell for a liquid sample with a thickness of 1 cm was used. The average molar absorption coefficient was calculated by simple averaging of the molar absorption coefficients at plural measured wavelengths with the wavelength range of 190 nm (200 nm) to 380 nm.

With regard to the reflection spectrum, the total reflection measurement of specular reflection and diffusion reflection was carried out with the measurement range of 200 nm to 2500 nm, the sampling rate of 2.0 nm, the measurement rate of medium, and the method of a double beam measurement. In the background measurement (setting of the base line) upon measurement of the powder, a standard white plate (product name of Spectralon (trade mark): manufactured by Labspere, Inc.) was used. The reflection spectrum was measured by using the dried powder of the silicon compound-coated iron oxide particle obtained in each Example. The average reflectance was obtained by simple averaging of the reflectances at plural measured wavelengths in a certain wavelength range. The hue and saturation were obtained from the equations, the hue H=b*/a* and the saturation C=$\sqrt{((a^*)^2+(b^*)^2)}$ from the respective values of L*, a*, and b* obtained from the measurement result of the reflection spectrum with the L*a*b* color system, with the view field of 2 (deg), the power source of D65-2, the color matching function of JIS Z 8701:1999, and the data distance of 5 nm.

Example 1

Hereinafter, in Example 1, the silicon compound-coated iron oxide particle having at least part of the iron oxide particle surface coated with a silicon compound is described as the oxide particle. By using Clearmix (product name: CLM-2.2S, manufactured by M. Technique Co., Ltd.), which is a high speed rotational dispersion emulsifier, the oxide raw material solution (A-solution), the oxide separating solvent (B-solution), and the silicon compound raw material solution (C-solution) each were prepared. Specifically, according to the prescription of the oxide raw material solution described in Example 1 of Table 1, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescription of the oxide separating solvent described in Example 1 of Table 1, each component of the oxide separating solvent were uniformly mixed by stirring for 30 minutes at the preparation temperature of 45° C. by using Clearmix with the rotation number of the rotor thereof being 15000 rpm to obtain the oxide separating solvent. Further, according to the prescription of the silicon compound raw material solution described in Example 1 of Table 1, each component of the silicon compound raw material solution were uniformly mixed by stirring for 10 minutes at the preparation temperature of 20° C. by using Clearmix with the rotation number of the rotor thereof being 6000 rpm to obtain the silicon compound raw material solution.

Meanwhile, the substances used here and represented by chemical formula or abbreviation described in Table 1 are: 97 wt % $H_2SO_4$ for concentrated sulfuric acid (manufactured by Kishida Chemical Co., Ltd.), NaOH for sodium hydroxide (manufactured by Kanto Chemical Co., Ltd.), TEOS for tetraethyl orthosilicate (manufactured by Wako Pure Chemical Industries, Ltd.), and $Fe(NO_3)_3 \cdot 9H_2O$ for ferric nitrate nonahydrate (manufactured by Kanto Chemical Co., Ltd.).

Next, the oxide raw material solution, the oxide separating solvent, and the silicon compound raw material solution, all having been prepared as described above, were mixed by using the fluid processing apparatus described in Patent Document 7 that was filed by the applicant of the present invention. Meanwhile, the fluid processing apparatus described in Patent Document 7 is the apparatus described in FIG. 1(B) of the said gazette, wherein the openings d20 and d30 of the second and third introduction parts which are arranged in a concentric circular form surrounding the opening in the center of the processing surface 2 having the form of a ring-like disc. Specifically, the oxide raw material solution was introduced as the A-solution from the first introduction part d1 into between the processing surfaces 1 and 2 while operating the processing member 10 with the rotation number of 1130 rpm, the oxide separating solvent was introduced as the B-solution from the second introduction part d2 into between the processing surfaces 1 and 2 so as to mix the oxide raw material solution with the oxide separating solvent in a thin film fluid, whereby the iron oxide particles destined to be a core were separated in between the processing surfaces 1 and 2. Next, the silicon compound raw material solution was introduced as the C-solution from the third introduction part d3 into between the processing surfaces 1 and 2 so as to be mixed in the thin film fluid with the mixed fluid including the iron oxide particles destined to be a core. As a result, the silicon compound is separated on the surface of the iron oxide particles destined to be a core, whereby the ejected fluid including the silicon compound-coated iron oxide particles (hereinafter, the silicon compound-coated iron oxide particle dispersion solution) was ejected from between the processing surfaces 1 and 2 of the fluid processing apparatus. The ejected silicon compound-coated iron oxide particle dispersion solution was re in a beaker b via the vessel v.

In Table 2, operation conditions of the fluid processing apparatus, the average primary particle diameter calculated from the TEM observation result of the obtained silicon compound-coated iron oxide particles, and the Si/Fe molar ratio calculated from TEM-EDS analysis, together with the calculated value thereof from the prescriptions and introduction flow rates of the A-solution, B-solution, and C-solution, are listed. The introduction temperatures (supply temperatures) and introduction pressures (supply pressures) of the A-solution, B-solution, and C-solution described in Table 2 were measured by using the thermometers and pressure meters installed in the sealed introduction paths to between the processing surfaces 1 and 2 (first introduction part d1, second introduction part d2, and third introduction part d3), wherein the introduction temperature of the A-solution in Table 2 is the actual temperature of the A-solution under the introduction pressure in the first introduction part d1, similarly, the introduction temperature of the B-solution was ejected from the apparatus and re in the beaker b was measured at room temperature.

From the silicon compound-coated iron oxide particle dispersion solution that was ejected from the fluid processing apparatus and re in the beaker b, the dried powder and wet cake sample thereof were prepared. The preparations thereof were made according to a method normally used in this kind of processing. The ejected silicon compound-coated iron oxide particle dispersion solution was re, and then, the silicon compound-coated iron oxide particles were allowed to settle so as to remove a supernatant thereof; thereafter, washing with 100 parts by weight of pure water and settling were repeated for three times, and then, washing with pure water and settling were repeated for three times so as to clean the silicon compound-coated iron oxide particle. Part of the finally obtained wet cake of the silicon compound-coated iron oxide particle was dried at 25° C. and −0.10 MPaG for 20 hours to obtain the product as the dried powder. The remaining product was used as the wet cake sample thereof.

TABLE 1

| | Prescription of first fluid (A-solution: oxide raw material solution) | | | | | | Prescription of second fluid (B-solution: oxide separating solvent) | | | | | |
|---|---|---|---|---|---|---|---|---|---|---|---|---|
| | Prescription | | | | pH | | Prescription | | | | pH | |
| | Raw material | [wt %] | Raw material | [wt %] | pH | [° C.] | Raw material | [wt %] | Raw material | [wt %] | pH | [° C.] |
| Example 1 | Fe(NO$_3$)$_3$•9H$_2$O | 2.00 | Pure water | 98.00 | 1.8 | 26.6 | NaOH | 9.00 | Pure water | 91.00 | >14 | — |

| | Prescription of third fluid (C-solution: silicon compound raw material solution) | | | | | | |
|---|---|---|---|---|---|---|---|
| | Prescription | | | | | pH | |
| | Raw material | [wt %] | Raw material | [wt %] | Raw material | [wt %] | pH | [° C.] |
| Example 1 | Pure water | 96.35 | 97 wt % H$_2$SO$_4$ | 2.46 | TEOS | 1.19 | <1 | — | is the actual temperature of the B-solution under the introduction pressure in the second introduction part d2, and the introduction temperature of the C-solution is the actual temperature of the C-solution under the introduction pressure in the third introduction part d3.

TABLE 2

| | Introduction flow rate (supply flow rate) [mL/min] | | | Introduction temperature (supply temperature) [° C.] | | | Introduction pressure (supply pressure) [MPaG] | | | Ejected solution | | Shell/core Si/Fe [molar ratio] | | Average primary particle diam. [nm] |
|---|---|---|---|---|---|---|---|---|---|---|---|---|---|---|
| | A-Soln. | B-Soln. | C-Soln. | A-Soln. | B-Soln. | C-Soln. | A-Soln. | B-Soln. | C-Soln. | pH | Temp. [° C.] | [Calculated value] | [EDS] | |
| Example 1 | 400 | 40 | 50 | 141 | 87 | 86 | 0.412 | 0.10 | 0.20 | 11.02 | 30.6 | 0.14 | 0.14 | 9.60 |

Measurement of pH was made by using a pH meter (catalogue No. D-51; manufactured by HORIBA, Ltd.). Before the A-solution, the B-solution, and the C-solution were introduced into the fluid processing apparatus, respective pHs of these solutions were measured at room temperature. It was difficult to measure a pH of the mixed fluid immediately after the oxide raw material solution was mixed with the oxide separating solvent and a pH of the mixed fluid immediately after the fluid including the iron oxide particles destined to be a core was mixed with the silicon compound raw material solution; and thus, a pH of the silicon compound-coated iron oxide particle dispersion solution which In FIG. 3, the mapping result using STEM of the silicon compound-coated iron oxide particle obtained in Example 1 is shown; and in FIG. 4, the result of the line analysis in the position where a dotted line is drawn in the HAADF picture of FIG. 3 is shown. As can be seen in FIG. 3 and FIG. 4, in the silicon compound-coated iron oxide particle obtained in Example 1, the particles that were not coated entirely with the silicon compound were also observed, so that the silicon compound-coated iron oxide particles in which part of the surface of the iron oxide particle was coated with the silicon compound were observed.

The silicon compound-coated iron oxide particle obtained in Example 1 was subjected to a dehydration reaction by a heat treatment using an electric furnace as the changing treatment of the functional group included in the silicon compound-coated iron oxide particle. The heat treatment conditions thereof were: no heat treatment in Example 1, 200° C. in Example 1-2, 400° C. in Example 1-3, 600° C. in Example 1-4, and 800° C. in Example 1-5, wherein the period of the heat treatment was 30 minutes in all the heat treatment temperatures. In FIG. 1, the mapping result using STEM of the silicon compound-coated iron oxide obtained in Example 1-5 is shown; and in FIG. 2, the result of the line analysis in the position where a dotted line is drawn in the HAADF picture of FIG. 1 is shown. As can be seen in FIG. 1 and FIG. 2, the silicon compound-coated iron oxide particle obtained in Example 1-5 was observed as the iron oxide particle that was entirely coated with the silicon compound.

In FIG. 5, the IR measurement results of the silicon compound-coated iron oxide particles obtained in Example 1 and Example 1-5 measured with the ATR method are shown. As compared with the IR measurement result of the silicon compound-coated iron oxide particle obtained in Example 1, the IR measurement result of the silicon compound-coated iron oxide particle obtained in Example 1-5 shows that the broad peaks at about 1650 cm$^{-1}$ and at about 3400 cm$^{-1}$ are smaller, and the broad peak from about 800 cm$^{-1}$ to about 1250 cm$^{-1}$ appears to shift to a higher wave number side.

With regard to the separation result of the wave shapes of the peaks in the wave number from 100 cm$^{-1}$ to 1250 cm$^{-1}$ in the IR measurement result of Example 1 or Example 1-5, the result of Example 1 is illustrated in FIG. 6, and the result of Example 1-5 is illustrated in FIG. 7. From FIG. 6 and FIG. 7, in Example 1-5, as compared with Example 1, it can be seen that the M-OH bond/M-O bond ratio is smaller, wherein this ratio is the ratio of the total area of each peak whose wave shape is separated to the M-OH bond to the total area of each peak whose wave shape is separated to the M-O bond in the entire peak components of the peaks whose wave shapes are separated. Namely, it can be seen that the M-OH bond/M-O bond ratio in the oxide particle of Example 1-5 is smaller than the M-OH bond/M-O bond ratio in the oxide particle of Example 1. It can now be seen that cause of apparent shift of the broad peak from about 800 cm$^{-1}$ to about 1250 cm$^{-1}$ to a higher wave number side in the IR measurement result of the silicon compound-coated iron oxide particle (FIG. 5) is due to the decrease in the ratio of the M-OH bond included in the silicon compound-coated iron oxide particle, especially due to the decrease in the peak ratio whose wave shape is separated to the M-OH bond 1 (about 936 cm$^{-1}$ in Example 1, and about 912 cm$^{-1}$ in Example 1-5)

In FIG. 8, the XRD measurement result of the silicon compound-coated iron oxide particle obtained in Example 1-5 is shown. As can be seen in FIG. 8, in the XRD measurement, only the peaks derived from α-Fe$_2$O$_3$ were detected. Namely, it was confirmed that the silicon compound confirmed by the STEM and the IR measurement was amorphous.

In FIG. 9, the reflection spectra to the light beam in the wavelength of 200 nm to 2500 nm in the silicon compound-coated iron oxide particles obtained in Example 1 and Examples 1-2 to 1-5 are shown. First, it can be seen that the reflectance to the light beam in the near infrared region of 780 nm to 2500 nm is higher in the silicon compound-coated iron oxide particle obtained in Example 1-5 than that of the silicon compound-coated iron oxide particle obtained in Example 1. The wave shapes of the peaks in the wave number range of 100 cm$^{-1}$ to 1250 cm$^{-1}$ in the above-mentioned IR spectra were separated; and the area ratio of the peaks of the M-OH bond to the total area of each peak whose wave shape was separated (M-OH ratio [%]) is smaller in the order of Example 1-5<1-4<1-3<1-2<1: on the other hand, the average reflectance to the light beam in the wavelength of 780 nm to 2500 nm is larger in the order of Example 1-5>1-4>1-3>1-2>1. In FIG. 10, the graph of the average reflectance to the light beam in the wavelength of 780 nm to 2500 nm to the M-OH bond/M-O bond ratio is shown. Meanwhile, in FIG. 10, other than Example 1 and Examples 1-2 to 1-5, the data of the average reflectance to the light beam in the wavelength of 780 nm to 2500 nm of the silicon compound-coated iron oxide particle whose M-OH ratio is changed by changing the heat treatment temperature are also included. As can be seen in FIG. 10, there is a tendency that when the M-OH bond/M-O bond ratio is lower, the average reflectance to the light beam in the wavelength of 780 nm to 2500 nm is higher. Namely, the silicon compound-coated iron oxide particle, which is one of the oxide particles of the present invention, is the silicon compound-coated iron oxide particle whose average reflectance to the light beam in the wavelength of 780 nm to 2500 nm is controlled by controlling the M-OH bond ratio or the M-OH bond/M-O bond ratio included in the silicon compound-coated iron oxide particle, the said average reflectance being one of the color characteristics. In the silicon compound-coated iron oxide particle, it is preferable that the average reflectance to the light beam in the wavelength of 780 nm to 2500 nm be increased by lowering the M-OH bond ratio or the M-OH bond/M-O bond ratio, while it is more preferable that the average reflectance to the light beam in the wavelength of 780 nm to 2500 nm be increased to 50% or more by controlling the M-OH bond/M-O bond ratio in the range of 1% or more and 30% or less. In the case where the silicon compound-coated iron oxide particle like this is used in the coating composition, this can be suitably used as a paint, because this has, among others, a high effect to suppress the temperature rise of the coated body that is irradiated with a solar beam.

Figure 11:
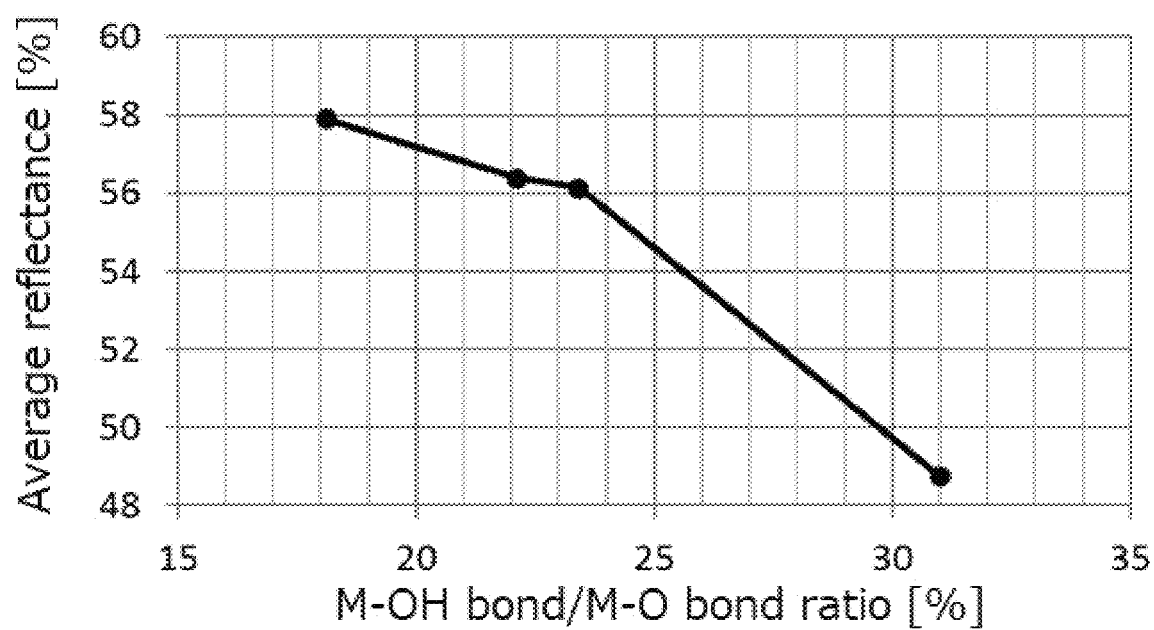

In FIG. 11, the graph of the average reflectance to the light beam in the wavelength of 780 nm to 2500 nm to the M-OH bond/M-O bond ratio of the silicon compound-coated iron oxide particle that is heat-treated is shown, wherein the heat treatment is carried out with statically leaving the aqueous dispersion solution of the silicon compound-coated iron oxide particle obtained in Example 1 for the period of 0.5 hours, 1.0 hours, and 2.0 hours at 100° C. The M-OH bond/M-O bond ratio of each treatment period, obtained from the IR measurement and separation of the wave shapes, was 31.0% in Example 1 (without treatment), 23.4% for 0.5 hours of the treatment, 22.1% for 1.0 hours of the treatment, and 18.1% for 2.0 hours of the treatment. As can be seen in FIG. 11, it was found that when the M-OH ratio is lower, the average reflectance to the light beam in the wavelength of 780 nm to 2500 nm is higher. In the present invention, upon controlling the M-OH bond/M-O bond ratio included in the silicon compound-coated iron oxide particle by means of the heat treatment, this may be carried out by the dry method as well as by the method which is carried out under the dispersion state in a dispersion medium.

Figure 12:
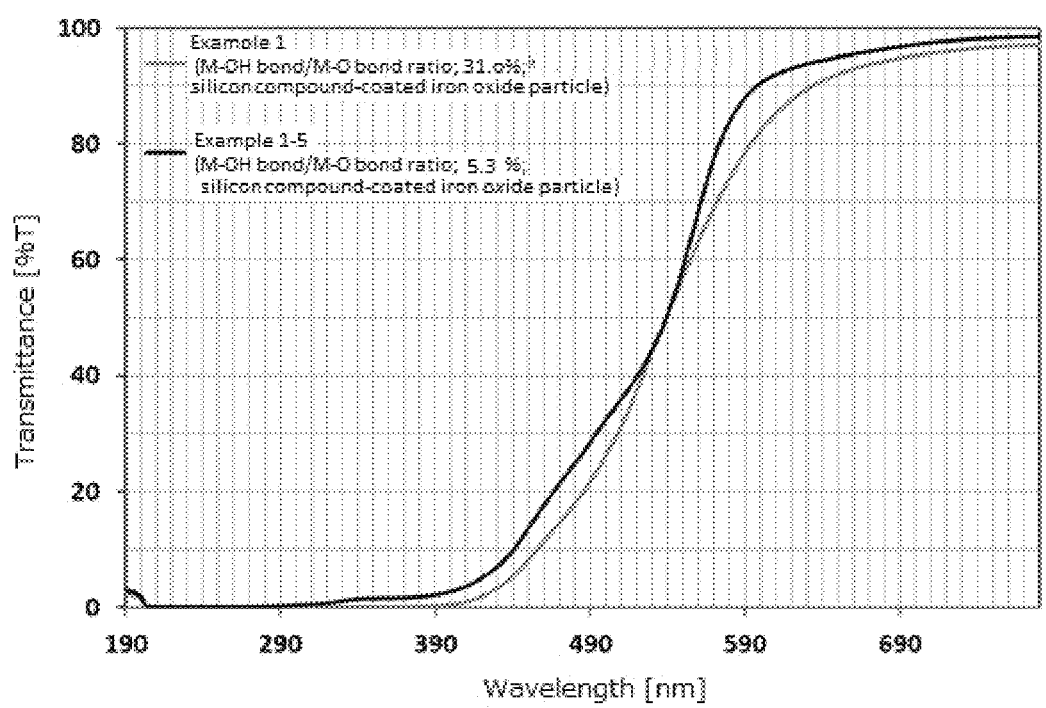

In FIG. 12, the transmission spectra of the dispersion solutions in which the silicon compound-coated iron oxide particles obtained in Example 1 and Example 1-5 each are dispersed into propylene glycol with the concentration thereof being 0.05% by weight as Fe$_2$O$_3$ are shown.

From FIG. 12, it can be seen that the shape of the transmission spectrum of the silicon compound-coated iron oxide particle changes by changing the M-OH bond/M-O bond ratio thereof. In Example 1-2 to Example 1-4, too, similar results to Example 1 and Example 1-5 are obtained; therefore, in the present invention, it is preferable that the M-OH bond/M-O bond ratio of the silicon compound-coated iron oxide particle be 1% or more and 31% or less, and that in the transmission spectrum of the dispersion solution in which the silicon compound-coated iron oxide particle is dispersed in a dispersion medium, it is preferable that the transmittance thereof to the light beam at wavelength of 380 nm be 5% or less as well as the transmittance thereof to the light beam at 600 nm be 80% or more.

Figure 15:
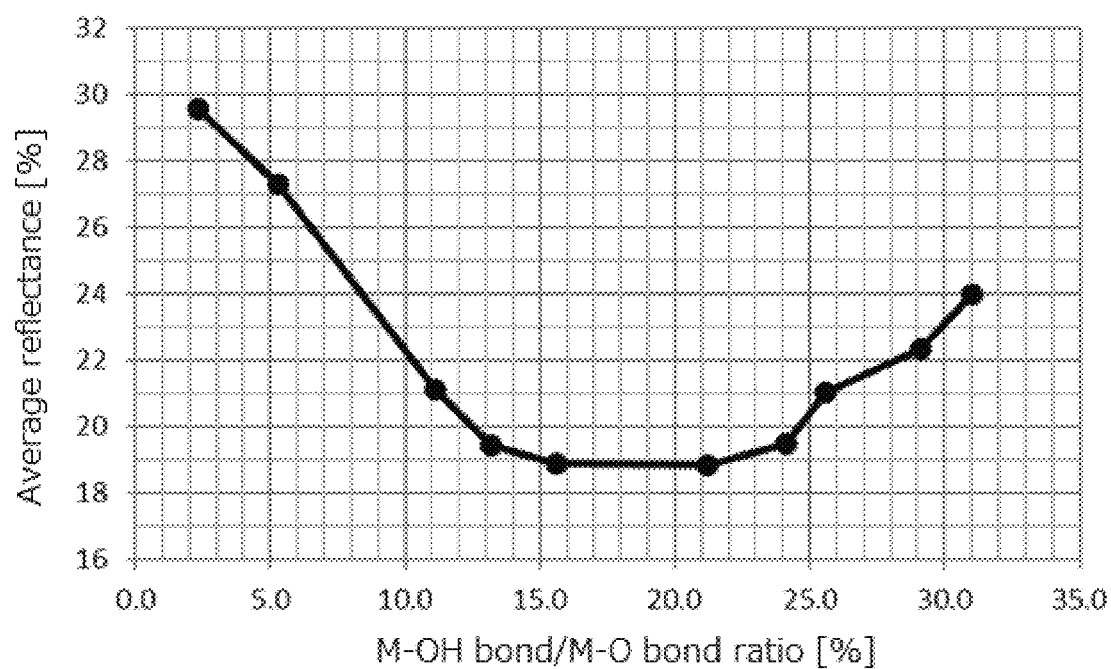

Next, at the time when the silicon compound-coated iron oxide particle was prepared in Example 1, the flow rate of the second fluid (B-solution) was changed so as to change the pH of the ejected solution to prepare the silicon compound-coated iron oxide particle. In Table 3, the M-OH bond ratio and the M-OH bond/M-O bond ratio of the silicon compound-coated iron oxide particle obtained with different preparation condition in each Example is described. By controlling the pH at the time of separating the silicon compound-coated iron oxide particle, the M-OH bond/M-O bond ratio was changed.

group included in the silicon compound-coated iron oxide particles of Example 1 and Example 1, the average reflectance to the light beam in the wavelength of 620 nm to 750 nm to the M-OH ratio included in the silicon compound-coated iron oxide particle is shown. As can be seen in FIG. 15, when the M-OH bond/M-O bond ratio of the silicon compound-coated iron oxide particle is in the range of 10% or more and 28% or less, the average reflectance to the light beam in the wavelength of 620 nm to 750 nm is 22% or less; and thus, the silicon compound-coated iron oxide particle like this can reduce the reflectance in the red color region. Accordingly, when this is used for a laminate coat film, the effect to increase the difference between highlight and shade is so large that this is suitable. In addition, among Examples described in FIG. 15, when the M-OH bond/M-O bond ratio of the silicon compound-coated iron oxide particle is 1% or more and less than 10%, or 28% or more and 35% or less, and the average reflectance to the light beam in the wavelength of 620 nm to 750 nm is 22% or more, the silicon compound-coated iron oxide particle develops a red color more strongly than the silicon compound-coated iron oxide

TABLE 3

| | Introduction flow rate (supply flow rate) [mL/min] | | | Introduction temperature (supply temperature) [° C.] | | | Introduction pressure (supply pressure) [MPaG] | | | Ejected solution | | Shell/core Si/Fe [molar ratio] [Calculated value] | [EDS] | Average primary particle diam. [nm] | M—OH bond/M—O bond ratio [%] |
|---|---|---|---|---|---|---|---|---|---|---|---|---|---|---|---|
| | A-Soln. | B-Soln. | C-Soln. | A-Soln. | B-Soln. | C-Soln. | A-Soln. | B-Soln. | C-Soln. | pH | Temp. [° C.] | | | | |
| Example 1-6 | 400 | 50 | 50 | 141 | 87 | 86 | 0.402 | 0.10 | 0.20 | 12.17 | 29.6 | 0.14 | 0.14 | 9.58 | 28.6 |
| Example 1-7 | 400 | 39 | 50 | 141 | 87 | 86 | 0.396 | 0.10 | 0.20 | 9.42 | 32.9 | 0.14 | 0.14 | 9.67 | 29.2 |
| Example 1-8 | 400 | 38 | 50 | 141 | 87 | 86 | 0.382 | 0.10 | 0.20 | 6.87 | 31.8 | 0.14 | 0.14 | 9.59 | 28.4 |

Figure 13:
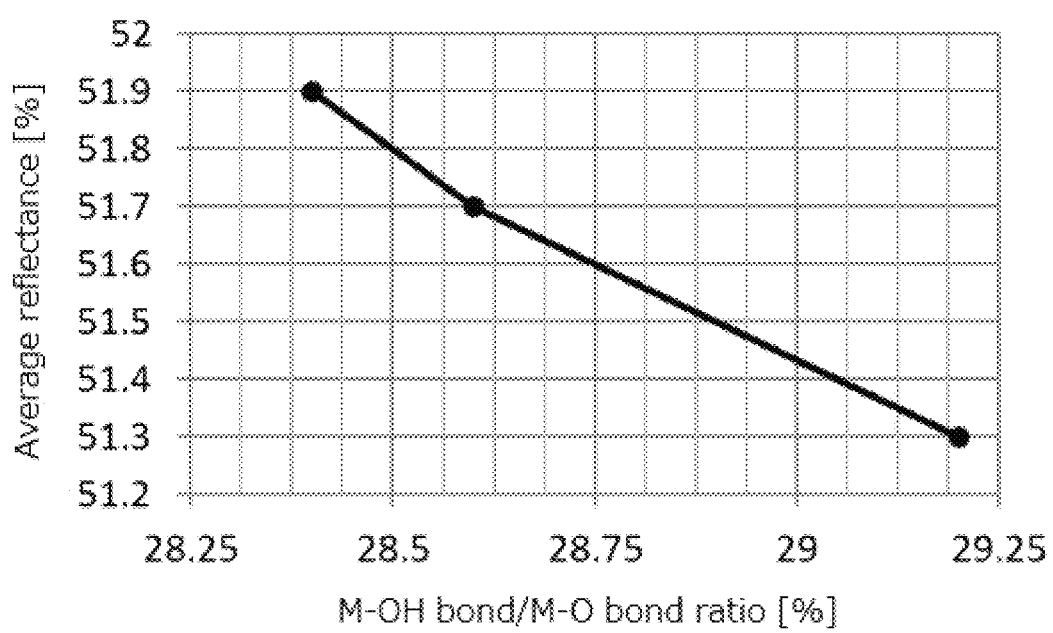

In FIG. 13, the graph of the average reflectance to the light beam in the wavelength of 780 nm to 2500 nm to the M-OH bond/M-O bond ratio of the silicon compound-coated iron oxide particles obtained in Examples 1-6 to 1-8 is shown. As can be seen in FIG. 13, similarly to Examples 1 to 1-5, there is a tendency that when the M-OH bond/M-O bond ratio is lower, the average reflectance to the light beam in the wavelength of 780 nm to 2500 nm is higher.

Figure 14:
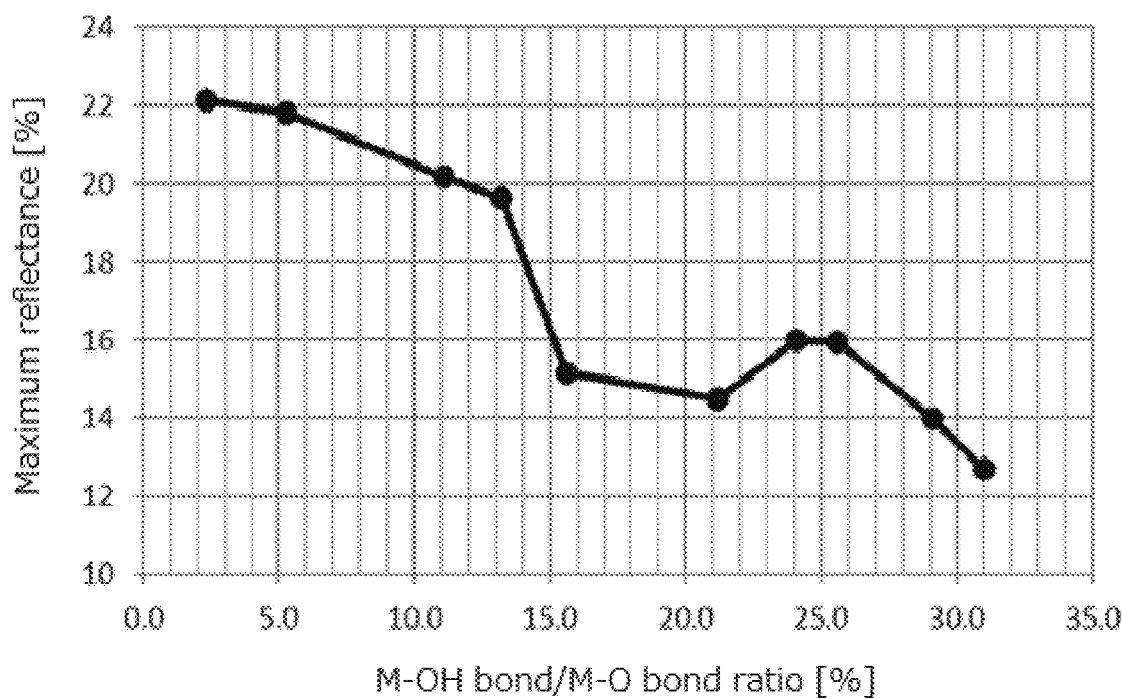

In FIG. 14, the graph of the maximum value of the reflectance (maximum reflectance) to the light beam in the wavelength of 400 nm to 620 nm in the silicon compound-coated iron oxide particle obtained by the changing treatment of the functional group included in the silicon compound-coated iron oxide particles of Example 1 and Example 1 is shown. As can be seen in FIG. 14, in the silicon compound-coated iron oxide particle obtained by the changing treatment of the functional group of the silicon compound included in the silicon compound-coated iron oxide particles of Example 1 and Example 1, when the M-OH bond/M-O bond ratio of the silicon compound-coated iron oxide particle is in the range of 14% or more and 35% or more, the silicon compound-coated iron oxide particle is the silicon compound-coated iron oxide particle whose maximum reflectance to the light beam in the wavelength of 400 nm to 620 nm is 18% or less; and thus, the effect to suppress the reflection to the light other than red can be seen. Because the silicon compound-coated iron oxide particle like this can reduce the light other than red, this is suitably used in the coating composition such as a laminate coat film showing a red color.

In FIG. 15, in the silicon compound-coated iron oxide particle obtained by the changing treatment of the functional particle whose average reflectance to the light beam in the wavelength of 620 nm to 750 nm is less than 22%. Accordingly, in the case where it is used as a red pigment or as a general paint, amount of other red pigment can be reduced when forming a red coat film, or it can be suitably used for fine tuning of a color and so forth.

Figure 16:
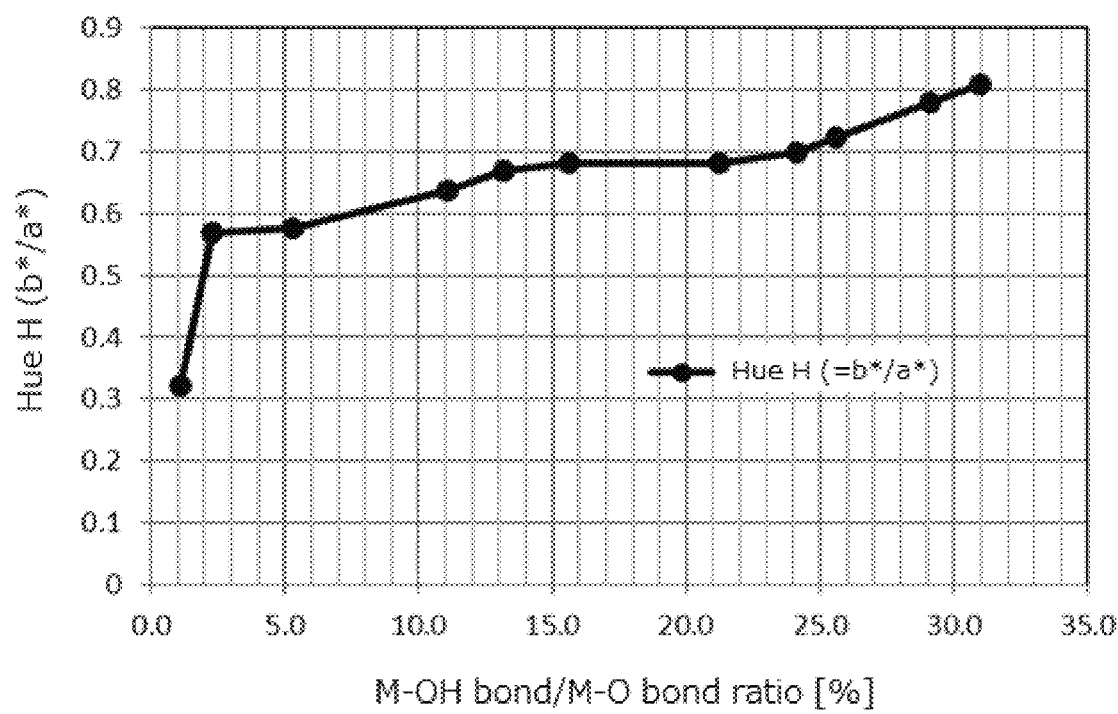

In FIG. 16, the graph of the hue H (=b*/a*) in the L*a*b* color system to the M-OH bond/M-O bond ratio in the silicon compound-coated iron oxide particle obtained by the changing treatment of the functional group included in the silicon compound-coated iron oxide particles of Example 1 and Example 1 is shown. In Table 4, the hue H of the silicon compound-coated iron oxide particle obtained in each of Example 1 and Examples 1-2 to 1-5 is shown. As described in Table 4, it can be seen that by controlling the M-OH bond/M-O bond ratio, the hue H can be controlled. In the silicon compound-coated iron oxide particle of the present invention, it is preferable that the M-OH bond/M-O bond ratio of the silicon compound-coated iron oxide particle be 2% or more and 25% or less, and that the hue H (=b*/a*) in the L*a*b* color system be in the range of 0.5 to 0.9.

TABLE 4

| Example | 1 | 1-2 | 1-3 | 1-4 | 1-5 |
|---|---|---|---|---|---|
| M—OH bond/M—O bond ratio [%] | 31.0 | 25.6 | 21.2 | 13.2 | 5.3 |
| Hue H (=b*/a*) | 0.81 | 0.72 | 0.68 | 0.67 | 0.58 |

Figure 17:
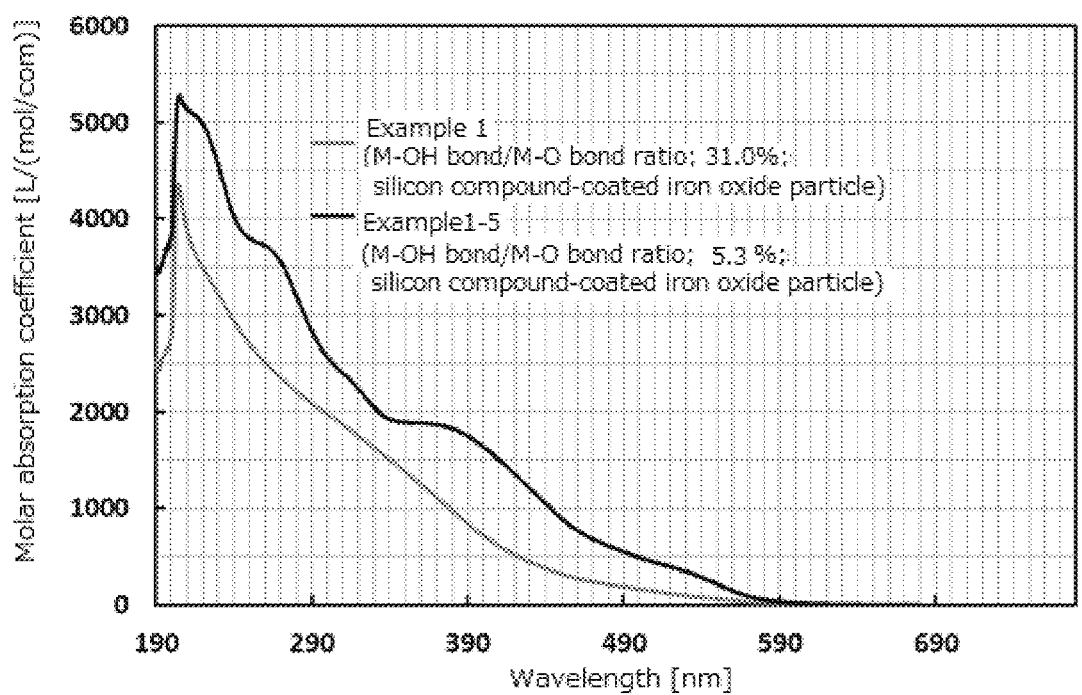
Figure 18:
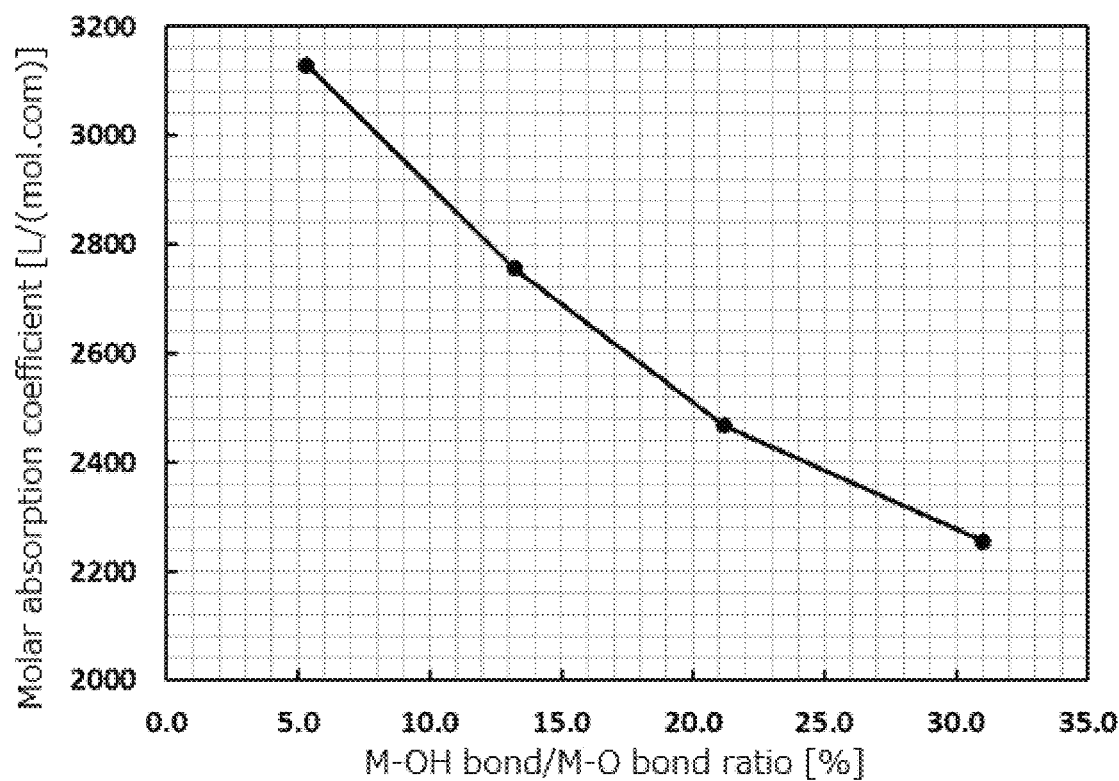

In FIG. 17, the graph of the molar absorption coefficient calculated from the absorption spectrum of the dispersion solution in which the silicon compound-coated iron oxide particle obtained in each of Example 1 and Example 1-5 is dispersed into propylene glycol and the concentration (as $Fe_2O_3$) of the silicon compound-coated iron oxide particle in the dispersion solution used for the measurement the measured wavelength is shown. In FIG. 18, the graph of the average molar absorption coefficient with the wavelength range of 190 nm to 380 nm to the M-OH bond/M-O bond ratio of the silicon compound-coated iron oxide particle obtained in each of Example 1 and Examples 1-3 to 1-5 is shown. In Table 5, the M-OH bond/M-O bond ratio of the silicon compound-coated iron oxide particle obtained in each of Example 1 and Examples 1-3 to 1-5 and the average molar absorption coefficient thereof with the wavelength range of 190 nm to 380 nm are shown.

TABLE 5

| Example | 1 | 1-3 | 1-4 | 1-5 |
|---|---|---|---|---|
| M—OH bond/M—O bond ratio [%] | 31.0 | 21.2 | 13.2 | 5.3 |
| Average molar absorption coefficient [L/(cm · mol)] (190 nm to 380 nm) | 2255 | 2467 | 2756 | 3129 |

As can be seen in FIG. 18 and Table 5, there is a tendency that as the M-OH bond/M-O bond ratio is lower the average molar absorption coefficient with the wavelength range of 190 nm to 380 nm is higher. In the silicon compound-coated iron oxide particle of the present invention, it is preferable that the ratio of the M-OH bond included in the silicon compound-coated iron oxide particle be 5% or more and 35% or less and that the average molar absorption coefficient to the light beam in the wavelength of 190 nm to 380 nm be 2200 L/(mol·cm) or more in the dispersion solution in which the silicon compound-coated iron oxide particle is dispersed in a dispersion medium. When the molar absorption coefficient increases to this level, design of the coating composition or the film-like composition can be made easily. Namely, protection from a UV beam becomes possible even by addition of a very small quantity of the silicon compound-coated iron oxide particle. In addition, by utilizing development of the red color in the iron oxide, the coated material, film, and glass having highly designable characteristics from a pale skin color to a highly developed red color can be prepared.

Figure 19:
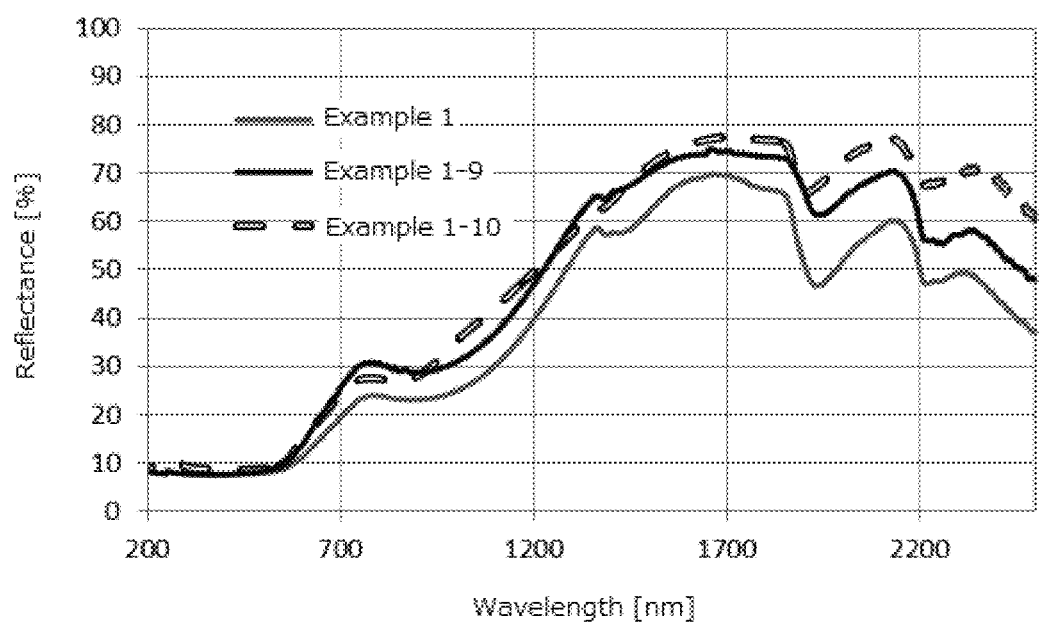

FIG. 19 shows the reflection spectrum of the silicon compound-coated iron oxide particle of Example 1-9, which is obtained in such a way that as the changing treatment of the functional group of the silicon compound-coated iron oxide particle, the hydroxyl group included in the silicon compound-coated iron oxide particle obtained in Example 1 is reacted with an acetyl group so as to provide the silicon compound-coated iron oxide particle with an acetoxylyl group. Table 6 shows the M-OH bond/M-O bond ratio, which is calculated from the IR spectrum and separation of the wave shapes, and the average reflectance to the light beam in the wavelength of 780 nm to 2500 nm. In the silicon compound-coated iron oxide particle of Example 1-9, in order to provide the silicon compound-coated iron oxide particle obtained in Example 1 with the acetoxylyl group, which is an ester group, the following procedure was carried out. First, 1 parts by weight of the silicon compound-coated iron oxide particle obtained in Example 1 was charged into 99 parts by weight of propylene glycol (manufactured by Kishida Chemical Co., Ltd.); and then, the resulting mixture was dispersed by using Clearmix (product name: CLM-2.2S, manufactured by M. Technique Co., Ltd.), which is a high speed rotational dispersion emulsifier, at 65° C. for 1 hour with the rotation number of the rotor thereof being 20000 rpm to obtain the dispersion solution. To the propylene glycol dispersion solution of the silicon compound-coated iron oxide particle thus obtained were added pyridine (manufactured by Kanto Chemical Co., Ltd.) and acetic anhydride (manufactured by Kishida Chemical Co., Ltd.) with the amount thereof being 2 parts by weight and 1 parts by weight, respectively, relative to 1 parts by weight of the silicon compound-coated iron oxide particle; and then, they were dispersed by using the high speed rotational dispersion emulsifier at 65° C. for 1 hour with the rotation number of the rotor thereof being 20000 rpm. The treated solution thus obtained was centrifugally separated under the condition of 26000 G for 15 minutes, and then, the deposited material was obtained by separating the supernatant. Part of the settled material was dried at −0.10 MPaG and 25° C. for 20 hours to obtain dried powders. As a result of the TEM observation, it was confirmed that the silicon compound-coated iron oxide particle obtained in Example 1-9 is almost the same particle as the silicon compound-coated iron oxide particle obtained in Example 1.

Figure 20:
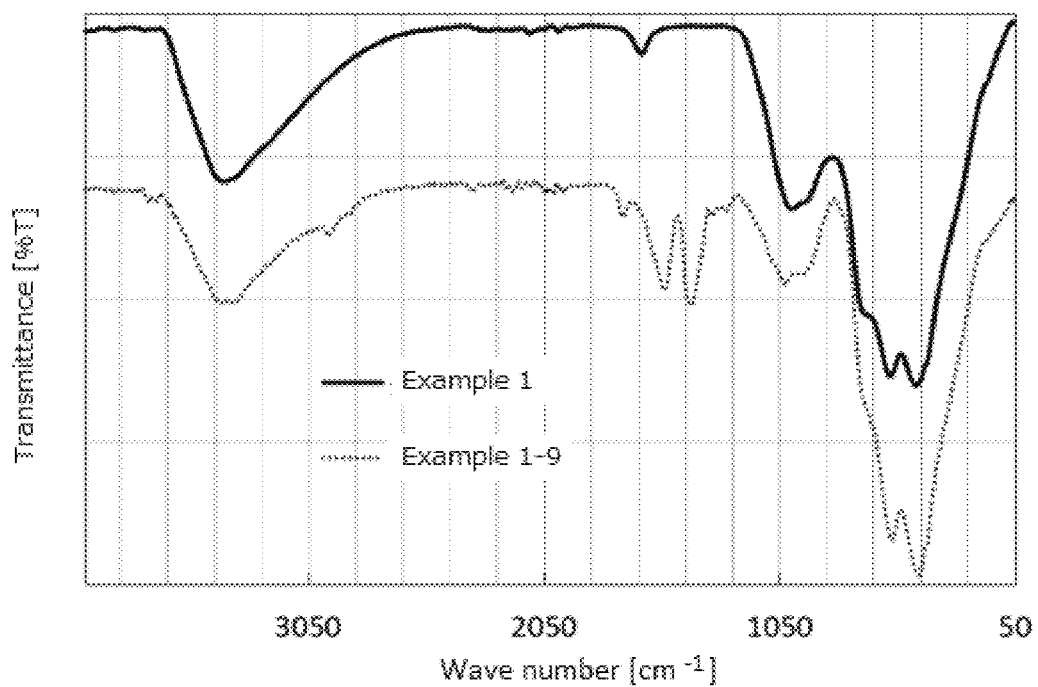

FIG. 20 shows the FT-IR spectrum (infrared absorption spectrum) measurement results of the silicon compound-coated iron oxide particles obtained in Example 1 and Example 1-9. From the FT-IR measurement result of the silicon compound-coated iron oxide particle obtained in Example 1-9, which is the silicon compound-coated iron oxide particle obtained in Example 1 provided with the acetoxylyl group, the broad peak in the range of about 2900 $cm^{-1}$ to about 3600 $cm^{-1}$ derived from the hydroxy group which was observed in the FT-IR measurement result of the silicon compound-coated iron oxide particle obtained in Example 1 becomes smaller, while new peaks are detected at about 1450 $cm^{-1}$ and at about 1600 $cm^{-1}$. It is presumed that the hydroxy group included in the silicon compound-coated iron oxide particle obtained in Example 1 is reacted with the acetyl group to form an ester bond thereby providing the silicon compound-coated iron oxide particle with the acetoxylyl group. In addition, a change is observed in the peak in the range of about 800 $cm^{-1}$ to about 1250 $cm^{-1}$. The wave shapes of the peaks in the wave number range of 100 $cm^{-1}$ to 1250 $cm^{-1}$ in the IR spectra of Example 1 and Example 1-9 were separated to calculate the M-OH bond/M-O bond ratio. The results thereof together with the average reflectance to the light beam in the wavelength of 780 nm to 2500 nm are described in Table 6. The results of the silicon compound-coated iron oxide particle obtained in Example 1-10 are also described in Table 6 and FIG. 19, wherein the particle of Example 1-10 is obtained with the same condition as Example 1-9 in the process in which pyridine and acetic anhydride are charged and the dispersion processing is carried out at 65° C. for 1 hour with the rotation number of the rotor thereof being 20000 rpm, except that the said temperature is changed to 80° C. and the dispersion processing period is changed to 2 hours.

From FIG. 19 and Table 6, it can be seen that when the acetyl group is acted to the hydroxy group included in the silicon compound-coated iron oxide particle, the M-OH bond/M-O bond ratio is decreased and the average reflectance to the light beam in the wavelength of 780 nm to 2500 nm is increased. As can be seen in Table 6, there is a tendency that as compared with Example 1, the average reflectance to the light beam in the wavelength of 780 nm to 2500 nm is higher in Examples 1-9 and 1-10 in which the M-OH bond/M-O bond ratio is lower. In the present invention, it is preferable that the silicon compound of the silicon compound-coated iron oxide particle include an ester bond, the M-OH bond/M-O bond ratio be 5% or more and 30% or less, and the average reflectance to the light beam in the wavelength of 780 nm to 2500 nm be 50% or more.

TABLE 6

| Example | 1 | 1-9 | 1-10 |
|---|---|---|---|
| M—OH bond/M—O bond ratio [%] | 31.0 | 23.4 | 6.4 |
| Average reflectance [%] (780 nm to 2500 nm) | 48.8 | 56.9 | 67.4 |

Example 1-11 to Example 1-13

Figure 34:
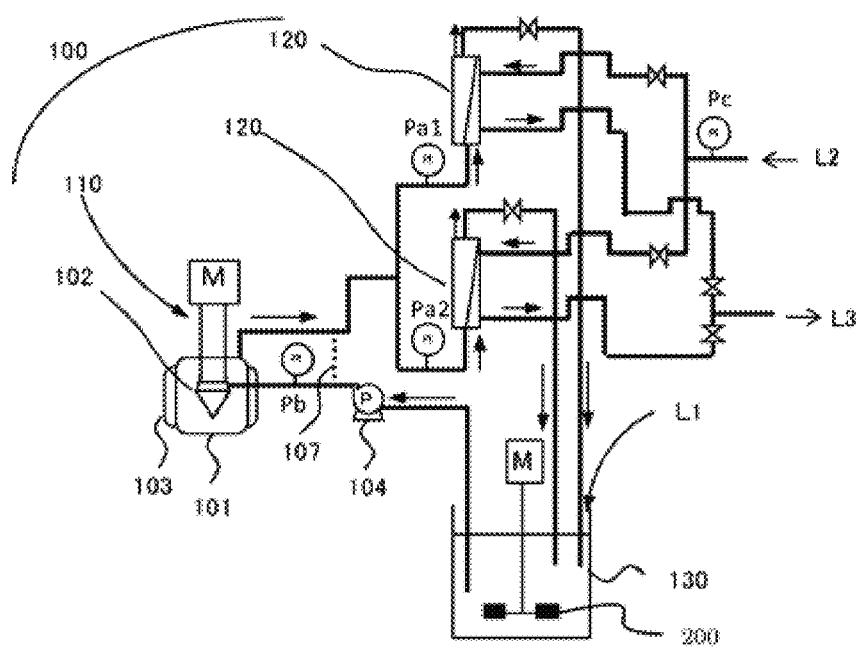

Next, the silicon compound-coated iron oxide particle was prepared in the same way as Example 1, except that in Example 1, the silicon compound-coated iron oxide particle dispersion solution which was ejected from the fluid processing apparatus and re in the beaker was processed by using the dispersion solution reformation apparatus 100 that is illustrated in FIG. 34. One example of the apparatus in which the dispersing apparatus and a filtration membrane are continuously connected is the dispersion solution reformation apparatus 100. The dispersion solution reformation apparatus 100 in FIG. 34 is a typical example of the apparatus which can be used to control the M-OH bond/M-O bond ratio relating to the embodiment of the present invention wherein pH and conductivity of the silicon compound-coated iron oxide particle dispersion solution are adjusted by removing the impurities from the silicon compound-coated iron oxide particle dispersion solution. Specifically, the dispersion solution reformation apparatus 100 includes the dispersion processing equipment 110, the removal unit 120 provided with a filtration membrane, and the storing vessel 130, wherein these equipment are connected by a piping system. The dispersion processing equipment 110 is composed of the dispersing vessel 101 and the disperser 102 attached thereto, as the main components.

The silicon compound-coated iron oxide particle dispersion solution that is ejected from the fluid processing apparatus and re in the beaker in Example 1 is charged as the silicon compound-coated iron oxide particle dispersion solution L1 into the storing vessel 130; and then, by starting up the pump 104, the silicon compound-coated iron oxide particle dispersion solution L1 is supplied to the dispersing vessel 101. The silicon compound-coated iron oxide particle dispersion solution L1 that is sent by the pump 104 fills the dispersing vessel 101 and overflows so as to be sent to the removal unit 120, whereby a part thereof is discharged as the filtrated solution L3 together with the cross-flow washing solution L2, and a part thereof is recharged into the storing vessel 130. Meanwhile, it is preferable that the storing vessel 130 be equipped with the stirrer 200 in order to make concentration of the dispersion solution uniform. The silicon compound-coated iron oxide particle dispersion solution recharged into the storing vessel 130 is supplied again to the dispersing vessel 101, thereby the dispersion and the removal of the impurities are carried out continuously and repeatedly.

By carrying out the reformation process of the silicon compound-coated iron oxide particle dispersion solution by the apparatus based on the principle described in FIG. 34, the impurities can be removed after the impurities in the agglomerate of the silicon compound-coated iron oxide particle included in the silicon compound-coated iron oxide particle dispersion solution are discharged into the said dispersion solution and before reagglomeration thereof takes place with the elapse of time, namely the impurities can be removed during the period when much more amount of impurities are present in the dispersion solution. Therefore, strict control of the M-OH bond ratio and the M-OH bond/M-O bond ratio can be made to individual silicon compound-coated iron oxide particle under the state in which the silicon compound-coated iron oxide particles are uniformly dispersed; and thus, this method is effective.

In Table 7, the conditions to control the M-OH bond/M-O bond ratio by using the dispersion solution reformation apparatus 100 of FIG. 34 are summarized.

First, 15 kg of pure water ((1) in Table 7: pH of 5.89 (measurement temperature of 22.4° C.) and conductivity of 0.80 µS/cm (measurement temperature of 22.4° C.)) was charged into the storing vessel 130 illustrated in FIG. 34; and then, operation of the pump 104 was started so as to supply the pure water into the dispersing vessel 101 equipped with the disperser 102 ((3) in Table 7: Clearmix (product name: CLM-2.2S, rotor: RI, screen: S0.8-48, manufactured by M. Technique Co., Ltd.), which is the high speed rotational dispersion emulsifier)). The pure water sent by the pump 104 filled the dispersing vessel 101 and overflowed therefrom so as to be sent, as the cross-flow washing solution, at the flow rate of 1.5 L/minute and the temperature of 21° C. ((2) in Table 7: pH of 5.89 (measurement temperature of 22.4° C.) and conductivity of 0.80 µS/cm (measurement temperature of 22.4° C.)), to the hollow fiber type dialyzer as the membrane of the removal unit 120 ((4) in Table 7: membrane area of 2.2 m$^2$, material of polysulfone, manufactured by Nikkiso Co., Ltd.), wherein part thereof, together with the cross-flow washing solution, was discharged as the filtrate L3, and part thereof was returned again to the storing vessel 130.

Next, operation of the disperser 102 was started with setting the rotation number of the rotor thereof to 20000 rpm ((5) in Table 7: circumferential velocity of 31.4 m/sec). When the pure water in the storing vessel 130 was discharged to 1 L (about 1 kg), 14 L (about 14 kg) of the silicon compound-coated iron oxide particle dispersion solution (pH: 11.02 (measurement temperature of 30.6° C.)) was charged into the storing vessel 130 ((6) and (7) in Table 7). The silicon compound-coated iron oxide particle dispersion solution was mixed with the pure water being circulated in the equipment; and similarly to the pure water mentioned above, this solution was circulated from the vessel to the dispersion processing equipment and to the vessel via the filtration membrane. At this time, pH of the silicon compound-coated iron oxide particle dispersion solution in the storing vessel 130 was 10.88 (measurement temperature of 26.6° C.) ((8) in Table 7), and the conductivity thereof was 8120 µS/cm (measurement temperature of 26.6° C.) ((9) in Table 7).

The silicon compound-coated iron oxide particle dispersion solution was dispersed in the dispersing vessel 101, and sent to the removal unit 120 so as to be filtrated, whereby the filtrate L3 including the impurities was discharged together with the cross-flow washing solution. The silicon compound-coated iron oxide particle dispersion solution sent at the flow rate of 8.8 L/minute by means of the pump 104 ((10) in Table 7) was returned again to the storing vessel 130 at the flow rate of 7.3 L/minute ((11) in Table 7), thus, indicating that the filtrate L3 including the impurities was discharged at the flow rate of 1.5 L/minute by the filtration membrane of the removal unit 120 ((12) in Table 7).

When the silicon compound-coated iron oxide particle dispersion solution in the storing vessel 130 was concentrated to 1.5 L (about 1.5 kg), 13.5 L (about 13.5 kg) of pure water (pH of 5.89 (measurement temperature of 22.4° C.) and conductivity of 0.80 μS/cm (measurement temperature of 22.4° C.)) was charged into the storing vessel 130 ((13) and (14) in Table 7). The operation was continued without changing the condition before, during, and after the charge thereof so as to remove the impurities in the silicon compound-coated iron oxide particle dispersion solution. Between during concentration (1.5 L of the dispersion solution) and during dilution (15 L of the dispersion solution), concentration of the silicon compound-coated iron oxide particle in the silicon compound-coated iron oxide particle dispersion solution fluctuated between 0.4% by weight and 2.0% by weight ((15) in Table 7). With regard to the pressure meters in FIG. 34, both two Pa indicated 0.10 MPaG, Pb indicated 0.15 MPaG, and Pc indicated 0.02 MPaG ((16), (17), and (18) in Table 7). With regard to the just-before transporting path from the dispersing vessel 101 to the removal unit 120, the path length (Lea) was 0.3 m ((19) in Table 7) and the inner diameter of pipe (Leb) was 0.0105 m ((20) in Table 7). The flow rate of the silicon compound-coated iron oxide particle dispersion solution in the just-before transporting path was 1.2 m/sec ((21) in Table 7), and the time T1 from the dispersing vessel 101 to start of removal of the impurity by the removal unit 120 was 0.24 sec (0.24 seconds) ((22) in Table 7), that is, it is presumed to be 3 seconds or less. From the thermometer (not illustrated in the drawing) installed in the dispersing vessel 101, the temperature was 23 to 26° C. ((23) in Table 7), and the temperature of the silicon compound-coated iron oxide particle dispersion solution in the storing vessel 130 was 23 to 26° C. ((24) in Table 7) during this processing. Meanwhile, for measurement of conductivity, the conductivity meter (catalogue number; ES-51, manufactured by HORIBA, Ltd.) was used ((25) in Table 7).

The dispersion processing of the silicon compound-coated iron oxide particle dispersion solution and the operation to remove the impurities in the silicon compound-coated iron oxide particle dispersion solution were repeated until pH of the silicon compound-coated iron oxide particle dispersion solution reached 6.91 (measurement temperature of 24.6° C.) and the conductivity thereof reached 7.14 μS/cm, thereby not only the impurities included in the agglomerate of the silicon compound-coated iron oxide particles were removed, but also all the silicon compound-coated iron oxide particles in the silicon compound-coated iron oxide particle dispersion solution were reformed.

TABLE 7

| | Processing solution | Example 1-11 Silicon compound-coated iron oxide particle dispersion solution |
|---|---|---|
| (1) | Initial solution amount charged into the storing vessel 130 | Kind: Pure water pH: 5.89 (measurement temperature: 22.4° C.) Conductivity: 0.80 μS/cm (measurement temperature: 22.4° C.) Charged amount: 15 kg |
| (2) | Cross flow washing solution: kind, flow rate, and temperature | Kind: Pure water pH: 5.89 (measurement temperature: 22.4° C.) Conductivity: 0.80 μS/cm (measurement temperature: 22.4° C.) Flow rate: 1.5 L/min, 21° C. |
| (3) | Disperser 102 | Clearmix (product name: CLM-2.2S, rotor: R1, screen: S0.8-48, manufactured by M. Technique Co., Ltd.) |
| (4) | Removal unit 120 | Hollow fiber type dialyzer PN-220 (membrane area; 2.2 m$^2$, material; polysulfone, manufactured by Nikkiso Co., Ltd.) |
| (5) | Rotation number of the rotor | 20000 rpm (circumferential velocity of 31.4 m/sec) |
| (6) | Start of charging of the oxide particle dispersion solution | When initial pure water in the storing vessel 130 is decreased to 1 L. |
| (7) | Charge amount of the oxide particle dispersion solution into the storing vessel 130 | 14 L (about 14 kg) |
| (8) | pH of the oxide particle dispersion solution in the storing vessel 130 | 10.88 (measurement temperature: 26.6° C.) |
| (9) | Conductivity of the oxide particle dispersion solution in the storing vessel 130 | 8120 μS/cm (measurement temperature: 26.6° C.) |
| (10) | Flow rate of the pump 104 | 8.8 L/min |
| (11) | Flow rate of the oxide particle dispersion solution returned to the storing vessel 130 | 7.3 L/min |
| (12) | Discharge amount of the filtrate L3 by the removal unit 120 (calculated value) | 1.5 L/min |
| (13) | Charge timing of the diluting solution into the storing vessel 130 | When amount of the dispersion solution in the storing vessel 130 is concentrated to 1.5 L |
| (14) | Second diluting solution into the storing vessel 130: kind and the charged amount | Kind: Pure water pH: 5.89 (measurement temperature: 22.4° C.) Conductivity: 0.80 μS/cm (measurement temperature: 22.4° C.) Charged amount: 13.5 L (about 13.5 kg) |

TABLE 7-continued

| | Processing solution | Example 1-11<br>Silicon compound-coated iron oxide particle<br>dispersion solution |
|---|---|---|
| (15) | Concentration of the oxide particle in the oxide particle dispersion solution | From 0.4% by weight to 2.0% by weight |
| (16) | Pressure meter | Pa: Both are 0.10 MPaG |
| (17) | Pressure meter | Pb: 0.15 MPaG |
| (18) | Pressure meter | Pc: 0.02 MPaG |
| (19) | Path length (Lea) | 0.3 m |
| (20) | Inner diameter of pipe (Leb) | 0.0105 m |
| (21) | Flow rate of the oxide particle dispersion solution in the just-before transporting path | 1.2 m/sec |
| (22) | Time T1 from the dispersing vessel 101 to start of removal of the impurities by the removal unit 120 | 0.24 sec |
| (23) | Thermometer installed in the dispersing vessel 101 | 23 to 26° C. |
| (24) | Temperature of the oxide particle dispersion solution | 23 to 26° C. |
| (25) | Conductivity measurement apparatus | Conductivity meter (catalogue number; ES-51, manufactured by HORIBA, Ltd.) |

By changing the processing temperature in the reformation processing of the silicon compound-coated iron oxide particle dispersion solution described in (23) and (24) of Table 7, the silicon compound-coated iron oxide particles having different M-OH bond/M-O bond ratio were prepared in Example 1-11 to Example 1-13. The processing temperature in the reformation processing of the silicon compound-coated iron oxide particle dispersion solution, the M-OH bond/M-O bond ratio of the obtained silicon compound-coated iron oxide particle, the average reflectance thereof with the wavelength range of 780 nm to 2500 nm, and the average molar absorption coefficient thereof with the wavelength range of 190 nm to 380 nm, together with the results of Example 1, are summarized in Table 8.

TABLE 8

| Example | 1 | 1-11 | 1-12 | 1-13 |
|---|---|---|---|---|
| Processing temperature (Table 7: (23)) [° C.] | — | 23 to 26 | 43 to 46 | 59 to 61 |
| Processing temperature (Table 7: (24)) [° C.] | — | 23 to 26 | 43 to 46 | 59 to 61 |
| M—OH bond/M—O bond ratio [%] | 31.0 | 28.6 | 12.5 | 5.1 |
| Average reflectance [%] (780 nm to 2500 nm) | 48.8 | 54.2 | 60.1 | 68.4 |
| Average molar absorption coefficient [L/(cm · mol)] (190 nm to 380 nm) | 2255 | 2314 | 2614 | 2946 |

As can be seen in Table 8, there is a tendency that when the M-OH bond/M-O bond ratio is lower, the average reflectance with the wavelength range of 780 nm to 2500 nm and the average molar absorption coefficient with the wavelength range of 190 nm to 380 nm are higher. Accordingly, it was found that the color characteristics can be controlled by controlling the M-OH bond/M-O bond ratio.

Example 2

Hereinafter, in Example 2, the silicon compound-coated zinc oxide particle having at least part of surface of the zinc oxide particle surface coated with a silicon compound is described as the oxide particle. By using Clearmix (product name: CLM-2.2S, manufactured by M. Technique Co., Ltd.), which is a high speed rotational dispersion emulsifier, the oxide separating solvent (A-solution), the oxide raw material solution (B-solution), and the silicon compound raw material solution (C-solution) each were prepared. Specifically, according to the prescription of the oxide raw material solution described in Example 2 of Table 9, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescription of the oxide separating solvent described in Example 2 of Table 9, each component of the oxide separating solvent were uniformly mixed by stirring for 30 minutes at the preparation temperature of 45° C. by using Clearmix with the rotation number of the rotor thereof being 15000 rpm to obtain the oxide separating solvent. Further, according to the prescription of the silicon compound raw material solution described in Example 2 of Table 9, each component of the silicon compound raw material solution were uniformly mixed by stirring for 10 minutes at the preparation temperature of 20° C. by using Clearmix with the rotation number of the rotor thereof being 6000 rpm to obtain the silicon compound raw material solution.

Meanwhile, the substances used here and represented by chemical formula or abbreviation described in Table 9 are: MeOH for methanol (manufactured by Godo Co., Ltd.), 97 wt % $H_2SO_4$ for concentrated sulfuric acid (manufactured by Kishida Chemical Co., Ltd.), KOH for potassium hydroxide (manufactured by Nippon Soda Co., Ltd.), 35 wt % HCl for hydrochloric acid (manufactured by Kanto Chemical Co., Ltd.), TEOS for tetraethyl orthosilicate (manufactured by Wako Pure Chemical Industries, Ltd.), and ZnO for zinc oxide (manufactured by Kanto Chemical Co., Ltd.)

Next, the oxide raw material solution, the oxide separating solvent, and the silicon compound raw material solution, all having been prepared as described above, were mixed by using the fluid processing apparatus described in Patent Document 7 that was filed by the applicant of the present invention. The processing method of each fluid and the recovery method of the processed solution were the same as those of Example 1.

In Table 10, operation conditions of the fluid processing apparatus, the average primary particle diameter calculated from the TEM observation result of the silicon compound-coated zinc oxide particles, and the Si/Zn molar ratio calculated from and TEM-EDS analysis, together with the calculated value thereof from the prescriptions and introduction flow rates of the A-solution, B-solution, and C-solution, are listed. The measurement of pH, analyses, and washing method of the particle were the same as those of Example 1.

TABLE 9

| | Prescription of first fluid (A-solution: oxide separating solvent) | | | | | Prescription of second fluid (B-solution: oxide raw material solution) | | | | | | | |
|---|---|---|---|---|---|---|---|---|---|---|---|---|---|
| | Prescription | | | | | Prescription | | | | | | | |
| | Raw material | [wt %] | Raw material | [wt %] | pH | pH [° C.] | Raw material | [wt %] | Raw material | [wt %] | Raw material | [wt %] | pH | pH [° C.] |
| Example 2 | 97 wt % H₂SO₄ | 6.29 | MeOH | 93.71 | <1 | — | ZnO | 3.00 | KOH | 46.56 | Pure water | 50.44 | >14 | — |

| | Prescription of third fluid (C-solution: silicon compound raw material solution) | | | | | | | |
|---|---|---|---|---|---|---|---|---|
| | Prescription | | | | | | | |
| | Raw material | [wt %] | Raw material | [wt %] | Raw material | [wt %] | pH | pH [° C.] |
| Example 2 | MeOH | 88.12 | 35 wt % HCl | 10.22 | TEOS | 1.66 | <1 | — |

TABLE 10

| | Introduction flow rate (supply flow rate) [mL/min] | | | Introduction temperature (supply temperature) [° C.] | | | Introduction pressure (supply pressure) [MPaG] | | | Ejected solution | | Shell/core Si/Zn [molar ratio] | | Average primary particle |
|---|---|---|---|---|---|---|---|---|---|---|---|---|---|---|
| | A-Soln. | B-Soln. | C-Soln. | A-Soln. | B-Soln. | C-Soln. | A-Soln. | B-Soln. | C-Soln. | pH | Temp. [° C.] | [Calculated value] | [EDS] | diam. [nm] |
| Example 2 | 575 | 50 | 75 | 28 | 25 | 25 | 0.108 | 0.10 | 0.10 | 13.61 | 35.7 | 0.32 | 0.32 | 14.10 |

Figure 21:
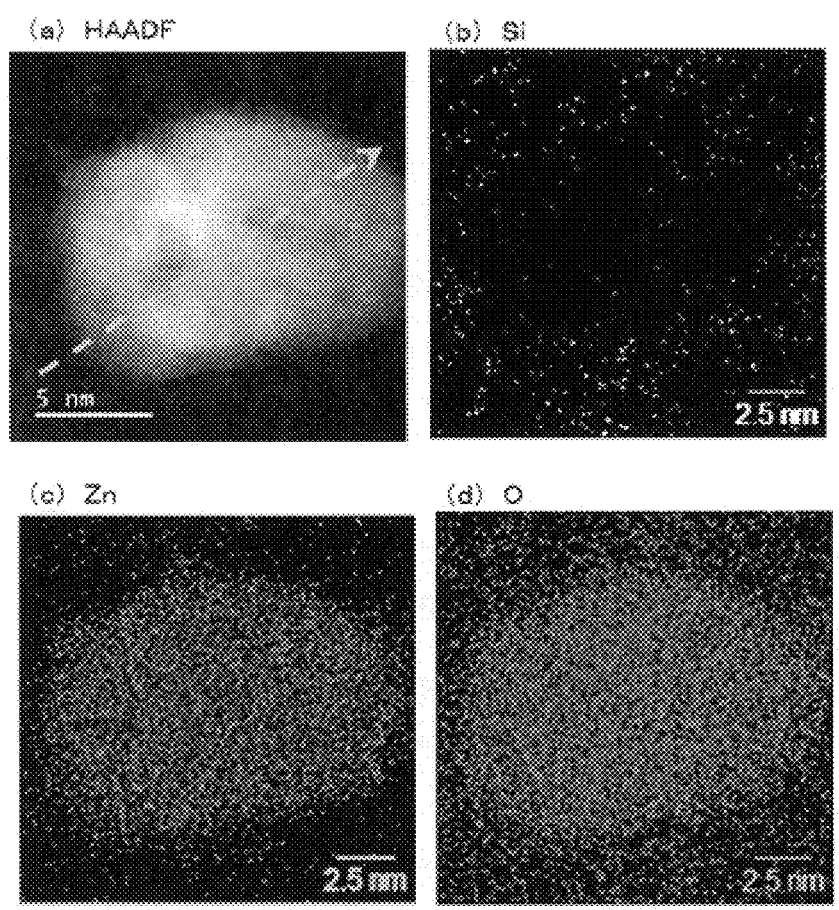
Figure 22:
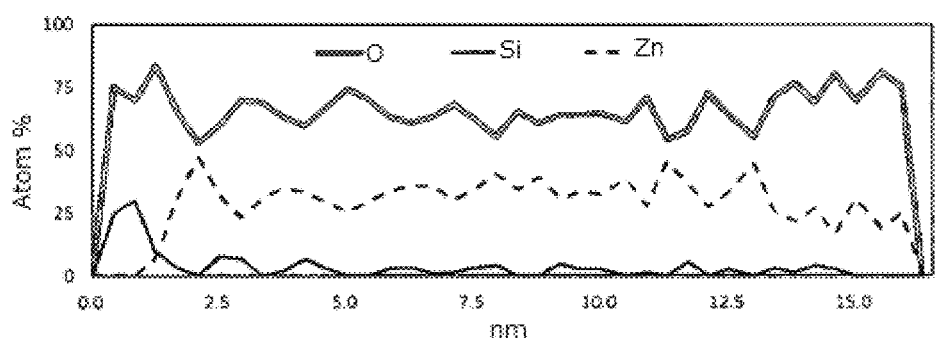

In FIG. 21, the mapping result using STEM of the silicon compound-coated zinc oxide particle obtained in Example 2 is shown; and in FIG. 22, the result of the line analysis in the position where a dotted line is drawn in the HAADF picture of FIG. 21 is shown. As can be seen in FIG. 21 and FIG. 22, in the silicon compound-coated zinc oxide particles obtained in Example 2, the silicon compound-coated zinc oxide particle in which part of the surface of the zinc oxide particle was coated with the silicon compound, i.e., the particle whose entire surface was not coated with the silicon compound, was also observed.

Figure 23:
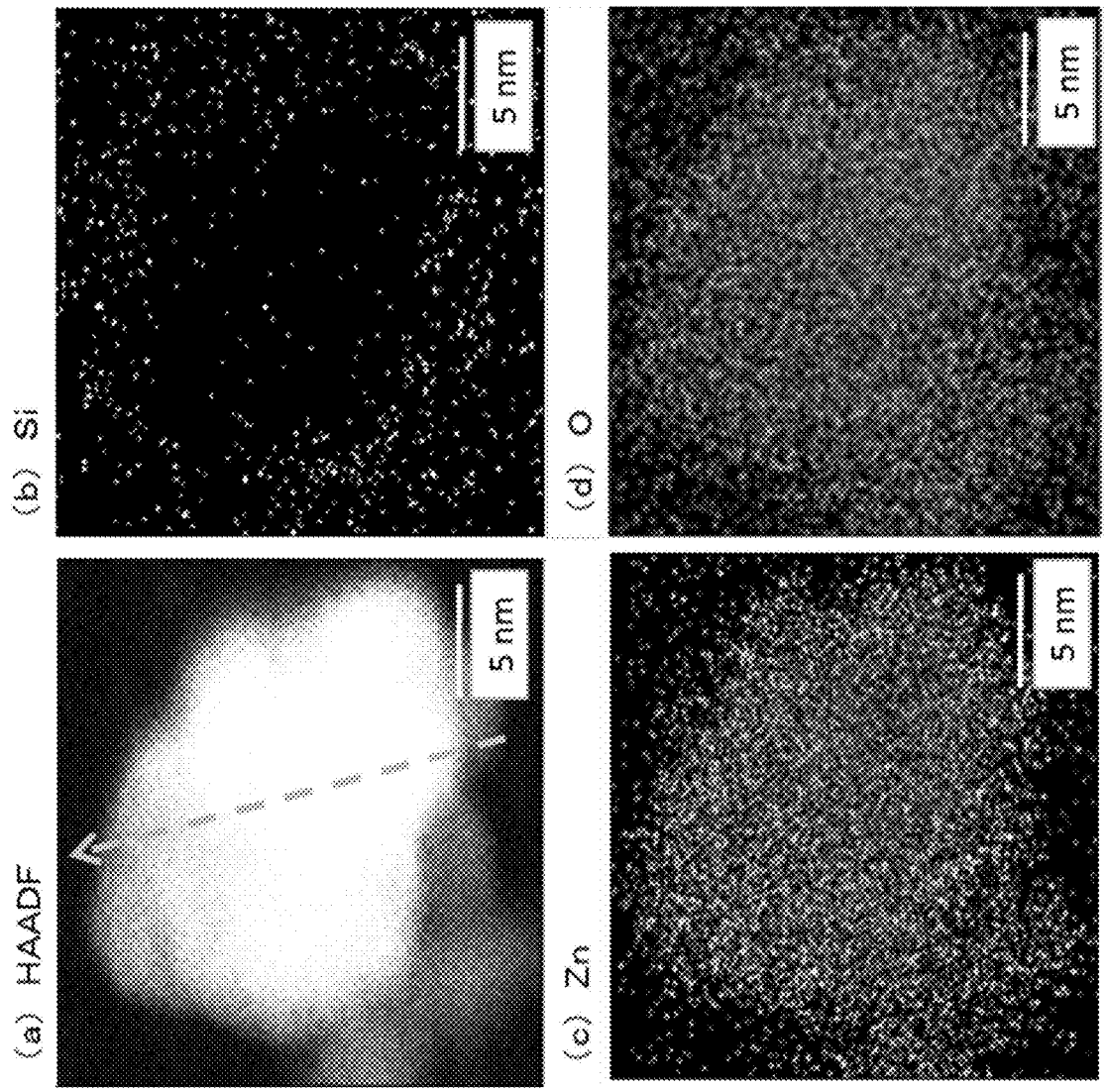
Figure 24:
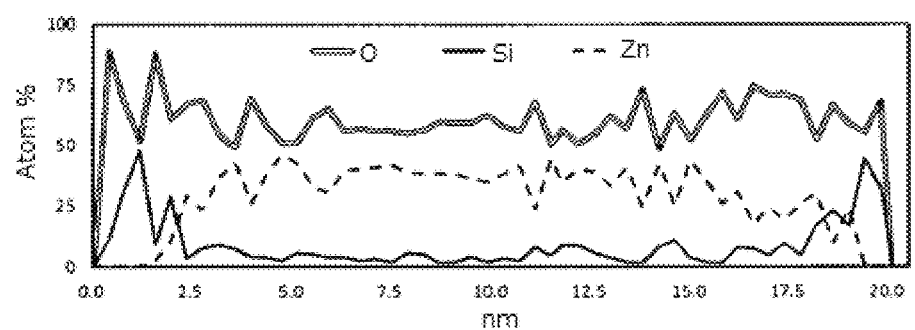

The silicon compound-coated zinc oxide particle obtained in Example 2 was subjected to the heat treatment using an electric furnace as the changing treatment of the functional group included in the silicon compound-coated zinc oxide particle. The heat treatment conditions thereof were: no heat treatment in Example 2, 200° C. in Example 2-2, 400° C. in Example 2-3, and 600° C. in Example 2-4, wherein the period of the heat treatment was 30 minutes in all the heat treatment temperatures. In FIG. 23, the mapping result using STEM of the silicon compound-coated zinc oxide obtained in Example 2-4 is shown; and in FIG. 24, the result of the line analysis in the position where a dotted line is drawn in the HAADF picture of FIG. 23 is shown. As can be seen in FIG. 23 and FIG. 24, the silicon compound-coated zinc oxide particle obtained in Example 2-4 was observed as the zinc oxide particle whose entire surface was coated with the silicon compound.

Figure 25:
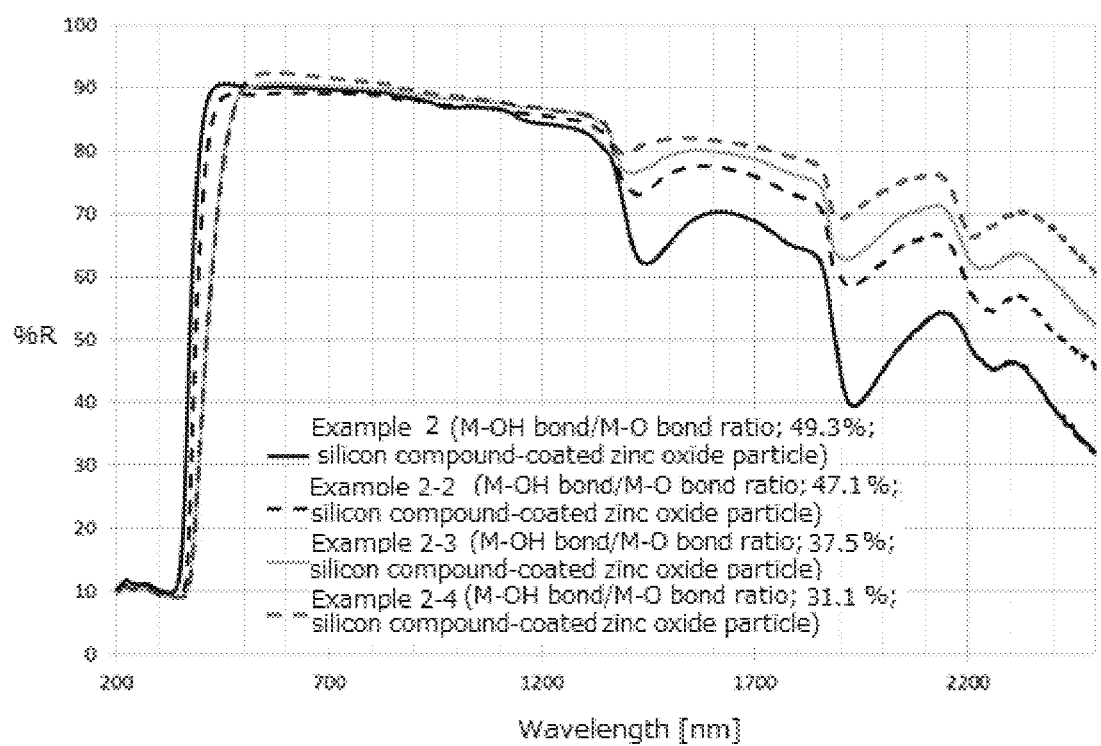

In FIG. 25, the reflection spectra of the silicon compound-coated zinc oxide particles obtained in Example 2 and Examples 2-2 to 2-4 to the light beam in the wavelength of 200 nm to 2500 nm are shown.

Figure 26:
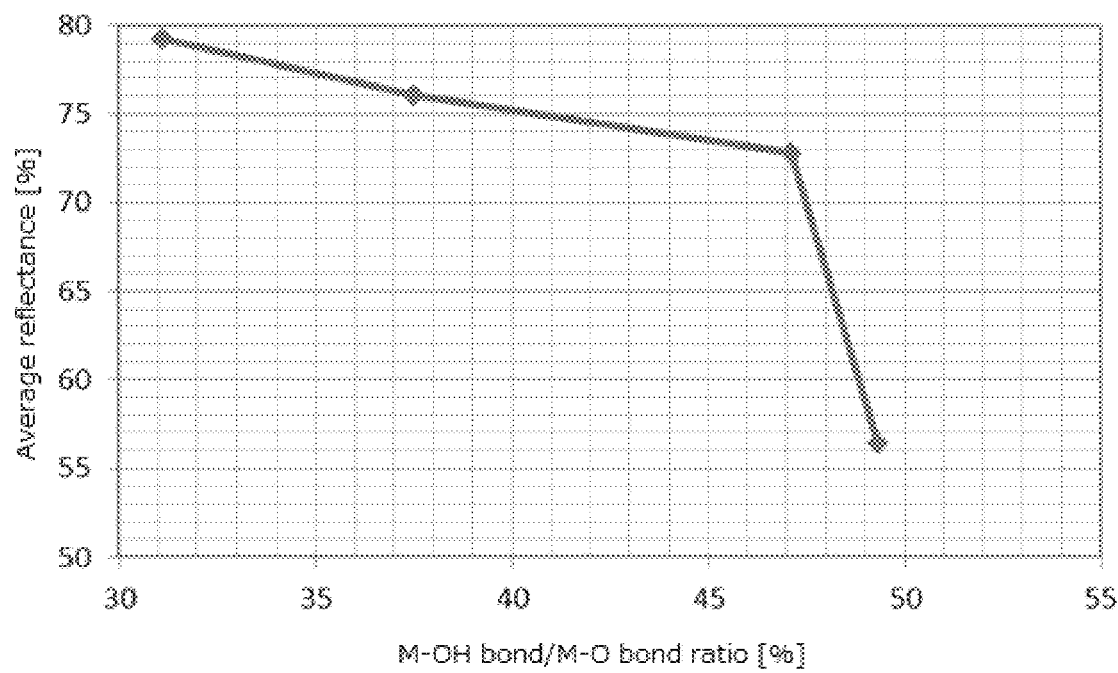

From FIG. 25, it can be seen that the reflectance to the light beam in the near infrared region of 780 nm to 2500 nm is higher in the silicon compound-coated zinc oxide particle obtained in Example 2-4 than that of the silicon compound-coated zinc oxide particle obtained in Example 2. The M-OH bond/M-O bond ratio of each Example is smaller in the order of Example 2-4<2-3<2-2<2: on the other hand, the average reflectance to the light beam in the wavelength of 780 nm to 2500 nm is larger in the order of Example 2-4>2-3>2-2>2. In FIG. 26, the graph of the average reflectance to the light beam in the wavelength of 780 nm to 2500 nm to the M-OH bond/M-O bond ratio is shown. As can be seen in FIG. 26, there is a tendency that when the M-OH bond/M-O bond ratio is lower, the average reflectance to the light beam in the wavelength of 780 nm to 2500 nm is higher. In Table 11, the M-OH bond/M-O bond ratios of the silicon compound-coated zinc oxide particles obtained in Example 2 and Examples 2-2 to 2-4 as well as the average reflectance thereof with the wavelength range of 780 nm to 2500 nm are summarized.

TABLE 11

| Example | 2 | 2-2 | 2-3 | 2-4 |
|---|---|---|---|---|
| M—OH bond/M—O bond ratio [%] | 49.3 | 47.1 | 37.5 | 31.1 |
| Average reflectance [%] (780 nm to 2500 nm) | 56.4 | 72.8 | 76.0 | 79.3 |

As can be seen in Table 11, it was found that when the M-OH bond/M-O bond ratio is lower, the average reflectance to the light beam in the wavelength of 780 nm to 2500 nm is higher. In the silicon compound-coated zinc oxide particle of the present invention, it is preferable that the M-OH bond/M-O bond ratio of the silicon compound-coated zinc oxide particle be 30% or more and 43% or less, and the average reflectance thereof to the light beam in the wavelength of 780 nm to 2500 nm be 65% or more. In the case where the silicon compound-coated zinc oxide particle like this is used in the coating composition, this can be suitably used as a paint, because this has, among others, a high effect to suppress the temperature rise of the coated body that is irradiated with a solar beam.

Figure 27:
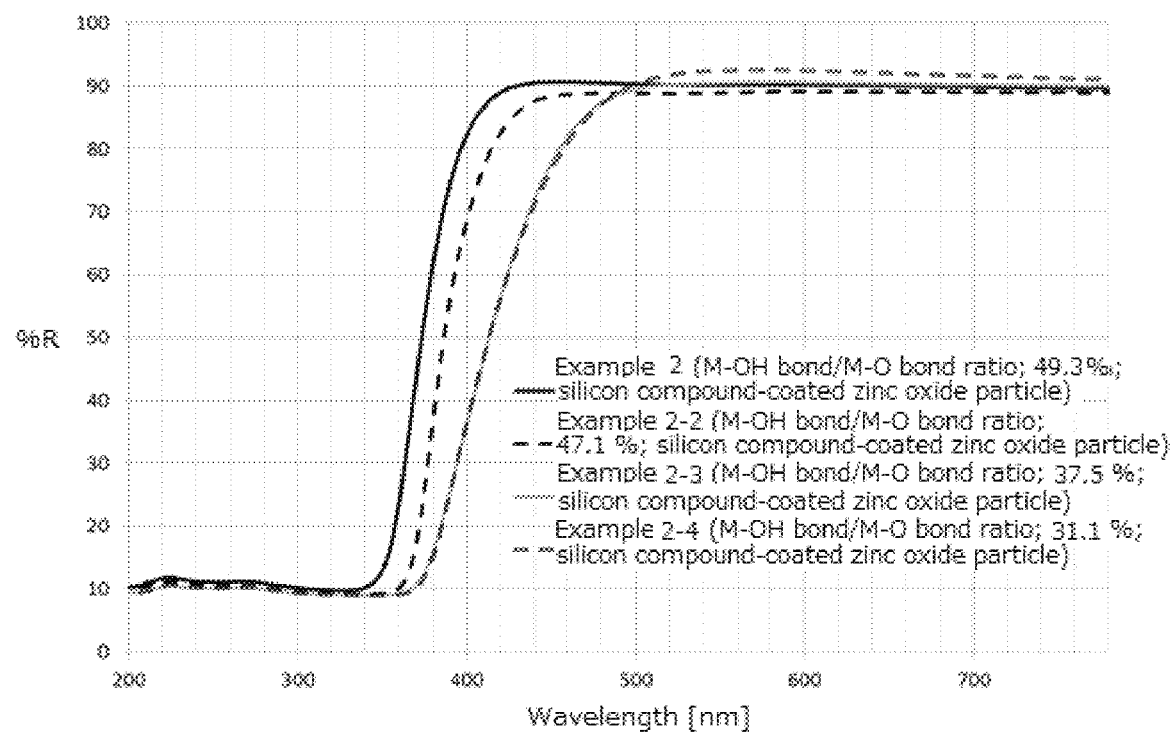

In FIG. 27, the reflection spectrum of the silicon compound-coated zinc oxide particles obtained in Example 2 and Examples 2-2 to 2-4 as well as of the zinc oxide particle obtained in Example 5 to the light beam in the wavelength of 200 nm to 780 nm are shown. By changing the M-OH bond/M-O bond ratio of the silicon compound-coated zinc oxide particle, the change was seen in the absorption region of the wavelength of 340 nm to 380 nm. In addition, in the silicon compound-coated zinc oxide particles obtained in Examples 2-3 to 2-4, the M-OH bond ratio included in the silicon compound-coated zinc oxide particles are 30% or more and 40% or less, and the wavelength at which the reflectance becomes 15% is 375 nm or more; therefore, they absorb a light of wide UV range. Accordingly, they are suitably used for a coating composition to shield a UV beam, or a film-like composition or a transparent composition to be used in a glass and the like. In Table 12, the M-OH bond/M-O bond ratios of the silicon compound-coated zinc oxide particles obtained in Example 2, and Examples 2-2 to 2-4, as well as the average reflectance thereof to the light beam in the wavelength of 380 nm to 780 nm are shown.

TABLE 12

| Example | 2 | 2-2 | 2-3 | 2-4 |
|---|---|---|---|---|
| M—OH bond/M—O bond ratio [%] | 49.3 | 47.1 | 37.5 | 31.1 |
| Average reflectance [%] (380 nm to 780 nm) | 89.0 | 86.4 | 82.6 | 83.5 |

In the silicon compound-coated zinc oxide particles obtained in Example 2 and Example 2-2, the M-OH bond/M-O bond ratios in the silicon compound-coated zinc oxide particle are 45% or more and 50% or less, and the average reflectance to the light beam in the wavelength of 380 nm to 780 nm are 86% or more, so that they reflect the light to the whole visible range; and thus, they are suitable as a white pigment.

Figure 28:
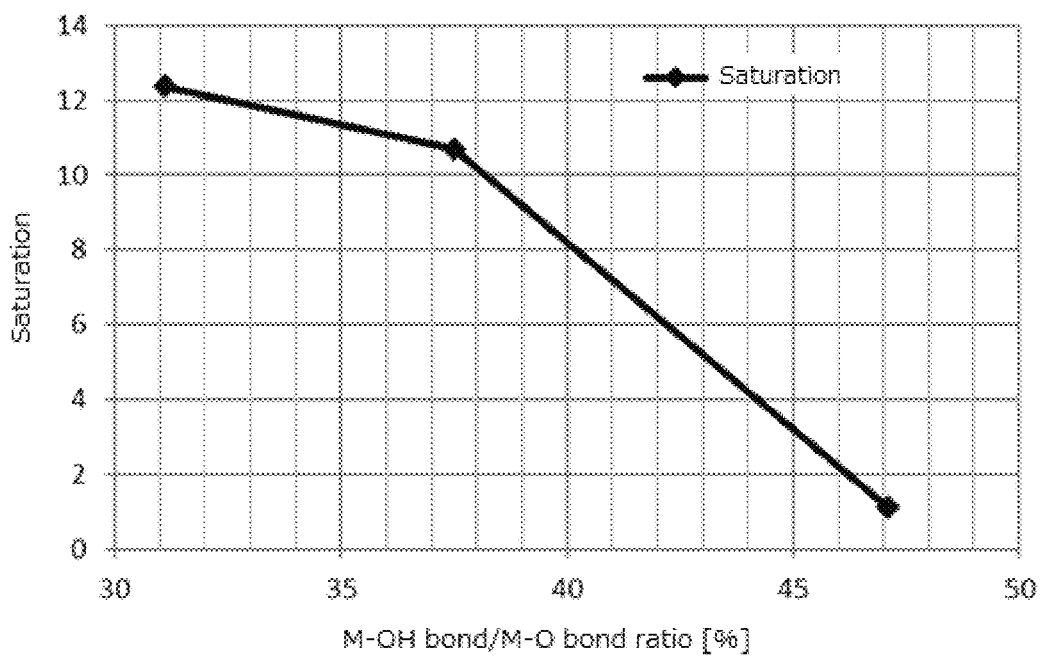

In FIG. 28, the graph of the saturation C $(=\sqrt{(a^*)^2+(b^*)^2})$ in the L*a*b* color system to the M-OH bond/M-O bond ratio of the silicon compound-coated zinc oxide particle is shown. As can be seen in FIG. 28, there is a tendency that when the M-OH bond/M-O bond ratio is higher, the saturation is lower. In the silicon compound-coated zinc oxide particle of the present invention, it is preferable that the M-OH bond/M-O bond ratio included in the silicon compound-coated zinc oxide particle be 31% or more and 50% or less, and that the saturation C $(=\sqrt{(a^*)^2+(b^*)^2})$ in the L*a*b* color system be in the range of 0.5 to 13.

Figure 29:
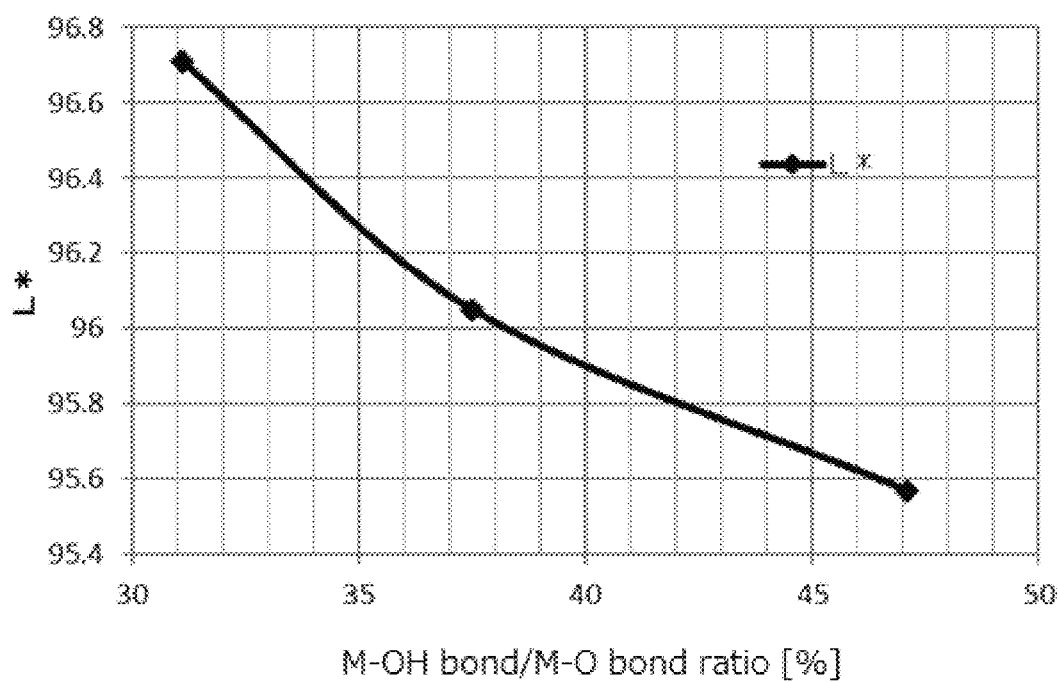

In FIG. 29, the graph of L* value in the L*a*b* color system the M-OH bond/M-O bond ratio of the silicon compound-coated zinc oxide particle is shown. As can be seen in FIG. 29, there is a tendency that when the M-OH bond/M-O bond ratio is higher, the L* value is lower. In the silicon compound-coated zinc oxide particle of the present invention, it is preferable that the M-OH bond/M-O bond ratio of the silicon compound-coated zinc oxide particle be 31% or more and 50% or less, the saturation C $(=\sqrt{(a^*)^2+(b^*)^2})$ in the L*a*b* color system be in the range of 0.5 to 13, and the L*value in the L*a*b* color system be in the range of 95 to 97. By so doing, the silicon compound-coated zinc oxide particle can have a high whiteness, so that it is suitably used as a white pigment.

Figure 30:
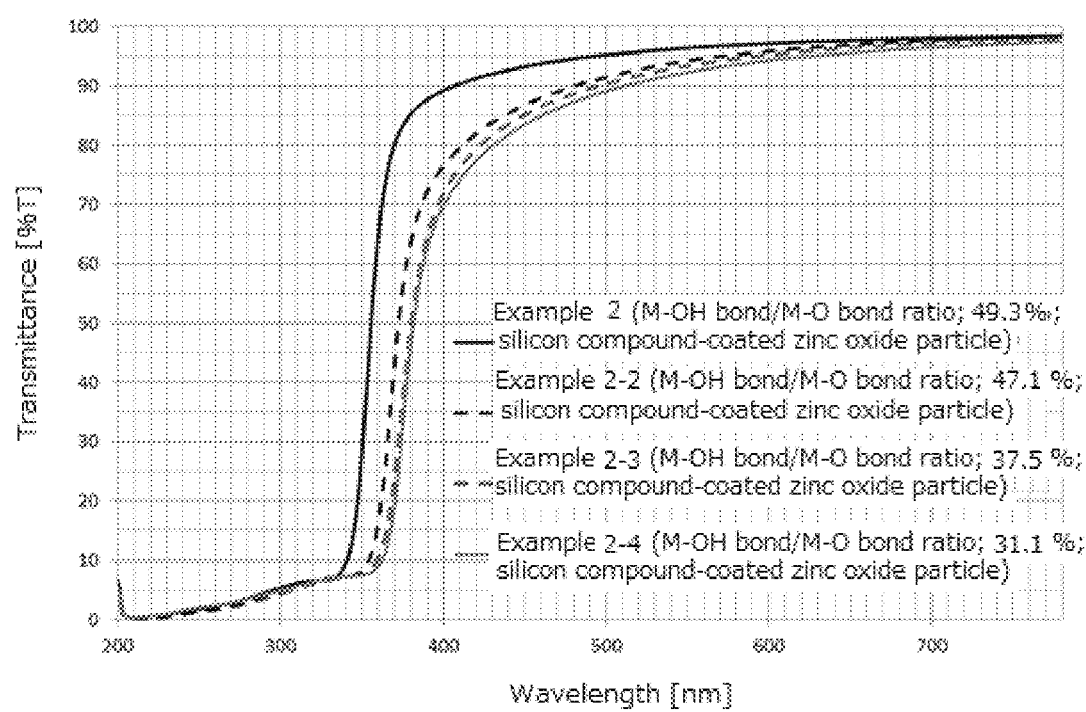

In FIG. 30, the transmission spectra of the dispersion solutions in which the silicon compound-coated zinc oxide particles obtained in Examples 2 and Examples 2-2 to 2-4 are dispersed into propylene glycol with the concentration thereof as ZnO being 0.011% by weight are shown. In Table 13, the M-OH bond/M-O bond ratios of the silicon compound-coated zinc oxide particles obtained in Examples 2 and Examples 2-2 to 2-4 and the average transmittances thereof to the light beam in the wavelength of 380 nm to 780 nm are listed.

TABLE 13

| Example | 2 | 2-2 | 2-3 | 2-4 |
|---|---|---|---|---|
| M—OH bond/M—O bond ratio [%] | 49.3 | 47.1 | 37.5 | 31.1 |
| Average transmittance [%] (380 nm to 780 nm) | 95.7 | 92.4 | 91.1 | 89.9 |

In Example 2 and Examples 2-2 to 2-4, it can be seen that as the M-OH bond/M-O bond ratio decreases, the absorption edge in the wavelength region of 380 nm or less shifts to a side of a longer wavelength. In addition, in the silicon compound-coated zinc oxide particles obtained in Example 2 to Example 2-4, as compared with the zinc oxide particle obtained in Example 5, it can be seen that transmittances thereof with the wavelength range of 380 nm to 780 nm are higher, and they absorb more efficiently the light beam in the UV region of 200 nm to 380 nm, and in addition, the transparencies thereof are higher. In the present invention, it is preferable that the M-OH bond/M-O bond ratio of the silicon compound-coated zinc oxide particle be 47% or more and 50% or less, and that in the transmission spectrum of the dispersion solution in which the silicon compound-coated zinc oxide particle is dispersed in a dispersion medium, the transmittance to the light beam in the wavelength of 340 nm be 10% or less, and the average transmittance to the light beam in the wavelength of 380 nm to 780 nm be 92% or more. By so doing, when this is used in a coating composition having a purpose to use in cosmetics such as a lipstick, a foundation, and a sunscreen or to apply to a skin, as well as in a film-like composition to be used for a coat film, a coat body, and a glass, this is suitable because this can realize a coating composition having a good balance between the transparency and the absorption capacity of the UV beam of the wavelength of 380 nm or less. In addition, from the transmission spectra of the silicon compound-coated oxides obtained in Examples 2-3 and 2-4, the absorption regions thereof in the UV region of the wavelength of 200 nm to 380 nm shift to a side of a longer wavelength as compared with Example 2. In the present invention, it is preferable that the M-OH bond/M-O bond ratio of the silicon compound-coated zinc oxide particle be 30% or more and 40% or less, and in the transmission spectrum of the dispersion solution in which the silicon compound-coated zinc oxide particle is dispersed in a dispersion medium, the wavelength at which the transmittance thereof becomes 15% be 365 nm or more. By so doing, it becomes possible to absorb a wide range of the light beam in the UV region of 200 nm to 380 nm.

Figure 31:
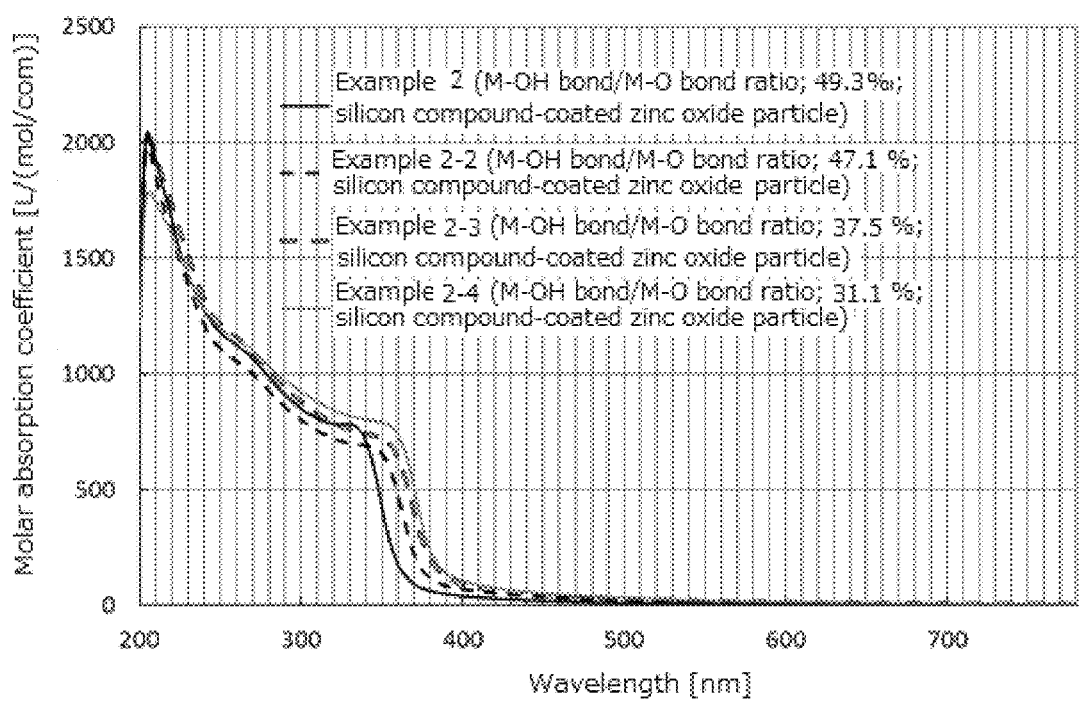

In FIG. 31, the graph of the molar absorption coefficient is shown, the coefficient being calculated from the measurement result of the absorption spectrum of the dispersion solution in which the silicon compound-coated zinc oxide particle obtained in each of Example 2 and Examples 2-2 to 2-4 is dispersed into propylene glycol and the concentration (as ZnO) of the silicon compound-coated zinc oxide particle in the dispersion solution that is used in the said measurement. In Table 14, the M-OH bond/M-O bond ratio and the average molar absorption coefficient with the wavelength range of 200 nm to 380 nm of the silicon compound-coated zinc oxide particle obtained in each Example, as well as the average molar absorption coefficient with the wavelength range of 200 nm to 380 nm of the zinc oxide particle obtained in Example 5 are summarized.

TABLE 14

| Example | 2 | 2-2 | 2-3 | 2-4 |
|---|---|---|---|---|
| M—OH bond/M—O bond ratio [%] | 49.3 | 47.1 | 37.5 | 31.1 |
| Average molar absorption coefficient [L/(cm · mol)] (200 nm to 380 nm) | 951 | 943 | 1038 | 1040 |

As can be seen in Table 14, there is a tendency that as the M-OH bond/M-O bond ratio is lower, the average molar absorption coefficient is higher. In addition, it can be seen that the silicon compound-coated zinc oxide particles obtained in Examples 2 to Example 2-4 have higher average molar absorption coefficients with the wavelength range of 200 nm and 380 nm as compared with the zinc oxide particle obtained in Example 5. In the present invention, it is preferable that the M-OH bond/M-O bond ratio of the silicon compound-coated zinc oxide particle be 30% or more and 50% or less, and in the dispersion solution in which the silicon compound-coated zinc oxide particle is dispersed in a dispersion medium, the molar absorption coefficient of the silicon compound-coated zinc oxide particle to the light beam in the wavelength of 200 nm to 380 nm be 700 L/(mol·cm) or more. By so doing, the UV light beam in the wavelength of 200 nm to 380 nm, i.e., UVA, UVB, and UVC, can be efficiently absorbed; and thus, when this is used in a coating composition or a film-like composition, this is suitable because, among other things, the use amount thereof can be reduced, and further enhanced transparency can be realized.

Example 2-5 to Example 2-7

Next, the silicon compound-coated zinc oxide particle was prepared by the same method as Example 1, except that in Example 2, the silicon compound-coated zinc oxide particle dispersion solution was ejected from the fluid processing apparatus and re in the beaker, and then was processed by using the dispersion solution reformation apparatus 100 described in FIG. 34. In Table 15, the conditions to control the M-OH bond/M-O bond ratio of the silicon compound-coated zinc oxide particle by using the dispersion solution reformation apparatus 100 of FIG. 34 are summarized. The silicon compound-coated zinc oxide particle whose M-OH bond/M-O bond ratio was controlled in the same way as that of Example 1-11 to Example 1-13 except for the contents described in Table 15 was obtained.

The dispersion processing of the silicon compound-coated zinc oxide particle dispersion solution and the operation to remove the impurities in the silicon compound-coated zinc oxide particle dispersion solution were repeated until pH of the silicon compound-coated zinc oxide particle dispersion solution reached 7.02 (measurement temperature of 23.1° C.) and the conductivity thereof reached 0.06 μS/cm, thereby not only the impurities included in the agglomerate of the silicon compound-coated zinc oxide particles were removed, but also all the silicon compound-coated zinc oxide particles in the silicon compound-coated zinc oxide particle dispersion solution were reformed.

TABLE 15

| | | Example 2-5 |
|---|---|---|
| | Processing solution | Silicon compound-coated zinc oxide particle dispersion solution |
| (1) | Initial solution amount charged into the storing vessel 130 | Kind: MeOH<br>pH: 7.00 (measurement temperature: 23.5° C.)<br>Conductivity: 0.01 μS/cm (measurement temperature: 23.5° C.)<br>Charged amount: 15 L (about 12 kg) |
| (2) | Cross flow washing solution: kind, flow rate, and temperature | Kind: MeOH<br>pH: 7.00 (measurement temperature: 23.5° C.)<br>Conductivity: 0.01 μS/cm (measurement temperature: 23.5° C.)<br>Flow rate: 0.7 L/min, 24° C. |
| (3) | Disperser 102 | Clearmix (product name: CLM-2.2S, rotor: R1, screen: S0.8-48, manufactured by M. Technique Co., Ltd.) |
| (4) | Removal unit 120 | Hollow fiber type dialyzer PN-220 (membrane area; 2.2 m², material; polysulfone, manufactured by Nikkiso Co., Ltd.) |
| (5) | Rotation number of the rotor | 10000 rpm (circumferential velocity of 15.7 m/sec) |
| (6) | Start of charging of the oxide particle dispersion solution | When initial pure water in the storing vessel 130 is decreased to 1 L. |
| (7) | Charge amount of the oxide particle dispersion solution into the storing vessel 130 | 15 L (about 12 kg) |
| (8) | pH of the oxide particle dispersion solution in the storing vessel 130 | Higher than 14 (measurement temperature: 23.2° C.) |
| (9) | Conductivity of the oxide particle dispersion solution in the storing vessel 130 | 3636 μS/cm (measurement temperature: 23.2° C.) |
| (10) | Flow rate of the pump 104 | 8.8 L/min |
| (11) | Flow rate of the oxide particle dispersion solution returned to the storing vessel 130 | 7.3 L/min |

TABLE 15-continued

Example 2-5

| | | |
|---|---|---|
| (12) | Discharge amount of the filtrate L3 by the removal unit 120 (calculated value) | 1.5 L/min |
| (13) | Charge timing of the diluting solution into the storing vessel 130 | When amount of the dispersion solution in the storing vessel 130 is concentrated to 1.5 L |
| (14) | Second diluting solution into the storing vessel 130: kind and the charged amount | Kind: MeOH<br>pH: 7.00 (measurement temperature: 23.5° C.)<br>Conductivity: 0.01 µS/cm (measurement temperature: 23.5° C.)<br>Flow rate: 0.7 L/min, 24° C. |
| (15) | Concentration of the oxide particle in the oxide particle dispersion solution | From 1.0% by weight to 10.0% by weight |
| (16) | Pressure meter | Pa: Both are 0.10 MPaG |
| (17) | Pressure meter | Pb: 0.15 MPaG |
| (18) | Pressure meter | Pc: 0.02 MPaG |
| (19) | Path length (Lea) | 0.3 m |
| (20) | Pipe's inner diameter (Leb) | 0.0105 m |
| (21) | Flow rate of the oxide particle dispersion solution in the just-before transporting path | 1.2 m/sec |
| (22) | Time T1 from the dispersing vessel 101 to start of removal of the impurities by the removal unit 120 | 0.24 sec |
| (23) | Thermometer installed in the dispersing vessel 101 | 23 to 24° C. |
| (24) | Temperature of the oxide particle dispersion solution | 23 to 24° C. |
| (25) | Conductivity measurement apparatus | Conductivity meter (catalogue number; ES-51, manufactured by HORIBA, Ltd.) |

By changing the processing temperature in the reformation processing of the silicon compound-coated zinc oxide particle dispersion solution described in (23) and (24) of Table 15, the silicon compound-coated zinc oxide particles having different M-OH bond/M-O bond ratio were prepared in Example 2-5 to Example 2-7. In Table 16, the processing temperature in the reformation processing of the silicon compound-coated zinc oxide particle dispersion solution, the M-OH bond/M-O bond ratio of the obtained silicon compound-coated zinc oxide particle, the average reflectance thereof with the wavelength range of 780 nm to 2500 nm, the average reflectance thereof with the wavelength range of 380 nm to 780 nm, the average transmittance thereof with the wavelength range of 380 nm to 780 nm, and the average molar absorption coefficient thereof with the wavelength range of 200 nm to 380 nm, together with the results of Example 2, are summarized.

TABLE 16

| Example | 2 | 2-5 | 2-6 | 2-7 |
|---|---|---|---|---|
| Processing temperature (Table 15: (23)) [° C.] | — | 23 to 24 | 35 to 37 | 45 to 48 |
| Processing temperature (Table 15: (24)) [° C.] | — | 23 to 24 | 35 to 37 | 45 to 48 |
| M—OH bond/M—O bond ratio [%] | 49.2 | 48.6 | 47.2 | 37.3 |
| Average reflectance [%] (780 nm to 2500 nm) | 56.4 | 70.4 | 74.3 | 75.3 |
| Average reflectance [%] (380 nm to 780 nm) | 89.0 | 87.4 | 86.4 | 84.3 |
| Average transmittance [%] (380 nm to 780 nm) | 95.7 | 93.4 | 92.3 | 91.7 |
| Average molar absorption coefficient [L/(cm · mol)] (200 nm to 380 nm) | 951 | 965 | 969 | 1020 |

As can be seen in Table 16, there is a tendency that when the M-OH bond/M-O bond ratio is lower, the average reflectance with the wavelength range of 780 nm to 2500 nm, the average reflectance with the wavelength range of 380 nm to 780 nm, the average transmittance with the wavelength range of 380 nm to 780 nm, and the average molar absorption coefficient with the wavelength range of 200 nm to 380 nm are higher. Accordingly, it was found that the color characteristics can be controlled by controlling the M-OH bond ratio.

Example 3

Hereinafter, in Example 3, the silicon compound-coated cerium oxide particle having at least part of the surface of the cerium oxide particle coated with a silicon compound is described. By using Clearmix (product name: CLM-2.2S, manufactured by M. Technique Co., Ltd.), which is a high speed rotational dispersion emulsifier, the oxide separating solvent (A-solution), the oxide raw material solution (B-solution), and the silicon compound raw material solution (C-solution) each were prepared. Specifically, according to the prescription of the oxide raw material solution described in Example 3 of Table 17, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescription of the oxide separating solvent described in Example 3 of Table 17, each component of the oxide separating solvent were uniformly mixed by stirring for 30 minutes at the preparation temperature of 45° C. by using Clearmix with the rotation number of the rotor thereof being 15000 rpm to obtain the oxide separating solvent. Further, according to the prescription of the silicon compound raw material solution described in Example 3 of Table 17, each component of the silicon compound raw material solution were uniformly mixed by stirring for 10 minutes at the preparation temperature of 20° C. by using Clearmix with the rotation number of the rotor thereof being 6000 rpm to obtain the silicon compound raw material solution.

Meanwhile, the substances used here and represented by chemical formula or abbreviation described in Table 17 are:

DMAE for dimethylamino ethanol (manufactured by Kishida Chemical Co., Ltd.), 60 wt % $HNO_3$ for concentrated nitric acid (manufactured by Kishida Chemical Co., Ltd.), $Ce(NO_3)_3 \cdot 6H_2O$ for cerium (III) nitrate hexahydrate (manufactured by Wako Pure Chemical Industries, Ltd.), and TEOS for tetraethyl orthosilicate (manufactured by Wako Pure Chemical Industries, Ltd.).

Next, the oxide raw material solution, the oxide separating solvent, and the silicon compound raw material solution, all having been prepared as described above, were mixed by using the fluid processing apparatus described in Patent Document 7 that was filed by the applicant of the present invention. The processing method of each fluid and the recovery method of the processed solution thereof were the same as those of Example 1.

In Table 18, operation conditions of the fluid processing apparatus, the average primary particle diameter calculated from the TEM observation result of the obtained silicon compound-coated cerium oxide particles, and the Si/Ce molar ratio calculated from and TEM-EDS analysis, together with the calculated value thereof from the prescriptions and introduction flow rates of the A-solution, B-solution, and C-solution, are listed. The measurement of pH, analyses, and washing method of the particle were the same as those of Example 1.

The silicon compound-coated cerium oxide particle obtained in Example 3 was subjected to a heat treatment using an electric furnace as the changing treatment of the functional group included in the silicon compound-coated cerium oxide particle. The heat treatment conditions thereof were: no heat treatment in Example 3, 200° C. in Example 3-2, and 400° C. in Example 3-3, wherein the period of the heat treatment was 30 minutes in all the heat treatment temperatures.

Figure 33:
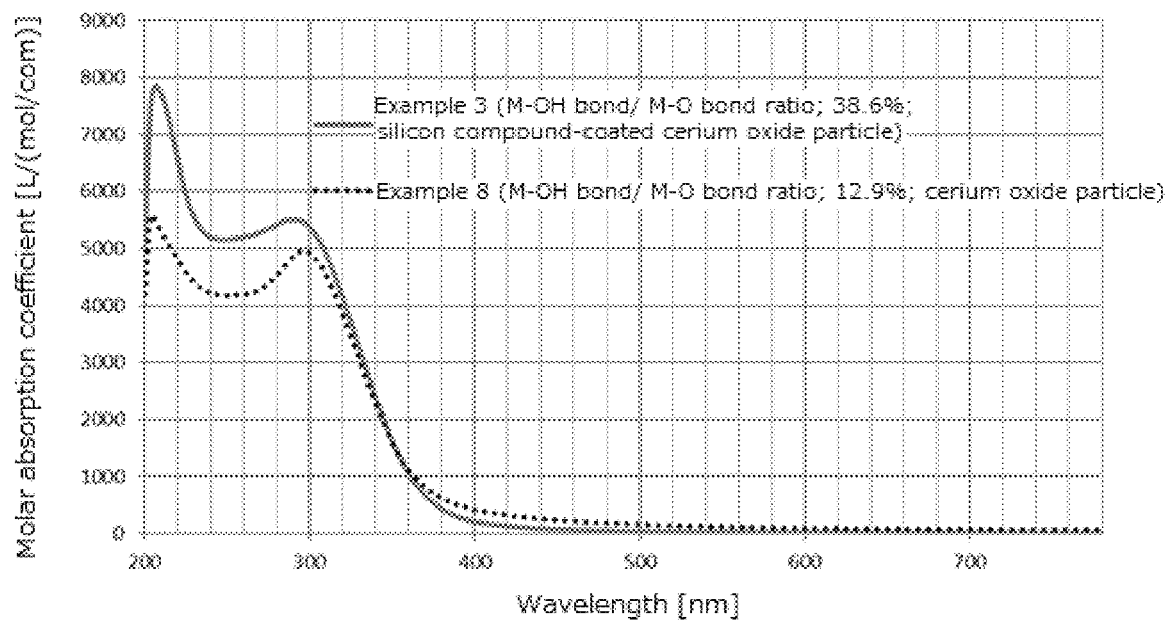

In FIG. 33, the graph of the molar absorption coefficient is shown wherein the coefficient is calculated from the measurement result of the absorption spectrum of the dispersion solution in which the silicon compound-coated cerium oxide particles obtained in Example 3 is dispersed into propylene glycol and the concentration of cerium oxide in the dispersion solution. In Table 19, the M-OH bond/M-O bond ratio of the silicon compound-coated cerium oxide particle obtained in each Example and the average molar absorption coefficient thereof with the wavelength range of 200 nm to 380 nm, as well as for a comparison purpose, the average molar absorption coefficient with the wavelength range of 200 nm to 380 nm of the cerium oxide obtained in Example 8 are summarized.

TABLE 17

| | Prescription of first fluid (A-solution: oxide separating solvent) | | | | | | Prescription of second fluid (B-solution: oxide raw material solution) | | | | | |
|---|---|---|---|---|---|---|---|---|---|---|---|---|
| | Prescription | | | | pH | | Prescription | | | | pH | |
| | Raw material | [wt %] | Raw material | [wt %] | pH | [° C.] | Raw material | [wt %] | Raw material | [wt %] | pH | [° C.] |
| Example 3 | DMAE | 1.40 | Pure water | 98.60 | 11.4 | 26.7 | $Ce(NO_3)_3 \cdot 6H_2O$ | 9.00 | Pure water | 91.00 | 3.2 | 29.0 |

| | | | Prescription of third fluid (C-solution: silicon compound raw material solution) | | | | | |
|---|---|---|---|---|---|---|---|---|
| | | | Prescription | | | | | pH |
| | | | Raw material | [wt %] | Raw material | [wt %] | Raw material | [wt %] | pH | [° C.] |
| | | | Example 3 | Pure water | 99.49 | 60 wt % $HNO_3$ | 0.01 | TEOS | 0.40 | 3.0 | 25.1 |

TABLE 18

| | Introduction flow rate (supply flow rate) [mL/min] | | | Introduction temperature (supply temperature) [° C.] | | | Introduction pressure (supply pressure) [MPaG] | | | Ejected solution | | Shell/core Si/Ce [molar ratio] | | Average primary particle |
|---|---|---|---|---|---|---|---|---|---|---|---|---|---|---|
| | A-Soln. | B-Soln. | C-Soln. | A-Soln. | B-Soln. | C-Soln. | A-Soln. | B-Soln. | C-Soln. | pH | Temp. [° C.] | [Calculated value] | [EDS] | diam. [nm] |
| Example 3 | 100 | 40 | 50 | 134 | 83 | 27 | 0.296 | 0.10 | 0.10 | 7.33 | 22.9 | 0.12 | 0.12 | 5.26 |

Figure 32:
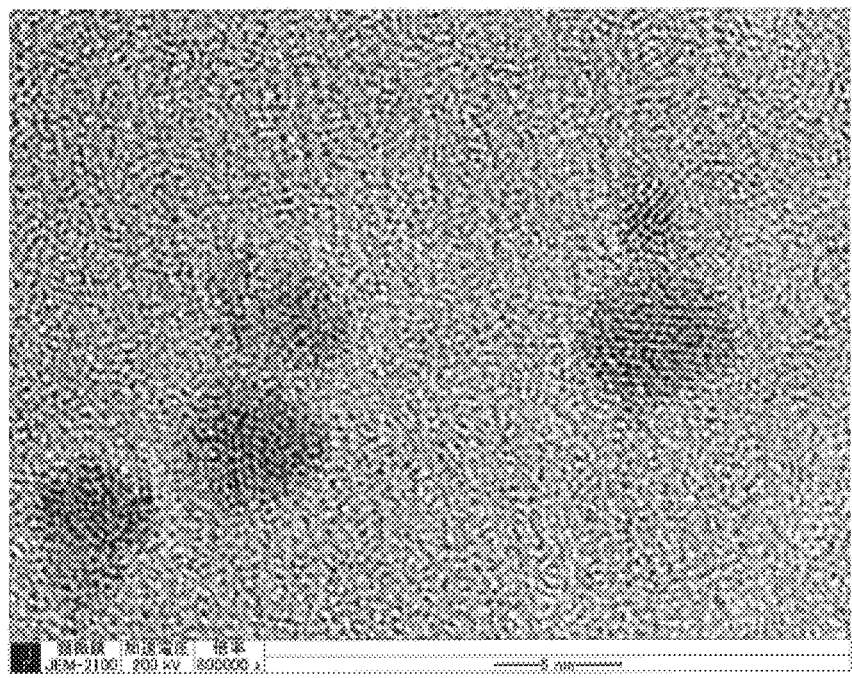

In FIG. 32, the TEM picture of the silicon compound-coated cerium oxide particle obtained in Example 3 is shown. In the silicon compound-coated cerium oxide particles obtained in Example 3, the silicon compound-coated cerium oxide particle in which part of the surface of the cerium oxide particle was coated with the silicon compound, i.e., the particle whose entire surface was not coated with the silicon compound, was also observed.

TABLE 19

| Example | 3 | 3-2 | 3-3 |
|---|---|---|---|
| M—OH bond/M—O bond ratio [%] | 38.6 | 36.4 | 27.8 |
| Average molar absorption coefficient [L/(cm · mol)] (200 nm to 380 nm) | 951 | 943 | 1038 |

As can be seen in Table 19, there is a tendency that as the M-OH bond/M-O bond ratio is lower, the average molar absorption coefficient is higher. In addition, it can be seen that as compared with the cerium oxide particle obtained in Example 8, the silicon compound-coated cerium oxide particles obtained in Examples have higher average molar absorption coefficients with the wavelength range of 200 nm to 380 nm. In the present invention, in the silicon compound-coated cerium oxide particle, it is preferable that the M-OH bond/M-O bond ratio of the silicon compound-coated cerium oxide particle be 25% or more and 40% or less, and in the dispersion solution in which the silicon compound-coated cerium oxide particle is dispersed in a dispersion medium, the molar absorption coefficient to the light beam in the wavelength of 200 nm to 380 nm be 4000 L/(mol·cm) or more. By so doing, the UV light beam in the wavelength of 200 nm to 380 nm, i.e., UVA, UVB, and UVC, can be efficiently absorbed; and thus, when this is used in a coating composition, this is suitable because, among other things, the use amount thereof can be reduced, and further enhanced transparency can be realized.

Therefore, the production method of oxide particles according to the present invention enabled to finely and strictly control the color characteristics of the silicon compound-coated oxide particle. Accordingly, when the oxide particle is used in the coating composition, transmission, absorption, hue, saturation, and molar absorption coefficient to each light beam region of UV, visible, and near infrared can be strictly controlled; and thus, when it is applied to a skin of a human body, designability and texture are not impaired; and when it is used in a coated body, a human body or a coated body can be protected from a UV or an infrared beam without impairing a designability.

Example 4

In Example 4, the iron oxide particle will be described. By using Clearmix (product name: CLM-2.2S, manufactured by M. Technique Co., Ltd.), which is a high speed rotational dispersion emulsifier, the oxide raw material solution (A-solution) and the oxide separating solvent (B-solution) were prepared. Specifically, according to the prescription of the oxide raw material solution described in Example 4 of Table 20, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescription of the oxide separating solvent described in Example 4 of Table 20, each component of the oxide separating solvent were uniformly mixed by stirring for 30 minutes at the preparation temperature of 45° C. by using Clearmix with the rotation number of the rotor thereof being 15000 rpm to obtain the oxide separating solvent.

Meanwhile, the substances used here and represented by chemical formula or abbreviation described in Table 20 are: NaOH for sodium hydroxide (manufactured by Kanto Chemical Co., Ltd.) and $Fe(NO_3)_3 \cdot 9H_2O$ for ferric nitrate nonahydrate (manufactured by Kanto Chemical Co., Ltd.).

Next, the oxide raw material solution and the oxide separating solvent, which had been prepared as described above, were mixed by using the fluid processing apparatus described in Patent Document 7 that was filed by the applicant of the present invention. The processing method of each fluid and the recovery method of the processed solution were the same as those of Example 1. Meanwhile, in Example 4, the third introduction part d3 and the C-solution were not used (not shown by drawings).

In Table 21, similarly to Example 1, operation conditions of the fluid processing apparatus and the average primary particle diameter calculated from the TEM observation result of the iron oxide particles are listed. The measurement of pH, analyses, and washing method of the particle were the same as those of Example 1. As a result of the TEM observation, the primary particle diameter thereof was about 5 nm to about 15 nm; and the average primary particle diameter thereof was 9.53 nm as described in Table 21.

TABLE 20

| | Prescription of first fluid (A-solution: oxide raw material solution) | | | | | Prescription of second fluid (B-solution: oxide separating solvent) | | | | |
|---|---|---|---|---|---|---|---|---|---|---|
| | Prescription | | | pH | | Prescription | | | pH | |
| | Raw material | [wt %] | Raw material | [wt %] | pH | [° C.] | Raw material | [wt %] | Raw material | [wt %] | pH | [° C.] |
| Example 4 | $Fe(NO_3)_3 \cdot 9H_2O$ | 2.00 | Pure water | 98.00 | 1.8 | 26.6 | NaOH | 9.00 | Pure water | 91.00 | >14 | — |

TABLE 21

| | Introduction flow rate (supply flow rate) [mL/min] | | Introduction temperature (supply temperature) [° C.] | | Introduction pressure (supply pressure) [MPaG] | | Ejected solution | | Average primary particle diam. [nm] |
|---|---|---|---|---|---|---|---|---|---|
| | A-Soln. | B-Soln. | A-Soln. | B-Soln. | A-Soln. | B-Soln. | pH | Temp. [° C.] | |
| Example 4 | 400 | 40 | 142 | 86 | 0.436 | 0.10 | 11.59 | 29.9 | 9.53 |

The iron oxide particle obtained in Example 4 was subjected to a heat treatment using an electric furnace as the changing treatment of the functional group included in the iron oxide particle. The heat treatment conditions thereof were: no heat treatment in Example 4, 100° C. in Example 4-2, 200° C. in Example 4-3, and 300° C. in Example 4-4, wherein the period of the heat treatment was 30 minutes in all the heat treatment temperatures. The primary particle diameters of the iron oxide particles obtained in Example 4-2 to Example 4-4 were also about 5 nm to about 15 nm.

Figure 35:
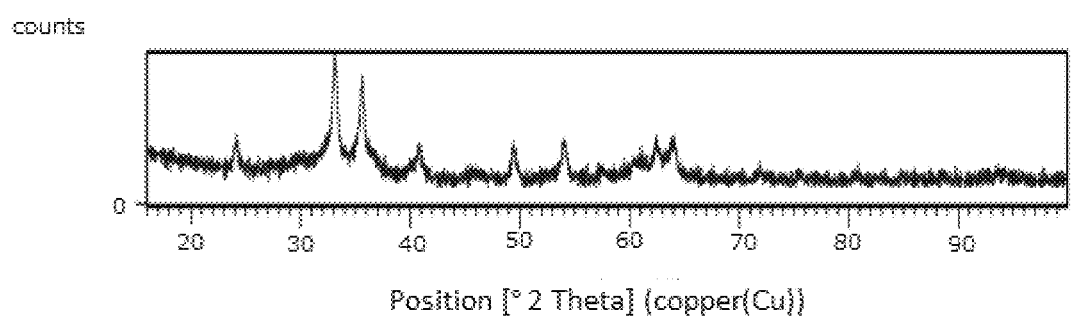

In FIG. 35, the XRD measurement result of the iron oxide particle obtained in Example 4 is shown. As can be seen in FIG. 35, in the XRD measurement result, only the peaks derived from iron oxide ($\alpha$-$Fe_2O_3$) were detected. In the XRD measurement results in Example 4-2 to Example 4-4, too, only the peaks derived from iron oxide were detected, similarly to FIG. 35.

Figure 36:
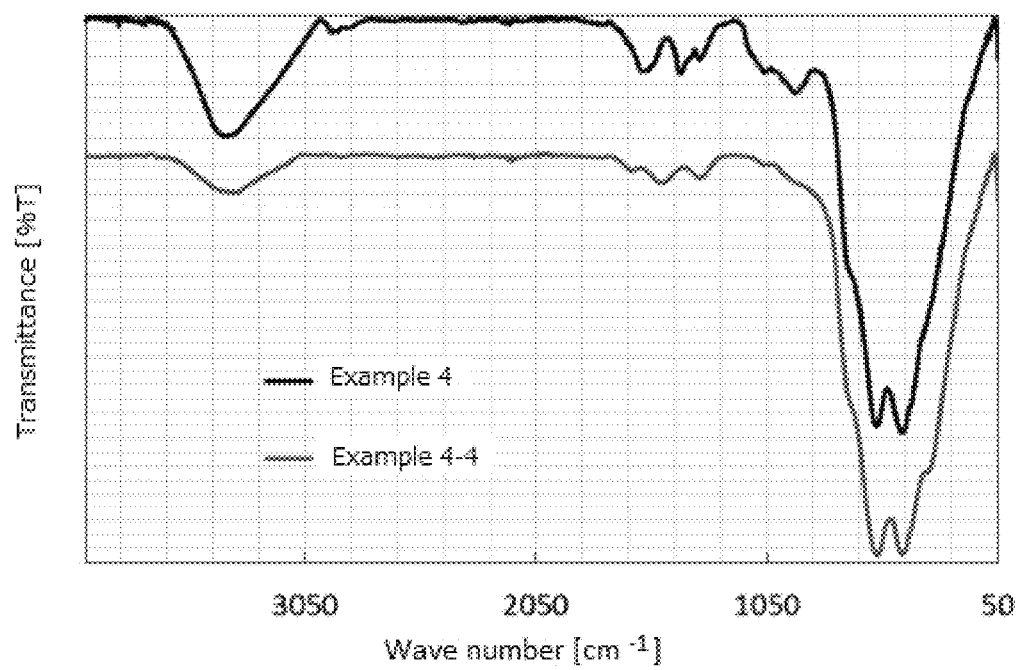

In FIG. 36, the FT-IR measurement results of the iron oxide particles obtained in Example 4 and Example 4-4, measured with the ATR method, are shown. As compared with the IR measurement result of the iron oxide particle obtained in Example 4, in the IR measurement result of the iron oxide particle obtained in Example 4-4, it appears that the broad peaks derived from the M-OH bond are in the wave number range of about 800 cm$^{-1}$ to about 1250 cm$^{-1}$ as well as the peaks in the wave number range of about 1250 cm$^{-1}$ to about 1750 cm$^{-1}$ which are generated by the reaction of the M-OH bond with carbon dioxide are to be smaller.

Figure 37:
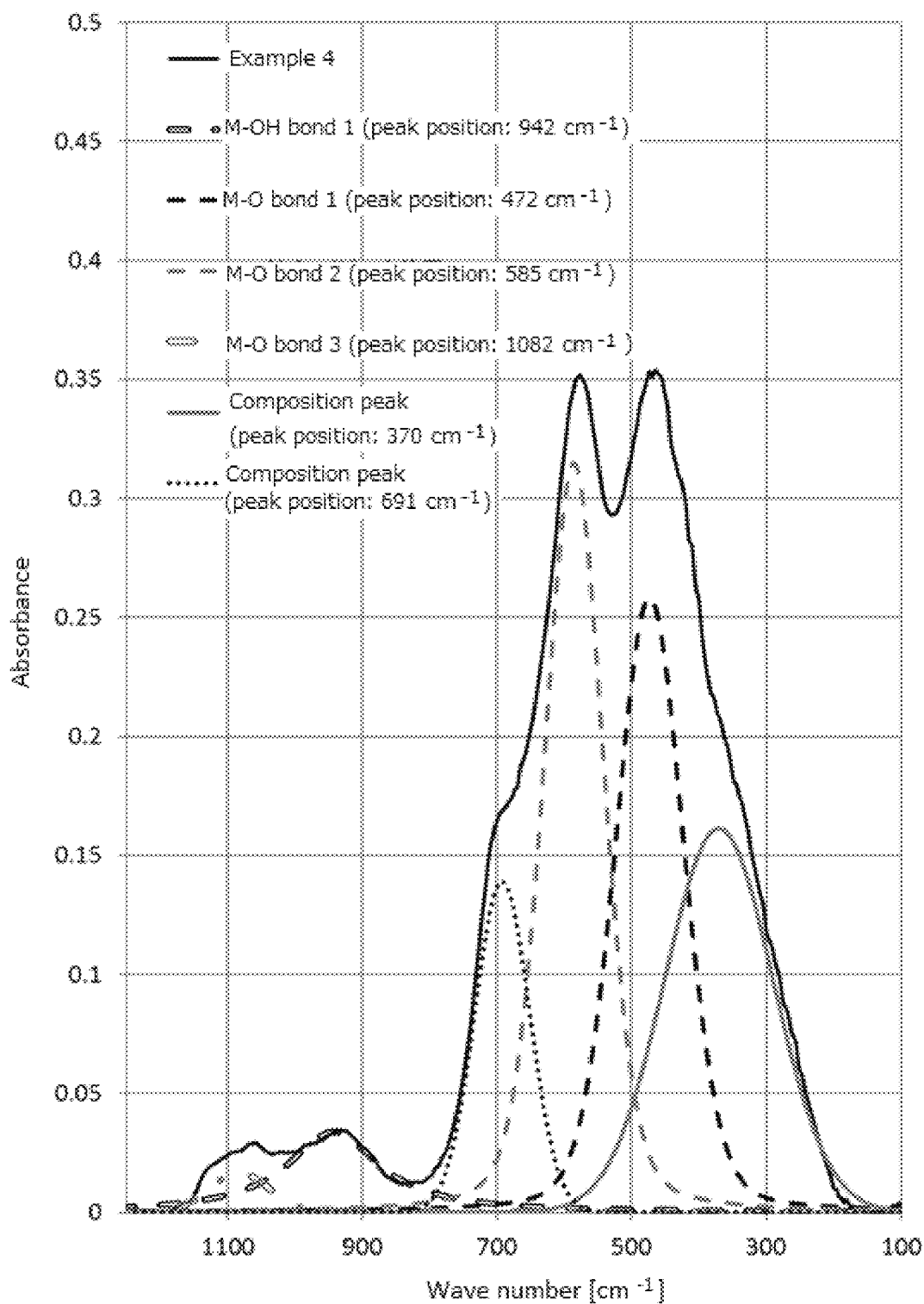
Figure 38:
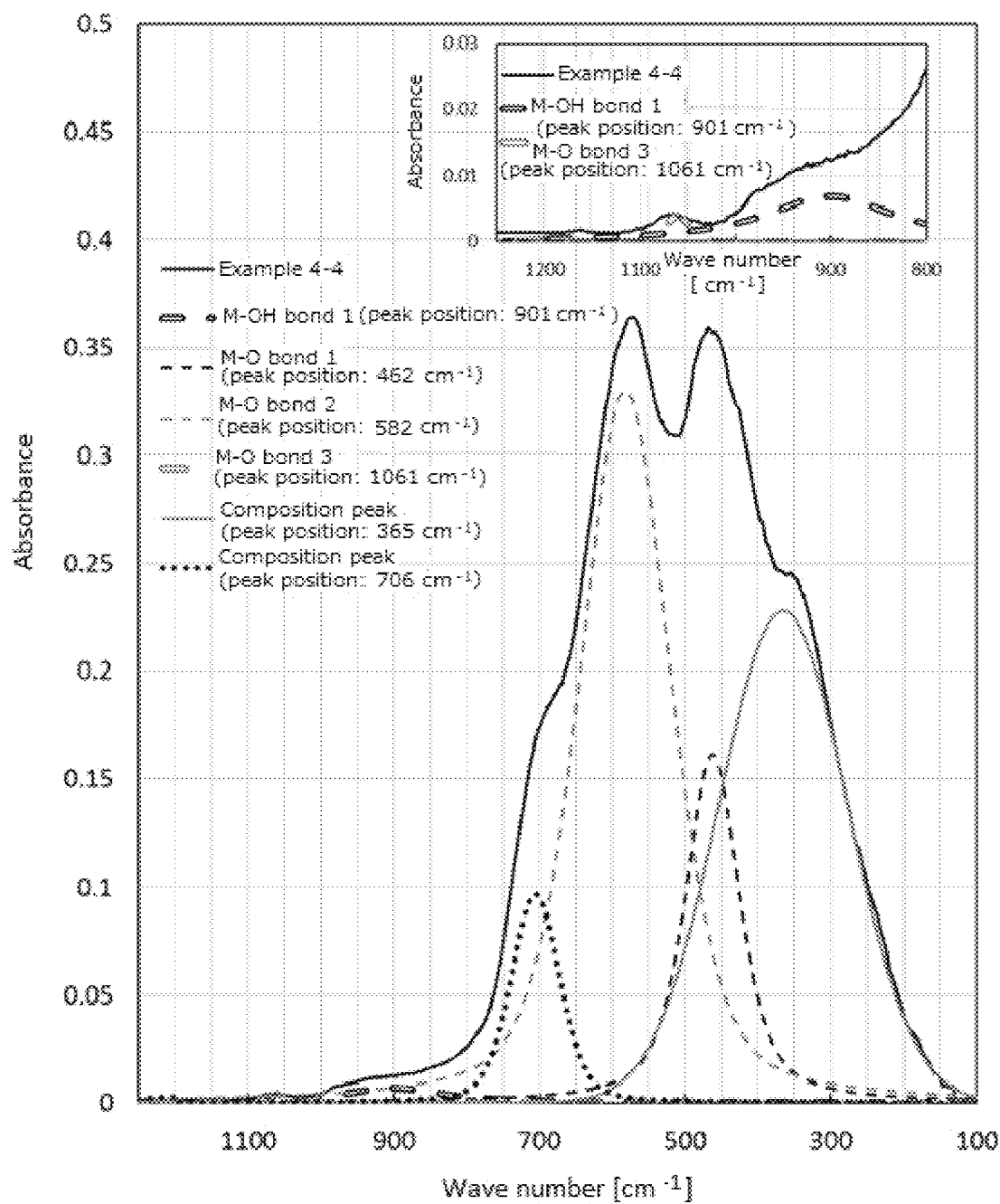

The results of wave shapes of the peaks that is separated in the wave number range of 100 cm$^{-1}$ to 1250 cm$^{-1}$ in the IR measurement are shown in FIG. 37 for Example 4 and in FIG. 38 of Example 4-4. Meanwhile, the peaks whose wave shapes are separated to the M-OH bond are so small that the enlarged figure of the wave number range of 800 cm$^{-1}$ to 1250 cm$^{-1}$ is also shown. As compared with Example 4, it can be seen that the iron oxide particle obtained in Example 4-4 has smaller total area of the M-OH bond peaks relative to the total area of the peaks whose wave shapes are separated, namely, it can be seen that the M-OH bond/M-O bond ratio is smaller.

Figure 39:
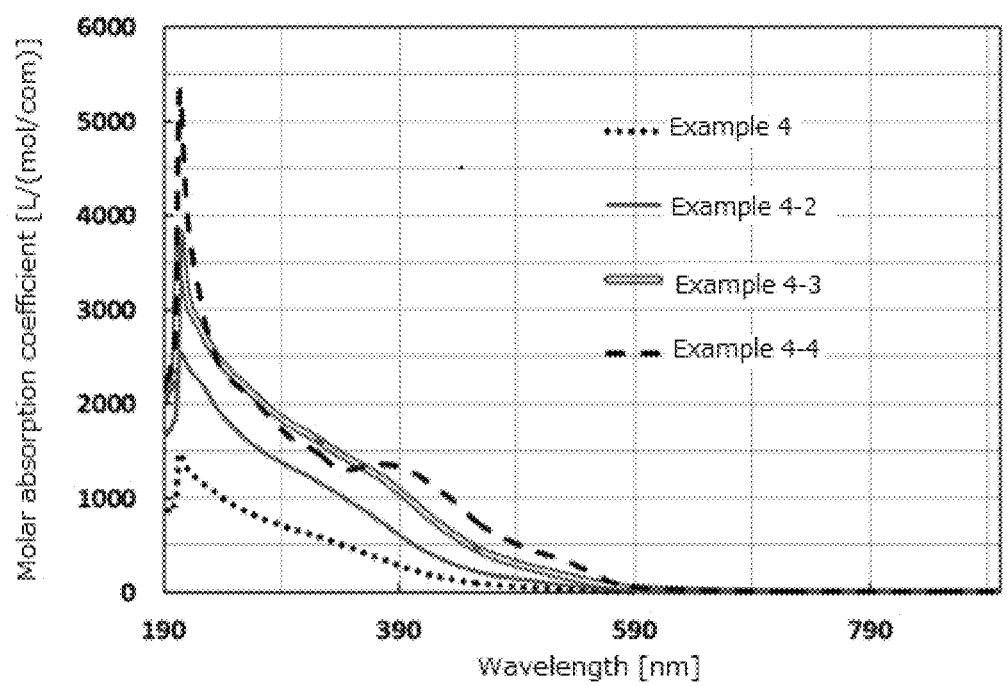

In FIG. 39, the graph of the molar absorption coefficients with the wavelength range of 190 nm to 780 nm of the dispersion solutions in which the iron oxide particles obtained in Example 4 and Examples 4-2 to 4-4 are dispersed into propylene glycol is shown. In Table 22, the average molar absorption coefficients thereof to the light beam in the wavelength of 190 nm to 380 nm are shown; and in FIG. 40, the average molar absorption coefficients to the light beam in the wavelength of 190 nm to 380 nm to the M-OH bond/M-O bond ratios of the iron oxide particles obtained in Example 4 and Examples 4-2 to 4-4 are shown. From FIG. 39 and Table 22, it can be seen that as M-OH ratio decreases in the order of Example 4, 4-2, 4-3, and 4-4, the average molar absorption coefficient with the wavelength range of 190 nm to 380 nm increases.

TABLE 22

| Example | 4 | 4-2 | 4-3 | 4-4 |
|---|---|---|---|---|
| M—OH bond/M—O bond ratio [%] | 22.2 | 18.6 | 8.6 | 1.2 |
| Average molar absorption coefficient [L/(cm · mol)] (190 nm to 380 nm) | 770 | 1477 | 1995 | 2048 |

Figure 40:
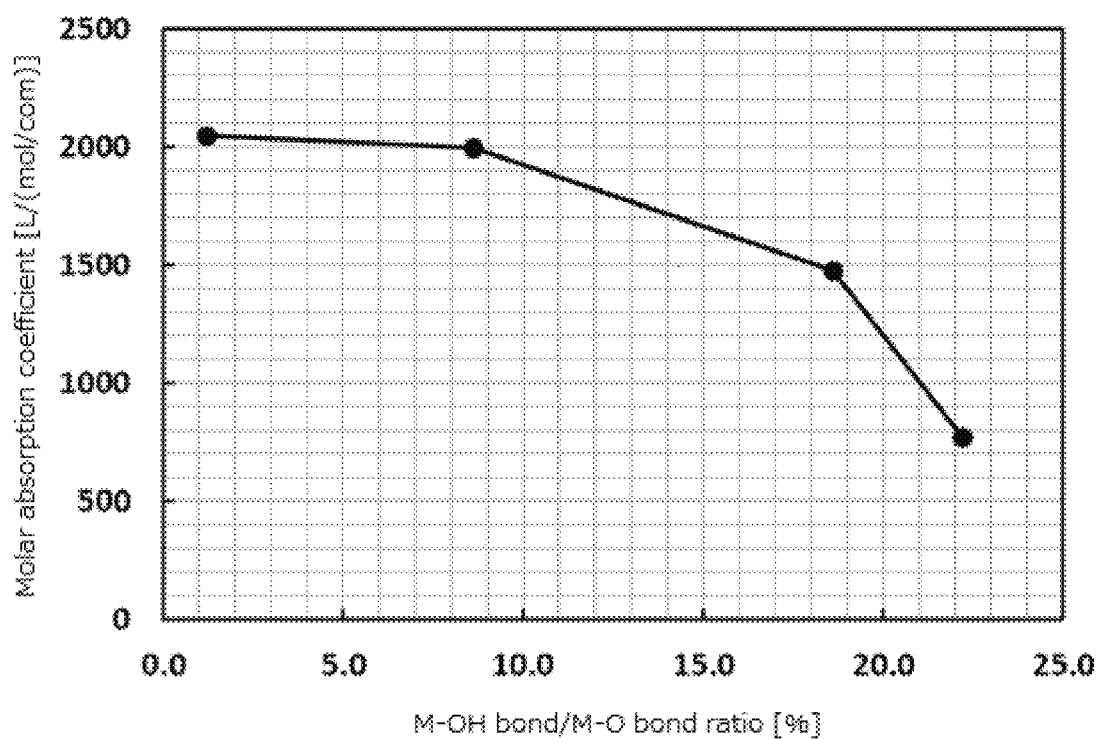

In addition, from FIG. 40, it can be seen that contrary to the silicon compound-coated iron oxide particle obtained in Example 1, in the iron oxide particle, by controlling the M-OH bond/M-O bond ratio in the range of 1% or more to 21% or less, the average molar absorption coefficient to the light beam in the wavelength of 190 nm to 380 nm can be made to 1000 L/(mol·cm) or more.

Figure 41:
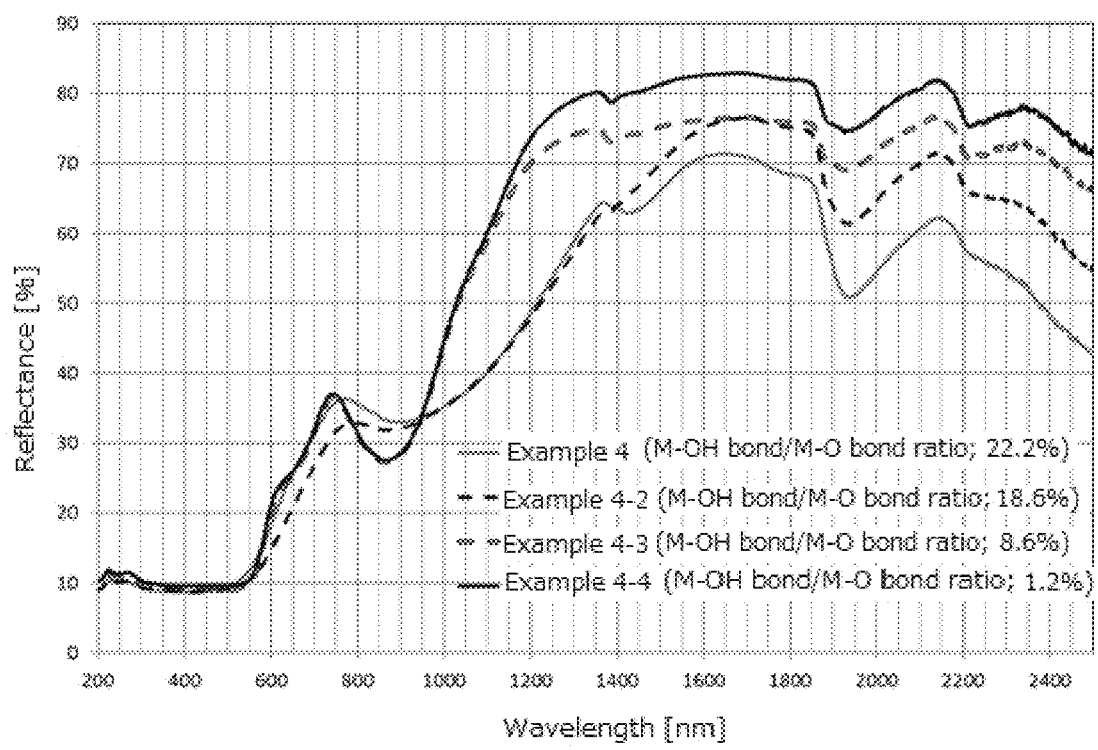
Figure 42:
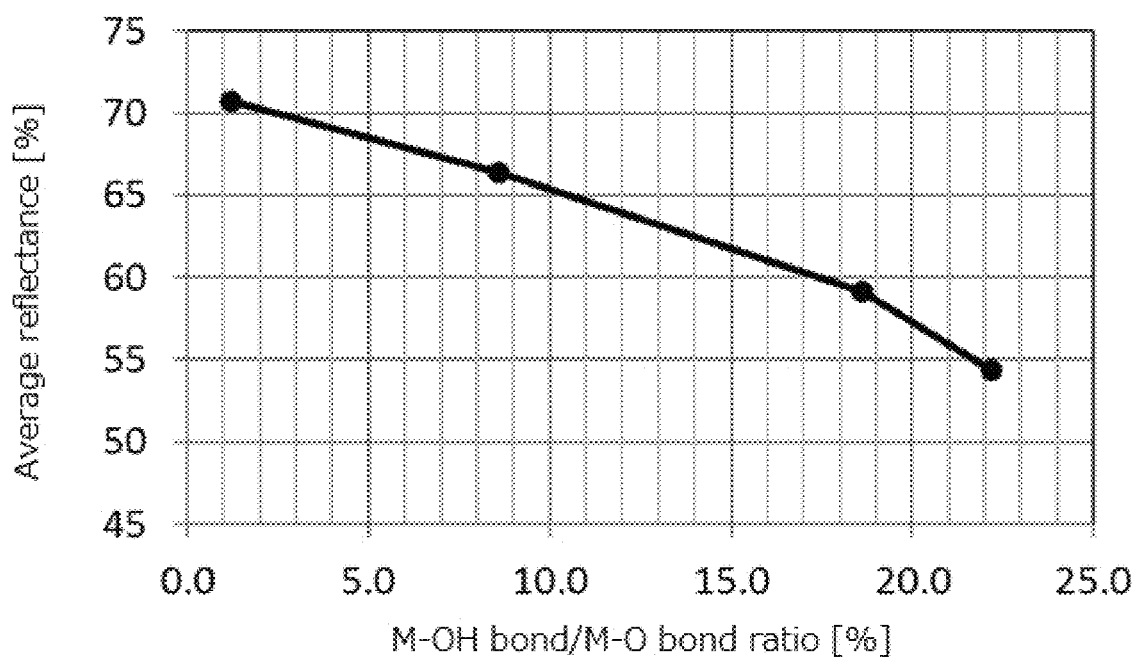

In FIG. 41, measurement results of the reflection spectra to the light beam in the wavelength of 200 nm to 2500 nm of the iron oxide particles obtained in Example 4 and Examples 4-2 to 4-4 are shown. In FIG. 42, the graph of the average reflectance to the infrared light beam in the wavelength of 780 nm to 2500 nm to the M-OH bond/M-O bond ratios calculated from the IR spectra of each Example is shown.

In Table 23, the average reflectance of the iron oxide particles obtained in Example 4 and Example 4-2 to Example 4-4 to the light beam in the wavelength of 780 nm to 2500 nm are shown.

TABLE 23

| Example | 4 | 4-2 | 4-3 | 4-4 |
|---|---|---|---|---|
| M—OH bond/M—O bond ratio [%] | 22.2 | 18.6 | 8.6 | 1.2 |
| Average reflectance [%] (780 nm to 2500 nm) | 54.4 | 59.2 | 66.4 | 70.7 |

As can be seen in Table 23 and FIG. 42, there is a tendency that as the M-OH bond/M-O bond ratio is lower, the average reflectance to the light beam in the wavelength of 780 nm to 2500 nm is higher. When the M-OH bond/M-O bond ratio of the iron oxide particle was 1.0% or more and 21% or less, the average reflectance to the near infrared region of the light beam in the wavelength of 780 nm to 2500 nm was 55% or more.

Example 4-5 to Example 4-7

Next, the iron oxide particle was prepared by the same method as Example 4, except that in Example 4 the iron oxide particle dispersion solution that was ejected from the fluid processing apparatus and then re in the beaker was processed by using the dispersion solution reformation apparatus 100 described in FIG. 34. In Table 24, the conditions used to control the M-OH bond ratio of the iron oxide particle using the dispersion solution reformation apparatus 100 of FIG. 34 are listed. By the same method as that of Examples 1-11 to Example 1-13 except for the contents described in Table 24, the iron oxide particle having the M-OH bond/M-O bond ratio thereof controlled was obtained.

The dispersion processing of the iron oxide particle dispersion solution and the removal operation of the impurities in the iron oxide particle dispersion solution were repeated until pH of the iron oxide particle dispersion solution reached 7.34 (measurement temperature: 23.6° C.) and the conductivity thereof reached 6.99 μS/cm, thereby not only the impurities included in the agglomerate of the iron oxide particle were removed, but also all the iron oxide particles in the iron oxide particle dispersion solution were reformed.

TABLE 24

| | | Example 4-5 |
|---|---|---|
| | Processing solution | Iron oxide particle dispersion solution |
| (1) | Initial solution amount charged into the storing vessel 130 | Kind: Pure water |
| | | pH: 5.89 (measurement temperature: 22.4° C.) |
| | | Conductivity: 0.80 μS/cm (measurement temperature: 22.4° C.) |
| | | Charged amount: 15 kg |

TABLE 24-continued

| | | Example 4-5 |
|---|---|---|
| (2) | Cross flow washing solution: kind, flow rate, and temperature | Kind: Pure water<br>pH: 5.89 (measurement temperature: 22.4° C.)<br>Conductivity: 0.80 µS/cm<br>(measurement temperature: 22.4° C.)<br>Flow rate: 1.5 L/min, 21° C. |
| (3) | Disperser 102 | Clearmix (product name: CLM-2.2S, rotor: R1, screen: S0.8-48, manufactured by M. Technique Co., Ltd.) |
| (4) | Removal unit 120 | Hollow fiber type dialyzer PN-220 (membrane area; 2.2 m$^2$, material; polysulfone, manufactured by Nikkiso Co., Ltd.) |
| (5) | Rotation number of the rotor | 20000 rpm<br>(circumferential velocity of 31.4 m/sec) |
| (6) | Start of charging of the oxide particle dispersion solution | When initial pure water in the storing vessel 130 is decreased to 1 L. |
| (7) | Charge amount of the oxide particle dispersion solution into the storing vessel 130 | 14 L (about 14 kg) |
| (8) | pH of the oxide particle dispersion solution in the storing vessel 130 | 11.23 (measurement temperature: 25.9° C.) |
| (9) | Conductivity of the oxide particle dispersion solution in the storing vessel 130 | 6999 µS/cm (measurement temperature: 25.8° C.) |
| (10) | Flow rate of the pump 104 | 8.8 L/min |
| (11) | Flow rate of the oxide particle dispersion solution returned to the storing vessel 130 | 7.3 L/min |
| (12) | Discharge amount of the filtrate L3 by the removal unit 120 (calculated value) | 1.5 L/min |
| (13) | Charge timing of the diluting solution into the storing vessel 130 | When amount of the dispersion solution in the storing vessel 130 is concentrated to 1.5 L |
| (14) | Second diluting solution into the storing vessel 130: kind and the charged amount | Kind: Pure water<br>pH: 5.89 (measurement temperature: 22.4° C.)<br>Conductivity: 0.80 µS/cm<br>rticle, the oxide particle 2.4° C.)<br>Charged amount: 13.5 L (about 13.5 kg) |
| (15) | Concentration of the oxide particle in the oxide particle dispersion solution | From 0.4% by weight to 2.0% by weight |
| (16) | Pressure meter | Pa: Both are 0.10 MPaG |
| (17) | Pressure meter | Pb: 0.15 MPaG |
| (18) | Pressure meter | Pc: 0.02 MPaG |
| (19) | Path length (Lea) | 0.3 m |
| (20) | Pipe's inner diameter (Leb) | 0.0105 m |
| (21) | Flow rate of the oxide particle dispersion solution in the just-before transporting path | 1.2 m/sec |
| (22) | Time T1 from the dispersing vessel 101 to start of removal of the impurities by the removal unit 120 | 0.24 sec |
| (23) | Thermometer installed in the dispersing vessel 101 | 23 to 26° C. |
| (24) | Temperature of the oxide particle dispersion solution | 23 to 26° C. |
| (25) | Conductivity measurement apparatus | Conductivity meter (catalogue number; ES-51, manufactured by HORIBA, Ltd.) |

By changing the processing temperature in the reformation processing of the iron oxide particle dispersion solution described in (23) and (24) of Table 24, the iron oxide particles having different M-OH bond/M-O bond ratio were prepared in Example 4-5 to Example 4-7. The processing temperature in the reformation processing of the iron oxide particle dispersion solution, the M-OH bond/M-O bond ratio of the obtained iron oxide particle, the average reflectance thereof with the wavelength range of 780 nm to 2500 nm, the average reflectance thereof with the wavelength range of 380 nm to 780 nm, and the average molar absorption coefficient thereof with the wavelength range of 190 nm to 380 nm, together with the results of Example 4, are summarized in Table 25.

TABLE 25

| Example | 4 | 4-5 | 4-6 | 4-7 |
|---|---|---|---|---|
| Processing temperature (Table 24: (23)) [° C.] | — | 23 to 26 | 43 to 46 | 59 to 61 |
| Processing temperature (Table 24: (24)) [° C.] | — | 23 to 26 | 43 to 46 | 59 to 61 |
| M—OH bond/M—O bond ratio [%] | 22.2 | 18.6 | 16.5 | 11.2 |
| Average reflectance [%] (780 nm to 2500 nm) | 54.4 | 58.6 | 62.1 | 64.1 |
| Average molar absorption coefficient [L/(cm · mol)] (190 nm to 380 nm) | 770 | 1468 | 1598 | 1798 |

As can be seen in Table 25, there is a tendency that when the M-OH bond ratio is lower, the average reflectance with the wavelength range of 780 nm to 2500 nm and the average molar absorption coefficient with the wavelength range of 190 nm to 380 nm are higher. Accordingly, it was found that the color characteristics can be controlled by controlling the M-OH bond ratio.

Example 4-8

In Example 4-8, the iron oxide particle was prepared with the same condition as those of Example 4 except that the apparatus and the method for mixing and reaction of the A-solution (oxide raw material solution) with the B-solution (oxide separating solvent) that were described in Japanese Patent Laid-Open Publication No. 2009-112892 were used. Meanwhile, the apparatus described in Japanese Patent Laid-Open Publication No. 2009-112892 is the apparatus described in FIG. 1 of the said gazette, wherein the inner diameter of the stirring vessel was 80 mm, the clearance between the outer edge of the stirring tool and the inner circumferential surface of the stirring vessel was 0.5 mm, and the rotation number of the stirring blade was 7200 rpm. The A-solution was introduced into the stirring vessel; and then, the B-solution was added into a thin film formed of the A-solution being pressed to the inner circumferential surface of the stirring vessel so as to mix them and react them. As a result of the TEM observation, the iron oxide particles having the primary particle diameter in the range of about 50 nm to about 60 nm were observed.

The iron oxide particle obtained in Example 4-8 was subjected to a heat treatment using an electric furnace as the changing treatment of the functional group included in the iron oxide particle. The heat treatment conditions thereof were: no heat treatment in Example 4-8, 100° C. in Example 4-9, 200° C. in Example 4-10, and 300° C. in Example 4-11, wherein the period of the heat treatment was 30 minutes in all the heat treatment temperatures. In Table 26, the average primary particle diameters of the iron oxide particles obtained in Example 4-8 to Example 4-11, the M-OH bond/M-O bond ratios thereof, the average reflectance thereof with the wavelength range of 780 nm to 2500 nm, and the average molar absorption coefficients thereof with the wavelength range of 190 nm to 380 nm are summarized. Meanwhile, the molar absorption coefficients of the iron oxide particles obtained in Example 4-8 to Example 4-11 were measured, similarly to Example 4, by using propylene glycol as the dispersion medium.

TABLE 26

| Example | 4-8 | 4-9 | 4-10 | 4-11 |
|---|---|---|---|---|
| Average primary particle diameter [nm] | 55.9 | 55.4 | 55.6 | 55.7 |
| M—OH bond/M—O bond ratio [%] | 21.3 | 18.1 | 15.3 | 9.6 |
| Average reflectance [%] (780 nm to 2500 nm) | 53.1 | 59.1 | 63.1 | 69.2 |
| Average molar absorption coefficient [L/(cm · mol)] (190 nm to 380 nm) | 695 | 1402 | 1649 | 1888 |

As can be seen in Table 26, it was found that even when the iron oxide particle that is prepared by using the apparatus different from that of Example 1 to Example 4 is used, by carrying out the changing treatment of the functional group included in the iron oxide particle whose primary particle diameter is 100 nm or less, the M-OH bond/M-O bond ratio thereof can be controlled, so that by controlling the M-OH bond/M-O bond ratio, the average molar absorption coefficient with the wavelength range of 190 nm to 380 nm as well as the average reflectance with the wavelength range of 780 nm to 2500 nm can be controlled.

Comparative Example 1

The iron oxide particle with the primary particle diameter of 150 nm to 250 nm (special grade of iron (III) oxide ($\alpha$-$Fe_2O_3$); manufactured by Wako Pure Chemical Industries, Ltd.) was subjected to a heat treatment by using an electric furnace as the changing treatment of the functional group included in the iron oxide particle in order to change the M-OH bond/M-O bond ratio thereof. The heat treatment conditions thereof were: no heat treatment in Comparative Example 1-1, 100° C. in Comparative Example 1-2, and 300° C. in Comparative Example 1-3, wherein the period of the heat treatment was 30 minutes in all the heat treatment temperatures. In Table 27, with regard to the iron oxide particles obtained in Comparative Examples 1-1 to 1-3, the M-OH bond/M-O bond ratios and the average molar absorption coefficients to the light beam in the wavelength of 190 nm to 380 nm of the dispersion solution obtained by dispersing into propylene glycol which is in the same way as Example 4 are shown. As can be seen in Table 27, in the case of the iron oxide particle having the primary particle diameter of more than 100 nm, even if the M-OH bond/M-O bond ratio was changed, not only the average molar absorption coefficient was low, but also there was no tendency. In addition, especially in the comparison between Comparative Example 1-1 and Example 4-4, in Comparative Example 1-1, it can be seen that in spite that the M-OH bond/M-O bond ratio thereof is in the same level as that of the iron oxide particle obtained in Example 4-4 whose primary particle diameter is 50 nm or less, the average molar absorption coefficient thereof with the wavelength range of 190 nm to 380 nm is lower. In the present invention, it was presumed that the M-OH bond/M-O bond ratio can have an influence to the color characteristics when the primary particle diameter is as small as 50 nm or less, namely, the color characteristics can be controlled by controlling the M—OH bond/M—O bond ratio under the condition that the surface area to the same amount of the iron oxide particle is increased.

TABLE 27

| Comparative Example | 1-1 | 1-2 | 1-3 |
|---|---|---|---|
| M—OH bond/M—O bond ratio [%] | 1.3 | 1.2 | 1.1 |
| Average molar absorption coefficient [L/(cm · mol)] (190 nm to 380 nm) | 331 | 333 | 329 |

Example 5

In Example 5, the zinc oxide particle will be described. By using Clearmix (product name: CLM-2.2S, manufactured by M. Technique Co., Ltd.), which is a high speed rotational dispersion emulsifier, the oxide raw material solution and the oxide separating solvent were prepared. Specifically, according to the prescription of the oxide raw material solution described in Example 5 of Table 28, each component of the zinc oxide raw material solution were uniformly mixed by stirring for 30 minutes at the preparation tempera-ture of 40° C. by using Clearmix with the rotation number of the rotor thereof being 20000 rpm to obtain the oxide raw material solution. Also, according to the prescription of the oxide separating solvent described in Example 5 of Table 28, each component of the oxide separating solvent were uniformly mixed by stirring for 30 minutes at the preparation temperature of 45° C. by using Clearmix with the rotation number of the rotor thereof being 15000 rpm to obtain the oxide separating solvent. Meanwhile, the substances used here and represented by chemical formula or abbreviation described in Table 28 are: MeOH for methanol (manufactured by Godo Co., Ltd.), 97 wt % $H_2SO_4$ for concentrated sulfuric acid (manufactured by Kishida Chemical Co., Ltd.), KOH for potassium hydroxide (manufactured by Nippon Soda Co., Ltd.), and ZnO for zinc oxide (manufactured by Kanto Chemical Co., Ltd.).

Next, the oxide raw material solution and the oxide separating solvent, which had been prepared as described above, were mixed by using the fluid processing apparatus described in Patent Document 7 that was filed by the applicant of the present invention. The processing method of each fluid and the recovery method of the processed solution were the same as those of Example 1. Meanwhile, in Example 5, the third introduction part d3 and the C-solution were not used (not shown by drawings).

In Table 29, similarly to Example 1, operation conditions of the fluid processing apparatus and the average primary particle diameter calculated from the TEM observation result of the obtained zinc oxide particles are listed. The measurement of pH, analyses, and washing method of the particle were the same as those of Example 2.

(Measurement of the Haze Value)

Meanwhile, in evaluation of Example 5, the Haze value of the zinc oxide particle dispersion solution was also measured. For measurement of the Haze value, a Haze meter (catalog No. HZ-V3; manufactured by Suga Test Instruments Co., Ltd.) was used, wherein the optical condition with a double beam system using a D65 light as the light source in accordance with JIS K 7136 and JIS K 7361 was used. The measurement was made with a liquid sample cell having the thickness of 1 mm, using the same dispersion solution as the dispersion solution used to measure the transmission spectrum.

TABLE 28

| | Prescription of first fluid (A-solution: oxide separating solvent) | | | | | | Prescription of second fluid (B-solution: oxide raw material solution) | | | | | | |
|---|---|---|---|---|---|---|---|---|---|---|---|---|---|
| | Prescription | | | | pH | | Prescription | | | | | pH | |
| | Raw material | [wt %] | Raw material | [wt %] | pH | [° C.] | Raw material | [wt %] | Raw material | [wt %] | Raw material | [wt %] | pH | [° C.] |
| Example 5 | MeOH | 93.71 | 97 wt % $H_2SO_4$ | 6.29 | <1 | — | ZnO | 3.00 | KOH | 46.56 | Pure water | 50.44 | <1 | — |

TABLE 29

| | Introduction flow rate (supply flow rate) [mL/min] | | Introduction temperature (supply temperature) [° C.] | | Introduction pressure (supply pressure) [MPaG] | | Ejected solution | | Average primary particle diam. [nm] |
|---|---|---|---|---|---|---|---|---|---|
| | A-Soln. | B-Soln. | A-Soln. | B-Soln. | A-Soln. | B-Soln. | pH | Temp. [° C.] | |
| Example 5 | 575 | 50 | 28 | 28 | 0.106 | 0.112 | 13.66 | 24.1 | 9.4 |

Figure 43:
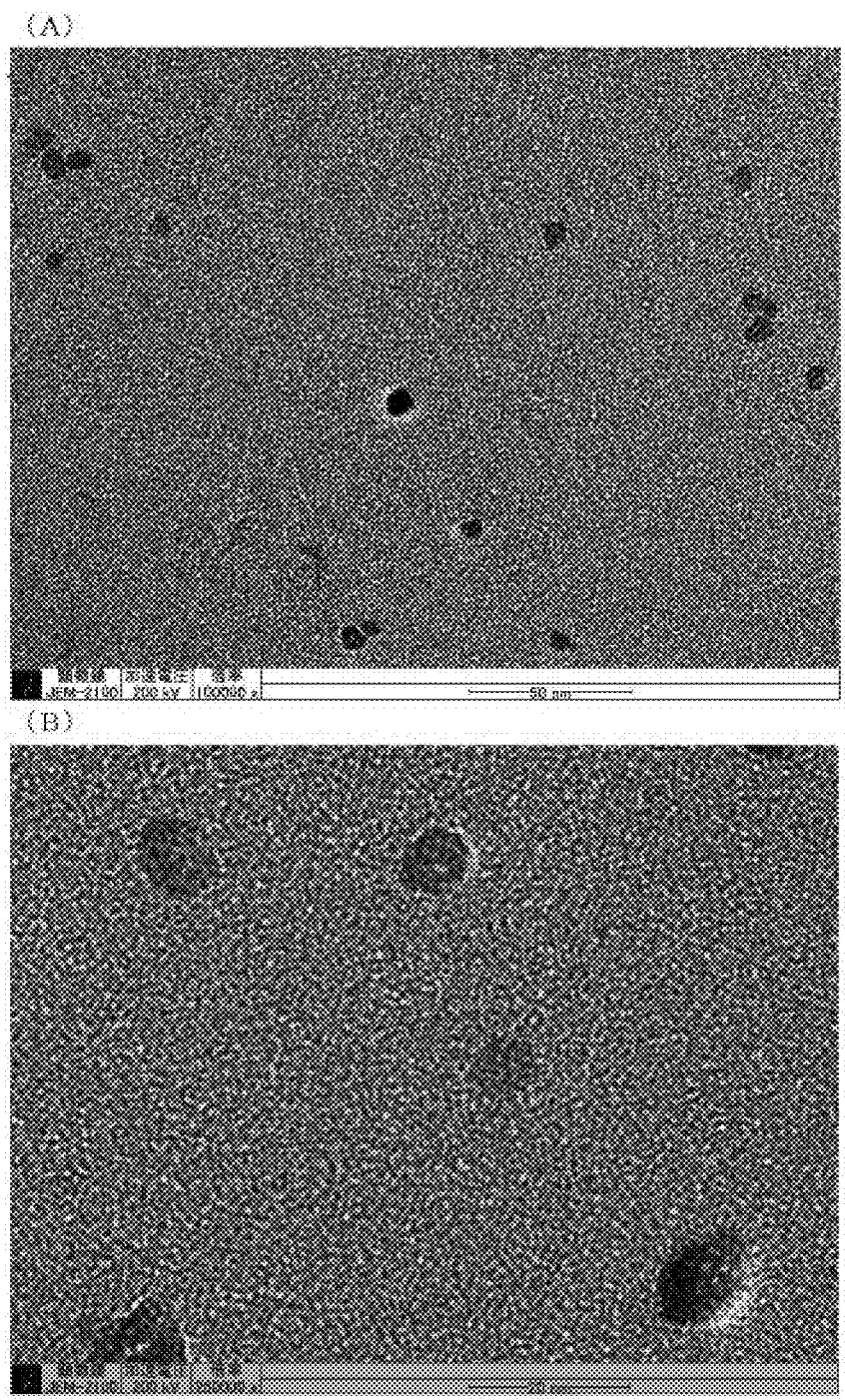

In FIG. 43, the TEM picture of the zinc oxide particle obtained in Example 5 is shown. In the zinc oxide particle obtained in Example 5, the primary particle diameter was about 5 nm to about 15 nm, and the average primary particle diameter was 9.4 nm as described in Table 29.

The zinc oxide particle obtained in Example 5 was subjected to the action of hydrogen peroxide as the changing treatment of the functional group included in the zinc oxide particle. Specifically, one parts by weight of the zinc oxide particle obtained in Example 5 is added to 99 parts by weight of propylene glycol (manufactured by Kishida Chemical Co., Ltd.), and then, it was subjected to a dispersion treatment by using Clearmix (product name: CLM-2.2S, manufactured by M. Technique Co., Ltd.), which is a high speed rotational dispersion emulsifier, at 25° C. for 1 hour with the rotation number of the rotor thereof being 20000 rpm to obtain the dispersion solution. Aqueous hydrogen peroxide (purity of 30.9%; manufactured by Kanto Chemical Co., Ltd.) was added to the thus obtained propylene glycol dispersion solution of the zinc oxide particle; and then, the resulting mixture was subjected to the dispersion treatment by using the high speed rotational dispersion emulsifier at 25° C. for 15 minutes. The treated solution thus obtained was centrifugally separated under the condition of 26000 G for 15 minutes, and then, the settled material was obtained by separating the supernatant. Part of the settled material was dried at −0.10 MPaG and 25° C. for 20 hours to obtain dried powders.

The molar ratio of hydrogen peroxide to the zinc oxide particle was changed by changing the amount of the aqueous hydrogen peroxide to carry out the changing treatment. The molar ratio of hydrogen peroxide to the zinc oxide particle ($H_2O_2$/ZnO [molar ratio]) was 0.01 fold by mole in Example 5-2, 0.50 fold by mole in Example 5-3, and 1.00 fold by mole in Example 5-4. In FIG. 44, the TEM picture of the zinc oxide particle obtained in Example 5-4 is shown. With regard to the zinc oxide particle obtained in Example 5-4, too, the primary particle diameter thereof was about 5 nm to about 15 nm, and the average primary particle diameter thereof was 9.5 nm.

Figure 45:
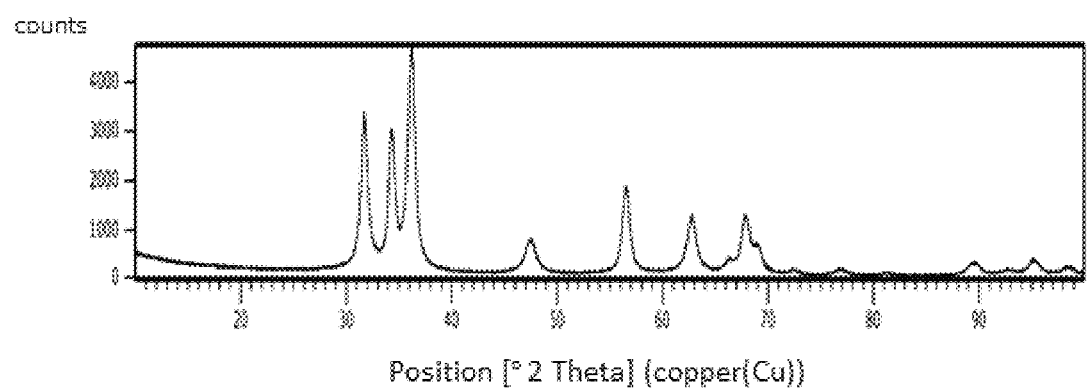

In FIG. 45, the XRD measurement result of the zinc oxide particle obtained in Example 5 is shown. As can be seen in FIG. 45, in the XRD measurement result thereof, only the peaks derived from zinc oxide (ZnO) were detected. In the XRD measurement results of Examples 5-2 to 5-4, too, only the peaks derived from zinc oxide were detected, similarly to FIG. 45.

Figure 46:
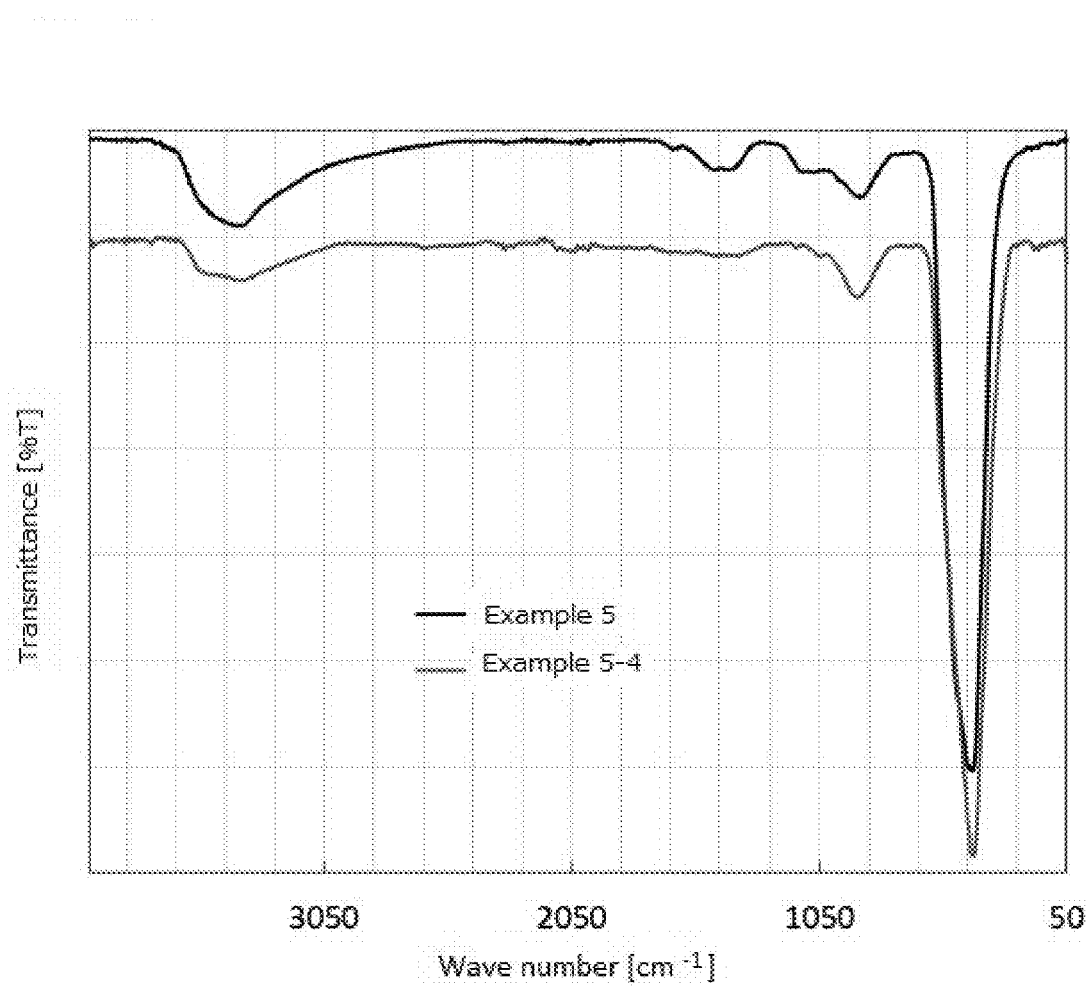

In FIG. 46, the FT-IR measurement results of the zinc oxide particles obtained in Example 5 and Example 5-4, measured with the ATR method, are shown. As compared with the IR measurement result of the zinc oxide particle obtained in Example 5, in the IR measurement result of the zinc oxide particle obtained in Example 5-4, it appears that the broad peaks derived from the M-OH bond which is in the wave number range of about 750 $cm^{-1}$ to about 1250 $cm^{-1}$ as well as the peaks in the wave number range of about 1300 $cm^{-1}$ to about 1500 $cm^{-1}$ which are considered to be generated by the reaction of the M-OH bond with carbon dioxide is to be smaller.

Figure 47:
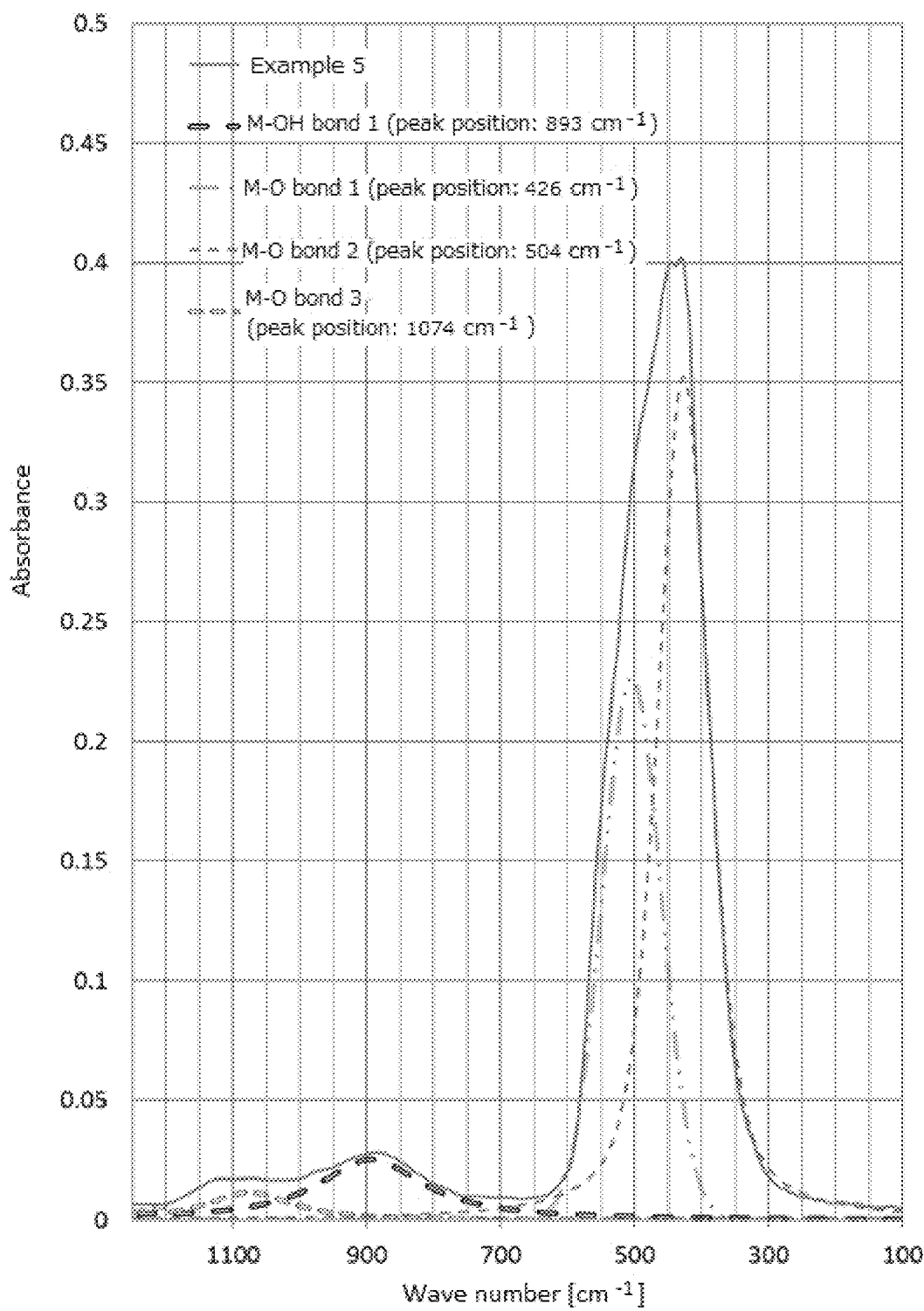
Figure 48:
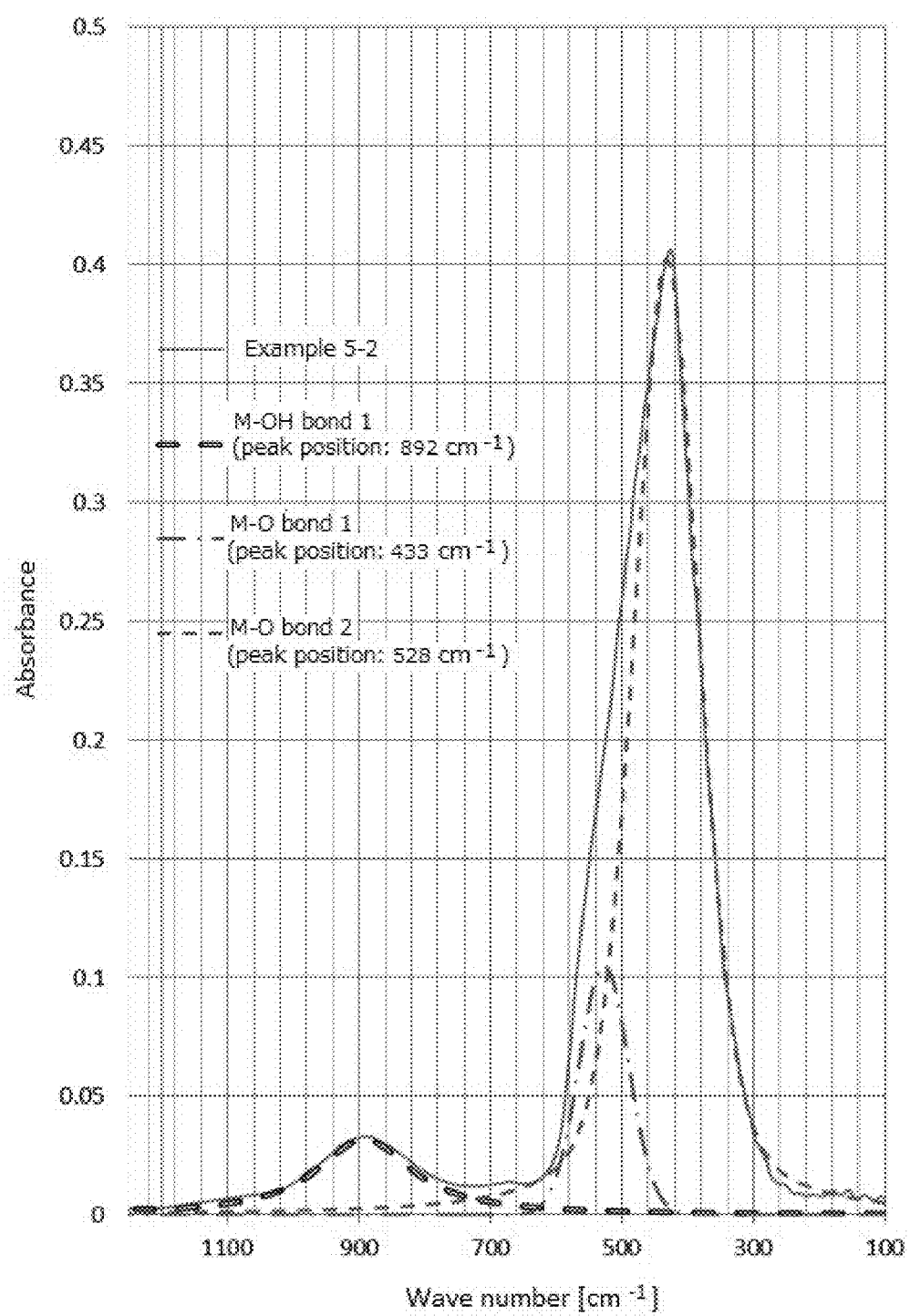
Figure 49:
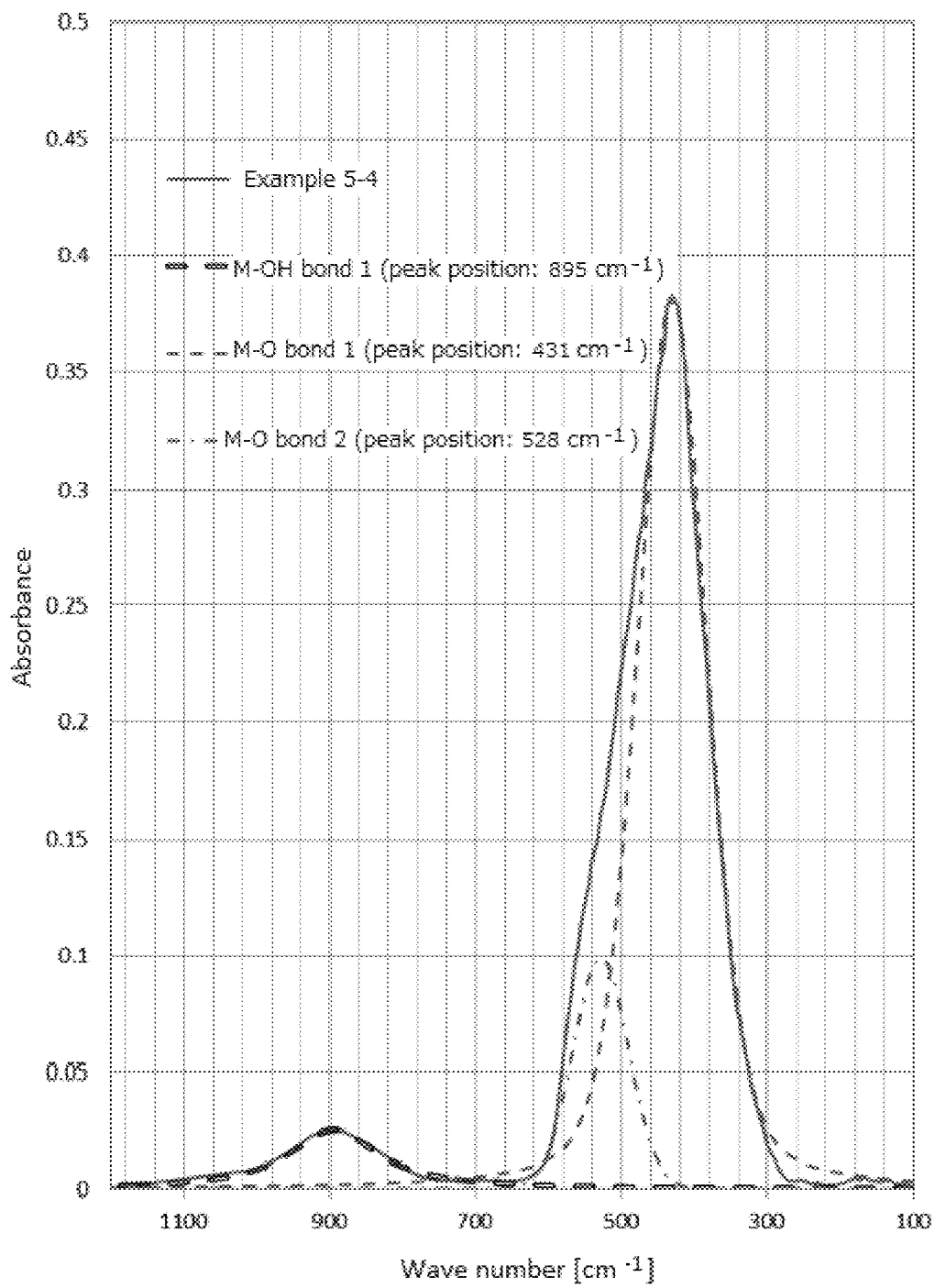

The results of wave shapes of the peaks that is separated in the wave number range of 100 $cm^{-1}$ to 1250 $cm^{-1}$ in the IR measurement are shown in FIG. 47 for Example 5, in FIG. 48 of Example 5-2 and in FIG. 49 for Example 5-4. In Table 30, the molar ratio of hydrogen peroxide to the zinc oxide particle ($H_2O_2$/ZnO [molar ratio]), the average primary particle diameter of the obtained zinc oxide particle, and the M-OH bond/M-O bond ratio are summarized. As can be seen in Table 30, it was found that by treating the zinc oxide particle with hydrogen peroxide, the M-OH ratio can be controlled.

Figure 50:
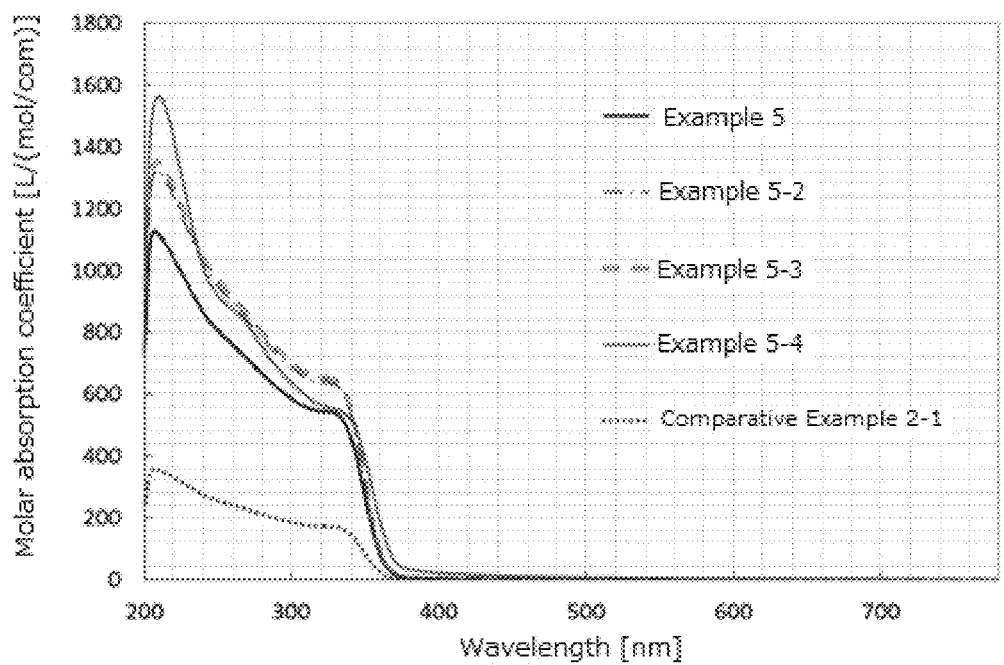

In FIG. 50, the graph of the molar absorption coefficients with the wavelength range of 200 nm to 780 nm of the dispersion solutions in which the zinc oxide particles obtained in Example 5 and Example 5-2 to Example 5-4 are dispersed into propylene glycol is shown. In Table 30, the average molar absorption coefficients thereof with the wavelength range of 200 nm to 380 nm are shown. As can be seen in FIG. 50 and Table 30, it was found that by controlling the M-OH bond/M-O bond ratio, the average molar absorption coefficient with the wavelength range of 200 nm to 380 nm can be controlled.

Figure 51:
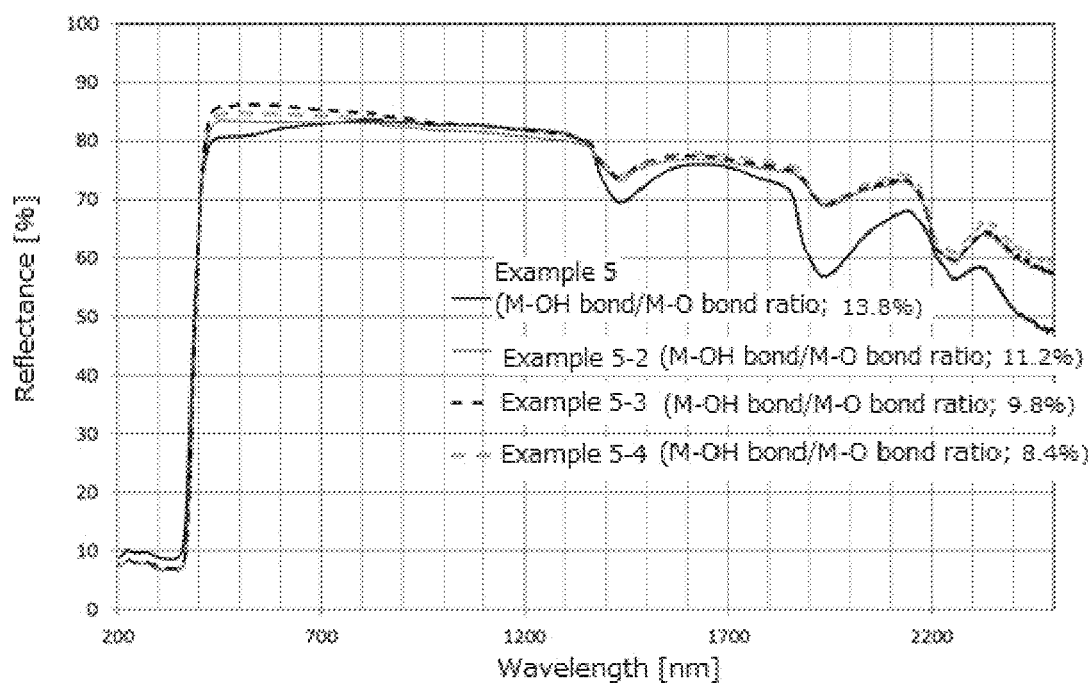

In FIG. 51, the measurement results of the reflection spectra to the light beam in the wavelength of 200 nm to 2500 nm of the zinc oxide particles obtained in Example 5 and Example 5-2 to Example 5-4 are shown; and in Table 30, the average reflectance thereof with the wavelength range of 780 nm to 2500 nm are shown. As can be seen in FIG. 51 and Table 30, it was found that by controlling the M-OH bond/M-O bond ratio, the average reflectance with the wavelength range of 780 nm to 2500 nm can be controlled.

Figure 52:
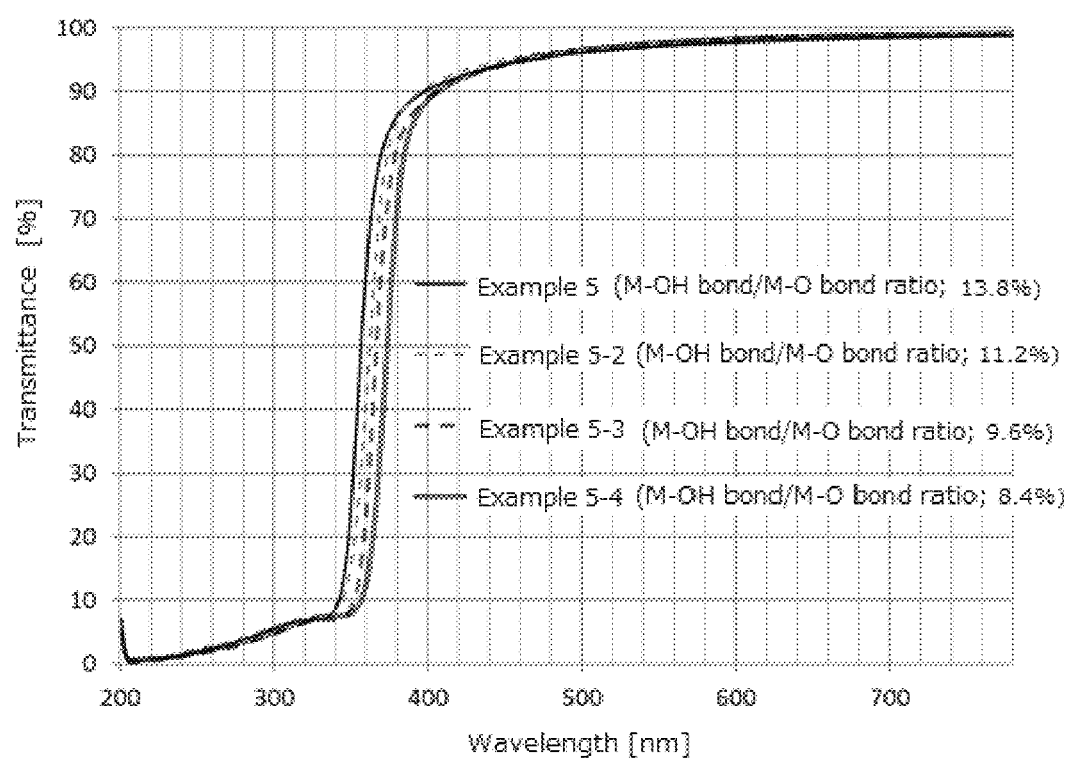

In FIG. 52, the transmission spectra of the dispersion solutions in which the zinc oxide particles obtained in Example 5 and Example 5-2 to Example 5-4 are dispersed into propylene glycol with the concentration thereof being 0.011% by weight as ZnO are shown. The tendency was seen that as the M-OH bond/M-O bond ratio decreases, the UV absorption region ranging from about 200 nm to about 360 nm shifts to a longer wavelength side. It was found that by controlling the M-OH bond/M-O bond ratio, the zinc oxide particle suitably used in a coating composition for a shielding purpose of a UV beam can be produced. In Table 30, the transmittance to the light beam in the wavelength of the wavelength of 330 nm, the average transmittance with the wavelength range of 380 nm to 780 nm, and the Haze value are summarized. In all of Example 5 and Example 5-2 to Example 5-4, the transmittances to the light beam in the wavelength of the wavelength of 330 nm were 10% or less, the average transmittances with the wavelength range of 380 nm to 780 nm were 90% or more, and the Haze values were 1% or less.

TABLE 30

| Example | 5 | 5-2 | 5-3 | 5-4 |
|---|---|---|---|---|
| Average primary particle diameter [nm] | 9.4 | 9.5 | 9.5 | 9.6 |
| $H_2O_2$/ZnO [molar ratio] | 0.00 | 0.01 | 0.50 | 1.00 |
| M—OH bond/M—O bond ratio [%] | 17.6 | 14.2 | 12.9 | 11.2 |
| Average molar absorption coefficient [L/(cm · mol)] (200 nm to 380 nm) | 623 | 723 | 739 | 744 |
| Average reflectance [%] (780 nm to 2500 nm) | 68.3 | 72.4 | 74.8 | 75.3 |
| Transmittance [%] (330 nm) | 7.0 | 7.5 | 7.4 | 7.4 |
| Average transmittance [%] (380 nm to 780 nm) | 96.4 | 96.5 | 97.0 | 96.9 |
| Haze value [%] | 0.02 | 0.02 | 0.04 | 0.02 |

The zinc oxide particle obtained in Example 5 was subjected to a heat treatment using an electric furnace as the changing treatment of the functional group included in the zinc oxide particle. The heat treatment conditions thereof were: no heat treatment in Example 5, 100° C. in Example 5-5, 200° C. in Example 5-6, and 300° C. in Example 5-7, wherein the period of the heat treatment was 30 minutes in all the heat treatment temperatures. In FIG. 53, the TEM picture of the zinc oxide particle obtained in Example 5-6 is shown. In the zinc oxide particle obtained in Example 5-6, the primary particle diameter thereof was about 5 nm to about 20 nm, and the average primary particle diameter thereof was 10.4 nm. The average primary particle diameter of the zinc oxide particle obtained in Example 5-5 was 9.5 nm, and the average primary particle diameter in Example 5-7 was 9.6 nm.

Figure 54:
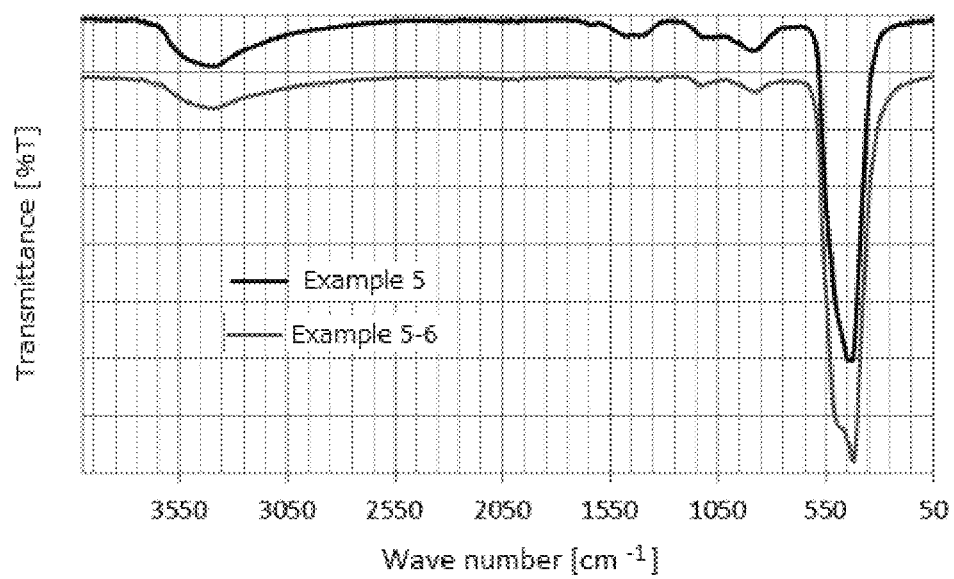

In FIG. 54, the FT-IR measurement results of the zinc oxide particles obtained in Example 5 and Example 5-6, measured with the ATR method, are shown. It can be seen that as compared with the zinc oxide particle obtained in Example 5, it can be seen that in the zinc oxide particle obtained in Example 5-6, the peaks due to the M-OH bond in the wave number range of 800 $cm^{-1}$ to 1250 $cm^{-1}$ are smaller, namely the M-OH bond/M-O bond ratio is smaller.

Figure 55:
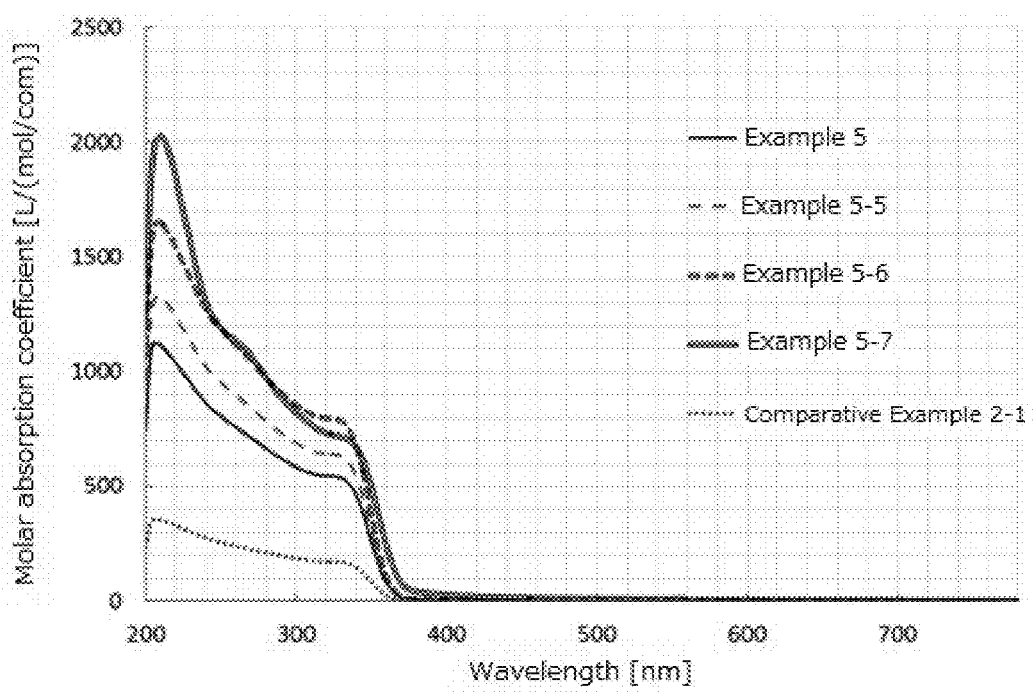

In FIG. 55, the graph of the molar absorption coefficients with the wavelength range of 200 nm to 380 nm of the dispersion solutions in which the zinc oxide particles obtained in Example 5 and Example 5-5 to Example 5-7 as well as the zinc oxide particle having the primary particle diameter of more than 50 nm obtained in Comparative Example 2-1 to be described later are dispersed into propylene glycol is shown. In Table 31, the average molar absorption coefficients thereof to the light beam in the wavelength of 200 nm to 380 nm are listed. From FIG. 55 and Table 31, it can be seen that as the M-OH bond/M-O bond ratio decreases in the order of Example 5, 5-5, 5-6, and 5-7, the average molar absorption coefficient with the wavelength range of 200 nm to 380 nm increases.

TABLE 31

| Example | 5 | 5-5 | 5-6 | 5-7 |
|---|---|---|---|---|
| M—OH bond/M—O bond ratio [%] | 17.6 | 10.2 | 5.9 | 1.6 |
| Average molar absorption coefficient [L/(cm · mol)] (200 nm to 380 nm) | 623 | 726 | 902 | 965 |

As can be seen in Table 31 and FIG. 55, it was found that when the M-OH bond/M-O bond ratio of the zinc oxide particle is in the range of 14% or less, as the M-OH ratio is lower, the average molar absorption coefficient to the light beam in the wavelength of 200 nm to 380 nm is higher. In the present invention, in the zinc oxide particle, it is preferable that the M-OH bond/M-O bond ratio of the zinc oxide particle be 18% or less, and the average molar absorption coefficient with the wavelength range of 200 nm to 380 nm be 500 L/(cm·mol) or more, while more preferably the M-OH bond/M-O bond ratio of the zinc oxide particle be 15% or less and the average molar absorption coefficient with the wavelength range of 200 nm to 380 nm be 650 L/(cm·mol) or more.

Figure 56:
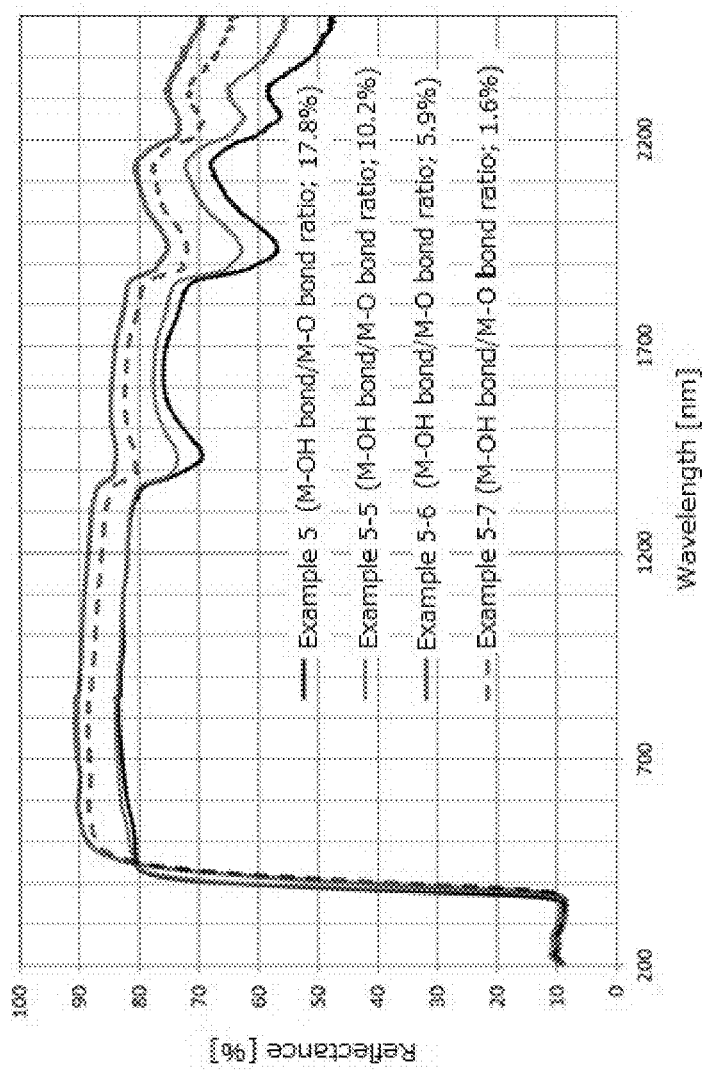
Figure 57:
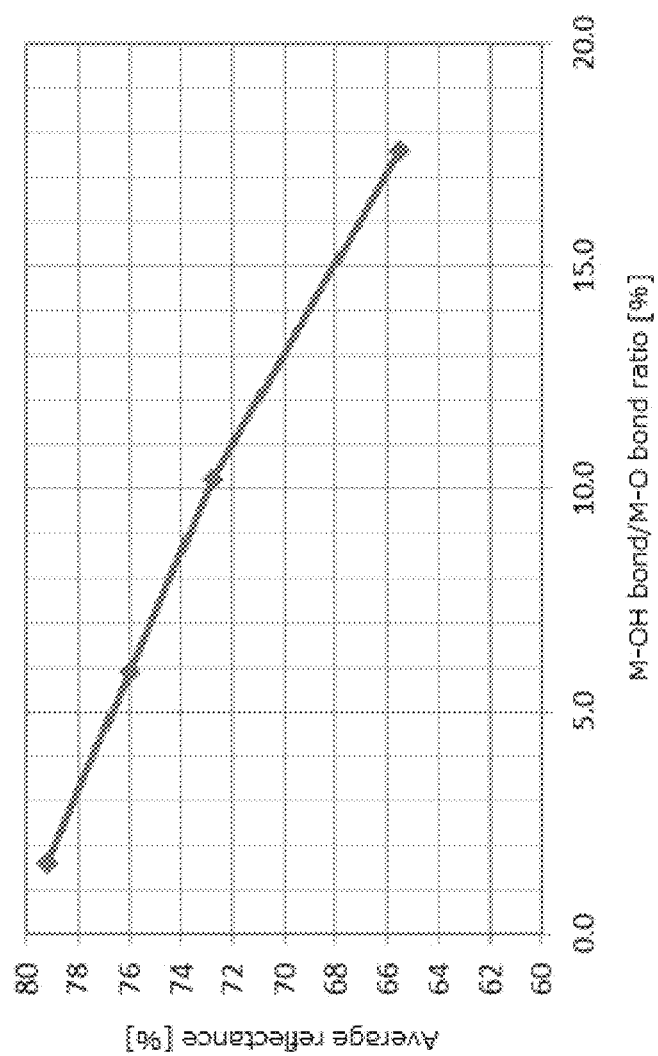

In FIG. 56, the measurement results of the reflection spectra of the zinc oxide particles obtained in Example 5 and Example 5-5 to Example 5-7 to the light beam in the wavelength of 200 nm to 2500 nm are shown. In FIG. 57 the graph of the average reflectance to the light beam in the near infrared region of 780 nm to 2500 nm to the M-OH bond/M-O bond ratio that is calculated from the IR spectrum of each Example is shown.

Figure 58:
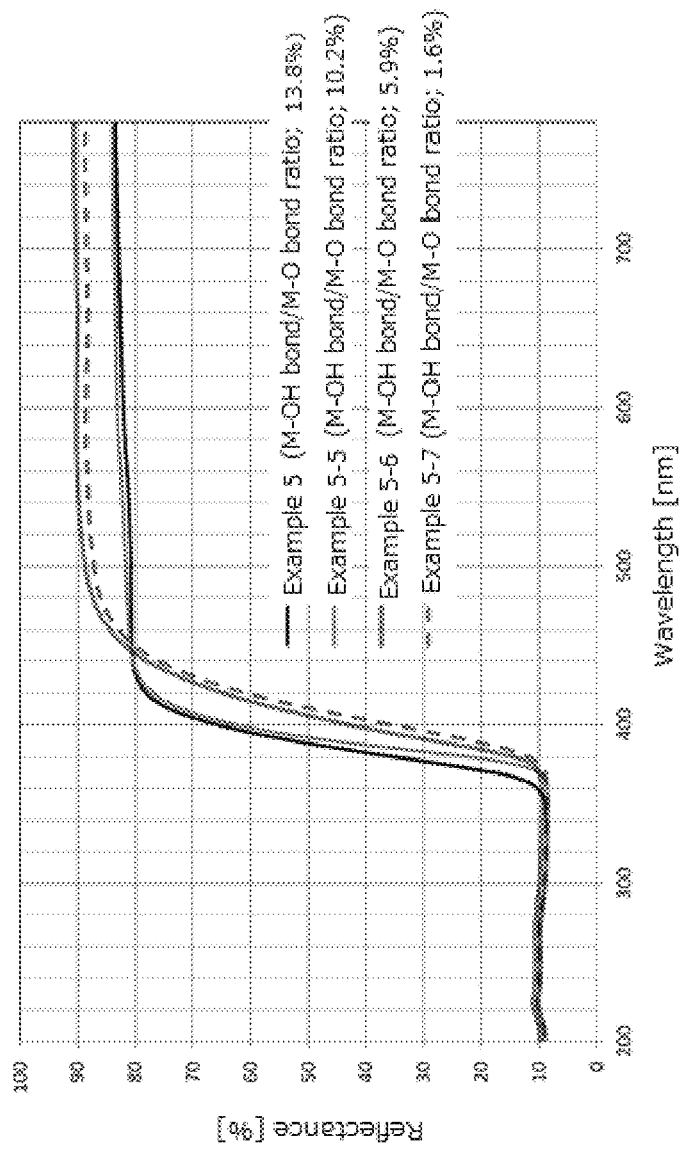

In FIG. 58, the measurement results of the reflection spectra of the zinc oxide particles obtained in Example 5 and Example 5-5 to Example 5-7 to the light beam in the wavelength of 200 nm to 780 nm are shown. As can be seen in FIG. 58, there is a tendency that as the M-OH bond/M-O bond ratio decreases, the UV absorption region ranging from about 200 nm to about 360 nm shifts to a longer wavelength side. In Table 32, with regard to the zinc oxide particles obtained in Example 5 and Example 5-5 to Example 5-7, the average reflectance thereof to the light beam in the wavelength of 780 nm to 2500 nm, the transmittances at the wavelength of 330 nm in the transmission spectra of the dispersion solutions in which the zinc oxide particles obtained in the said Examples are dispersed into propylene glycol with the concentration thereof being 0.011% by weight as ZnO, the average transmittances thereof obtained by the simple averaging calculation of the transmittances at plural measurement wavelengths with the wavelength range of 380 nm to 780 nm, and the Haze values thereof are summarized.

TABLE 32

| Example | 5 | 5-5 | 5-6 | 5-7 |
|---|---|---|---|---|
| M—OH bond/M—O bond ratio [%] | 13.8 | 10.2 | 5.9 | 1.6 |
| Average reflectance [%] (780 nm to 2500 nm) | 68.3 | 74.1 | 79.8 | 82.7 |
| Transmittance [%] (330 nm) | 7.0 | 7.5 | 6.9 | 7.4 |
| Average transmittance [%] (380 nm to 780 nm) | 96.4 | 97.0 | 96.5 | 96.5 |
| Haze value [%] | 0.02 | 0.02 | 0.03 | 0.04 |

As can be seen in FIG. 56, FIG. 57, and Table 32, there is a tendency that as the M-OH bond/M-O bond ratio is lower, the average reflectance to the light beam in the wavelength of 780 nm to 2500 nm is higher. In the zinc oxide particles obtained in Example 5 and Example 5-5 to Example 5-7, in spite that the average reflectance to the light beam in the near infrared range of 780 nm to 2500 nm was 65% or more, and the transmittance of the zinc oxide particle dispersion solution thereof to the light beam at the wavelength of 330 nm was 10% or less, the average transmittance to the light beam in the wavelength of 380 nm to 780 nm was 90% or more. In addition, the Haze value was very low, i.e., in the range of 0.02% to 0.04%.

Comparative Example 2

Figure 59:
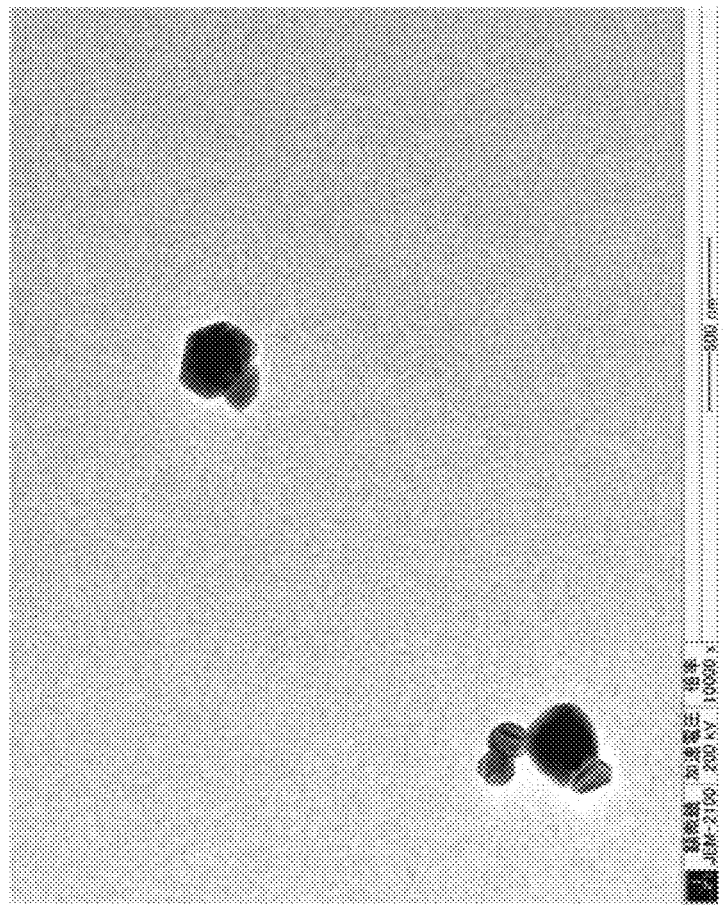

In the zinc oxide particle with the primary particle diameter of 150 nm to 300 nm (special grade 3N5; manufactured by Kanto Chemical Co., Ltd.), the M-OH bond ratio was changed. In FIG. 59, the TEM picture of Comparative Example 1 is shown. The heat treatment by using an electric furnace was carried out as the changing treatment of the functional group included in the zinc oxide particle. The heat treatment conditions thereof were: no heat treatment in Comparative Example 2-1, 100° C. in Comparative Example 2-2, and 300° C. in Comparative Example 2-3, wherein the period of the heat treatment was 30 minutes in all the heat treatment temperatures. In Table 33, with regard to the zinc oxide particles obtained in Comparative Examples 2-1 to 2-3, the M-OH bond/M-O bond ratios thereof, and the average molar absorption coefficients thereof to the light beam in the wavelength of 200 nm to 380 nm of the dispersion solutions obtained by dispersing the zinc oxide particles into propylene glycol in the same way of Example 5 and Example 5-5, as well as the transmittances thereof at the wavelength of 330 nm in the transmission spectra of the dispersion solutions in which the zinc oxide particles obtained in the said Examples are dispersed into propylene glycol with the concentration thereof being 0.011% by weight as ZnO, the average transmittances thereof to the light beam in the wavelength of 380 nm to 780 nm, and the Haze values thereof are summarized. As can be seen in Table 33, in the case of the zinc oxide particle having the primary particle diameter of more than 50 nm, even if the M-OH bond/M-O bond ratio was changed, there were no substantial changes in the average molar absorption coefficient, the transmittance, and the Haze value; and in addition, the absorption capacity of a UV beam and the transparency were low. In addition, especially in the comparison between Comparative Example 2-1 and Example 5-7, in Comparative Example 2-1, it can be seen that in spite that the M-OH bond ratio thereof is in the same level as that of the zinc oxide particle having the primary particle diameter 50 nm or less obtained in Example 5-7, the average molar absorption coefficient thereof with the wavelength range of 200 nm to 380 nm is lower. In the present invention, it was presumed that the M-OH bond/M-O bond ratio can have an influence to the color characteristics when the primary particle diameter is as small as 50 nm or less, namely, the color characteristics can be controlled by controlling the M-OH bond/M-O bond ratio under the condition that the surface area to the same amount of the zinc oxide particle is increased. Here, the average primary particle diameter of Comparative Example 2-1 was 228 nm, the average primary particle diameter of Comparative Example 2-2 was 228 nm, and the average primary particle diameter of Comparative Example 2-3 was 225 nm.

TABLE 33

| Comparative Example | 2-1 | 2-2 | 2-3 |
|---|---|---|---|
| M—OH bond/M—O bond ratio [%] | 1.7 | 0.9 | 0.3 |
| Average molar absorption coefficient [L/(cm · mol)] (200 nm to 380 nm) | 196 | 197 | 199 |
| Transmittance [%] (330 nm) | 15.1 | 15.6 | 15.3 |
| Average transmittance [%] (380 nm to 780 nm) | 65.1 | 66.4 | 66.5 |
| Haze value [%] | 3.68 | 3.81 | 3.78 |

Comparative Example 3

Figure 60:
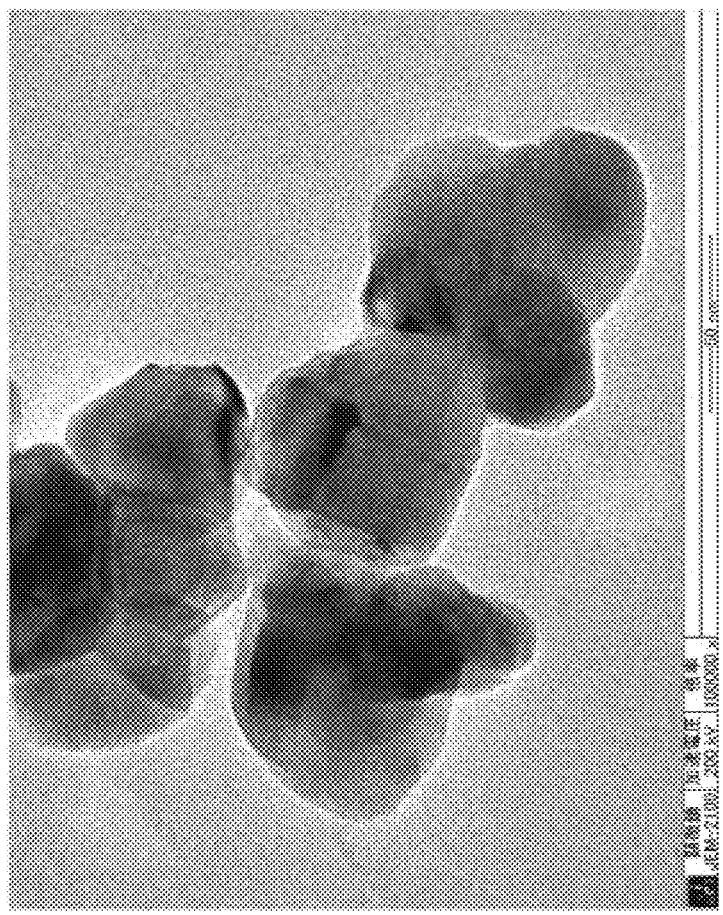
Figure 61:
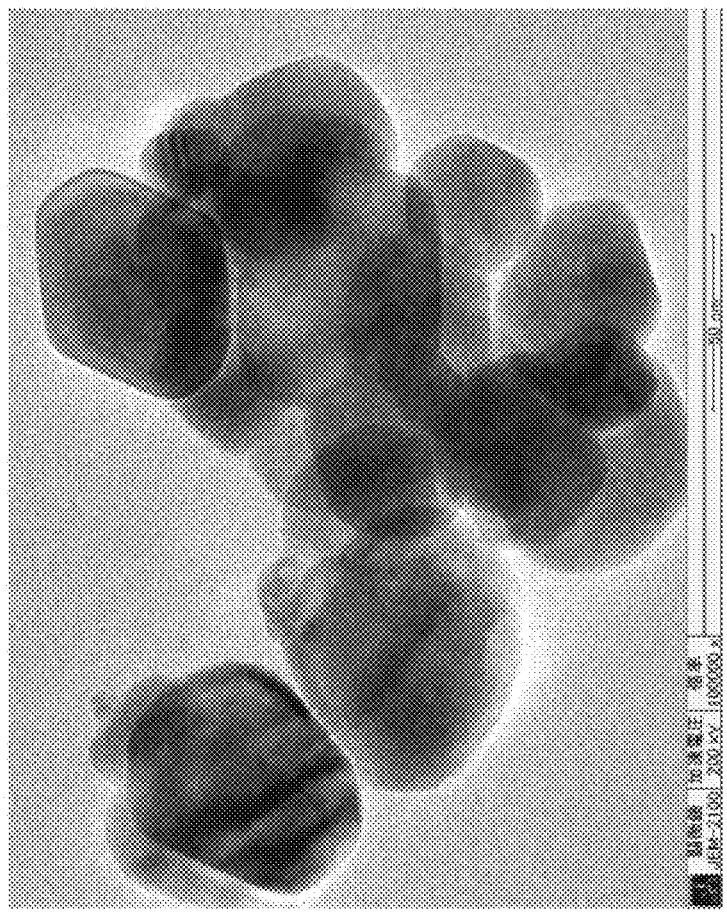

The zinc oxide particle obtained in Example 5 was subjected to a heat treatment by using an electric furnace as the changing treatment of the functional group included in the zinc iron oxide particle. The heat treatment conditions thereof were 400° C. (Comparative Example 3-1) and 600° C. (Comparative Example 3-2), wherein the period of the heat treatment was 30 minutes in both the heat treatment temperatures. The TEM pictures of the zinc oxide particles obtained with these heat treatment conditions are shown in FIG. 60 (Comparative Example 3-1) and FIG. 61 (Comparative Example 3-2), respectively. As can be seen in FIG. 60 and FIG. 61, fusion among the zinc oxide particles was clearly observed, whereby the primary particle diameter thereof was more than 50 nm. In Table 34, with regard to the zinc oxide particles obtained in Comparative Example 3-1 and Comparative Example 3-2, the M-OH bond/M-O bond ratios thereof, and the average molar absorption coefficients thereof to the light beam in the wavelength of 200 nm to 380 nm of the dispersion solutions obtained by dispersing the said zinc oxide particles into propylene glycol, as well as the transmittances thereof at the wavelength of 330 nm in the transmission spectra of the dispersion solutions in which the zinc oxide particles obtained in the said Examples are dispersed into propylene glycol with the concentration thereof being 0.011% by weight as ZnO, the average transmittance thereof to the light beam in the wavelength of 380 nm to 780 nm, and the Haze value thereof are summarized.

TABLE 34

| | Comparative Example | |
|---|---|---|
| | 3-1 | 3-2 |
| M—OH bond/M—O bond ratio [%] | 0.7 | 0.3 |
| Average molar absorption coefficient [L/(cm · mol)] (200 nm to 380 nm) | 239 | 237 |
| Transmittance [%] (330 nm) | 13.2 | 13.1 |
| Average transmittance [%] (380 nm to 780 nm) | 66.4 | 64.9 |
| Haze value [%] | 2.35 | 2.39 |

As can be seen in Table 34, similarly to Comparative Example 1, in the case where the zinc oxide particle whose the primary particle diameter was more than 50 nm, even when the M-OH bond/M-O bond ratio was changed, there were no differences among the average molar absorption coefficient, transmittance, and Haze value; and in addition, the absorption capacity of a UV beam and transparency thereof were poor.

Example 6

In Example 6-1, the zinc oxide particle was prepared with the same condition as those of Example 5 except that the apparatus and the method for mixing and reaction of the A-solution (oxide raw material solution) with B-solution (oxide separating solvent) that were described in Japanese Patent Laid-Open Publication No. 2009-112892 were used. Meanwhile, the apparatus described in Japanese Patent Laid-Open Publication No. 2009-112892 is the apparatus described in FIG. 1 of the said gazette, wherein the inner diameter of the stirring vessel was 80 mm, the clearance between the outer edge of the stirring tool and the inner circumferential surface of the stirring vessel was 0.5 mm, and the rotation number of the stirring blade was 7200 rpm. The A-solution was introduced into the stirring vessel; and then, the B-solution was added into a thin film formed of the A-solution being pressed to the inner circumferential surface of the stirring vessel so as to mix them and react them. As a result of the TEM observation, the zinc oxide particles having the primary particle diameter of about 30 nm were observed.

The zinc oxide particle obtained in Example 6-1 was subjected to a heat treatment by using an electric furnace as the changing treatment of the functional group included in the zinc oxide particle. The heat treatment conditions thereof were: no heat treatment in Example 6-1, 100° C. in Example 6-2, 200° C. in Example 6-3, and 300° C. in Example 6-4, wherein the period of the heat treatment was 30 minutes in all the heat treatment temperatures. In Table 35, the average primary particle diameters of the zinc oxide particles obtained in Example 6-1 to Example 6-4, the M-OH bond/M-O bond ratios thereof, the average molar absorption coefficients thereof with the wavelength range of 200 nm to 380 nm, the average reflectance thereof with the wavelength range of 780 nm to 2500 nm, the transmittances thereof to the light beam at the wavelength of 330 nm, the average transmittances thereof with the wavelength range of 380 nm to 780 nm, and the Haze values thereof are shown. Meanwhile, the transmittances and molar absorption coefficients of the zinc oxide particles obtained in Example 6-1 to Example 6-4 were measured, similarly to Example 5, by using propylene glycol as the dispersion medium.

TABLE 35

| | Example | | | |
|---|---|---|---|---|
| | 6-1 | 6-2 | 6-3 | 6-4 |
| Average primary particle diameter [nm] | 35.6 | 36.4 | 35.8 | 35.9 |
| M—OH bond/M—O bond ratio [%] | 17.2 | 13.4 | 11.1 | 8.3 |
| Average molar absorption coefficient [L/(cm · mol)] (200 nm to 380 nm) | 651 | 718 | 909 | 972 |
| Average reflectance [%] (780 nm to 2500 nm) | 69.4 | 71.9 | 80.2 | 83.2 |

TABLE 35-continued

|  | Example | | | |
|---|---|---|---|---|
|  | 6-1 | 6-2 | 6-3 | 6-4 |
| Transmittance [%] (330 nm) | 8.6 | 8.8 | 9.1 | 9.2 |
| Average transmittance [%] (380 nm to 780 nm) | 92.1 | 93.1 | 92.4 | 93.3 |
| Haze value [%] | 0.29 | 0.31 | 0.35 | 0.39 |

As can be seen in Table 35, it was found that even when the zinc oxide particle that is prepared by using the apparatus different from that of Example 1 to Example 5 is used, by carrying out the changing treatment of the functional group included in the zinc oxide particle whose primary particle diameter is 50 nm or less, the M-OH bond/M-O bond ratio thereof can be controlled, so that by controlling the M-OH bond/M-O bond ratio, the average molar absorption coefficient with the wavelength range of 200 nm to 380 nm as well as the average reflectance with the wavelength range of 780 nm to 2500 nm can be controlled. In addition, in all of Example 6-1 to Example 6-4, the transmittances to the light beam at the wavelength of 330 nm was 10% or less, the average transmittance with the wavelength range of 380 nm to 780 nm was 90% or more, and the Haze value was 1% or less.

Comparative Example 4

In Comparative Example 4-1, the zinc oxide particle was prepared with the same method as Example 6-1 except that the clearance between the outer edge of the stirring tool and the inner circumferential surface of the stirring vessel was set to 1 mm, and the rotation number of the stirring blade was set to 1/6 of the rotation number of Example 6 (1200 rpm). As a result of the TEM observation, the zinc oxide particles with the primary particle diameter of about 70 nm were observed.

The zinc oxide particle obtained in Comparative Example 4-1 was subjected to a heat treatment by using an electric furnace as the changing treatment of the functional group included in the zinc oxide particle. The heat treatment conditions thereof were: no heat treatment in Comparative Example 4-1, 100° C. in Comparative Example 4-2, and 200° C. in Comparative Example 4-3, wherein the period of the heat treatment was 30 minutes in all the heat treatment temperatures. In Table 36, the average primary particle diameters of the zinc oxide particles obtained in Comparative Example 4-1 to Comparative Example 4-3, the M-OH bond/M-O bond ratios thereof, the average molar absorption coefficients thereof with the wavelength range of 200 nm to 380 nm, the average reflectance thereof with the wavelength range of 780 nm to 2500 nm, the transmittances thereof to the light beam at the wavelength of 330 nm, the average transmittances thereof with the wavelength range of 380 nm to 780 nm, and the Haze values thereof are summarized. Meanwhile, the transmittances and molar absorption coefficients of the zinc oxide particles obtained in Comparative Example 4-1 to Comparative Example 4-2 were measured, similarly to Examples 1 to 5, by using propylene glycol as the dispersion medium.

TABLE 36

|  | Comparative Example | | |
|---|---|---|---|
|  | 4-1 | 4-2 | 4-3 |
| Average primary particle diameter [nm] | 115.6 | 116.2 | 116.7 |
| M—OH bond/M—O bond ratio [%] | 15.6 | 15.3 | 15.5 |
| Average molar absorption coefficient [L/(cm · mol)] (200 nm to 380 nm) | 231 | 243 | 251 |
| Average reflectance [%] (780 nm to 2500 nm) | 55.9 | 56.8 | 57.1 |
| Transmittance [%] (330 nm) | 11.1 | 11.3 | 11.5 |
| Average transmittance [%] (380 nm to 780 nm) | 76.9 | 75.1 | 73.9 |
| Haze value [%] | 2.18 | 2.11 | 2.26 |

As can be seen in Table 36, it was found that in the case of the zinc oxide particle having the primary particle diameter of more than 100 nm, even if the M-OH bond/M-O bond ratio was changed, there were no substantial changes in the average molar absorption coefficient with the wavelength range of 200 nm to 780 nm and the average reflectance with the wavelength range of 780 nm to 2500 nm. In addition, in the conditions of Comparative Example 4-1 to Comparative Example 4-3, the transmittance to the light beam at the wavelength of 330 nm was 10% or more, the average transmittance with the wavelength range of 380 nm to 780 nm was less than 90%, and the Haze value was more than 1%.

Example 7

Next, the zinc oxide particle was prepared by the same method as Example 5, except that in Example 5 the zinc oxide particle dispersion solution that was ejected from the fluid processing apparatus and then re in the beaker was processed by using the dispersion solution reformation apparatus 100 described in FIG. 34. In Table 37, the conditions used to control the M-OH bond/M-O bond ratio of the zinc oxide particle by using the dispersion solution reformation apparatus 100 of FIG. 34 are summarized. By the same method as that of Example 1-11 to Example 1-13 except for the contents described in Table 37, the zinc oxide particle having the M-OH bond/M-O bond ratio thereof controlled was obtained.

The dispersion processing of the zinc oxide particle dispersion solution and the removal operation of the impurities in the zinc oxide particle dispersion solution were repeated until pH of the zinc oxide particle dispersion solution reached 7.01 (measurement temperature: 23.2° C.) and the conductivity thereof reached 0.04 μS/cm, thereby not only the impurities included in the agglomerate of the zinc oxide particle were removed, but also all the zinc oxide particles in the zinc oxide particle dispersion solution were reformed.

TABLE 37

| Processing solution | Example 7-1 Zinc oxide particle dispersion solution |
|---|---|
| (1) Initial solution amount charged into the storing vessel 130 | Kind: MeOH pH: 7.00 (measurement temperature: 23.5° C.) Conductivity: 0.01 μS/cm (measurement |

TABLE 37-continued

| Processing solution | Example 7-1<br>Zinc oxide particle dispersion solution |
|---|---|
| | temperature: 23.5° C.)<br>Charged amount: 15 L (about 12 kg) |
| (2) Cross flow washing solution: kind, flow rate, and temperature | Kind: MeOH<br>pH: 7.00 (measurement temperature: 23.5° C.)<br>Conductivity: 0.01 µS/cm (measurement temperature: 23.5° C.)<br>Flow rate: 0.7 L/min, 24° C. |
| (3) Disperser 102 | Clearmix (product name: CLM-2.2S, rotor: R1, screen: S0.8-48, manufactured by M. Technique Co., Ltd.) |
| (4) Removal unit 120 | Hollow fiber type dialyzer PN-220 (membrane area; 2.2 $m^2$, material; polysulfone, manufactured by Nikkiso Co., Ltd.) |
| (5) Rotation number of the rotor | 10000 rpm (circumferential velocity of 15.7 m/sec) |
| (6) Start of charging of the oxide particle dispersion solution | When initial pure water in the storing vessel 130 is decreased to 1 L. |
| (7) Charge amount of the oxide particle dispersion solution into the storing vessel 130 | 15 L (about 12 kg) |
| (8) pH of the oxide particle dispersion solution in the storing vessel 130 | Higher than 14 (measurement temperature: 23.2° C.) |
| (9) Conductivity of the oxide particle dispersion solution in the storing vessel 130 | 2999 µS/cm (measurement temperature: 23.1° C.) |
| (10) Flow rate of the pump 104 | 8.8 L/min |
| (11) Flow rate of the oxide particle dispersion solution returned to the storing vessel 130 | 7.3 L/min |
| (12) Discharge amount of the filtrate L3 by the removal unit 120 (calculated value) | 1.5 L/min |
| (13) Charge timing of the diluting solution into the storing vessel 130 | When amount of the dispersion solution in the storing vessel 130 is concentrated to 1.5 L |
| (14) Second diluting solution into the storing vessel 130: kind and the charged amount | Kind: MeOH<br>pH: 7.00 (measurement temperature: 23.5° C.)<br>Conductivity: 0.01 µS/cm (measurement temperature: 23.5° C.)<br>Flow rate: 0.7 L/min, 24° C. |
| (15) Concentration of the oxide particle in the oxide particle dispersion solution | From 1.0% by weight to 10.0% by weight |
| (16) Pressure meter | Pa: Both are 0.10 MPaG |
| (17) Pressure meter | Pb: 0.15 MPaG |
| (18) Pressure meter | Pc: 0.02 MPaG |
| (19) Path length (Lea) | 0.3 m |
| (20) Pipe's inner diameter (Leb) | 0.0105 m |
| (21) Flow rate of the oxide particle dispersion solution in the just-before transporting path | 1.2 m/sec |
| (22) Time T1 from the dispersing vessel 101 to start of removal of the impurities by the removal unit 120 | 0.24 sec |
| (23) Thermometer installed in the dispersing vessel 101 | 23 to 26° C. |
| (24) Temperature of the oxide particle dispersion solution | 23 to 26° C. |
| (25) Conductivity measurement apparatus | Conductivity meter (catalogue number; ES-51, manufactured by HORIBA, Ltd.) |

By changing the processing temperature in the reformation processing of the zinc oxide particle dispersion solution described in (23) and (24) of Table 37, the zinc oxide particles having different M-OH bond/M-O bond ratio were prepared. In Table 38, the processing temperatures in the reformation processing of the zinc oxide particle dispersion solution, the M-OH bond/M-O bond ratios of the obtained zinc oxide particles, the average reflectance thereof with the wavelength range of 780 nm to 2500 nm, the average reflectance thereof with the wavelength range of 380 nm to 780 nm, the average transmittance thereof with the wavelength range of 380 nm to 780 nm, and the average molar absorption coefficients thereof with the wavelength range of 200 nm to 380 nm, and the Haze values are summarized.

TABLE 38

|  | Example | | |
| --- | --- | --- | --- |
|  | 7-1 | 7-2 | 7-3 |
| Average primary particle diameter [nm] | 8.5 | 8.5 | 8.4 |
| Processing temperature (Table 37: (23)) [° C.] | 23 to 26 | 43 to 46 | 59 to 61 |
| Processing temperature (Table 37: (24)) [° C.] | 23 to 26 | 43 to 46 | 59 to 61 |
| M—OH bond/M—O bond ratio [%] | 12.2 | 11.1 | 9.3 |
| Average molar absorption coefficient [L/(cm · mol)] (200 nm to 380 nm) | 665 | 712 | 725 |
| Average reflectance [%] (780 nm to 2500 nm) | 69.9 | 71.6 | 73.6 |
| Average transmittance [%] (380 nm to 780 nm) | 97.3 | 97.5 | 97.6 |
| Haze value [%] | 0.02 | 0.02 | 0.02 |

As can be seen in Table 38, there is a tendency that when the M-OH bond/M-O bond ratio is lower, the average reflectance with the wavelength range of 780 nm to 2500 nm, the average reflectance with the wavelength range of 380 nm to 780 nm, the average transmittance with the wavelength range of 380 nm to 780 nm, and the average molar absorption coefficient with the wavelength range of 200 nm to 380 nm are higher. Accordingly, it was found that the color characteristics can be controlled by controlling the M-OH bond/M-O bond ratio.

Example 8

In Example 8, the cerium oxide particle will be described. By using Clearmix (product name: CLM-2.2S, manufactured by M. Technique Co., Ltd.), which is a high speed rotational dispersion emulsifier, the oxide raw material solution (A-solution) and the oxide separating solvent (B-solution) were prepared. Specifically, according to the prescription of the oxide raw material solution described in Example 8 of Table 39, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescription of the oxide separating solvent described in Example 8 of Table 39, each component of the oxide separating solvent were uniformly mixed by stirring for 30 minutes at the preparation temperature of 45° C. by using Clearmix with the rotation number of the rotor thereof being 15000 rpm to obtain the oxide separating solvent.

Meanwhile, the substances used here and represented by chemical formula or abbreviation described in Table 39 are: DMAE for dimethylamino ethanol (manufactured by Kishida Chemical Co., Ltd.) and $Ce(NO_3)_3 \cdot 6H_2O$ for cerium (III) nitrate hexahydrate (manufactured by Wako Pure Chemical Industries, Ltd.).

Next, the oxide raw material solution and the oxide separating solvent, which had been prepared as described above, were mixed by using the fluid processing apparatus described in Patent Document 7 that was filed by the applicant of the present invention. The processing method of each fluid and the recovery method of the processed solution were the same as those of Example 1. Meanwhile, in Example 8, the third introduction part d3 and the C-solution were not used (not shown by drawings).

In Table 40, similarly to Example 1, operation conditions of the fluid processing apparatus and the average primary particle diameter calculated from the TEM observation result of the cerium oxide particles are listed. The measurement of pH, analyses, and washing method of the particle were the same as those of Example 1. As a result of the TEM measurement, the primary particle diameter was about 5 nm to about 15 nm, and the average particle diameter was 5.19 nm, as described in Table 40.

TABLE 39

| | Prescription of first fluid (A-solution: oxide separating solvent) | | | | | Prescription of second fluid (B-solution: oxide raw material solution) | | | | |
| --- | --- | --- | --- | --- | --- | --- | --- | --- | --- | --- |
| | Prescription | | | | | Prescription | | | | |
| | Raw material | [wt %] | Raw material | [wt %] | pH | pH [° C.] | Raw material | [wt %] | Raw material | [wt %] | pH | pH [° C.] |
| Example 8 | DMAE | 1.40 | Pure water | 98.60 | 11.4 | 26.7 | $Ce(NO_3)_3 \cdot 6H_2O$ | 9.00 | Pure water | 91.00 | 3.2 | 29.0 |

TABLE 40

| | Introduction flow rate (supply flow rate) [mL/min] | | Introduction temperature (supply temperature) [° C.] | | Introduction pressure (supply pressure) [MPaG] | | Ejected solution | | Average primary particle diam. [nm] |
| --- | --- | --- | --- | --- | --- | --- | --- | --- | --- |
| | A-Soln. | B-Soln. | A-Soln. | B-Soln. | A-Soln. | B-Soln. | pH | Temp. [° C.] | |
| Example 8 | 100 | 40 | 135 | 81 | 0.333 | 0.10 | 7.97 | 29.6 | 5.19 |

The cerium oxide particle obtained in Example 8 was subjected to a heat treatment by using an electric furnace as the changing treatment of the functional group included in the iron oxide particle. The heat treatment conditions thereof were: no heat treatment in Example 8, 100° C. in Example 8-2, 200° C. in Example 8-3, and 300° C. in Example 8-4, wherein the period of the heat treatment was 30 minutes in all the heat treatment temperatures. The primary particles diameter of the cerium oxide particles obtained in Example 8-2 to Example 8-4, too, were about 5 nm to about 15 nm.

In the results of the XRD measurement of the cerium oxide particles obtained in Example 8 and Example 8-2 to Example 8-4, only the peaks derived from cerium oxide ($CeO_2$) were detected.

In Table 41, the average molar absorption coefficients to the light beam in the wavelength of 200 nm to 380 nm, as well as the M-OH bond ratios of the cerium oxide particles obtained in Example 8 and Example 8-2 to Example 8-4 are summarized. From Table 41, it can be seen that as the M-OH bond/M-O bond ratio decreases in the order of Example 8, 8-2, 8-3, and 8-4, the average molar absorption coefficient with the wavelength range of 200 nm to 380 nm increases.

TABLE 41

| | Example | | | |
|---|---|---|---|---|
| | 8 | 8-2 | 8-3 | 8-4 |
| M—OH bond/M—O bond ratio [%] | 28.6 | 22.6 | 14.3 | 8.4 |
| Average molar absorption coefficient [L/(cm · mol)] (200 nm to 380 nm) | 3655 | 4074 | 4159 | 4218 |

In addition, from Table 41, it can be seen that contrary to the silicon compound-coated cerium oxide particle obtained in Example 3, in the cerium oxide particle, by controlling the M-OH bond/M-O bond ratio in the range of 23% or less, the average molar absorption coefficient to the light beam in the wavelength of 200 nm to 380 nm can be made to 4000 L/(mol·cm) or more. In the present invention, in the cerium oxide particle, it is preferable that the M-OH bond/M-O bond ratio included in the cerium oxide particle be 30% or less, and that the average molar absorption coefficient to the light beam in the wavelength of 200 nm to 380 nm be 3500 L/(mol·cm) or more, while more preferably that the M-OH bond/M-O bond ratio included in the cerium oxide particle be 12% or less, and the average molar absorption coefficient to the light beam with the wavelength range of 200 nm to 380 nm be 4000 L/(mol·cm) or more.

Example 8-5 to Example 8-7

Next, the cerium oxide particle was prepared by the same method as Example 8, except that in Example 8 the cerium oxide particle dispersion solution that was ejected from the fluid processing apparatus and then re in the beaker was processed by using the dispersion solution reformation apparatus 100 described in FIG. 34. In Table 42, the conditions used to control the M-OH bond/M-O bond ratio of the cerium oxide particle by using the dispersion solution reformation apparatus 100 of FIG. 34 are summarized. By the same method as that of Example 1-11 to Example 1-13 except for the contents described in Table 42, the cerium oxide particle having the M-OH bond/M-O bond ratio thereof controlled was obtained.

The dispersion processing of the cerium oxide particle dispersion solution and the removal operation of the impurities in the cerium oxide particle dispersion solution were repeated until pH of the silicon compound-coated iron oxide particle dispersion solution reached 7.22 (measurement temperature: 25.6° C.) and the conductivity thereof reached 7.77 μS/cm, thereby the impurities included in the agglomerate of the cerium oxide particle were also removed, and all the cerium oxide particles in the cerium oxide particle dispersion solution were reformed.

TABLE 42

| | Processing solution | Example 8-5<br>Cerium oxide particle dispersion solution |
|---|---|---|
| (1) | Initial solution amount charged into the storing vessel 130 | Kind: Pure water<br>pH: 5.89 (measurement temperature: 22.4° C.)<br>Conductivity: 0.80 μS/cm<br>(measurement temperature: 22.4° C.)<br>Charged amount: 15 kg |
| (2) | Cross flow washing solution: kind, flow rate, and temperature | Kind: Pure water<br>pH: 5.89 (measurement temperature: 22.4° C.)<br>Conductivity: 0.80 μS/cm<br>(measurement temperature: 22.4° C.)<br>Flow rate: 1.5 L/min, 21° C. |
| (3) | Disperser 102 | Clearmix (product name: CLM-2.2S, rotor: R1, screen: S0.8-48, manufactured by M. Technique Co., Ltd.) |
| (4) | Removal unit 120 | Hollow fiber type dialyzer PN-220 (membrane area; 2.2 m², material; polysulfone, manufactured by Nikkiso Co., Ltd.) |
| (5) | Rotation number of the rotor | 20000 rpm<br>(circumferential velocity of 31.4 m/sec) |
| (6) | Start of charging of the oxide particle dispersion solution | When initial pure water in the storing vessel 130 is decreased to 1 L. |
| (7) | Charge amount of the oxide particle dispersion solution into the storing vessel 130 | 14 L (about 14 kg) |
| (8) | pH of the oxide particle dispersion solution in the storing vessel 130 | 7.69 (measurement temperature: 26.6° C.) |
| (9) | Conductivity of the oxide particle dispersion solution in the storing vessel 130 | 3131 μS/cm<br>(measurement temperature: 26.6° C.) |

TABLE 42-continued

| Processing solution | Example 8-5<br>Cerium oxide particle dispersion solution |
|---|---|
| (10) Flow rate of the pump 104 | 8.8 L/min |
| (11) Flow rate of the oxide particle dispersion solution returned to the storing vessel 130 | 7.3 L/min |
| (12) Discharge amount of the filtrate L3 by the removal unit 120 (calculated value) | 1.5 L/min |
| (13) Charge timing of the diluting solution into the storing vessel 130 | When amount of the dispersion solution in the storing vessel 130 is concentrated to 1.5 L |
| (14) Second diluting solution into the storing vessel 130: kind and the charged amount | Kind: Pure water<br>pH: 5.89 (measurement temperature: 22.4° C.)<br>Conductivity: 0.80 μS/cm<br>(measurement temperature: 22.4° C.)<br>Charged amount: 13.5 L (about 13.5 kg) |
| (15) Concentration of the oxide particle in the oxide particle dispersion solution | From 0.4% by weight to 2.0% by weight |
| (16) Pressure meter | Pa: Both are 0.10 MPaG |
| (17) Pressure meter | Pb: 0.15 MPaG |
| (18) Pressure meter | Pc: 0.02 MPaG |
| (19) Path length (Lea) | 0.3 m |
| (20) Pipe's inner diameter (Leb) | 0.0105 m |
| (21) Flow rate of the oxide particle dispersion solution in the just-before transporting path | 1.2 m/sec |
| (22) Time T1 from the dispersing vessel 101 to start of removal of the impurities by the removal unit 120 | 0.24 sec |
| (23) Thermometer installed in the dispersing vessel 101 | 23 to 26° C. |
| (24) Temperature of the oxide particle dispersion solution | 23 to 26° C. |
| (25) Conductivity measurement apparatus | Conductivity meter (catalogue number; ES-51, manufactured by HORIBA, Ltd.) |

By changing the processing temperature described in the reformation processing of the cerium oxide particle dispersion solution in (23) and (24) of Table 42, the cerium oxide particles having different M-OH bond/M-O bond ratio in Example 8-5 to Example 8-7 were prepared. In Table 43, the processing temperatures in the reformation processing of the cerium oxide particle dispersion solution, the M-OH bond/M-O bond ratios of the obtained cerium oxide particles, and the average molar absorption coefficients thereof with the wavelength range of 200 nm to 380 nm, together with the results of Example 8, are summarized.

TABLE 43

| | Example | | | |
|---|---|---|---|---|
| | 8 | 8-5 | 8-6 | 8-7 |
| Processing temperature (Table 42: (23)) [° C.] | — | 23 to 26 | 43 to 46 | 59 to 61 |
| Processing temperature (Table 42: (24)) [° C.] | — | 23 to 26 | 43 to 46 | 59 to 61 |
| M—OH bond/M—O bond ratio [%] | 28.6 | 25.6 | 24.2 | 21.2 |
| Average molar absorption coefficient [L/(cm · mol)] (200 nm to 380 nm) | 3655 | 3888 | 4092 | 4123 |

As can be seen in Table 43, there is a tendency that when the M-OH bond/M-O bond ratio is lower, the average molar absorption coefficient with the wavelength range of 200 nm to 380 nm is higher; and thus, it was found that the color characteristics can be controlled by controlling the M-OH bond/M-O bond ratio.

Comparative Example 5

As the changing treatment of the functional group included in the cerium oxide particle in order to change the M-OH bond/M-O bond ratio of the cerium oxide particle with the primary particle diameter of 120 nm to 200 nm (special grade cerium (IV) oxide ($CeO_2$); manufactured by Wako Pure Chemical Industries, Ltd.), it was subjected to a heat treatment by using an electric furnace. The heat treatment conditions thereof were: no heat treatment in Comparative Example 1-1, 100° C. in Comparative Example 1-2, and 300° C. in Comparative Example 1-3, wherein the period of the heat treatment was 30 minutes in all the heat treatment temperatures. In Table 44, with regard to the cerium oxide particles obtained in Comparative Examples 1-1 to 1-3, the M-OH bond/M-O bond ratios thereof and the average molar absorption coefficients thereof to the light beam in the wavelength of 200 nm to 380 nm of the dispersion solutions obtained by dispersing the cerium oxide particles into propylene glycol as with the same way of Example 8 are shown. As can be seen in Table 44, in the case of the cerium oxide particle having the primary particle diameter of more than 50 nm, even if the M-OH bond/M-O bond ratio was changed, not only the average molar absorption coefficient was low, but also there was no tendency in it. In addition, especially in the comparison between Comparative Example 5-1 and Example 8-4, in Comparative Example 5-1, it can be seen that in spite that the M-OH bond/M-O bond ratio thereof is in the same level as that of the cerium oxide particle obtained in Example 8-4 whose primary particle diameter is 50 nm or less, the average molar absorption coefficient thereof with the wavelength range of 200 nm to 380 nm is lower. In the present invention, it was presumed that the M-OH bond ratio can have an influence to the color characteristics when the primary particle diameter is so small as 50 nm or less, namely, the color characteristics can be controlled by controlling the M-OH bond/M-O bond ratio under the condition that the surface area to the same amount of the cerium oxide particle is increased.

TABLE 44

|  | Comparative Example | | |
|---|---|---|---|
|  | 5-1 | 5-2 | 5-3 |
| M—OH bond/M—O bond ratio [%] | 8.2 | 4.1 | 2.1 |
| Average molar absorption coefficient [L/(cm · mol)] (190 nm to 380 nm) | 946 | 951 | 933 |

Example 9 to Example 11

In Example 9 to Example 11, a cobalt zinc composite oxide particle, i.e., the oxide including cobalt and zinc, will be described as the oxide particle. By using Clearmix (product name: CLM-2.2S, manufactured by M. Technique Co., Ltd.), which is a high speed rotational dispersion emulsifier, the oxide raw material solution (A-solution) and the oxide separating solvent (B-solution) were prepared. Specifically, according to the prescriptions of the oxide raw material solution described in Example 9 to Example 11 of Table 45, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescription of the oxide separating solvent described in Example 9 of Table 45, each component of the oxide separating solvent were uniformly mixed by stirring for 30 minutes at the preparation temperature of 45° C. by using Clearmix with the rotation number of the rotor thereof being 15000 rpm to obtain the oxide separating solvent.

Meanwhile, the substances used here and represented by chemical formula or abbreviation described in Table 45 are: EG for ethylene glycol (manufactured by Kishida Chemical Co., Ltd.), $Zn(NO_3)_2 \cdot 6H_2O$ for zinc nitrate hexahydrate (manufactured by Wako Pure Chemical Industries, Ltd.), $Co(NO_3)_2 \cdot 6H_2O$ for cobalt nitrate hexahydrate (manufactured by Wako Pure Chemical Industries, Ltd.), and NaOH for sodium hydroxide (manufactured by Kanto Chemical Co., Ltd.).

Next, the oxide raw material solution and the oxide separating solvent, which had been prepared as described above, were mixed by using the fluid processing apparatus described in Patent Document 7 that was filed by the applicant of the present invention. The processing method of each fluid and the recovery method of the processed solution were the same as those of Example 1. Meanwhile, in Example 9 to Example 11, the third introduction part d3 and the C-solution were not used (not shown by drawings).

In Table 46, similarly to Example 1, operation conditions of the fluid processing apparatus, the average primary particle diameter calculated from the TEM observation result of the cobalt zinc composite oxide particles, and the Co/Zn molar ratio calculated from the TEM-EDS analysis, together with the calculated value thereof from the prescriptions and introduction flow rates of the A-solution and B-solution, are summarized. The measurement of pH, analyses, and washing method of the particle were the same as those of Example 1.

TABLE 45

| Prescription of first fluid (A-solution: oxide raw material solution) | | | | | | | |
|---|---|---|---|---|---|---|---|
| | Prescription | | | | | | pH |
| | Raw material | [wt %] | Raw material | [wt %] | Raw material | [wt %] | pH | [° C.] |
| Example 9 | $Zn(NO_3)_2 \cdot 6H_2O$ | 3.0000 | $Co(NO_3)_3 \cdot 6H_2O$ | 0.0447 | EG | 96.955 | 4.21 | 21.9 |
| Example 10 | $Zn(NO_3)_2 \cdot 6H_2O$ | 3.0000 | $Co(NO_3)_3 \cdot 6H_2O$ | 0.3650 | EG | 96.635 | 4.10 | 22.2 |
| Example 11 | $Zn(NO_3)_2 \cdot 6H_2O$ | 3.0000 | $Co(NO_3)_3 \cdot 6H_2O$ | 0.9783 | EG | 96.022 | 3.87 | 23.1 |

| Prescription of second fluid (B-solution: oxide separating solvent) | | | | | |
|---|---|---|---|---|---|
| | Prescription | | | | pH |
| | Raw material | [wt %] | Raw material | [wt %] | pH | [° C.] |
| Example 9 | NaOH | 9.00 | Pure water | 91.00 | >14 | — |
| Example 10 | NaOH | 9.00 | Pure water | 91.00 | >14 | — |
| Example 11 | NaOH | 9.00 | Pure water | 91.00 | >14 | — |

TABLE 46

| | Introduction flow rate (supply flow rate) [mL/min] | | Introduction temperature (supply temperature) [° C.] | | Introduction pressure (supply pressure) [MPaG] | | Ejected solution | | Co/Zn [molar ratio] | | Average primary particle diam. [nm] |
|---|---|---|---|---|---|---|---|---|---|---|---|
| | A-Soln. | B-Soln. | A-Soln. | B-Soln. | A-Soln. | B-Soln. | pH | Temp. [° C.] | [Calculated value] | [EDS] | |
| Example 9 | 400 | 45 | 160 | 87 | 0.103 | 0.10 | 11.87 | 29.3 | 0.02 | 0.02 | 9.79 |
| Example 10 | 400 | 45 | 159 | 87 | 0.093 | 0.10 | 11.86 | 28.8 | 0.11 | 0.11 | 9.89 |
| Example 11 | 400 | 50 | 161 | 86 | 0.087 | 0.10 | 11.78 | 28.9 | 0.33 | 0.33 | 10.16 |

Figure 62:
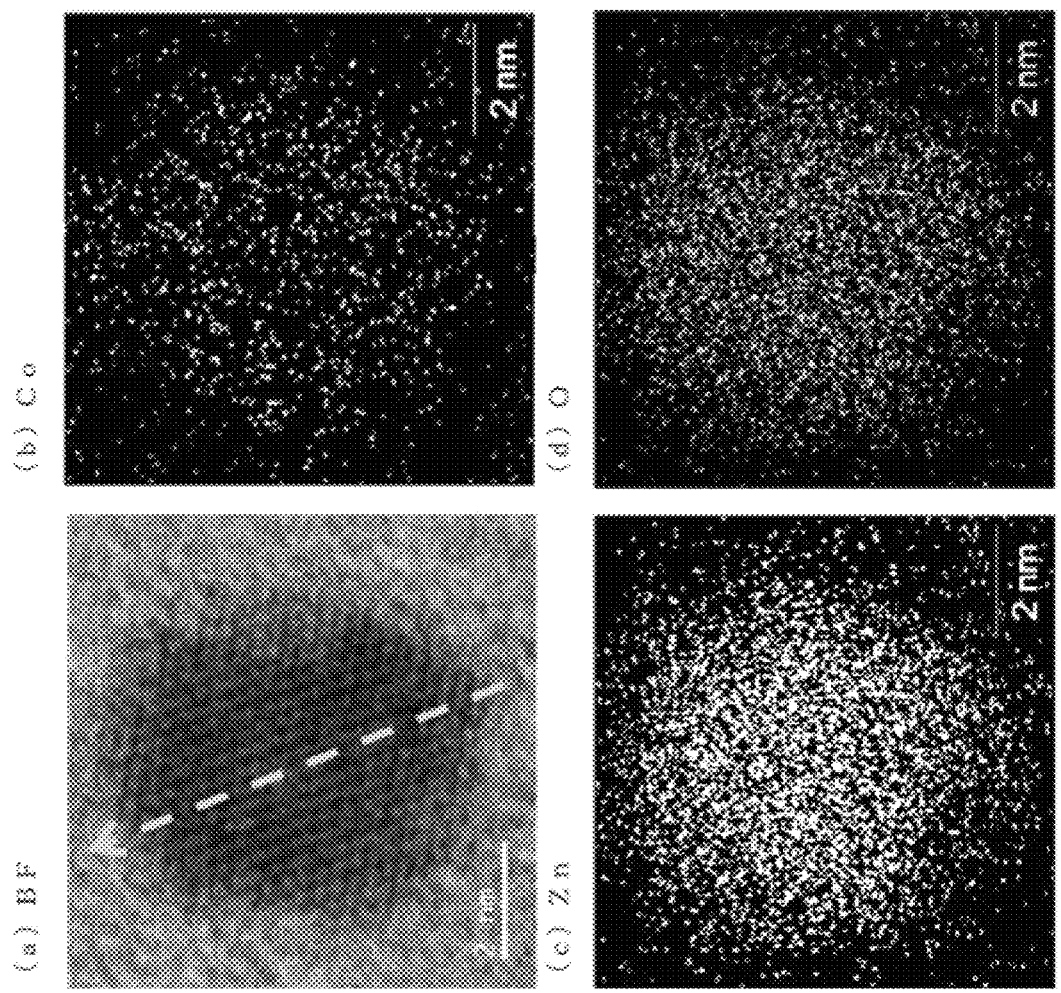
Figure 63:
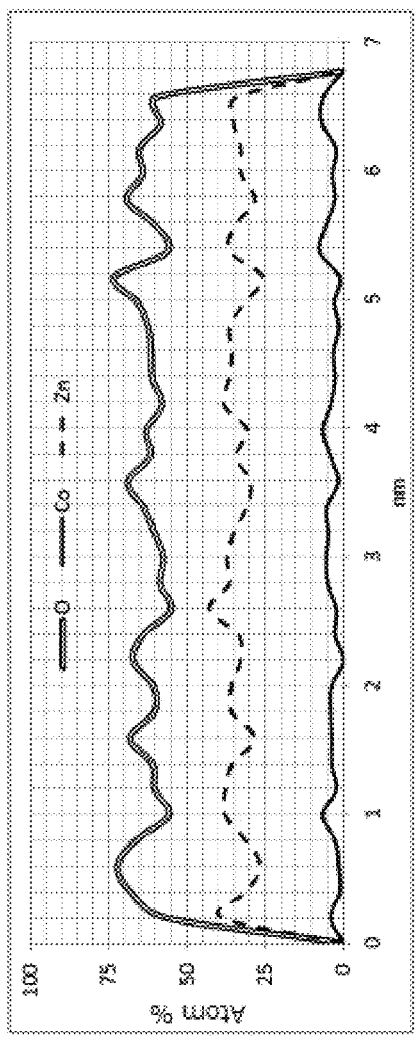
Figure 64:
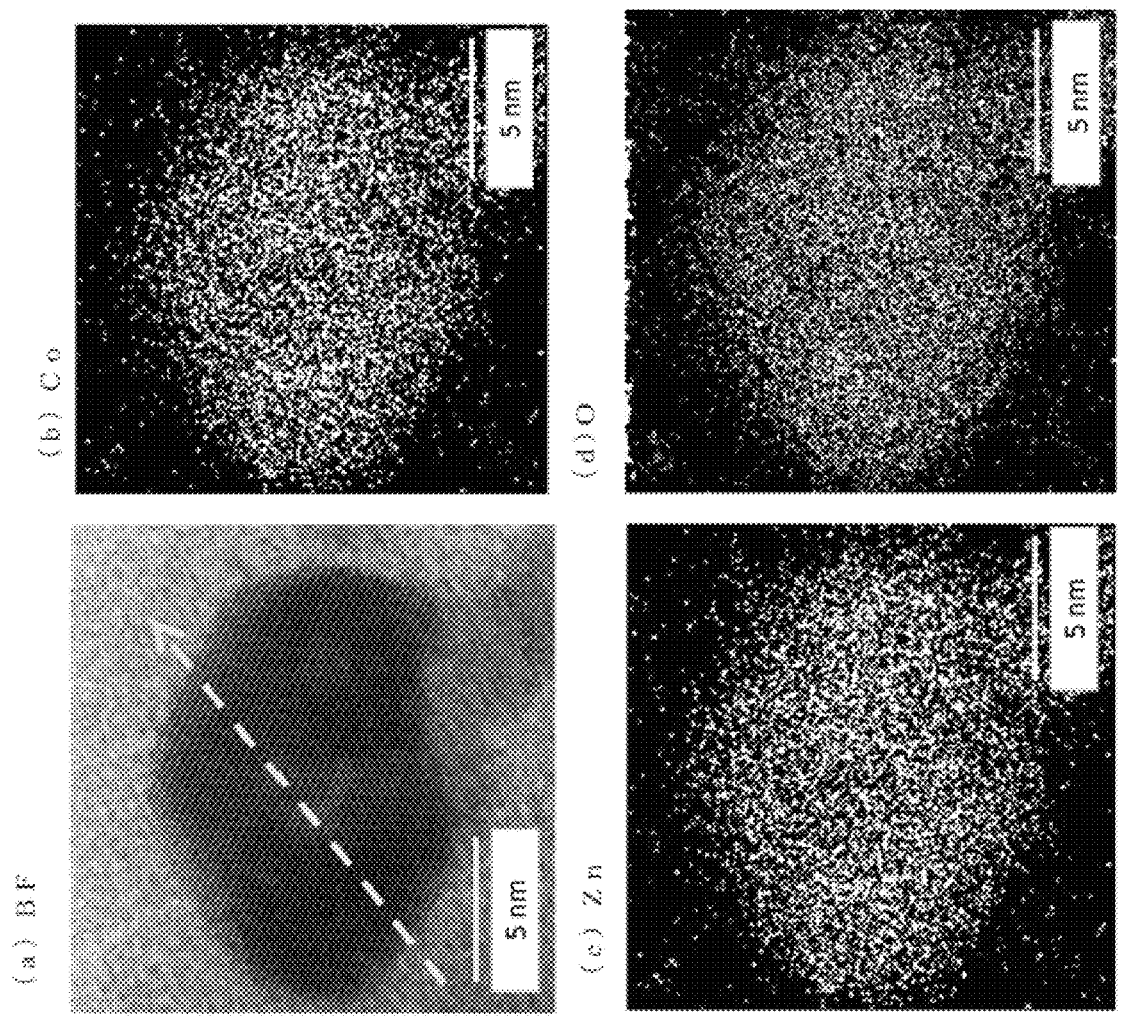
Figure 65:
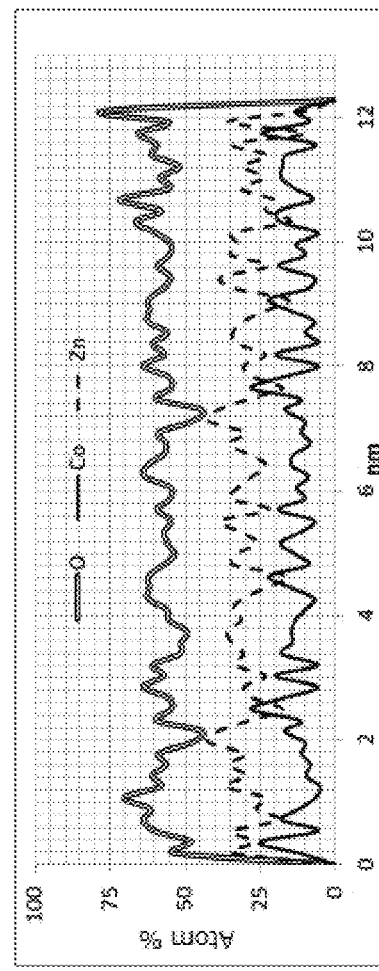

In FIG. 62, the mapping result using the STEM of the cobalt zinc composite oxide particle obtained in Example 9 is shown; and in FIG. 63, the line analysis result at the position of the dotted line in the BF image (bright field image) of FIG. 62 is shown. In FIG. 64, the result of cobalt zinc composite oxide particle obtained in Example 11 is shown; and in FIG. 65, the line analysis result at the position of the dotted line in the BF image (bright field image) of FIG. 64 is shown. As can be seen in FIG. 62 to FIG. 65, in the cobalt zinc composite oxide particles obtained in Example 9 and Example 11, cobalt and zinc were detected in the entire particles, wherein the particle was observed as the cobalt zinc composite oxide particle having the cobalt and zinc distributed uniformly in the solid solution state. In Example 9-2, Example 9-3, Example 10, Example 10-2, Example 10-3, Example 11-2, and Example 11-3 to be mentioned later, the similar particles were also observed.

The cobalt zinc composite oxide particles obtained in Example 9 to Example 11 were subjected to a heat treatment using an electric furnace as the changing treatment of the functional group included in the cobalt zinc composite oxide particle. The heat treatment conditions thereof were: no heat treatment in Example 9, Example 10, and Example 11; 100° C. in Example 9-2, Example 10-2, and Example 11-2; 200° C. in Example 9-3, Example 10-3, and Example 11-3; and 300° C. in Example 9-4, Example 10-4, and Example 11-4, wherein the period of the heat treatment was 30 minutes in all the heat treatment temperatures.

Figure 66:
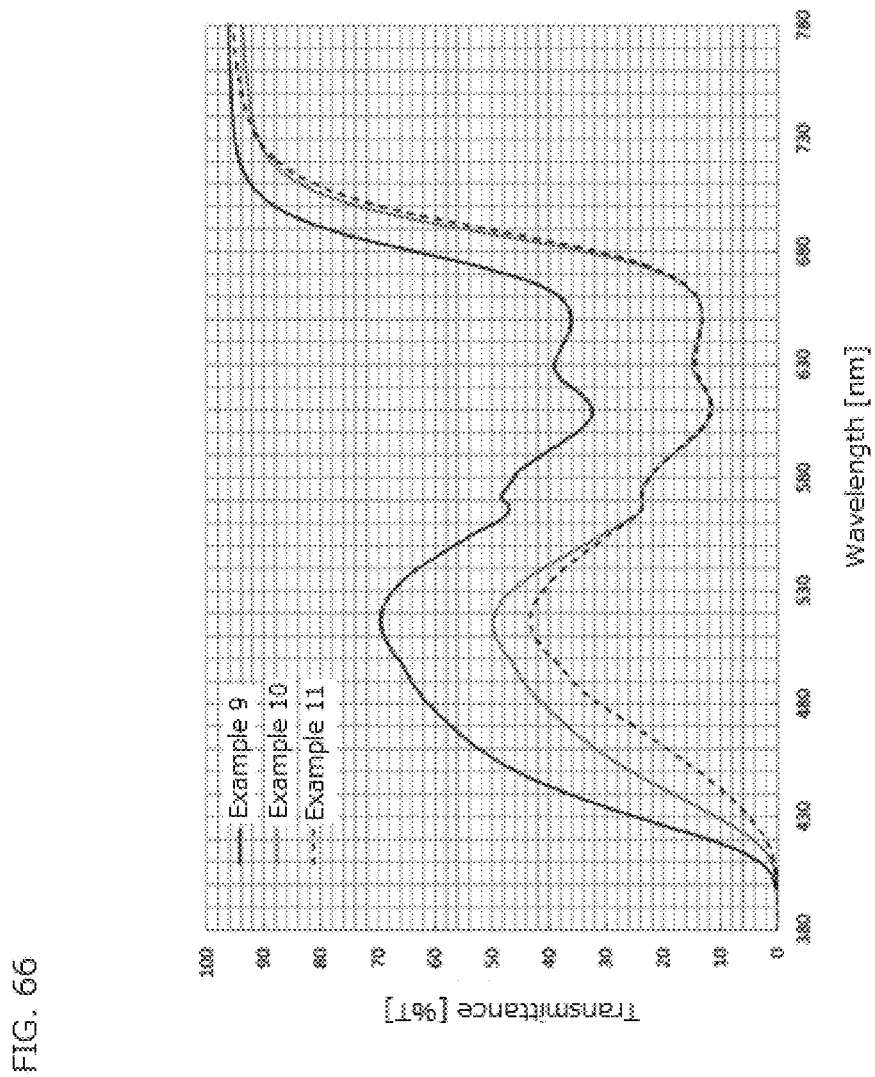
Figure 67:
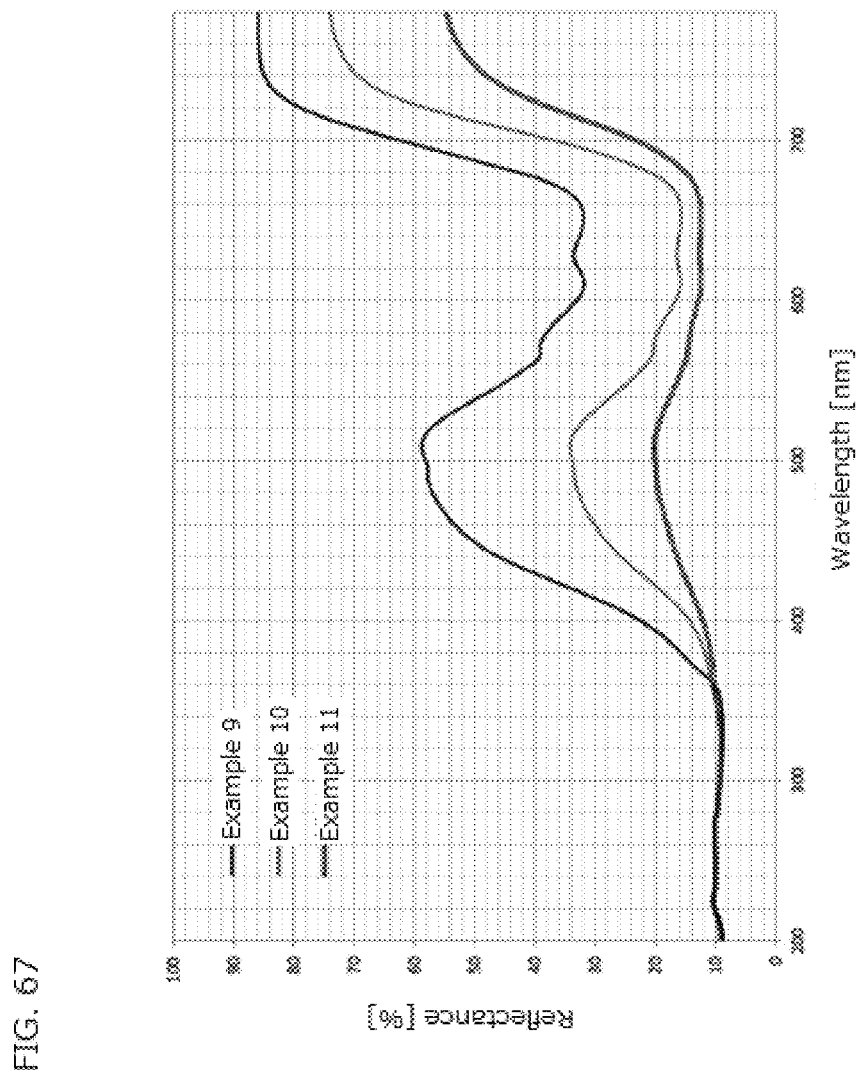

In FIG. 66, the graph of the transmission spectra to the light beam in the wavelength ranging from 380 nm to 780 nm of the dispersion solutions in which the cobalt zinc composite oxide particles obtained in Example 9, Example 10, and Example 11 are dispersed into propylene glycol with the concentration thereof being 0.05% by weight is shown. In FIG. 67, the graph of the reflection spectra to the light beam in the wavelength of 200 nm to 780 nm of the cobalt zinc composite oxide particles powders obtained in Example 9, Example 10, and Example 11 is shown. As can be seen in them, the cobalt zinc composite oxide particles exhibit the color from a light blue color to a green color.

In Table 47, with regard to the cobalt zinc composite oxide particles obtained in Example 9 and Example 9-2 to Example 9-4, in Table 48 with regard to those obtained in Example 10 and Example 10-2 to Example 10-4, and in Table 49 with regard to those obtained in Example 11 and Example 11-2 to Example 11-4, the M-OH bond/M-O bond ratios thereof as well as the average molar coefficients thereof to the light beam in the wavelength of 200 nm to 380 nm are shown, wherein each of the said coefficients was calculated from the absorption spectrum of the dispersion solution in which the cobalt zinc composite oxide particles were dispersed into propylene glycol and the concentration (as ZnO+Co) of the cobalt zinc composite oxide particle in the measurement solution. In addition, for comparison purpose, the results of the zinc oxide particle obtained in Example 5 are also included.

TABLE 47

| | Example | | | | |
|---|---|---|---|---|---|
| | 5 | 9 | 9-2 | 9-3 | 9-4 |
| M—OH bond/M—O bond ratio [%] | 17.6 | 29.3 | 18.6 | 12.3 | 2.3 |
| Average molar absorption coefficient [L/(cm · mol)] (200 nm to 380 nm) | 623 | 781 | 896 | 923 | 999 |

TABLE 48

| | Example | | | | |
|---|---|---|---|---|---|
| | 5 | 10 | 10-2 | 10-3 | 10-4 |
| M—OH bond/M—O bond ratio [%] | 17.6 | 30.2 | 19.2 | 13.3 | 2.2 |
| Average molar absorption coefficient [L/(cm · mol)] (200 nm to 380 nm) | 623 | 779 | 879 | 919 | 987 |

TABLE 49

| | Example | | | | |
|---|---|---|---|---|---|
| | 5 | 11 | 11-2 | 11-3 | 11-4 |
| M—OH bond/M—O bond ratio [%] | 17.6 | 31.1 | 19.3 | 12.9 | 1.8 |
| Average molar absorption coefficient [L/(cm · mol)] (200 nm to 380 nm) | 623 | 772 | 864 | 906 | 979 |

As can be seen in Table 47 to Table 49, in the cobalt zinc composite oxide particle, too, as the M-OH bond/M-O bond ratio is lower, the average molar absorption coefficient to the light beam in the wavelength of 200 nm to 380 nm becomes higher. In the cobalt zinc composite oxide particle, it is preferable that by making the M-OH bond/M-O bond ratio to the range of 1% or more to 33% or less, the average molar absorption coefficient to the light beam in the wavelength of 200 nm to 380 nm be 700 L/(mol·cm) or more. Further, it was found that the cobalt zinc composite oxide particle has a higher molar absorption coefficient to the light beam with the wavelength range of 200 nm to 380 nm as compared with the zinc oxide particle. In addition, because the cobalt zinc composite oxide particle having the M-OH bond/M-O bond ratio controlled expresses a color from a light blue color to a green color, in the case where this is used in a film-like composition for a coating material, a glass, or the like, this can be effectively used for, among other things, transparency or UV beam shielding performance; and in addition, this is suitable for coloring with a blue color or a light blue color.

Example 12 to Example 14

In Example 12 to Example 14, a silicon cobalt zinc composite oxide particle will be described as the oxide particle. By using Clearmix (product name: CLM-2.2S, manufactured by M. Technique Co., Ltd.), which is a high speed rotational dispersion emulsifier, the oxide raw material solution (A-solution), the oxide separating solvent (B-solution), and the silicon compound raw material solution (C-solution) were prepared. Specifically, according to the prescriptions of the oxide raw material solution described in Example 12 to Example 14 of Table 50, each component of the oxide raw material solution were uniformly mixed by stirring for 30 minutes at the preparation temperature of 40° C. by using Clearmix with the rotation number of the rotor thereof being 20000 rpm to obtain the oxide raw material solution. Also, according to the prescriptions of the oxide separating solvent described in Example 12 to Example 14 of Table 50, each component of the oxide separating solvent were uniformly mixed by stirring for 30 minutes at the preparation temperature of 45° C. by using Clearmix with the rotation number of the rotor thereof being 15000 rpm to obtain the oxide separating solvent. Further, according to the prescriptions of the silicon compound raw material solution described in Example 12 to Example 14 of Table 50, each component of the silicon compound raw material solution were uniformly mixed by stirring for 10 minutes at the preparation temperature of 20° C. by using Clearmix with the rotation number of the rotor thereof being 6000 rpm to obtain the silicon compound raw material solution.

Meanwhile, the substances used here and represented by chemical formula or abbreviation described in Table 50 are: EG for ethylene glycol (manufactured by Kishida Chemical Co., Ltd.), $Zn(NO_3)_2 \cdot 6H_2O$ for zinc nitrate hexahydrate (manufactured by Wako Pure Chemical Industries, Ltd.), $Co(NO_3)_2 \cdot 6H_2O$ for cobalt nitrate hexahydrate (manufactured by Wako Pure Chemical Industries, Ltd.), NaOH for sodium hydroxide (manufactured by Kanto Chemical Co., Ltd.), 60 wt % $HNO_3$ for concentrated nitric acid (manufactured by Kishida Chemical Co., Ltd.), and TEOS for tetraethyl orthosilicate (manufactured by Wako Pure Chemical Industries, Ltd.).

Next, the oxide raw material solution, the oxide separating solvent, and the silicon compound raw material solution, which had been prepared as described above, were mixed by using the fluid processing apparatus described in Patent Document 7 that was filed by the applicant of the present invention. The processing method of each fluid and the recovery method of the processed solution were the same as those of Example 1.

In Table 51, similarly to Example 1, operation conditions of the fluid processing apparatus, the average primary particle diameter calculated from the TEM observation result of the silicon cobalt zinc composite oxide particles, and the Si/Co/Zn molar ratio calculated from the TEM-EDS analysis, together with the calculated value thereof from the prescriptions and introduction flow rates of the A-solution, B-solution, and C-solution, are summarized. The measurement of pH, analyses, and washing method of the particle were the same as those of Example 1.

TABLE 50

Prescription of first fluid (A-solution: oxide raw material solution)

| | Prescription (wt %) | | | | | | pH | |
|---|---|---|---|---|---|---|---|---|
| | Raw material | [wt %] | Raw material | [wt %] | Raw material | [wt %] | pH | [° C.] |
| Example 12 | $Zn(NO_3)_2 \cdot 6H_2O$ | 3.0000 | $Co(NO_3)_3 \cdot 6H_2O$ | 0.0447 | EG | 96.955 | 4.21 | 21.9 |
| Example 13 | $Zn(NO_3)_2 \cdot 6H_2O$ | 3.0000 | $Co(NO_3)_3 \cdot 6H_2O$ | 0.3650 | EG | 96.635 | 4.10 | 22.2 |
| Example 14 | $Zn(NO_3) \cdot 6H_2O$ | 3.0000 | $Co(NO_3)_3 \cdot 6H_2O$ | 0.9783 | EG | 96.022 | 3.87 | 23.1 |

Prescription of second fluid (B-solution: oxide separating solvent)

| | Prescription (wt %) | | | | pH | |
|---|---|---|---|---|---|---|
| | Raw material | [wt %] | Raw material | [wt %] | pH | [° C.] |
| Example 12 | NaOH | 9.00 | Pure water | 91.00 | >14 | — |
| Example 13 | NaOH | 9.00 | Pure water | 91.00 | >14 | — |
| Example 14 | NaOH | 9.00 | Pure water | 91.00 | >14 | — |

Prescription of third fluid (C-solution: silicon compound raw material solution)

| | Prescription (wt %) | | | | | | | | pH | |
|---|---|---|---|---|---|---|---|---|---|---|
| | Raw material | [wt %] | Raw material | [wt %] | Raw material | [wt %] | Raw material | [wt %] | pH | [° C.] |
| Example 12 | Pure water | 9.4222 | EG | 90.0000 | 60 wt % $HNO_3$ | 0.0100 | TEOS | 0.5678 | 2.13 | 15.9 |
| Example 13 | Pure water | 9.4222 | EG | 90.0000 | 60 wt % $HNO_3$ | 0.0100 | TEOS | 0.5678 | 2.13 | 15.9 |
| Example 14 | Pure water | 9.4222 | EG | 90.0000 | 60 wt % $HNO_3$ | 0.0100 | TEOS | 0.5678 | 2.13 | 15.9 |

TABLE 51

| | Introduction flow rate (supply flow rate) [mL/min] | | | Introduction temperature (supply temperature) [° C.] | | | Introduction pressure (supply pressure) [MPaG] | | | Ejected solution | | Si/Co/Zn [molar ratio] | | Average primary particle diam. [nm] |
|---|---|---|---|---|---|---|---|---|---|---|---|---|---|---|
| | A-Soln. | B-Soln. | C-Soln. | A-Soln. | B-Soln. | C-Soln. | A-Soln. | B-Soln. | C-Soln. | pH | Temp. [° C.] | [Calculated value] | [EDS] | |
| Example 12 | 400 | 39 | 100 | 160 | 86 | 25 | 0.068 | 0.10 | 0.10 | 10.95 | 20.8 | Si/Co/Zn = 20.7/1.2/78.1 | Si/Co/Zn = 20.7/1.2/78.1 | 9.64 |
| Example 13 | 400 | 40 | 100 | 161 | 85 | 25 | 0.065 | 0.10 | 0.10 | 10.02 | 22.6 | Si/Co/Zn = 19.3/8.1/72.6 | Si/Co/Zn = 19.3/8.1/72.6 | 9.57 |
| Example 14 | 400 | 49 | 100 | 160 | 87 | 25 | 0.071 | 0.10 | 0.10 | 8.34 | 22.3 | Si/Co/Zn = 16.7/20.8/62.5 | Si/Co/Zn = 16.7/20.8/62.5 | 9.34 |

Figure 68:
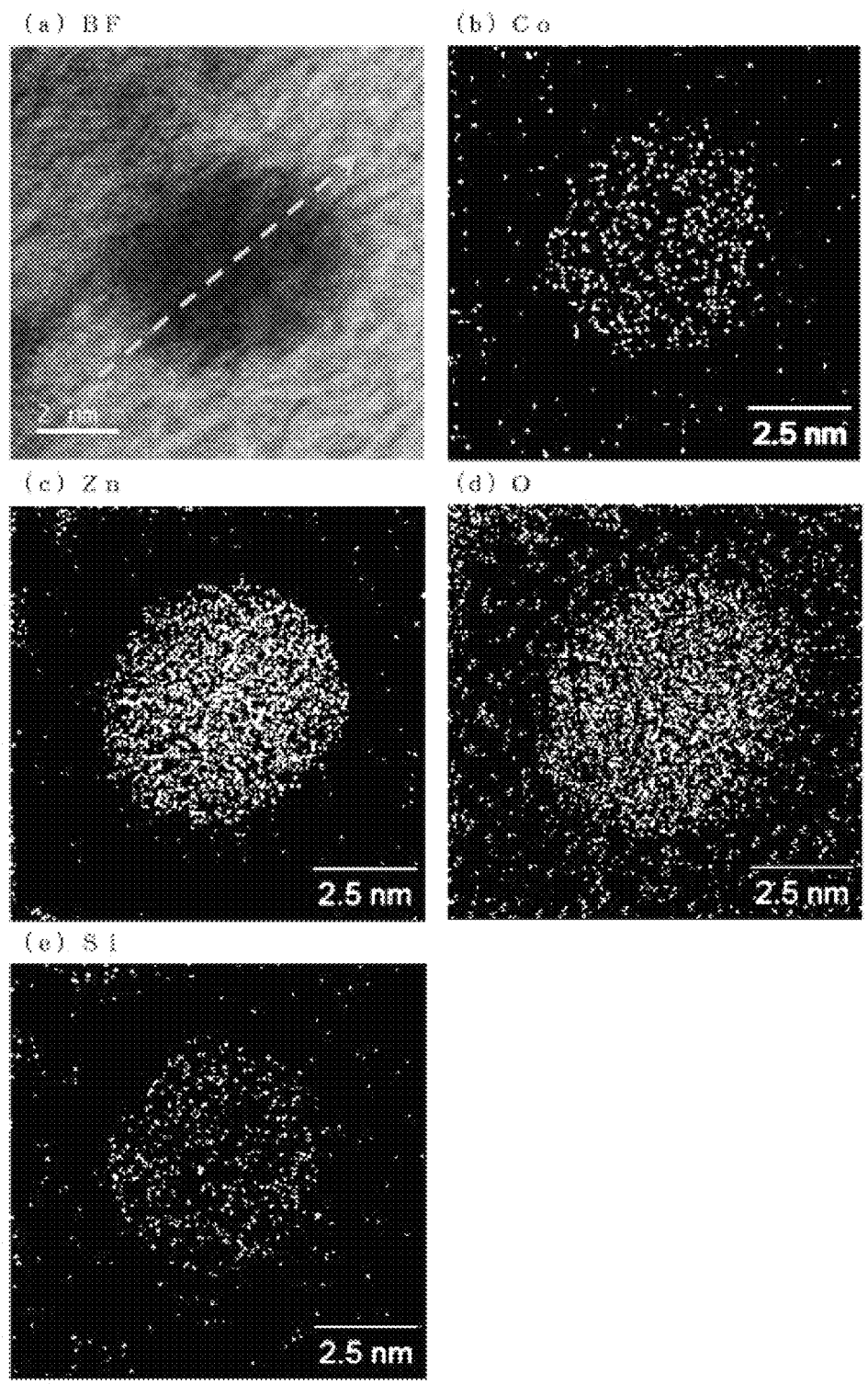
Figure 69:
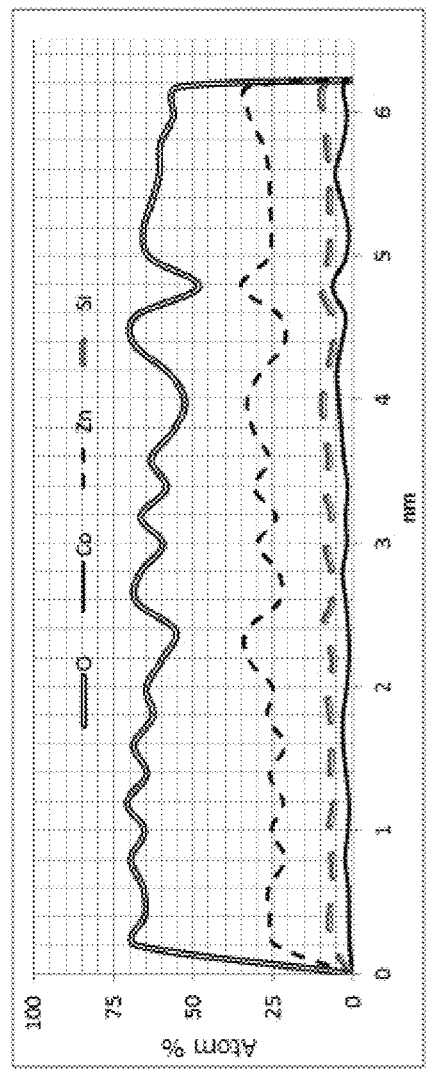

In FIG. 68, the mapping result using the STEM of the silicon cobalt zinc composite oxide particle obtained in Example 13 is shown; and in FIG. 69, the line analysis result at the position of the dotted line in the BF image (bright field image) of FIG. 68 is shown. As can be seen in FIG. 68 and FIG. 69, in the silicon cobalt zinc composite oxide particle obtained in Example 13, silicon, cobalt, zinc, and oxygen were detected in the entire particles, wherein the particle was observed as the silicon cobalt zinc composite oxide particle having the silicon, cobalt, and zinc distributed uniformly in the solid solution state. In Example 12, Example 12-2, Example 12-3, Example 13-2, Example 13-3, Example 14, Example 14-2, and Example 14-3, all of them to be mentioned later, the similar particles were also observed.

The silicon cobalt zinc composite oxide particles obtained in Example 12 to Example 14 were subjected to a heat treatment by using an electric furnace as the changing treatment of the functional group included in the silicon cobalt zinc composite oxide particle. The heat treatment conditions thereof were: no heat treatment in Example 12, Example 13, and Example 14; 100° C. in Example 12-2, Example 13-2, and Example 14-2; 200° C. in Example 12-3, Example 13-3, and Example 14-3; and 300° C. in Example 12-4, Example 13-4, and Example 14-4, wherein the period of the heat treatment was 30 minutes in all the heat treatment temperatures.

Figure 70:
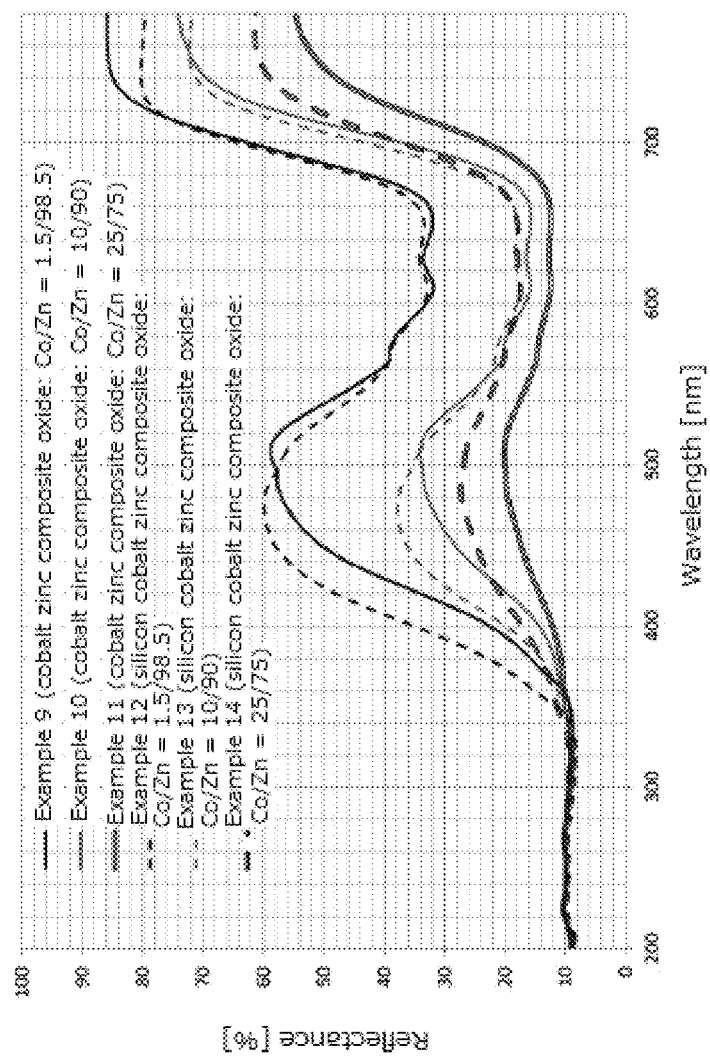

In FIG. 70, the graph of the refection spectra of the silicon cobalt zinc composite oxide particle powders obtained in Example 12, Example 13, and Example 14 to the light beam in the wavelength of 200 nm to 780 nm is shown; and for comparison, the results of the cobalt zinc composite oxide particle powders obtained in Example 9, Example 10, and Example 11 having the same Co/Zn (molar ratio) included therein is also included. As can be seen in them, as compared to the cobalt zinc composite oxide particles (Example 9 to Example 11) which express a light blue color to a green color, in the silicon cobalt zinc composite oxide particles (Example 12 to Example 14), the reflectances to the light beam in the wavelength of 400 nm to 450 nm are higher, so that they develop a blue color more strongly.

In Table 52 with regard to the silicon cobalt zinc composite oxide particles obtained in Example 12 and Example 12-2 to Example 12-4 and the cobalt zinc composite oxide particle of Example 9 including the same Co/Zn (molar ratio) but without silicon therein, in Table 53 with regard to the silicon cobalt zinc composite oxide particles obtained in Example 13 and Example 13-2 to Example 13-4 and the cobalt zinc composite oxide particle of Example 10 including the same Co/Zn (molar ratio) but without silicon therein, and in Table 54 with regard to the silicon cobalt zinc composite oxide particles obtained in Example 14 and Example 14-2 to Example 14-4 and the cobalt zinc composite oxide particle of Example 11 including the same Co/Zn (molar ratio) but without silicon therein, the M-OH bond/M-O bond ratios, and the average molar absorption coefficients to the light beam in the wavelength of 200 nm to 380 nm calculated from the absorption spectra of the dispersion solution in which the silicon cobalt zinc composite oxide particles are dispersed in propylene glycol and the concentration (as ZnO+Co) of the cobalt zinc composite oxide particle in the measurement solution are summarized. For comparison, the results of the zinc oxide particle obtained in Example 5 are also described.

TABLE 52

| | Example | | | | |
|---|---|---|---|---|---|
| | 9 | 12 | 12-2 | 12-3 | 12-4 |
| M—OH bond/M—O bond ratio [%] | 29.3 | 34.6 | 25.9 | 28.6 | 14.2 |
| Average molar absorption coefficient [L/(cm · mol)] (200 nm to 380 nm) | 781 | 849 | 931 | 1009 | 1126 |

TABLE 53

| | Example | | | | |
|---|---|---|---|---|---|
| | 10 | 13 | 13-2 | 13-3 | 13-4 |
| M—OH bond/M—O bond ratio [%] | 30.2 | 35.8 | 26.1 | 22.3 | 13.9 |
| Average molar absorption coefficient [L/(cm · mol)] (200 nm to 380 nm) | 779 | 841 | 925 | 1023 | 1159 |

TABLE 54

| | Example | | | | |
|---|---|---|---|---|---|
| | 11 | 14 | 14-2 | 14-3 | 14-4 |
| M—OH bond/M—O bond ratio [%] | 31.1 | 38.6 | 33.4 | 27.6 | 22.1 |
| Average molar absorption coefficient [L/(cm · mol)] (200 nm to 380 nm) | 772 | 834 | 819 | 1064 | 1202 |

As can be seen in Table 52 to Table 54, in the silicon cobalt zinc composite oxide particle, too, as the M-OH bond/M-O bond ratio of the particle is lower, the average molar absorption coefficient to the light beam in the wavelength of 200 nm to 380 nm is higher. In the silicon cobalt zinc composite oxide particle, it is preferable that by making the M-OH bond/M-O bond ratio to the range of 13% or more to 40% or less, the average molar absorption coefficient to the light beam in the wavelength of 200 nm to 380 nm be 800 L/(mol·cm) or more. Further, it was found that the silicon compound-coated cobalt zinc composite oxide particle has a higher molar absorption coefficient to the light beam in the wavelength of 200 nm to 380 nm as compared with the cobalt zinc composite oxide particle. In addition, because the silicon cobalt zinc composite oxide particle having the M-OH bond/M-O bond ratio controlled expresses a color from a light blue color to a blue (bluish green) color, in the case when this is used in a film-like composition for a coating material, a glass, or the like, this can be effectively used for, among other things, transparency or UV beam shielding performance; and in addition, this is suitable for coloring with a blue color or a light blue color.

Accordingly, the production method of oxide particles according to the present invention enabled to finely and strictly control the color characteristics of the oxide particles. Therefore, when these oxide particles are used in a coating composition or a film-like composition, the transmission, absorption, hue, saturation, and molar absorption coefficient to the light beam region of UV, visible, and near infrared can be strictly controlled; and thus, when they are applied to a skin of a human body, texture and beauty appearance are not impaired; and when they are used in a coated body, or used in a film-like form for a glass or the like, a human body or a coated body can be protected from a UV or an infrared beam without impairing a designability.

The invention claimed is:

1. A method for producing an oxide particle, comprising: changing a ratio of an M-OH bond which is a bond between an element (M) and a hydroxide group (OH) by a changing treatment of a functional group included in the oxide particle, color characteristics of the oxide particle being controlled by changing the M-OH bond ratio, where the element (M) is one element or plural different elements other than oxygen or hydrogen included in the oxide particle selected from metal oxide particles and semi-metal oxide particles, wherein the M-OH bond ratio is a ratio of an area of a peak derived from the M-OH bond separated in wave shape in a wave number range of 800 $cm^{-1}$ to 1250 $cm^{-1}$ to a total area of peaks obtained by wave shape separation of peaks in a wave number range of 100 $cm^{-1}$ to 1250 $cm^{-1}$ in an infrared spectrum of the oxide particle measured with a total reflection method (ATR method).

2. The method for producing the oxide particle according to claim 1, wherein the color characteristics are any of reflectance, transmittance, molar absorption coefficient, hue, or saturation.

3. The method for producing the oxide particle according to claim 1, wherein the changing treatment of the functional group is any of a substitution reaction, an addition reaction, an elimination reaction, a dehydration reaction, a condensation reaction, or an oxidation reaction.

4. The method for producing the oxide particle according to claim 1, wherein the changing treatment of the functional group is an esterification treatment.

5. The method for producing the oxide particle according to claim 1, wherein the M-OH bond ratio is controlled under a state of a dispersion body in which the oxide particle is dispersed in a dispersion medium.

6. The method for producing the oxide particle according to claim 5, wherein the dispersion body is a film, and the color characteristics of the oxide particle are controlled by a heat treatment of the dispersion body.

7. The method for producing the oxide particle according to claim 1, wherein the M-OH bond ratio is controlled by using a dispersion solution reformation apparatus equipped with a removal unit using a filtration membrane.

8. The method for producing the oxide particle according to claim 1, wherein the oxide particle is an oxide particle in which at least part of a surface of a single oxide particle or of a surface of an agglomerate formed by agglomeration of plural oxide particles is coated with a silicon compound.

9. The method for producing the oxide particle according to claim 1, wherein a particle diameter of the oxide particle or the agglomerate of the oxide particles is 1 nm or more and 50 nm or less.

10. The method for producing the oxide particle according to claim 1, wherein by controlling the M-OH bond ratio to be low, an average reflectance to the light beam with the wavelength range of 780 nm to 2500 nm is controlled to be high.

11. The method for producing the oxide particle according to claim 1, wherein by controlling the M-OH bond ratio to be low, an average molar absorption coefficient to the light beam with the wavelength range of 190 nm to 380 nm is controlled to be high.

12. A method for producing an oxide particle, comprising: changing an M-OH bond/M-O bond ratio, which is a ratio of an M-OH bond between an element (M) and a hydroxide group (OH) to a ratio of an M-O bond between the element (M) and oxygen (O) by a changing treatment of a functional group included in the oxide particle, color characteristics of the oxide particle being controlled by changing the M-OH bond/M-O bond ratio, where the element (M) is one element or plural different elements other than oxygen or hydrogen included in the oxide particle selected from metal oxide particles and semi-metal oxide particles.

13. The method for producing the oxide particle according to claim 12, wherein the M-OH bond ratio is a ratio of an area of a peak derived from the M-OH bond separated in wave shape in a wave number range of 800 $cm^{-1}$ to 1250 $cm^{-1}$ to a total area of peaks obtained by wave shape separation of peaks in a wave number range of 100 $cm^{-1}$ to 1250 $cm^{-1}$ in an infrared spectrum of the oxide particle measured with a total reflection method (ATR method).

14. The method for producing the oxide particle according to claim 12, wherein the M-O bond ratio is a ratio of an area of a peak derived from the M-O bond separated in wave shape in a wave number range of 100 $cm^{-1}$ or more to less than 800 $cm^{-1}$ to a total area of peaks obtained by wave shape separation of peaks in a wave number range of 100 $cm^{-1}$ to 1250 $cm^{-1}$ in an infrared spectrum of the oxide particle measured with a total reflection method (ATR method), wherein the M-OH bond ratio is a ratio of an area of a peak derived from the M-OH bond separated in wave shape in a wave number range of 800 $cm^{-1}$ to 1250 $cm^{-1}$ to a total area of peaks obtained by wave shape separation of peaks in a wave number range of 100 $cm^{-1}$ to 1250 $cm^{-1}$ in an infrared spectrum of the oxide particle measured with a total reflection method (ATR method), and the color characteristics are controlled by controlling the M-OH bond/M-O bond ratio.

15. The method for producing the oxide particle according to claim 12, wherein the color characteristics are any of reflectance, transmittance, molar absorption coefficient, hue, or saturation.

16. The method for producing the oxide particle according to claim 12, wherein the changing treatment of the functional group is any of a substitution reaction, an addition reaction, an elimination reaction, a dehydration reaction, a condensation reaction, or an oxidation reaction.

17. The method for producing the oxide particle according to claim 12, wherein the M-OH bond/M-O bond ratio is controlled under a state of a dispersion body in which the oxide particle is dispersed in a dispersion medium.

18. The method for producing the oxide particle according to claim 12, wherein the oxide particle is an oxide particle in which at least part of a surface of a single oxide particle or of a surface of an agglomerate formed by agglomeration of plural oxide particles is coated with a silicon compound.

* * * * *